June 3, 1952 C. E. BROOKS ET AL 2,599,357

AUTOMATIC TELEPHONE BILLING SYSTEM

Filed Feb. 23, 1946 78 Sheets-Sheet 1

INVENTORS C.E.BROOKS W.W.CARPENTER

BY C. Mattice

ATTORNEY

AUTOMATIC TELEPHONE BILLING SYSTEM

INVENTORS C.E.BROOKS
W.W.CARPENTER
BY C. Mattice
ATTORNEY

INVENTORS C.E.BROOKS
W.W.CARPENTER
BY C. Mattice
ATTORNEY

June 3, 1952 C. E. BROOKS ET AL 2,599,357

AUTOMATIC TELEPHONE BILLING SYSTEM

Filed Feb. 23, 1946 78 Sheets-Sheet 4

INVENTORS C. E. BROOKS
W. W. CARPENTER
BY C. Mattice
ATTORNEY

AUTOMATIC TELEPHONE BILLING SYSTEM

Filed Feb. 23, 1946 78 Sheets-Sheet 5

INVENTORS C.E.BROOKS
W.W.CARPENTER
BY C. Mattice
ATTORNEY

INVENTORS C. E. BROOKS
W. W. CARPENTER
BY C. Mattice
ATTORNEY

June 3, 1952 C. E. BROOKS ET AL 2,599,357

AUTOMATIC TELEPHONE BILLING SYSTEM

Filed Feb. 23, 1946 78 Sheets-Sheet 7

INVENTORS C. E. BROOKS
W. W. CARPENTER
BY C. Mattice
ATTORNEY

June 3, 1952 C. E. BROOKS ET AL 2,599,357

AUTOMATIC TELEPHONE BILLING SYSTEM

Filed Feb. 23, 1946 78 Sheets-Sheet 8

INVENTORS C.E.BROOKS
W.W.CARPENTER
BY C. Mattice
ATTORNEY

INVENTORS C.E. BROOKS
W. W. CARPENTER
BY C. Mattice
ATTORNEY

June 3, 1952 C. E. BROOKS ET AL 2,599,357

AUTOMATIC TELEPHONE BILLING SYSTEM

Filed Feb. 23, 1946 78 Sheets-Sheet 10

INVENTORS C. E. BROOKS
W. W. CARPENTER
BY C. Mattice
ATTORNEY

AUTOMATIC TELEPHONE BILLING SYSTEM

Filed Feb. 23, 1946 78 Sheets-Sheet 11

INVENTORS C.E. BROOKS
W. W. CARPENTER
BY C. Mattice
ATTORNEY

AUTOMATIC TELEPHONE BILLING SYSTEM

INVENTORS C.E.BROOKS
W.W.CARPENTER
BY C. Mattice
ATTORNEY

INVENTORS C. E. BROOKS
W. W. CARPENTER
BY C. Mattice
ATTORNEY

INVENTORS C. E. BROOKS
W. W. CARPENTER
BY C. Mattice
ATTORNEY

INVENTORS C.E.BROOKS
W.W.CARPENTER
BY C. Mattice
ATTORNEY

INVENTORS C. E. BROOKS
W. W. CARPENTER
BY C. Mattice
ATTORNEY

INVENTORS C.E.BROOKS
W.W.CARPENTER
BY C. Mattice
ATTORNEY

June 3, 1952 C. E. BROOKS ET AL 2,599,357

AUTOMATIC TELEPHONE BILLING SYSTEM

Filed Feb. 23, 1946 78 Sheets-Sheet 18

INVENTORS C.E. BROOKS W. W. CAPPENTER

BY C. Mattice

ATTORNEY

INVENTORS C. E. BROOKS
W. W. CARPENTER
BY C. Mattice
ATTORNEY

INVENTORS C.E.BROOKS
W.W.CARPENTER
BY C. Mattice
ATTORNEY

AUTOMATIC TELEPHONE BILLING SYSTEM

INVENTORS C. E. BROOKS W. W. CARPENTER

BY C. Mattice

ATTORNEY

INVENTORS C. E. BROOKS
W. W. CARPENTER
BY C. Mattice
ATTORNEY

INVENTORS C.E. BROOKS
W.W. CARPENTER
BY C. Mattice
ATTORNEY

June 3, 1952 C. E. BROOKS ET AL 2,599,357

AUTOMATIC TELEPHONE BILLING SYSTEM

Filed Feb. 23, 1946 78 Sheets-Sheet 24

INVENTORS C.E. BROOKS
W. W. CARPENTER
BY C. Mattice
ATTORNEY

June 3, 1952 C. E. BROOKS ET AL 2,599,357

AUTOMATIC TELEPHONE BILLING SYSTEM

Filed Feb. 23, 1946 78 Sheets-Sheet 25

INVENTORS C. E. BROOKS
W. W. CARPENTER
BY C. Mattice
ATTORNEY

INVENTORS C.E.BROOKS
W.W.CARPENTER
BY C. Mattice
ATTORNEY

AUTOMATIC TELEPHONE BILLING SYSTEM

Filed Feb. 23, 1946 78 Sheets-Sheet 27

INVENTORS C.E. BROOKS
W. W. CARPENTER
BY C. Mattice
ATTORNEY

INVENTORS C.E.BROOKS
W.W.CARPENTER
BY C. Mattice
ATTORNEY

INVENTORS C. E. BROOKS
W. W. CARPENTER
BY C. Mattice
ATTORNEY

June 3, 1952 C. E. BROOKS ET AL 2,599,357

AUTOMATIC TELEPHONE BILLING SYSTEM

Filed Feb. 23, 1946 78 Sheets-Sheet 30

INVENTORS: C. E. BROOKS
W. W. CARPENTER

BY C. Mattice

ATTORNEY

INVENTORS C.E.BROOKS
W.W.CARPENTER
BY C. Mattice
ATTORNEY

INVENTORS C. E. BROOKS
W. W. CARPENTER
BY C. Mattice
ATTORNEY

INVENTORS C.E.BROOKS
W.W.CARPENTER
BY C. Mattice
ATTORNEY

AUTOMATIC TELEPHONE BILLING SYSTEM

INVENTORS C. E. BROOKS W. W. CARPENTER

BY C. Mattice

ATTORNEY

INVENTORS C. E. BROOKS
W. W. CARPENTER
BY C. Mattice
ATTORNEY

AUTOMATIC TELEPHONE BILLING SYSTEM

Filed Feb. 23, 1946 78 Sheets-Sheet 36

INVENTORS C. E. BROOKS
W. W. CARPENTER
BY C. Mattice
ATTORNEY

INVENTORS C. E. BROOKS
W. W. CARPENTER
BY C. Mattice
ATTORNEY

INVENTORS C. E. BROOKS
W. W. CARPENTER
BY C. Mattice
ATTORNEY

June 3, 1952 C. E. BROOKS ET AL 2,599,357

AUTOMATIC TELEPHONE BILLING SYSTEM

Filed Feb. 23, 1946 78 Sheets-Sheet 39

INVENTORS C. E. BROOKS W. W. CARPENTER

BY C. Mattice

ATTORNEY

June 3, 1952 C. E. BROOKS ET AL 2,599,357

AUTOMATIC TELEPHONE BILLING SYSTEM

Filed Feb. 23, 1946 78 Sheets-Sheet 40

INVENTORS C. E. BROOKS
W. W. CARPENTER
BY C. Mattice
ATTORNEY

INVENTORS C.E. BROOKS
W.W. CARPENTER
BY C. Mallice
ATTORNEY

AUTOMATIC TELEPHONE BILLING SYSTEM

Filed Feb. 23, 1946 78 Sheets-Sheet 42

INVENTORS C.E.BROOKS W.W.CARPENTER

BY C. Mathee

ATTORNEY

INVENTORS C.E.BROOKS
W.W.CARPENTER
BY C. Mattice
ATTORNEY

INVENTORS C. E. BROOKS
W. W. CARPENTER
BY C. Mattice
ATTORNEY

INVENTORS C.E.BROOKS
W.W.CARPENTER
BY C. Mattice
ATTORNEY

June 3, 1952 C. E. BROOKS ET AL 2,599,357

AUTOMATIC TELEPHONE BILLING SYSTEM

Filed Feb. 23, 1946 78 Sheets-Sheet 46

INVENTORS C. E. BROOKS
W. W. CARPENTER
BY C. Mattice
ATTORNEY

June 3, 1952 C. E. BROOKS ET AL 2,599,357

AUTOMATIC TELEPHONE BILLING SYSTEM

Filed Feb. 23, 1946 78 Sheets-Sheet 47

INVENTORS C. E. BROOKS
W. W. CARPENTER

BY C. Mattice

ATTORNEY

June 3, 1952 C. E. BROOKS ET AL 2,599,357

AUTOMATIC TELEPHONE BILLING SYSTEM

Filed Feb. 23, 1946 78 Sheets-Sheet 48

INVENTORS C. E. BROOKS
W. W. CARPENTER
BY C. Mattice
ATTORNEY

AUTOMATIC TELEPHONE BILLING SYSTEM

Filed Feb. 23, 1946 78 Sheets-Sheet 49

INVENTORS C. E. BROOKS
W. W. CARPENTER
BY C. Mattice
ATTORNEY

INVENTORS C. E. BROOKS
W. W. CARPENTER
BY C. Mattice
ATTORNEY

AUTOMATIC TELEPHONE BILLING SYSTEM

Filed Feb. 23, 1946 78 Sheets-Sheet 51

INVENTORS.
C. E. BROOKS
W. W. CARPENTER
BY C. Mattice
ATTORNEY

INVENTORS:
C. E. BROOKS
W. W. CARPENTER
BY C. Mattice
ATTORNEY

June 3, 1952 C. E. BROOKS ET AL 2,599,357

AUTOMATIC TELEPHONE BILLING SYSTEM

Filed Feb. 23, 1946 78 Sheets-Sheet 53

INVENTORS C. E. BROOKS
W. W. CARPENTER
BY C. Mattice

ATTORNEY

INVENTORS C. E. BROOKS
W. W. CARPENTER
BY C. Mattice
ATTORNEY

June 3, 1952 C. E. BROOKS ET AL 2,599,357

AUTOMATIC TELEPHONE BILLING SYSTEM

Filed Feb. 23. 1946 78 Sheets-Sheet 55

INVENTORS C.E.BROOKS
W.W.CARPENTER
BY C. Mattice
ATTORNEY

June 3, 1952 C. E. BROOKS ET AL 2,599,357

AUTOMATIC TELEPHONE BILLING SYSTEM

Filed Feb. 23, 1946 78 Sheets-Sheet 56

INVENTORS C. E. BROOKS
W. W. CARPENTER
BY C. Mattice
ATTORNEY

June 3, 1952 C. E. BROOKS ET AL 2,599,357

AUTOMATIC TELEPHONE BILLING SYSTEM

Filed Feb. 23, 1946 78 Sheets-Sheet 57

INVENTORS C. E. BROOKS
W. W. CARPENTER
BY C. Mattice
ATTORNEY

INVENTORS C. E. BROOKS
W. W. CARPENTER
BY C. Mattice
ATTORNEY

June 3, 1952 C. E. BROOKS ET AL 2,599,357

AUTOMATIC TELEPHONE BILLING SYSTEM

Filed Feb. 23, 1946 78 Sheets-Sheet 59

INVENTORS C. E. BROOKS
W. W. CARPENTER
BY C. Mattice
ATTORNEY

INVENTORS C.E. BROOKS
W. W. CARPENTER
BY C. Mattice
ATTORNEY

June 3, 1952 C. E. BROOKS ET AL 2,599,357

AUTOMATIC TELEPHONE BILLING SYSTEM

Filed Feb. 23, 1946 78 Sheets-Sheet 61

INVENTORS C. E. BROOKS
W. W. CARPENTER
BY C. Mattice

ATTORNEY

INVENTORS C. E. BROOKS
W. W. CARPENTER
BY C. Mattice
ATTORNEY

INVENTORS C. E. BROOKS
W. W. CARPENTER
BY C. Mattice
ATTORNEY

INVENTORS C. E. BROOKS
W. W. CARPENTER
BY C. Mattice
ATTORNEY

June 3, 1952 C. E. BROOKS ET AL 2,599,357

AUTOMATIC TELEPHONE BILLING SYSTEM

Filed Feb. 23, 1946 78 Sheets-Sheet 65

INVENTORS C.E.BROOKS
W.W.CARPENTER
BY C. Mattice

ATTORNEY

INVENTORS C.E. BROOKS
W. W. CARPENTER
BY C. Mattice
ATTORNEY

INVENTORS C.E.BROOKS
W.W.CARPENTER
BY C. Mattice
ATTORNEY

INVENTORS C.E.BROOKS
W.W.CARPENTER
BY C. Mathieu
ATTORNEY

INVENTORS
C. E. BROOKS
W. W. CARPENTER
BY C. Mattice
ATTORNEY

INVENTORS C.E.BROOKS
W.W.CARPENTER
BY C. Mattice
ATTORNEY

INVENTORS C. E. BROOKS
W. W. CARPENTER
BY C. Mattice
ATTORNEY

INVENTORS C.E.BROOKS
W.W.CARPENTER
BY C. Mattice
ATTORNEY

INVENTORS C.E.BROOKS
W.W.CARPENTER
BY C. Mattice
ATTORNEY

June 3, 1952 C. E. BROOKS ET AL 2,599,357

AUTOMATIC TELEPHONE BILLING SYSTEM

Filed Feb. 23, 1946 78 Sheets-Sheet 74

INVENTORS C. E. BROOKS
W. W. CARPENTER

BY C. Mattice

ATTORNEY

INVENTORS C. E. BROOKS
W. W. CARPENTER
BY C. Mattice
ATTORNEY

INVENTORS C.E.BROOKS
W.W.CARPENTER
BY C. Mattice
ATTORNEY

June 3, 1952 C. E. BROOKS ET AL 2,599,357

AUTOMATIC TELEPHONE BILLING SYSTEM

Filed Feb. 23, 1946 78 Sheets-Sheet 77

INVENTORS C. E. BROOKS
W. W. CARPENTER

BY C. Mattice

ATTORNEY

INVENTORS C. E. BROOKS
W. W. CARPENTER
BY C. Mattice
ATTORNEY

Patented June 3, 1952 2,599,357

UNITED STATES PATENT OFFICE 2,599,357

AUTOMATIC TELEPHONE BILLING SYSTEM

Chester E. Brooks, Montvale, N. J., and Warren W. Carpenter, Garden City, N. Y., assignors to Bell Telephone Laboratories, Incorporated, New York, N. Y., a corporation of New York Application February 23, 1946, Serial No. 649,584

32 Claims. (Cl. 179—7.1)

This invention relates to telephone systems and more particularly to systems in which connections are established by automatic switching mechanisms.

In such systems various methods of charging for service have been employed. Certain subscribers have been charged a flat rate for calls to a local area and have been obliged to call in an operator for calls outside that area, for which additional charges are made and for some of which a ticket must be prepared. Other subscribers have been provided with a message register, which is operated one or more times for each call in the local area. Such subscribers may also dial calls into a limited toll area for which their message register is operated a plurality of times, but these subscribers also require the services of a toll operator for calls outside that area.

It has been proposed heretofore to eliminate the services of the toll operator on calls to toll points which are not too remotely removed from the dial switching exchange area by providing facilities for automatically printing the information which may be required for billing purposes, that is, the calling and called subscribers' line identifications, the time and date when the call was made and the length of the conversation.

This has been done in two ways, one in which the information is stored in a circuit, individualized to the call, which stores the calling and called line identifications, measures the elapsed time and, at the end of the call, seizes a ticket printer and causes a ticket to be printed. The other method employs a tape perforator common to a group of subscribers, which records each of the items of the calls made by the various subscribers on the tape as the items become available. The information is entered by punching holes in the tape in accordance with a code and the tape is later passed through an analyzing process which produces group and individual tapes and finally the toll tickets.

The present invention relates to an improvement in the latter type of toll charging arrangement, particularly as applied to the cross bar dial system.

In a cross bar dial office, subscribers' lines are not arranged according to any numerical system, but according to traffic requirements, a number group frame being employed in connection with terminating calls by which control equipment, receiving the called line number, may test and determine the location of the wanted line. In the case of originating calls, the calling line is connected with a district junctor and to an idle sender by means of line link and sender link switches which are operated under the control of common control circuits.

The line link control circuit serves one line frame on which appear from one hundred to seven hundred lines, arranged in groups of ten each served by an individual switch. The switches are arranged in ten horizontal levels each of which may contain one to seven switches. The line link control circuit identifies the line to be served by a series of preference circuits which identify the horizontal level containing the switch serving the calling line, the vertical position of the switch in the level and the position of the line in the switch. This control circuit then selects a group of district junctors on a district frame capable of extending the call and connects with a sender link control circuit individual to the selected district frame.

The sender link control circuit then identifies the group of junctors selected by the line link control circuit, selects an idle junctor to extend the call, selects an idle sender to control the extension of the connection and brings about the operation of the line link and sender link switches to connect together the calling line, the district junctor and the sender, whereupon both control circuits are released to serve other calls.

In accordance with the present invention means is provided to identify a calling line in accordance with its posiiton on the line frame. More specifically means is provided to identify a calling line, by the frame, the coordinate position of the switch serving the line on the frame and by the position of the line in the switch.

According to another feature of the invention means is provided to register the calling line identity in the control circuit which operates the line switches, during the association of that circuit with the calling line and to transfer this registration to a recorder prior to the release of the control circuit. In addition means is provided to place the release of the control circuit under the control of the recorder.

Since the line identification is wiped out with the release of the control circuit, means is provided to include the identity of the district junctor to which the line has been extended in the record made of the calling line identity, and to include the identity of the district junctor in each of the subsequent records made in connection with the same call.

More specifically, means is provided to associate the recorder with the district junctor connected with a calling line, each time that a record is to be made. Furthermore, the association between the recorder and the district junctor might be initiated by either the recorder or the district junctor, according to the type of record to be made. The district junctor is a name for a type of circuit path, transmission circuit, or trunk over which a talking connection is established, or in the case of incompleted calls, attempted to be established, these terms being used interchangeably.

Three types of records are made, namely, the calling line number, with its class, etc., the called line number and the time at which the call is answered and terminated.

When a calling line number is to be recorded, the recorder is seized by the control circuit and in turn connects with the selected district junctor. When the called line number is to be recorded the recorder and district junctor are connected together under the control of the called number register. When the time is to be recorded the connection between the district junctor and the recorder is initiated by the district junctor.

A further feature of the invention lies in a called number register, operated from the sender, effective to transmit the entire number to the recorder or only the code digits in accordance with the type of charge to be made and to modify the operation of the recorder in accordance with the number of digits to be transmitted.

These and other features of the invention will be more clearly understood from a consideration of the following description, taken in connection with the accompanying drawings, in which:

Fig. 1 shows the manner in which

Fig. 1A shows the arrangement of Figs. 2 and 3;

Figs. 2 and 3 are a schematic showing of the equipment employed, while

Figs. 4 to 78 are a detailed showing of the circuits used in carrying out the invention, of which Figs. 4 to 7 show the switches used for measuring time;

Figs. 75 to 78 show the called number register.

It may be noted that relays identified by the same reference characters appear in more than one figure. In such cases the number of the figure in parentheses has been added to the reference character in the specification.

The switching and control circuits disclosed in these figures are essentially the same as those disclosed and claimed in Patent 2,235,803 to W. W. Carpenter, March 18, 1941, to which reference is made for a more complete description thereof.

GENERAL DESCRIPTION

Figures 1, 1A:
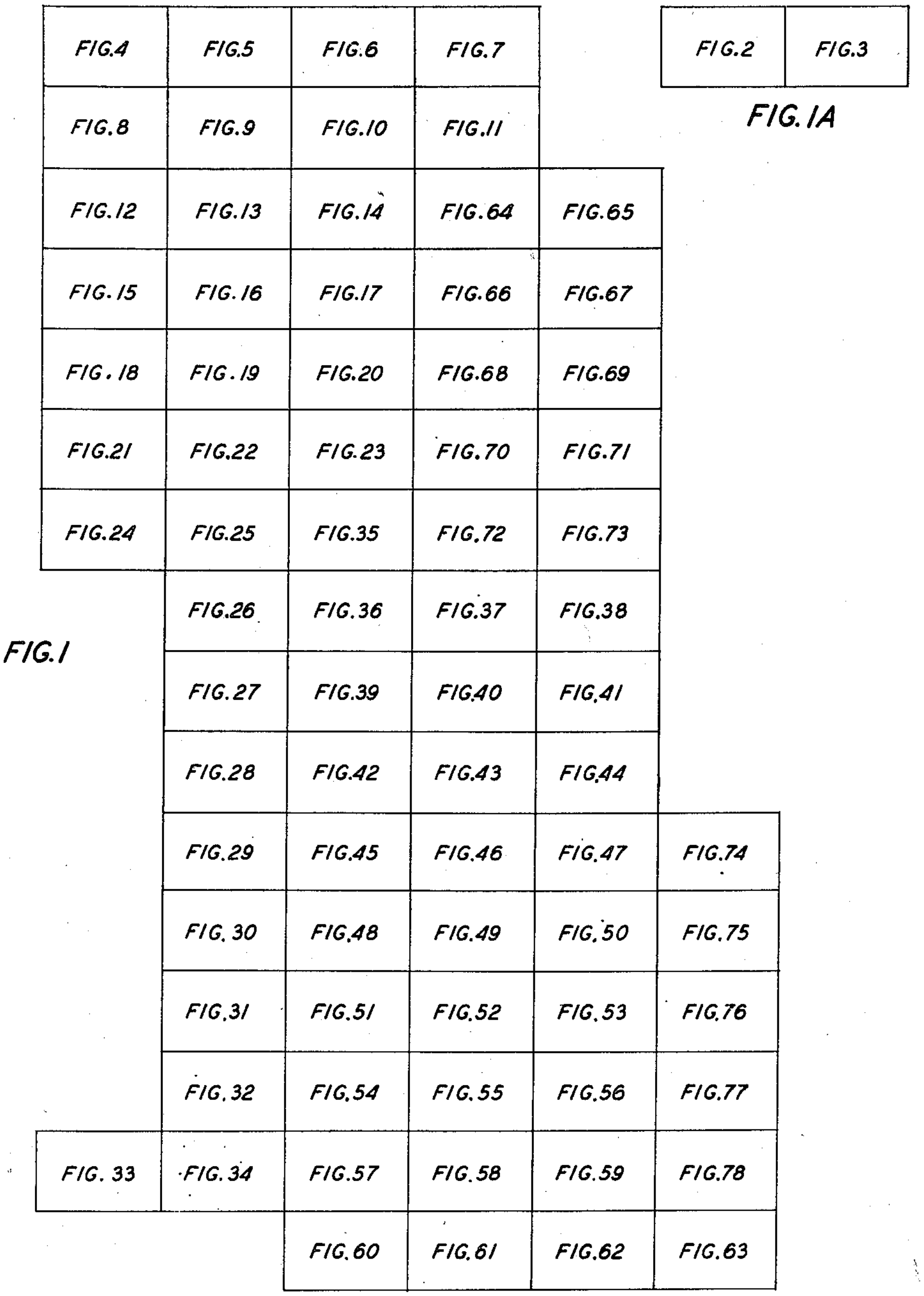
Figure 2:
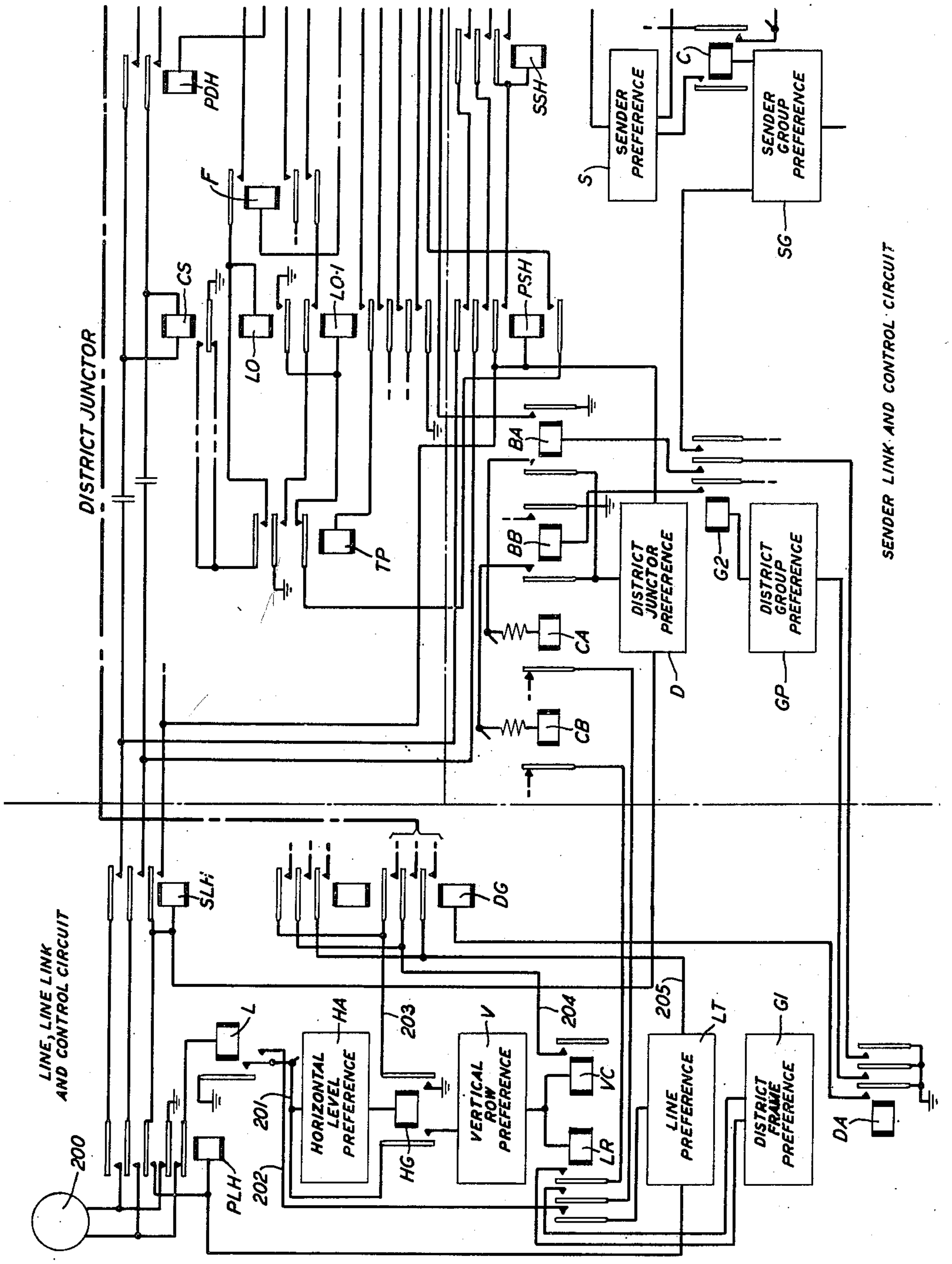
Figure 3:
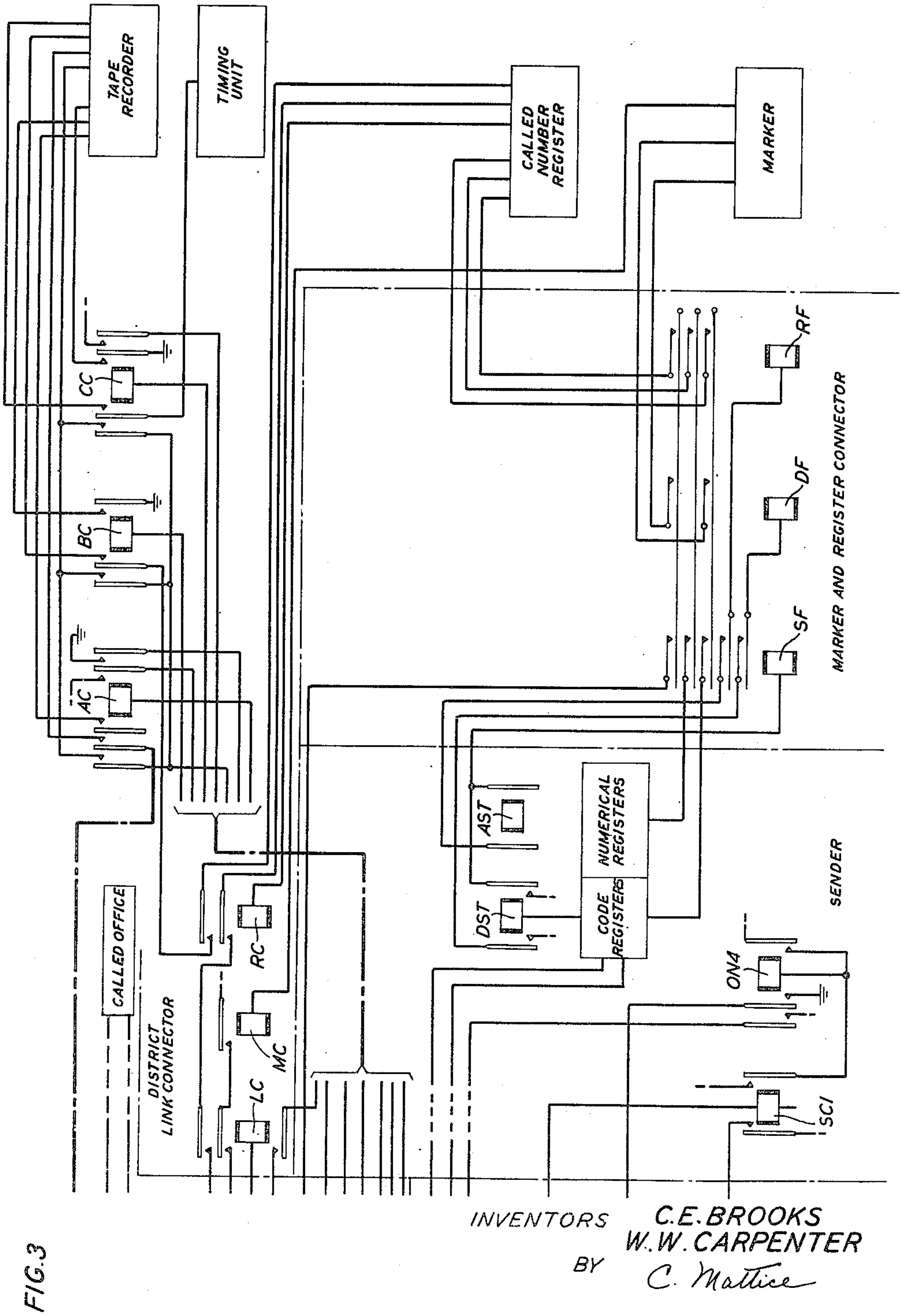
Figure 4:
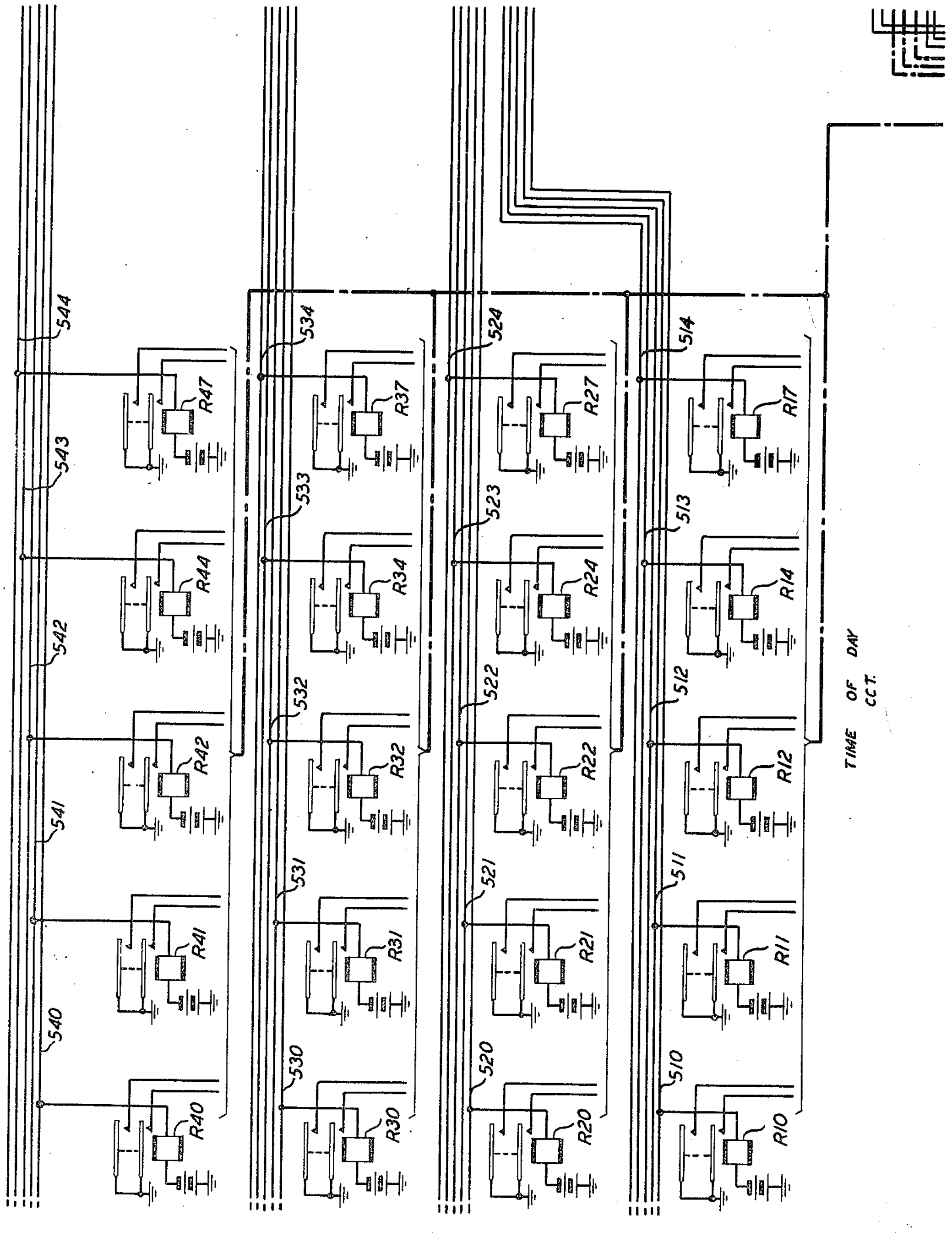
Figs. 4 to 78 are to be arranged.
Figure 5:
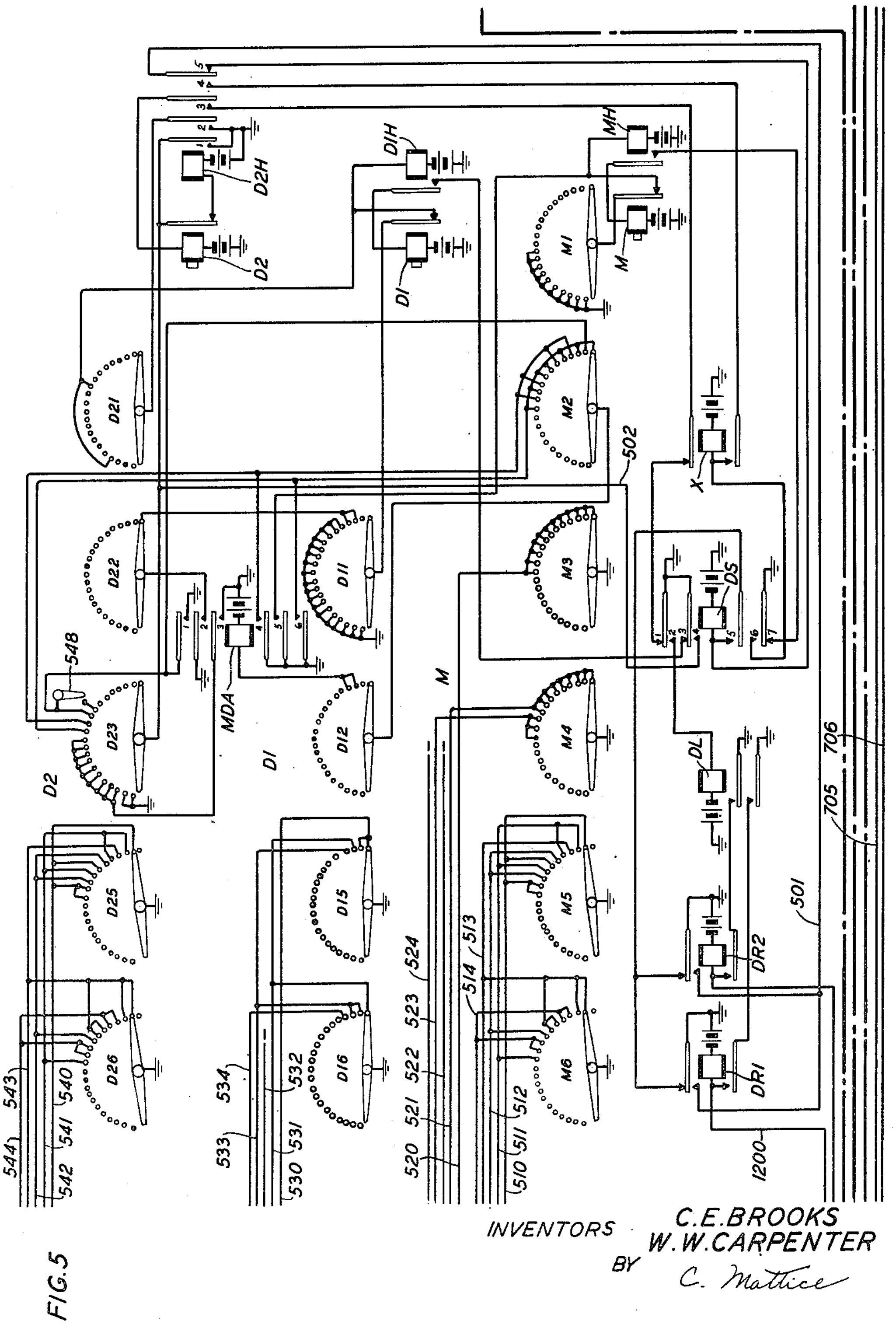
Figure 6:
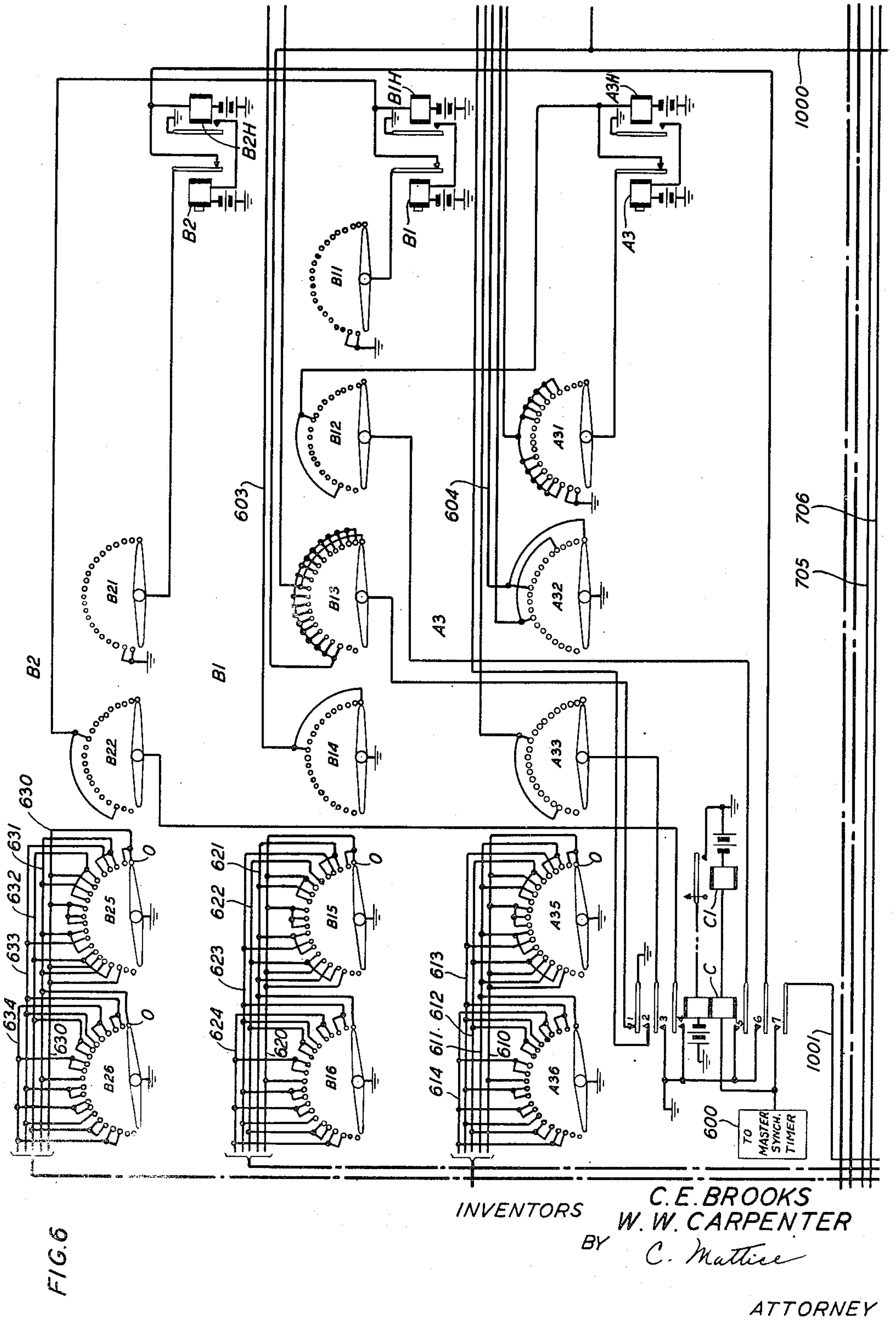
Figure 7:
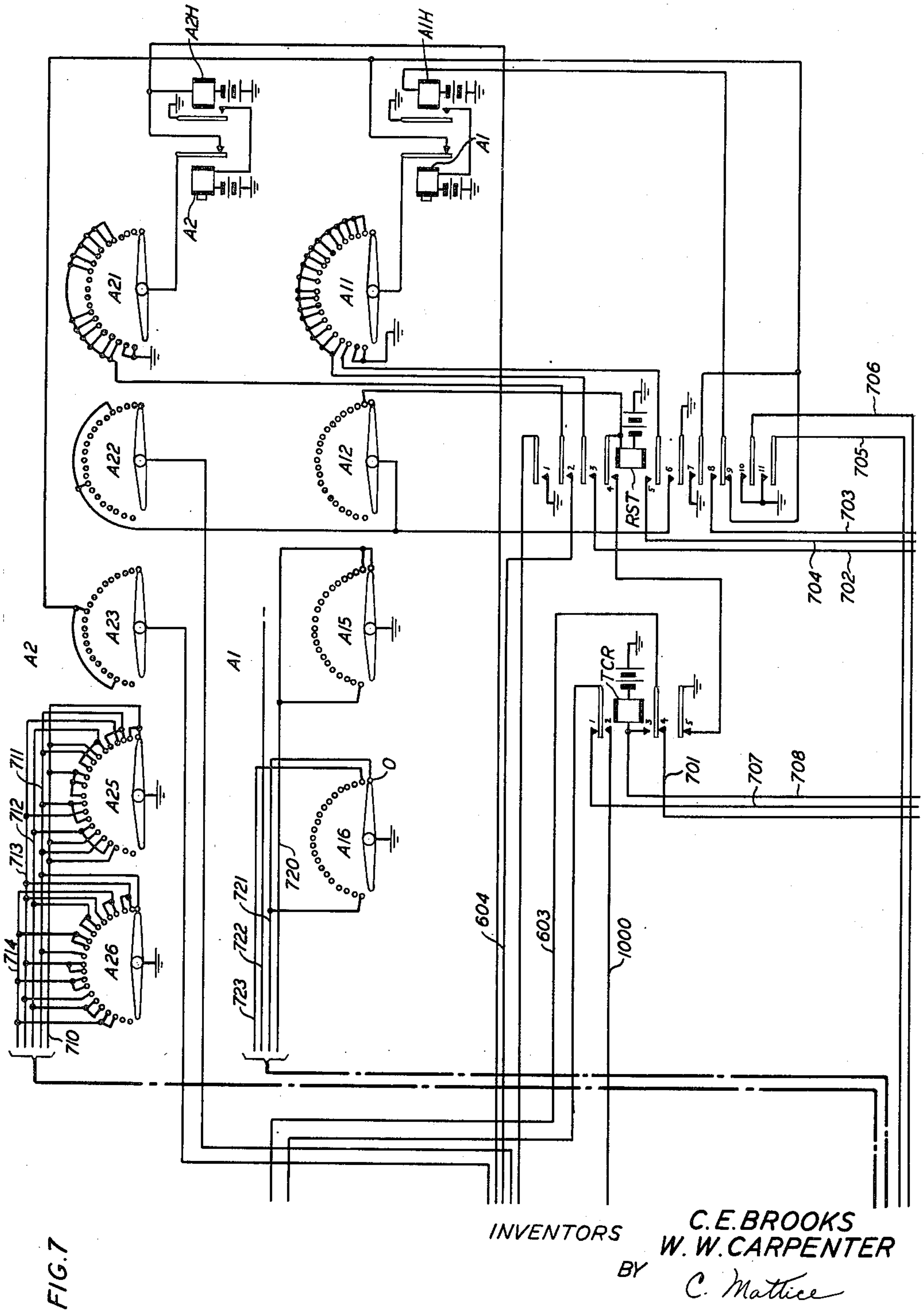
Figure 8:
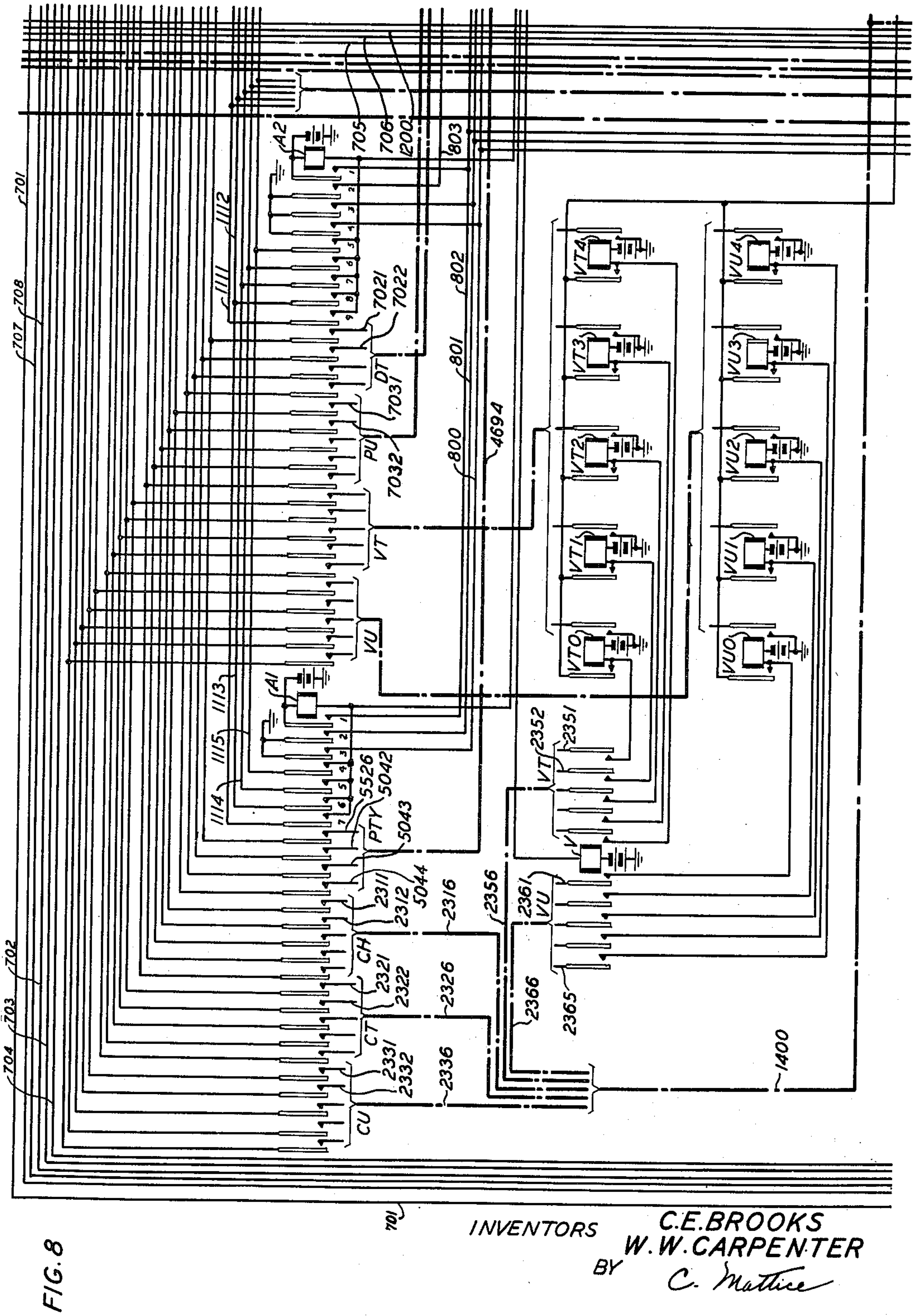
Figs. 8 to 13 show one tape recorder.
Figure 9:
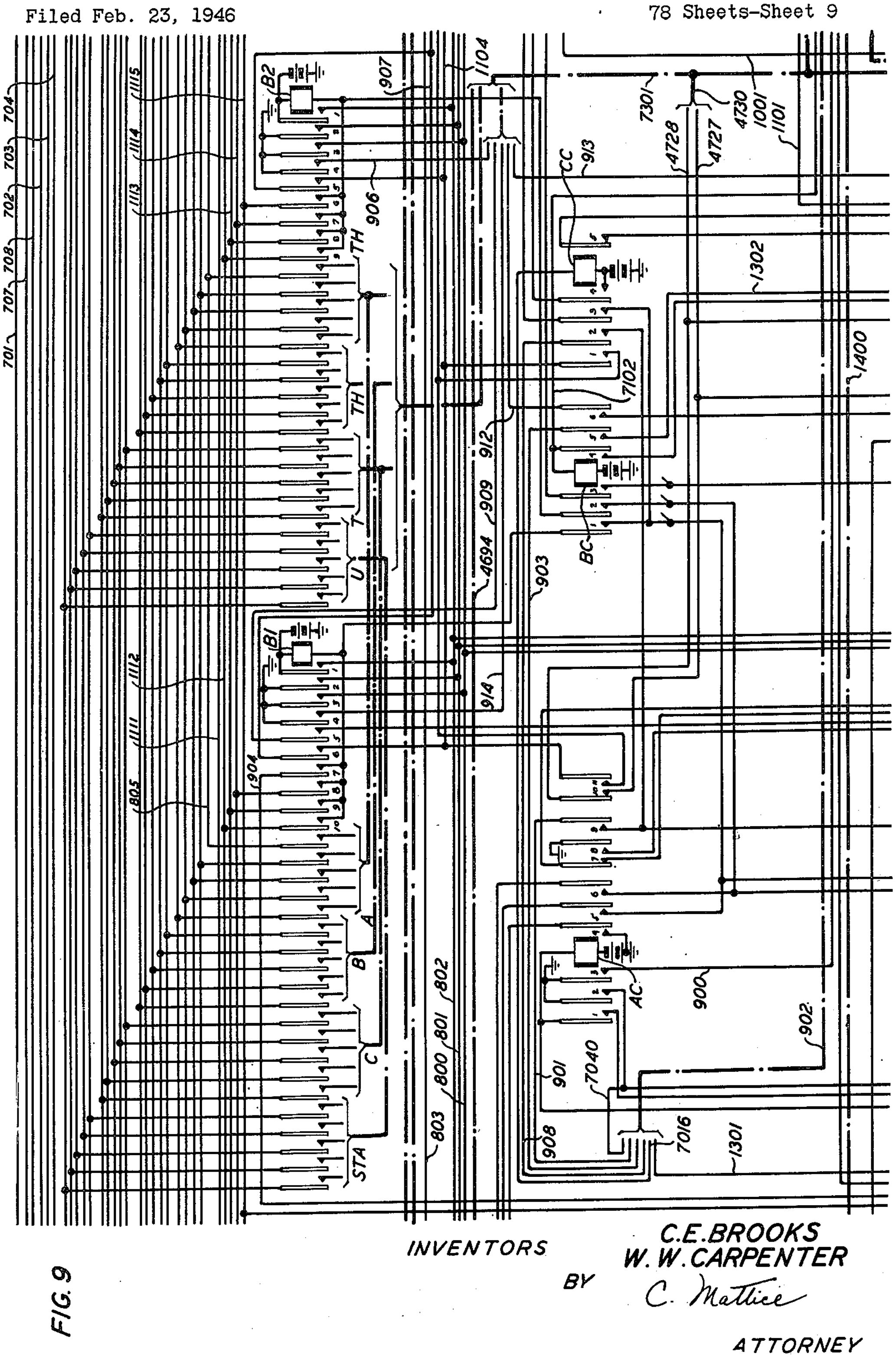
Figure 10:
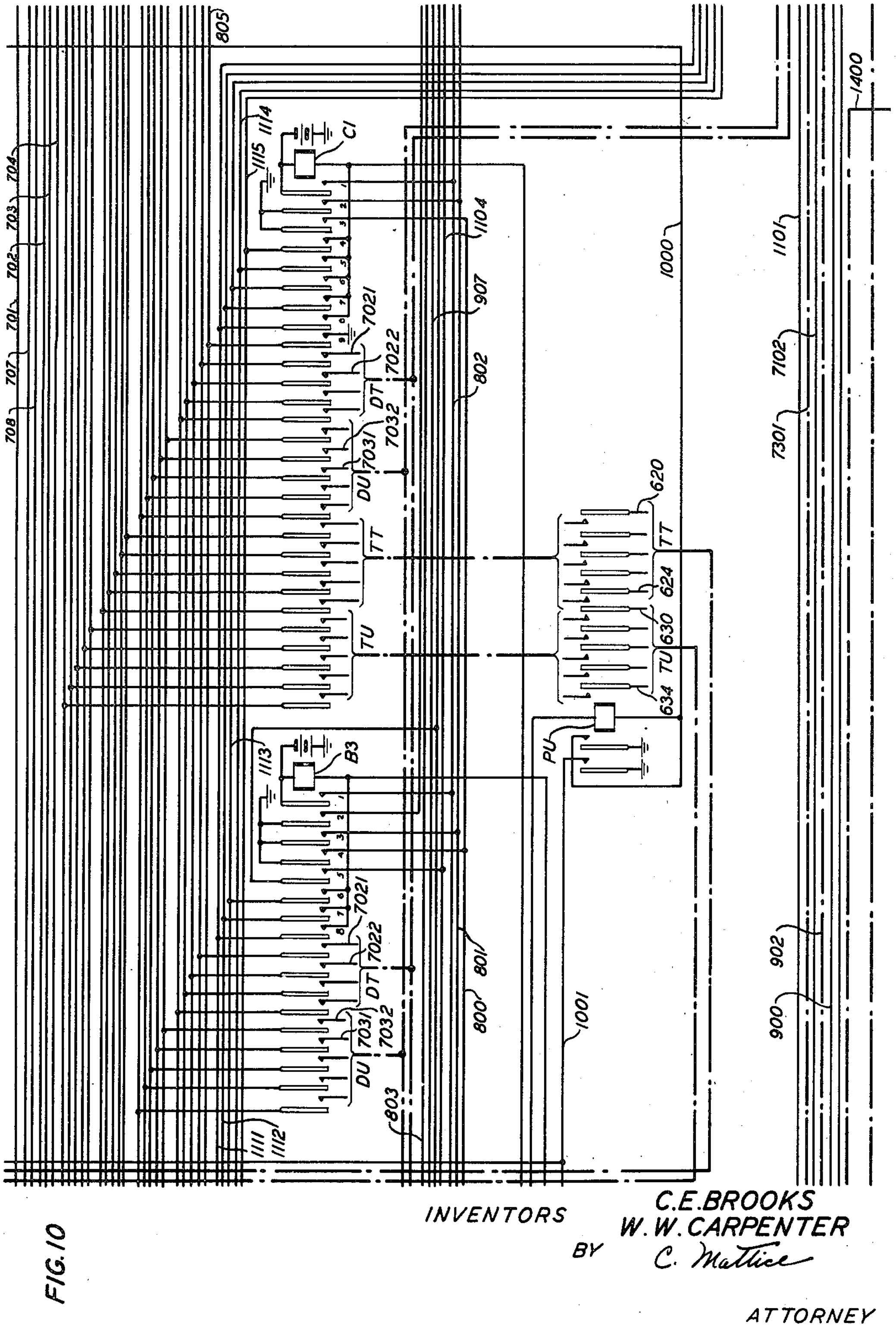
Figure 11:
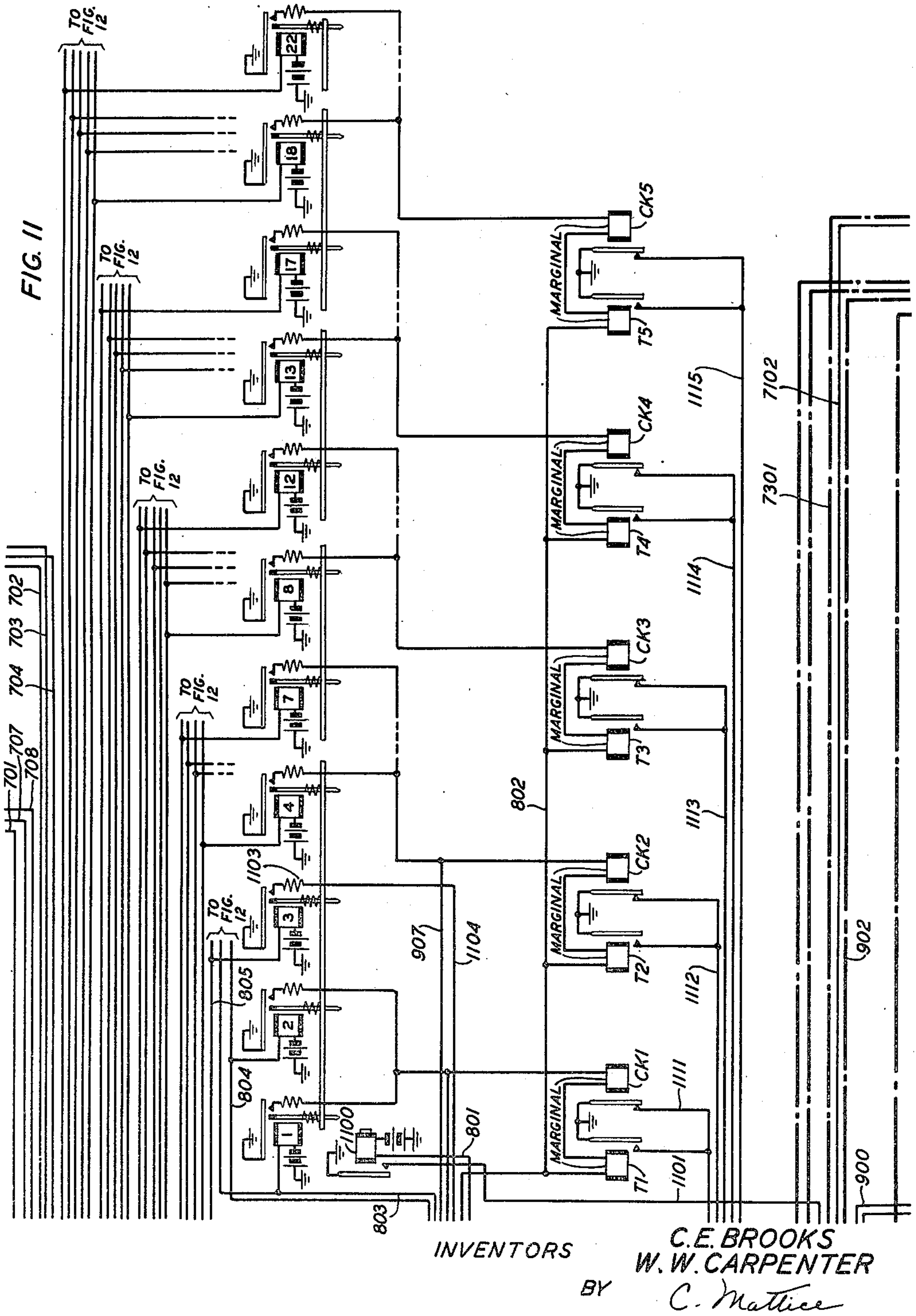
Figure 12:
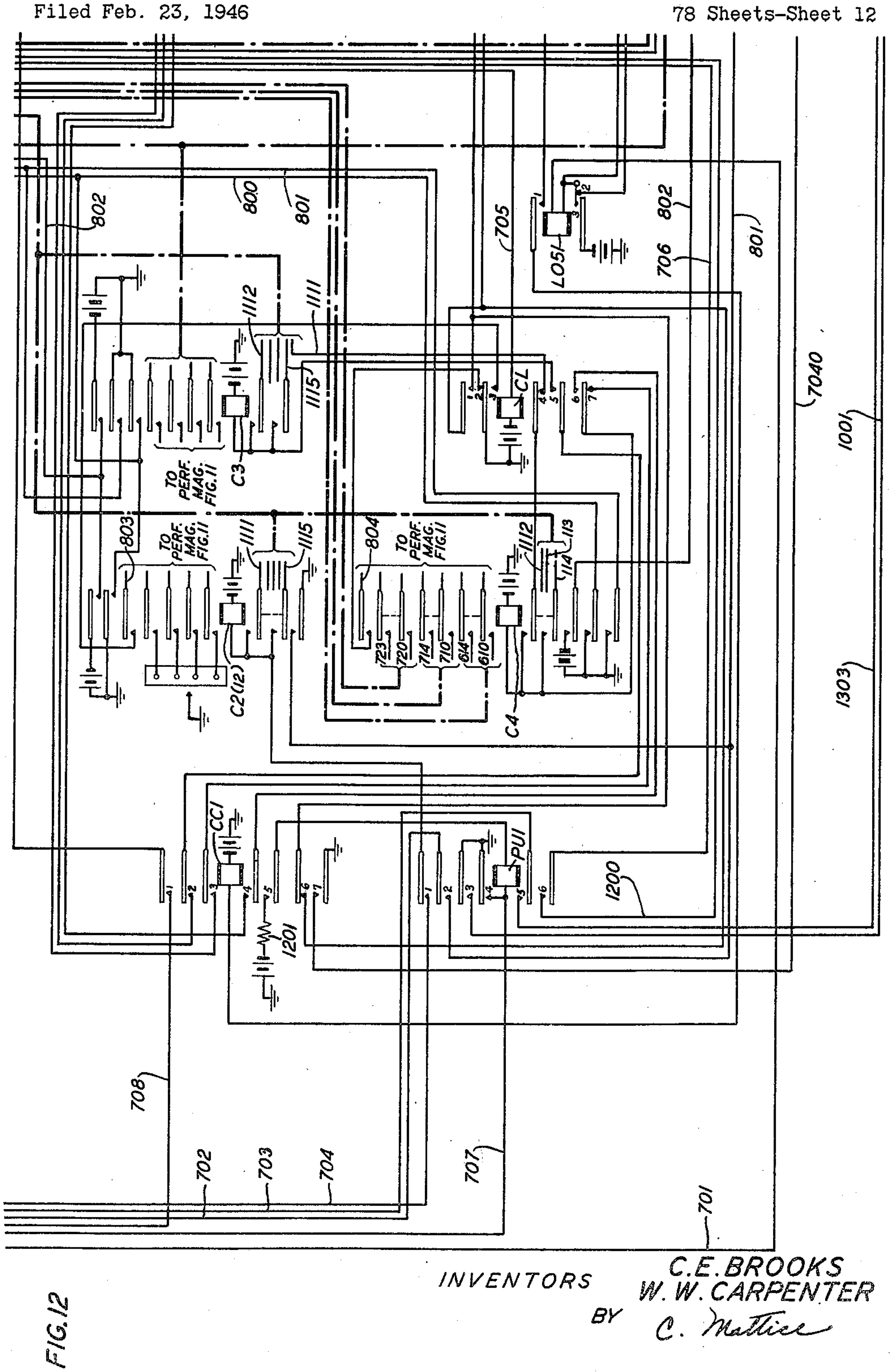
Figure 13:
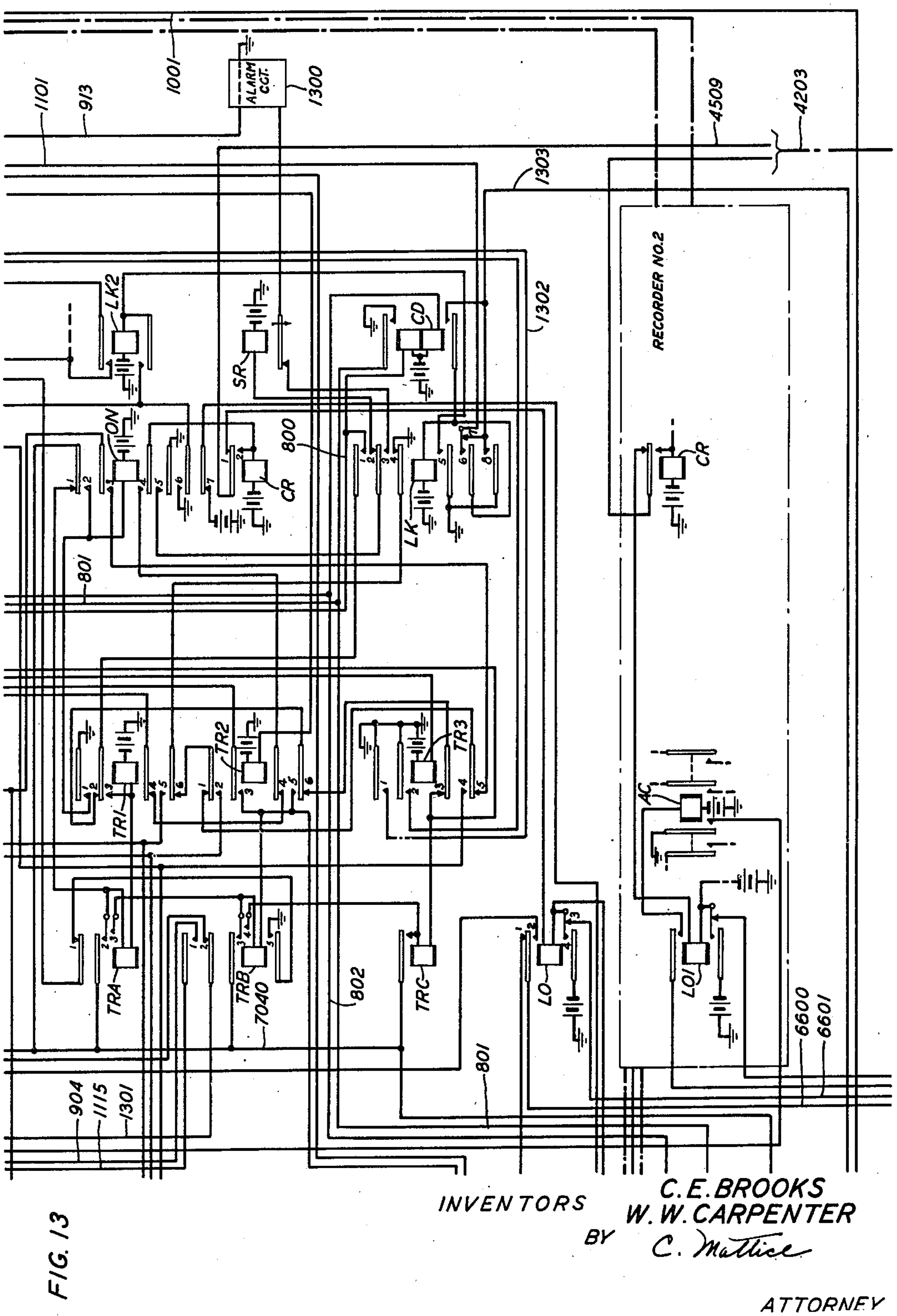
Figure 14:
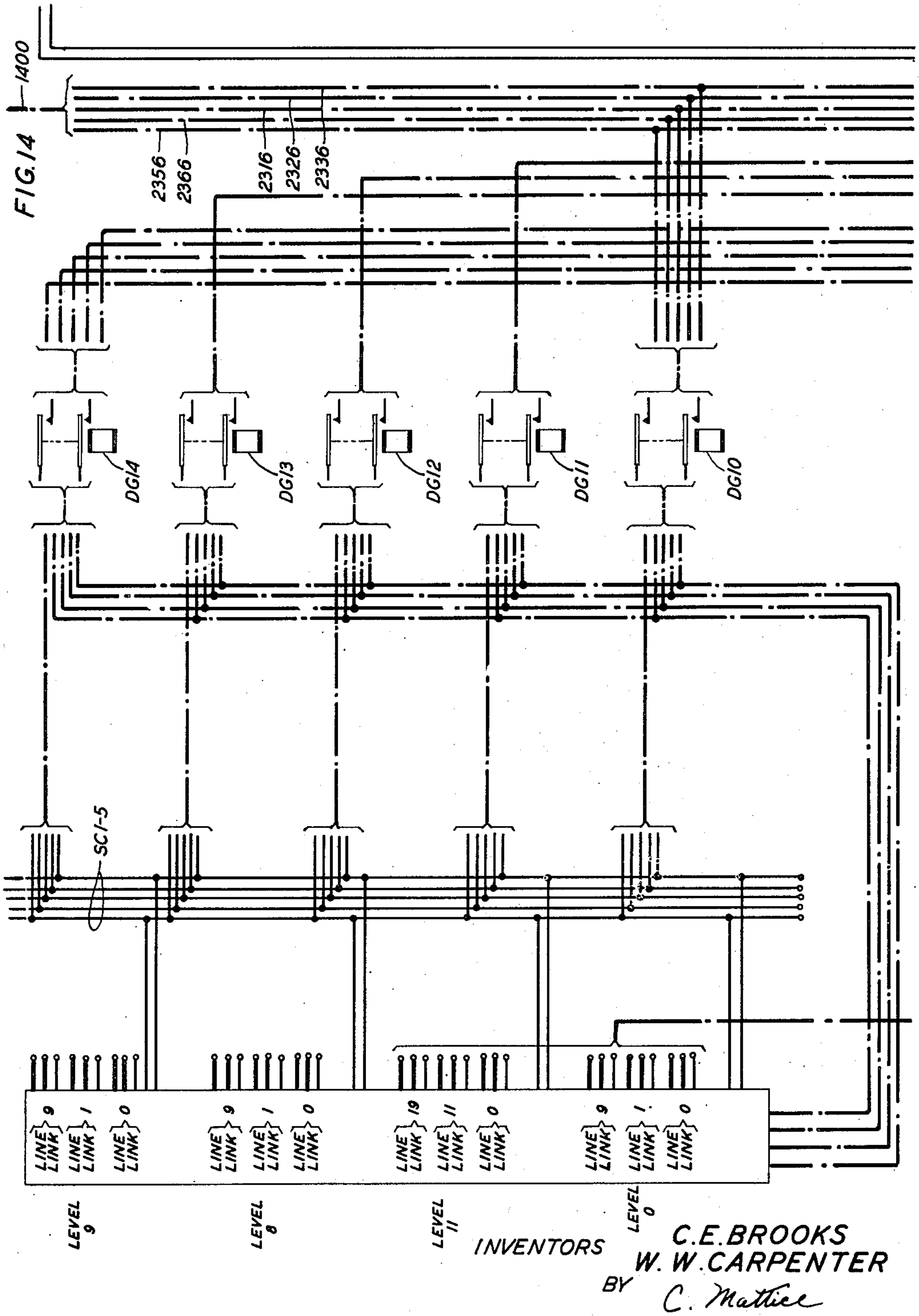
Figs. 14 to 34 show the line link switches and the line link control circuit.
Figure 78:
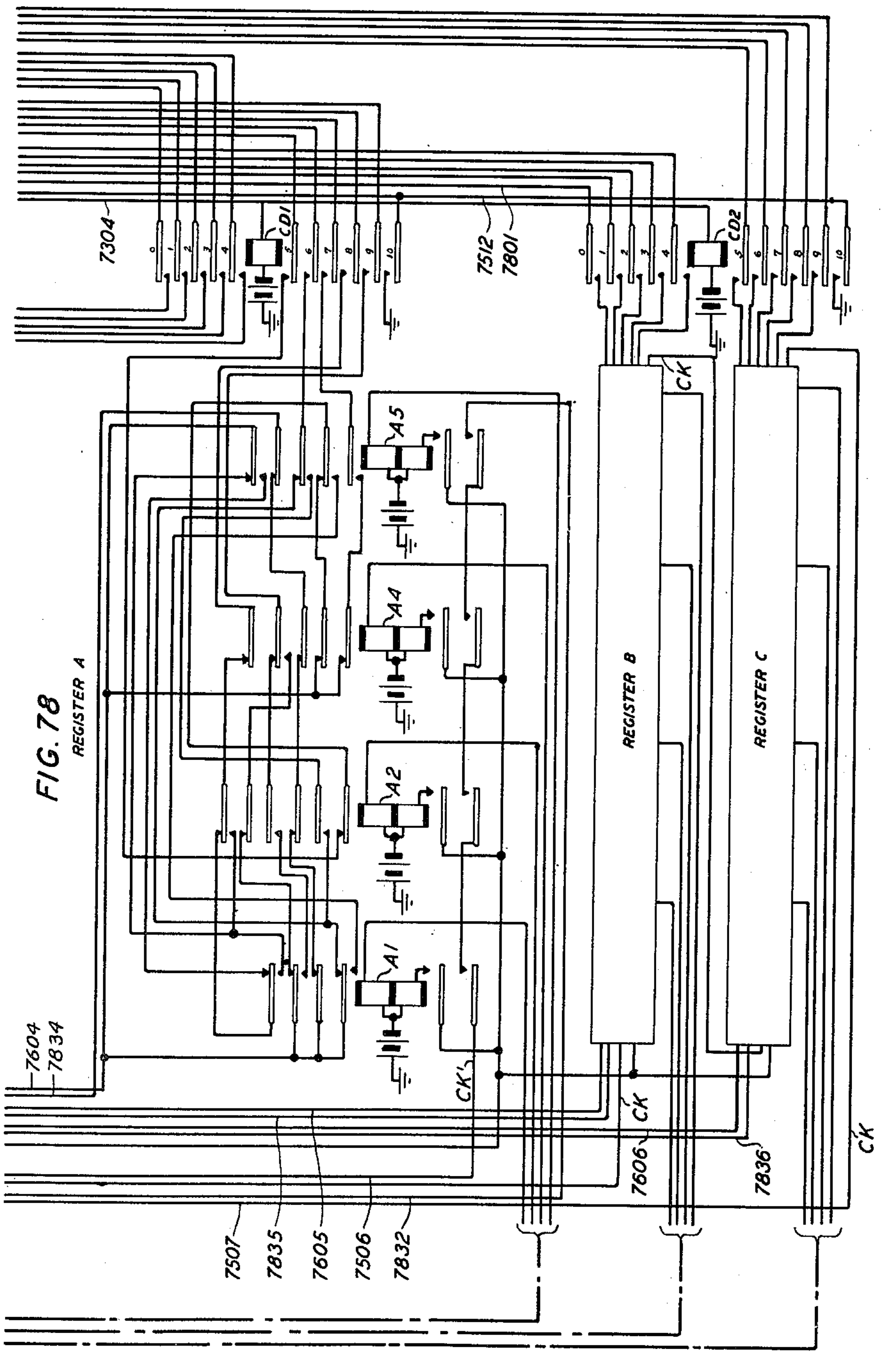

For a general understanding of the operation of the detailed circuits, reference may be made to Figs. 2 and 3. These figures, with the following general description, provide a brief outline of the sequence of operations and relationships between the various elements of the system, which are presented in detail in Figs. 4 to 78 and the subsequent detailed description. When a line such as line 200, initiates a call, the line relay L operates over contacts of the hold magnet PLH. Relay L when operated grounds the two conductors 201 and 202 to identify the calling line to the frame control circuit. In response to ground on conductor 201, the horizontal level preference relays HA are operated, selecting one horizontal level to be served and operating relay HG individual to that level. With relay HG operated, conductor 201 is extended to the vertical row preference relays V which select one vertical row to be served and operate relays LR and VC. Relay LR extends conductor 202 to the line preference relays LT which finally select the line to be served.

After relay LR has operated the district frame preference relays G1 test and select one of five district frames which has one or more idle district junctors available to the selected line switch, has an idle sender link control circuit, and has access to an idle sender through an idle sender link. When such preference has been made, relay DA is operated to connect the two control circuits together and the sender link control circuit proceeds to identify the preferred group of district junctors by means of district group preference relays GP, operating relay G2. With relay G2 operated, the district junctor preference relays D select a district junctor to be used.

When relay G2 operates it initiates the operation of the sender group preference relays SG which select a group of senders containing at least one idle sender and operate relay C in the control circuit. Relay C extends frame and class identification circuits toward the ten senders of the selected group and initiates the operation of the sender preference relays S which select the sender to be used, operating relay SC1 in that sender. With relay SC1 operated, the frame and class circuits are extended to the corresponding registers of the individual sender, after which relay ON4 is operated and locked to operate the sender busy relay and to supply a holding circuit for the hold magnets of the line link and sender link switches. The primary sender link hold magnet PSH and the secondary line link hold magnet SLH are operated under the control of the district junctor preference circuit, the secondary sender link hold magnet SSH being operated from the primary sender link hold magnet PSH. The primary line hold magnet PLH is operated under the control of the line preference relays LT but not until after relay DA has operated.

During the preference operations by which the line to be served is identified, an indication of that identity is set up by grounding three sets of conductors according to a code. These sets of conductors are represented by conductor 203, grounded by relay HG to identify the horizontal level, by conductor 204, grounded by relay VC to identify the vertical row, as well as the line link frame and by conductor 205, grounded by the line preference relays LT to identify the position of the individual line.

When the group of district junctors has been selected and relay DA operated, relay DG is operated to extend these grounded conductors to the recorder associated with the frame on which the selected district junctor group is located.

When the district group has been selected, relay BA is operated, in turn operating relay AC in the recorder circuit. Relay AC operates relay L01 in the selected district junctor to cause that relay to mark a set of conductors identifying the district junctor. Relay AC controls the connection of the line identification leads and district junctor identification leads to the tape recorder and operates relay TP in the junctor circuit. When the line identity has been recorded the line control circuit is permitted to release.

When the sender is connected to the calling line, the called line number is registered in the code registers and the numerical registers of the sender under the control of the calling subscribers' dial. As soon as the code registers have been set, relay DST is operated and the relay SF, individual to the sender in the marker and register connector is operated in turn operating relay DF, individual to an idle marker. The marker and sender are connected together and the code digits, identifying the wanted office, as well as the frame designation, are transmitted to the marker which translates the designation and operates a corresponding route relay. The marker selects an idle trunk leading to the called office; obtains access to the frame on which the district junctor is located by operating relay MC under the control of the frame designation, and obtains access to the individual district junctor by closing a circuit through the sender to relay F in the district junctor. Relay F operates relay LC and with relays MC and LC operated the marker selects a channel connecting the district junctor with the selected idle trunk, and operates the proper hold magnets, including magnet PDH. The marker also transmits to the sender information which the sender employs in controlling the equipment at the wanted office to complete the connection to the wanted line.

When the sender has completed these functions, relay AST is operated. Relay AST also operates relay SF in the marker and register connector, but causes the operation of relay RF in place of relay DF, thereby connecting the sender with a called number register. Both the code of the wanted office and the number of the wanted subscriber are transmitted to the called number register.

The called number register also causes the operation of relay F through the sender and operates relay RC. Relay F operates relay LC. With relays F, LC and RC operated, relay L0 is operated in turn operating relay L01. Since relay TP has been operated, relay LC now operates relay BC in the tape recorder circuit and the called line number and district junctor number are recorded on the tape. As soon as relay BC is operated the sender is permitted to release.

The completion of the connection to the called line and the ringing of that line take place in the usual manner. When the called subscriber answers, relay CS operates and, through circuits not shown, brings about the operation of relay L0, which in turn operates relay L01. Relay L01 operates relay CC which controls the tape recorder to record the identity of the district junctor as supplied by relay L01 and the time as supplied by the timing unit. Similarly, when the conversation is ended, relay CS releases and, through circuits not shown, again operates relays L0 and L01. Relay CC is operated as before, again recording the identity of the district junctor and the time. These two records provide the elapsed time on the call.

DETAILED DESCRIPTION

Before starting to describe the operations which take place, a few statements regarding the arrangement of the equipment may be helpful.

As described in detail in the above-identified patent to W. W. Carpenter, the subscribers' lines of a cross bar system are arranged in groups of ten, each group served by a primary cross bar switch unit having ten sets of vertical terminals to which the lines are connected, and ten sets of horizontal terminals which are connected to outgoing circuits known as line links. According to the amount of traffic required by the groups of lines, one to seven switch units are arranged in a horizontal group or level and are connected in multiple to a group of ten line links. Ten horizontal levels constitute a frame and four frames constitute a choice, the latter group being of interest only when completing a connection with a called line. On any one frame the same number of switches are used in each level, so that one frame may also be regarded as made up of one to seven verticals.

The line links of a primary switch frame are distributed to a secondary switch frame individual thereto, which comprises ten switches having ten sets of horizontal terminals and twenty sets of vertical terminals. If preferred, twenty switches, each having ten sets of vertical terminals, may be used, with two such switches in each level to provide the necessary number of vertical terminals. The line links from one primary level are connected, one to each of the secondary switches, the links from a primary level being connected to the correspondingly numbered sets of secondary horizontal terminals. For example, the line links from the zero primary level are connected to the zero sets of horizontal terminals in each of the ten secondary switches.

The sets of secondary vertical terminals are divided into two groups of ten each, one group of ten connecting with line junctors for use with terminating calls and the other group of ten connecting with district junctors for extending originating calls. Therefore, each line switch frame has access to one hundred district junctors and, by reason of the arrangement of the line links, any calling line may be extended to any one of those district junctors.

The district junctors extend to district junctor frames where they are connected to the sets of horizontal terminals in the primary district switches. From each secondary line switch, the ten district junctors are distributed to five district frames, two on each frame, so that from one line switch frame, there are twenty district junctors leading to each of five district frames. These groups of twenty junctors are multipled to one or more additional line frames, depending on the traffic originated by the lines appearing thereon.

Each line frame has a line link control circuit which controls the operation of the line switches in extending a calling line to an idle district junctor and each district frame has a sender link control circuit which assists the line link control circuit in selecting an idle district junctor and controls operation of the sender link switches in connecting an idle sender with the selected district junctor.

Figure 15:
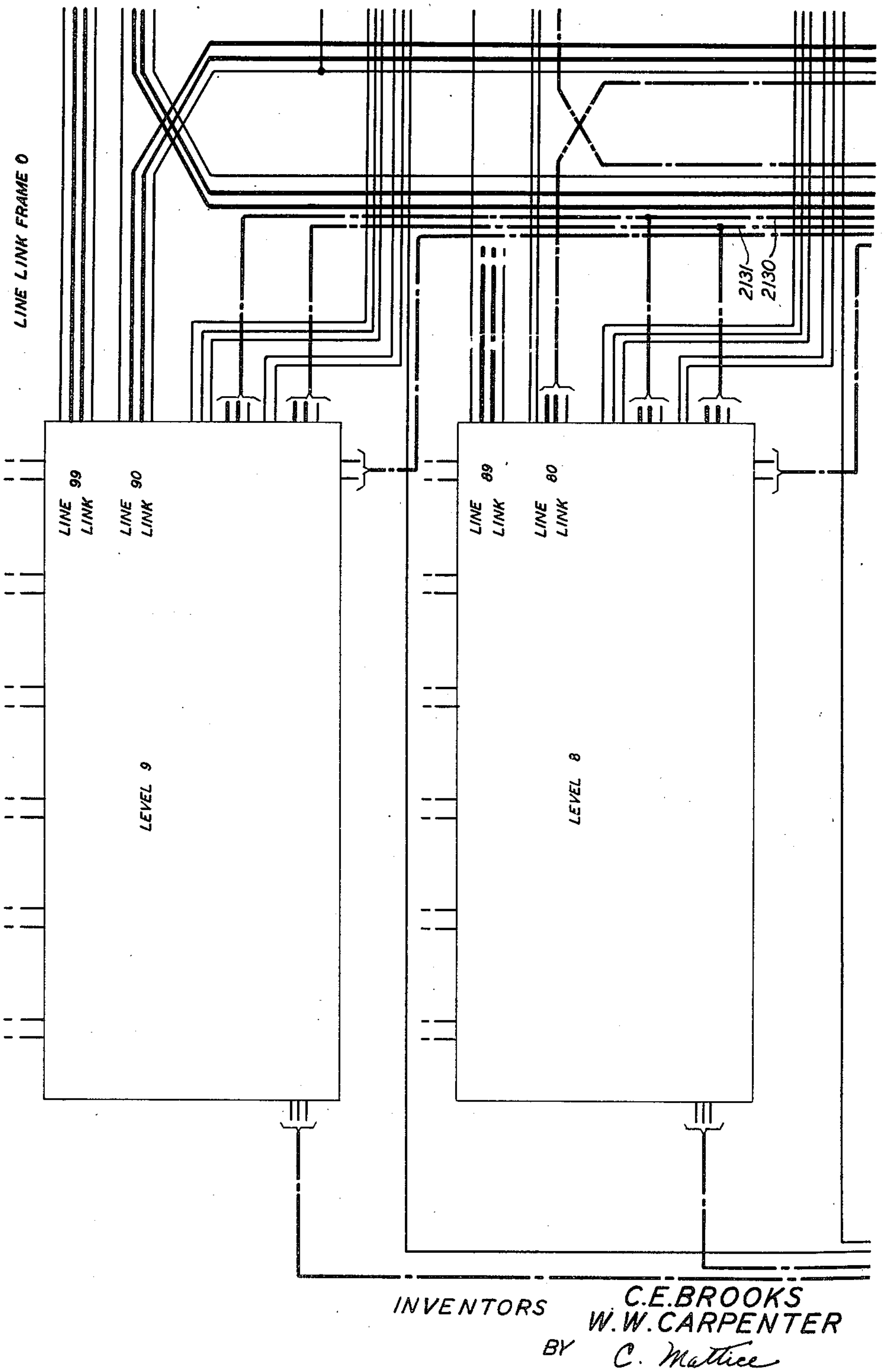
Figure 16:
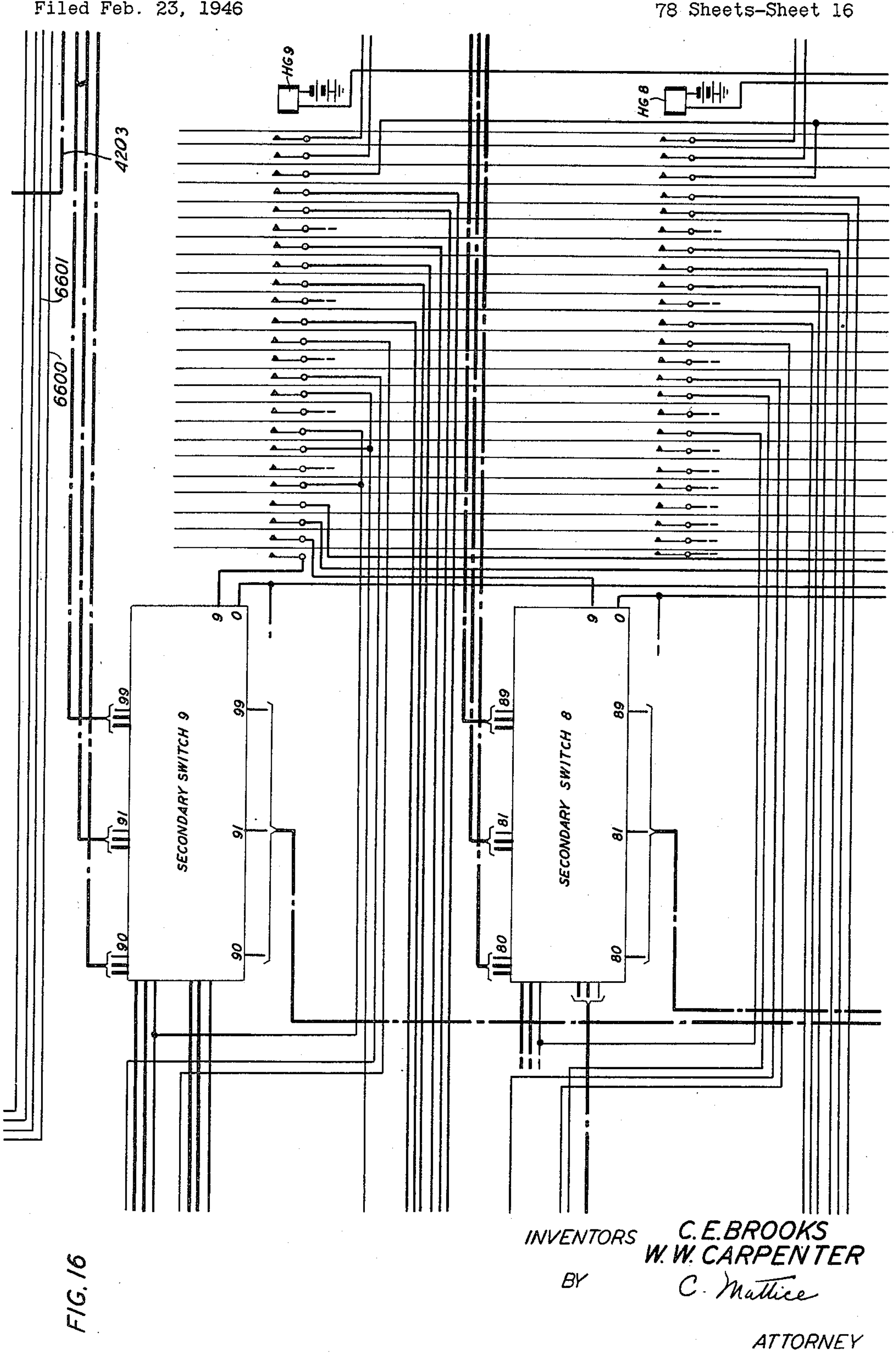
Figure 17:
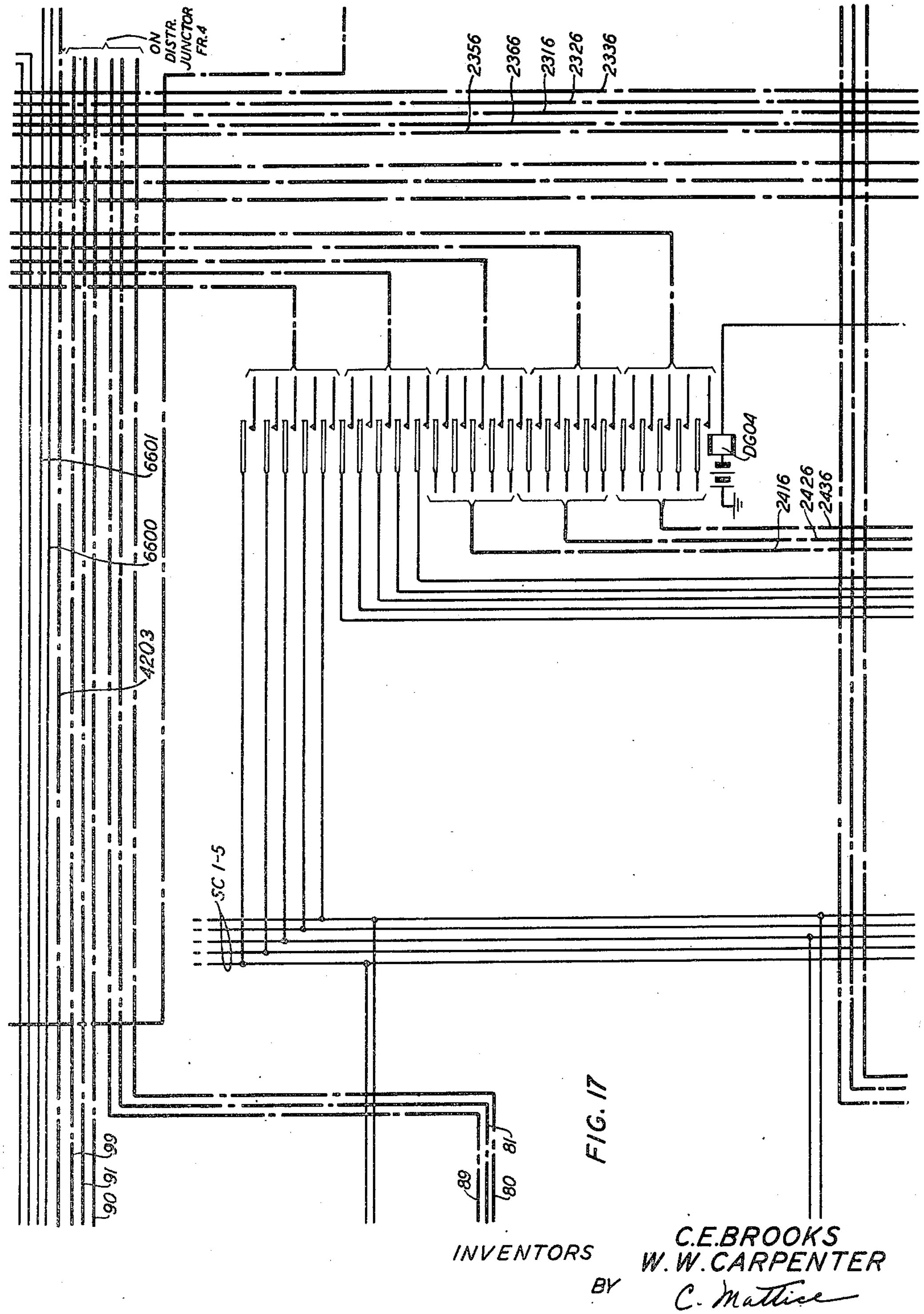
Figure 18:
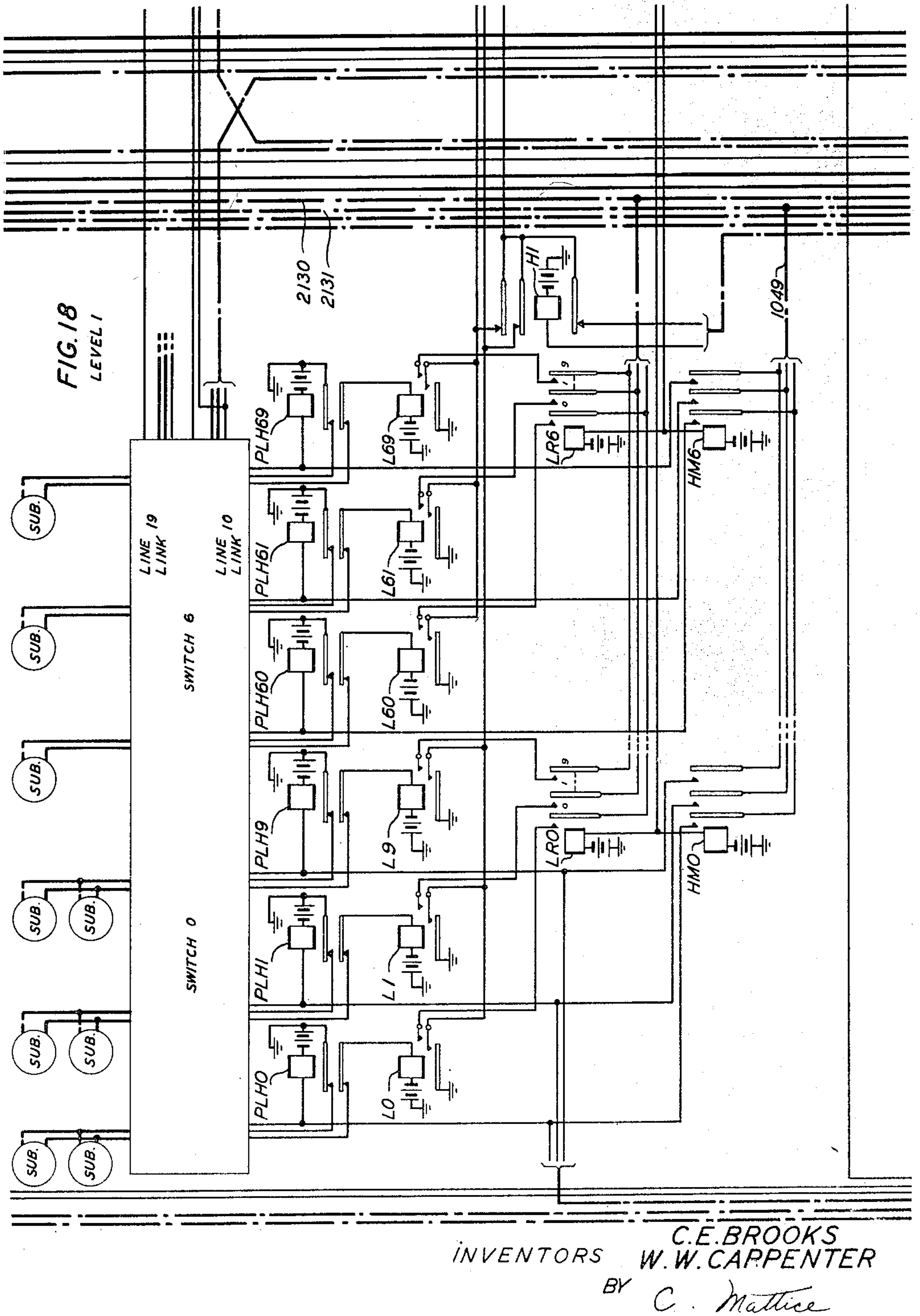
Figure 19:
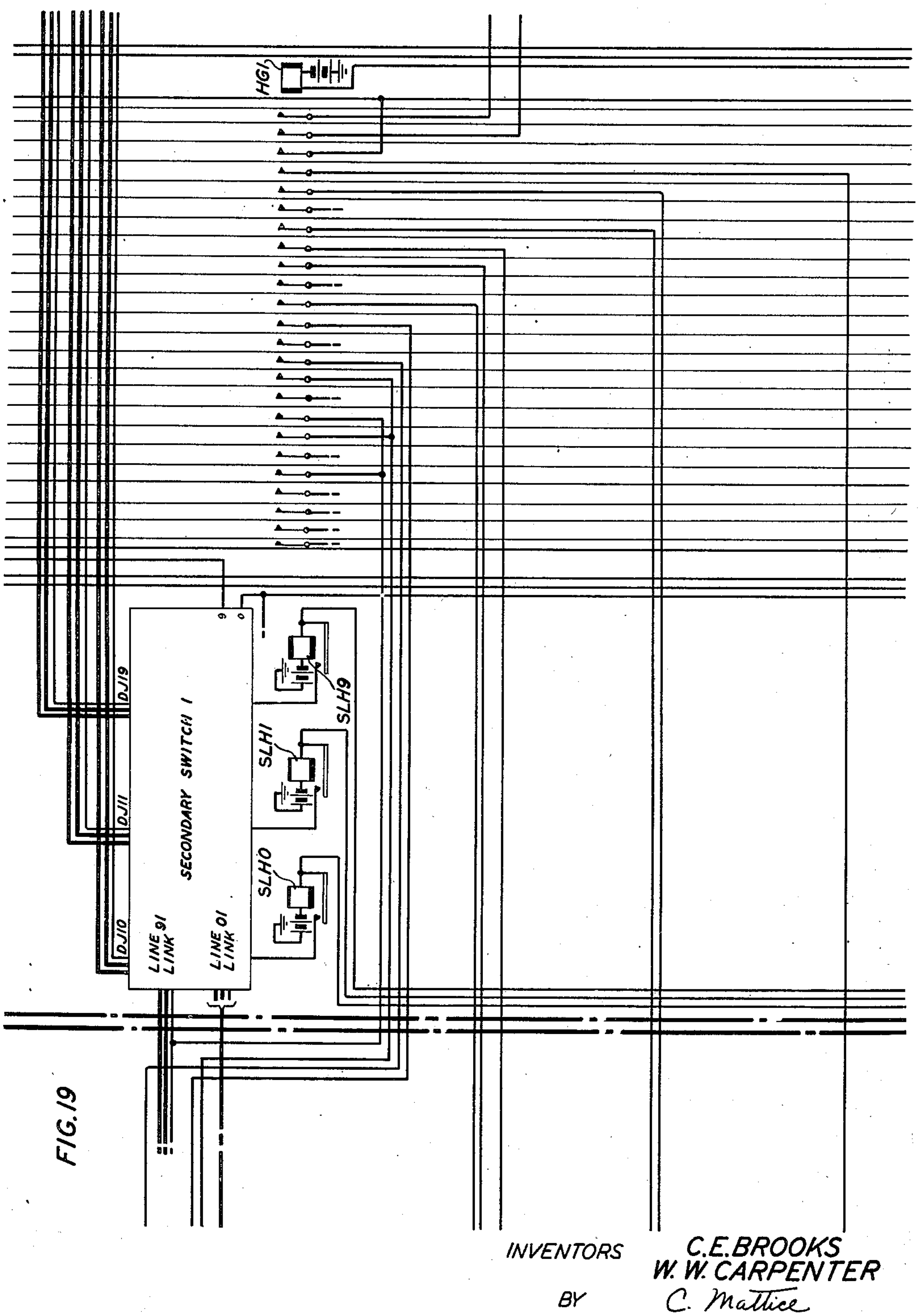
Figure 20:
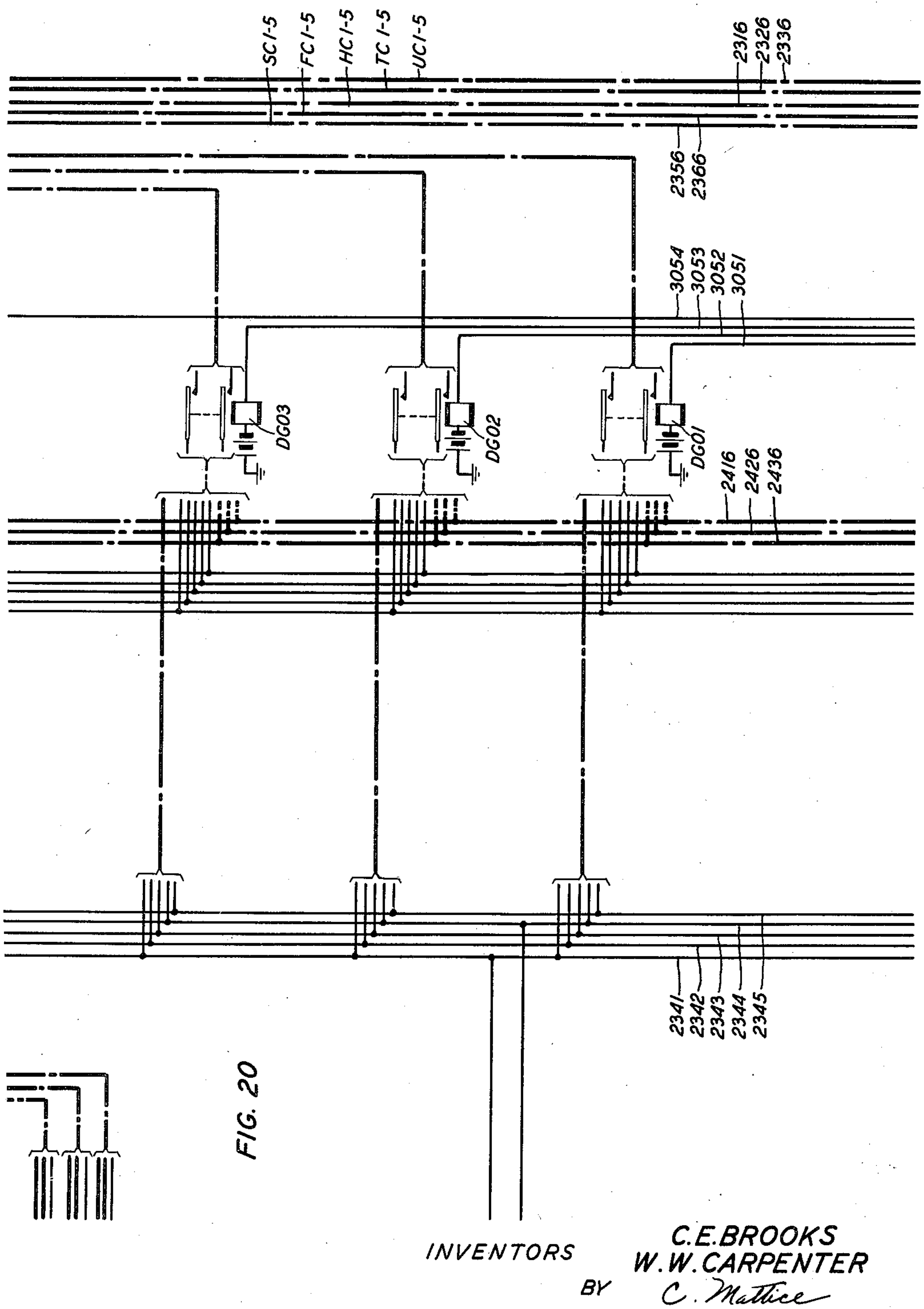
Figure 21:
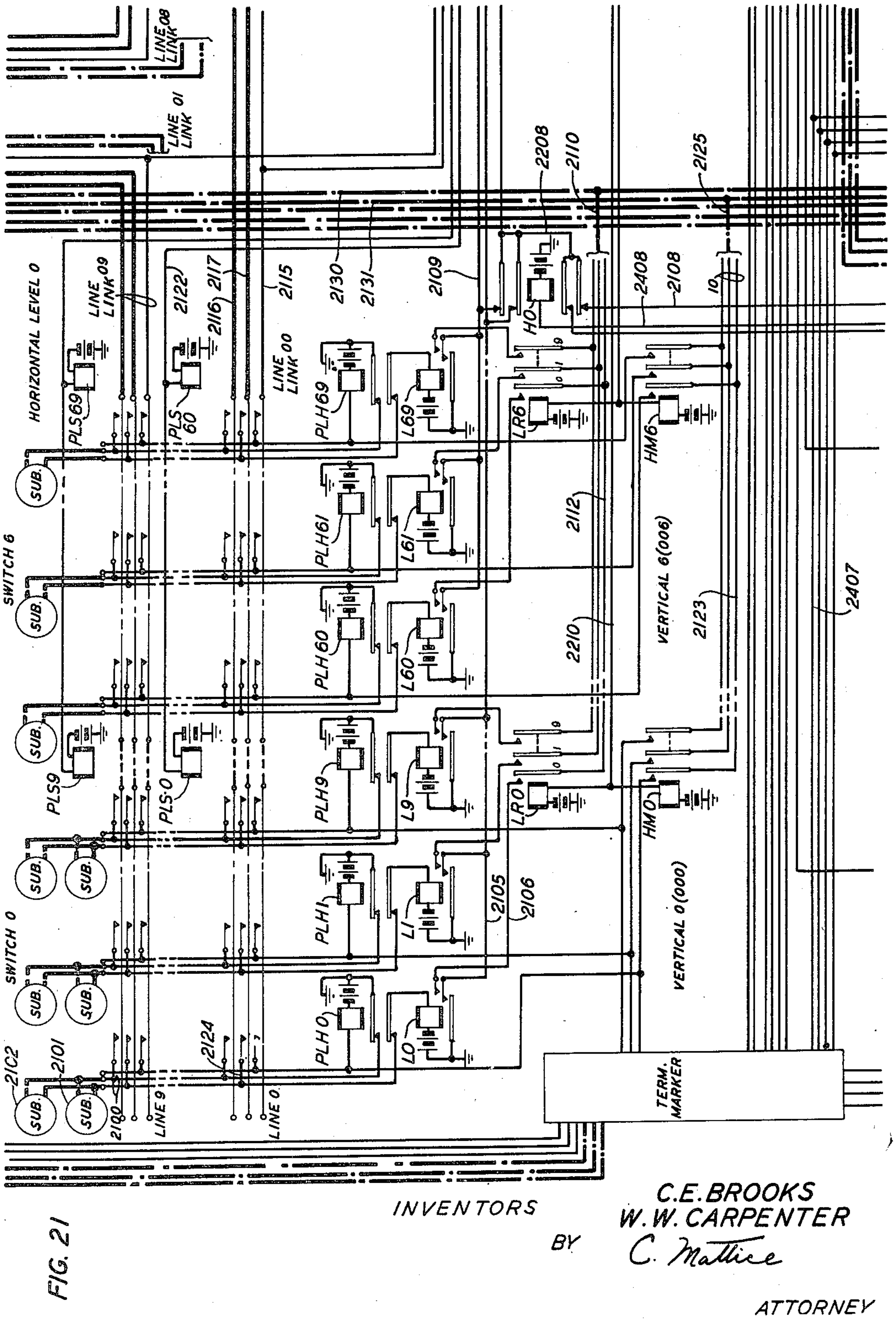
Figure 22:
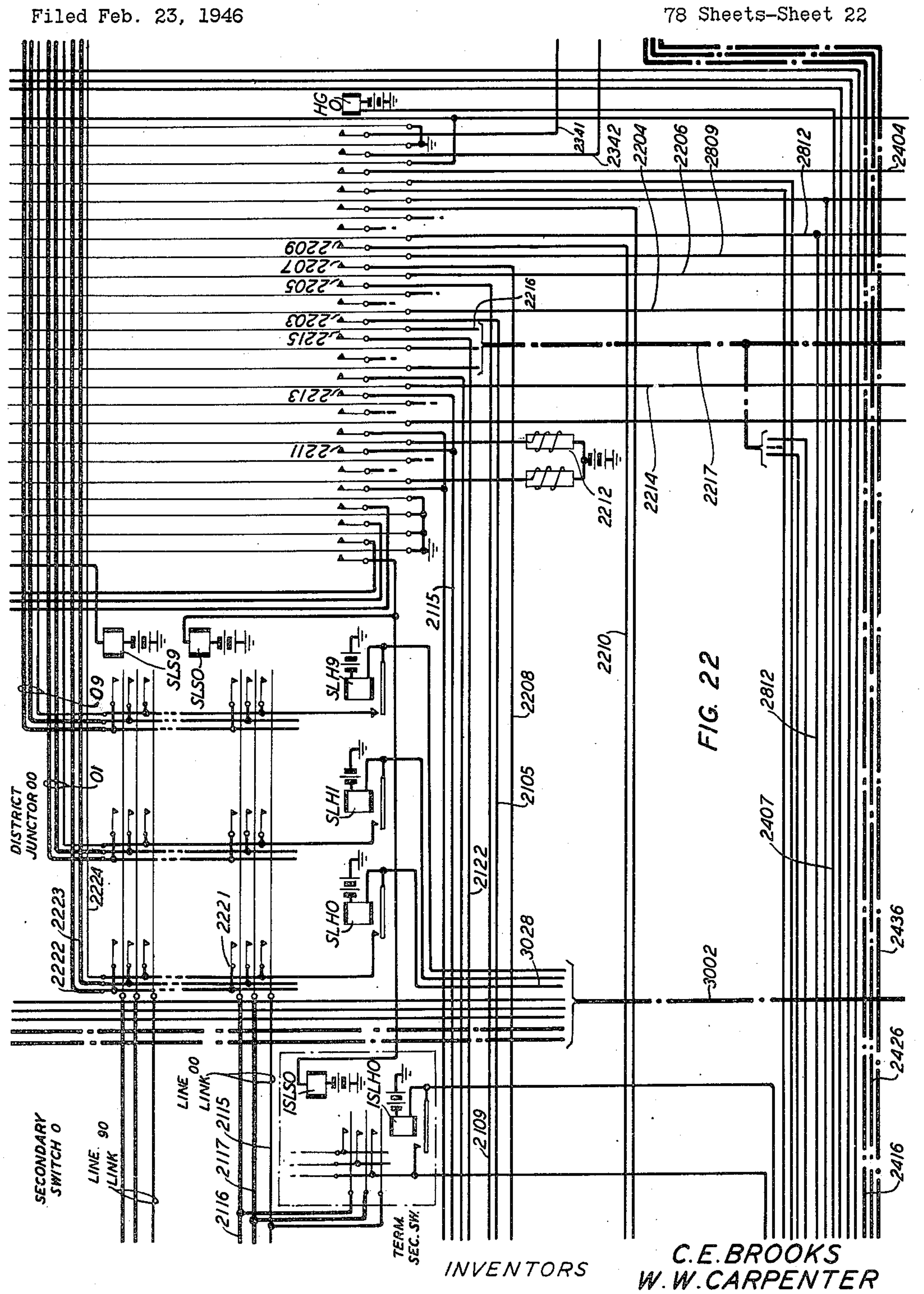
Figure 23:
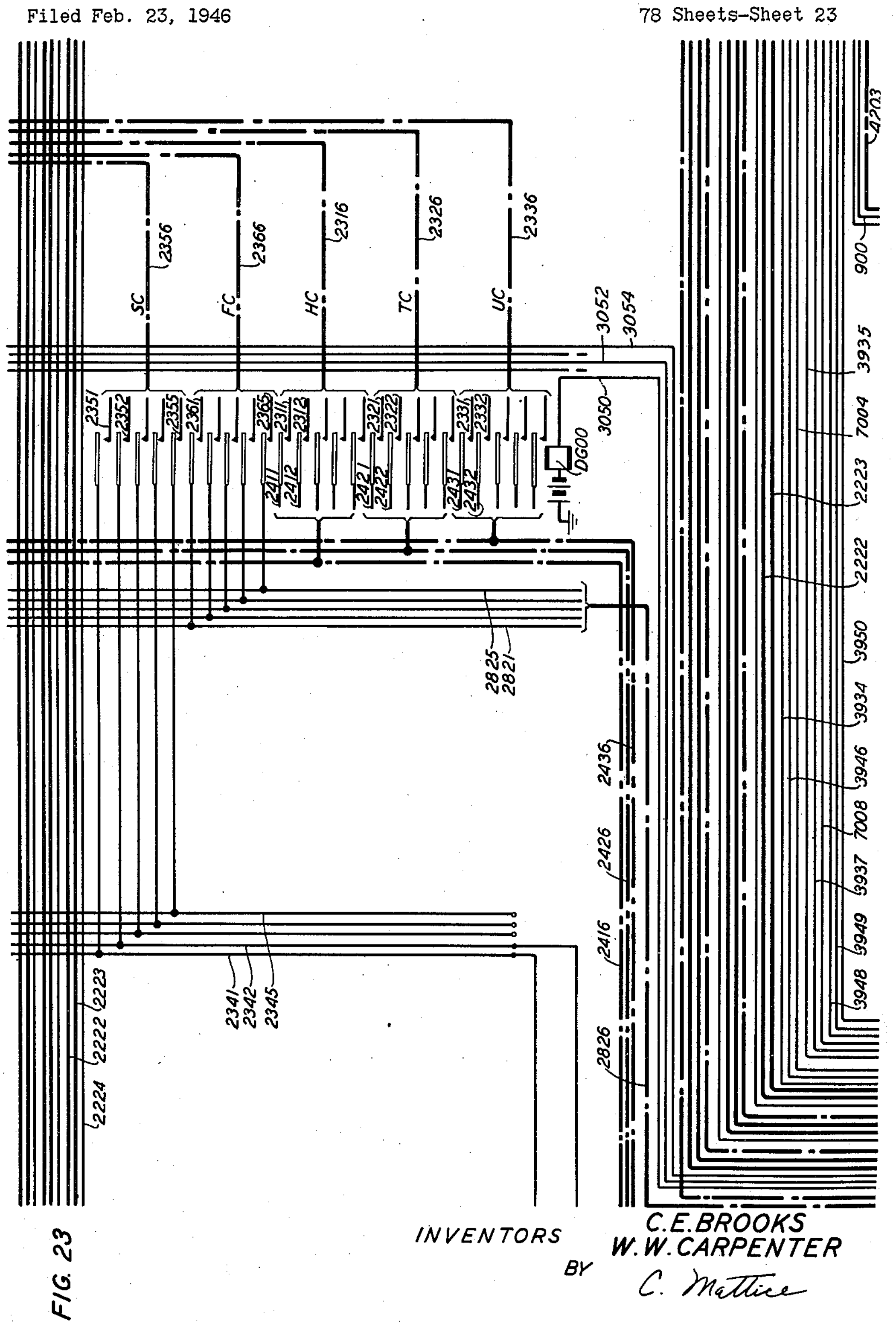
Figure 24:
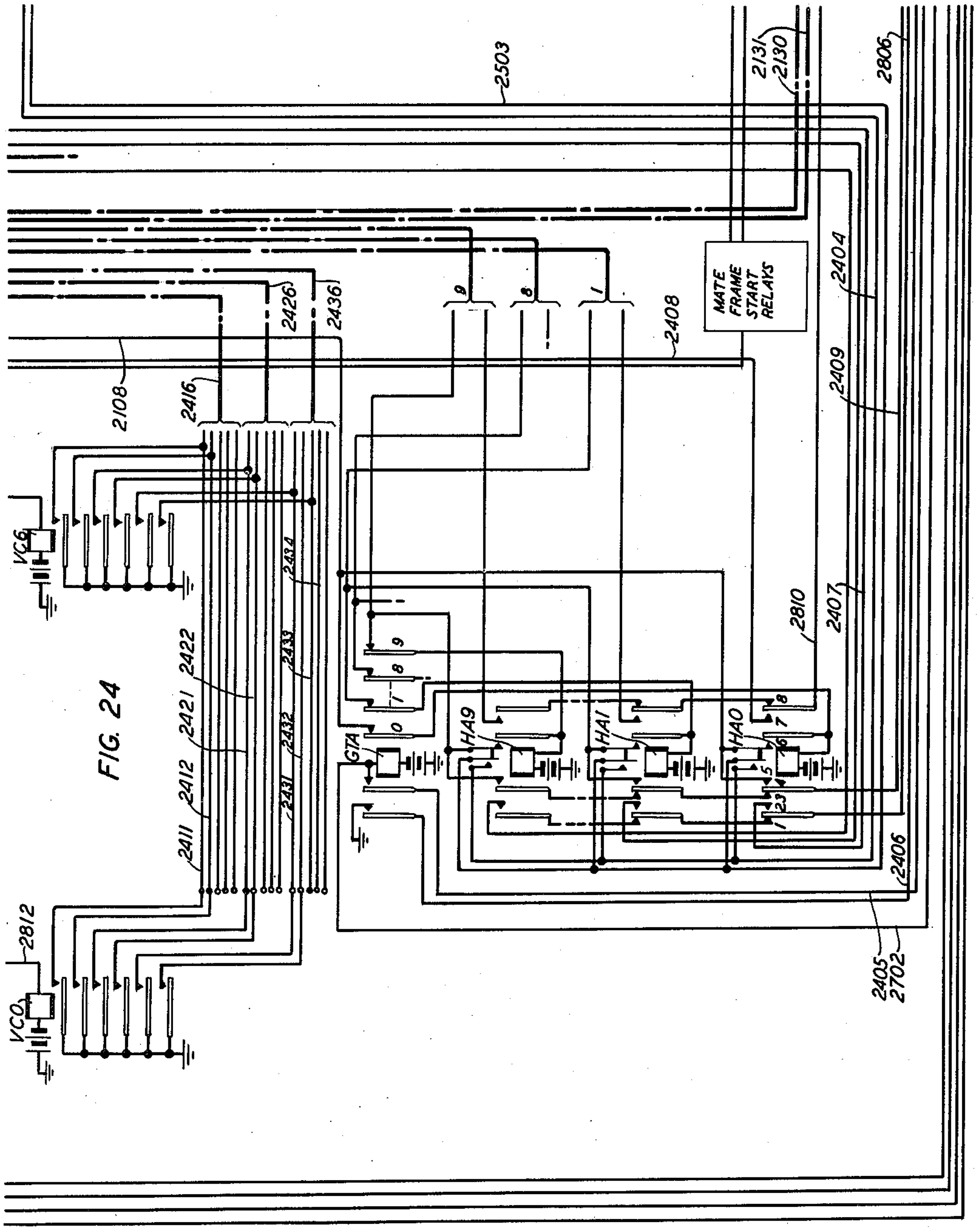
Figure 25:
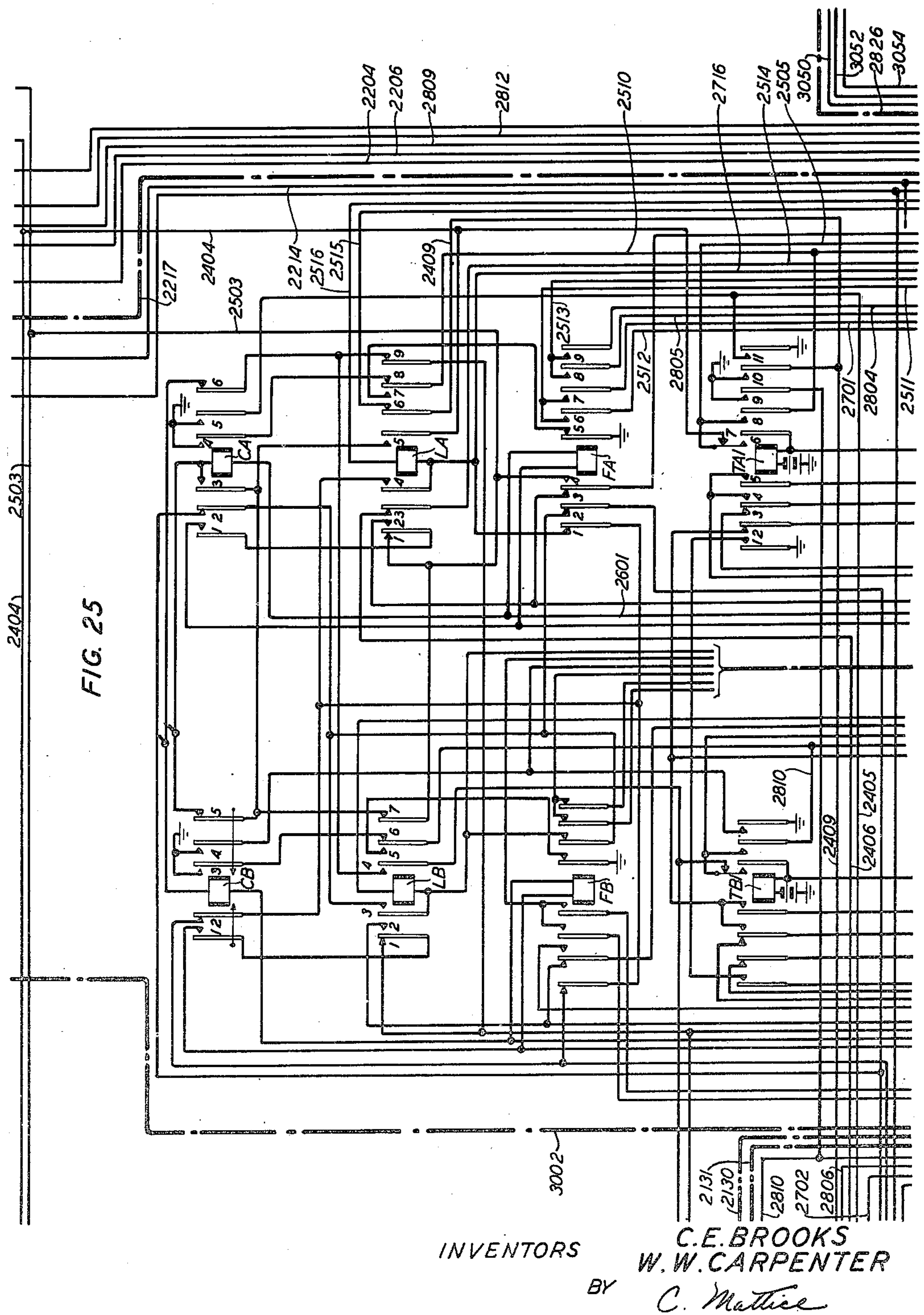
Figure 26:
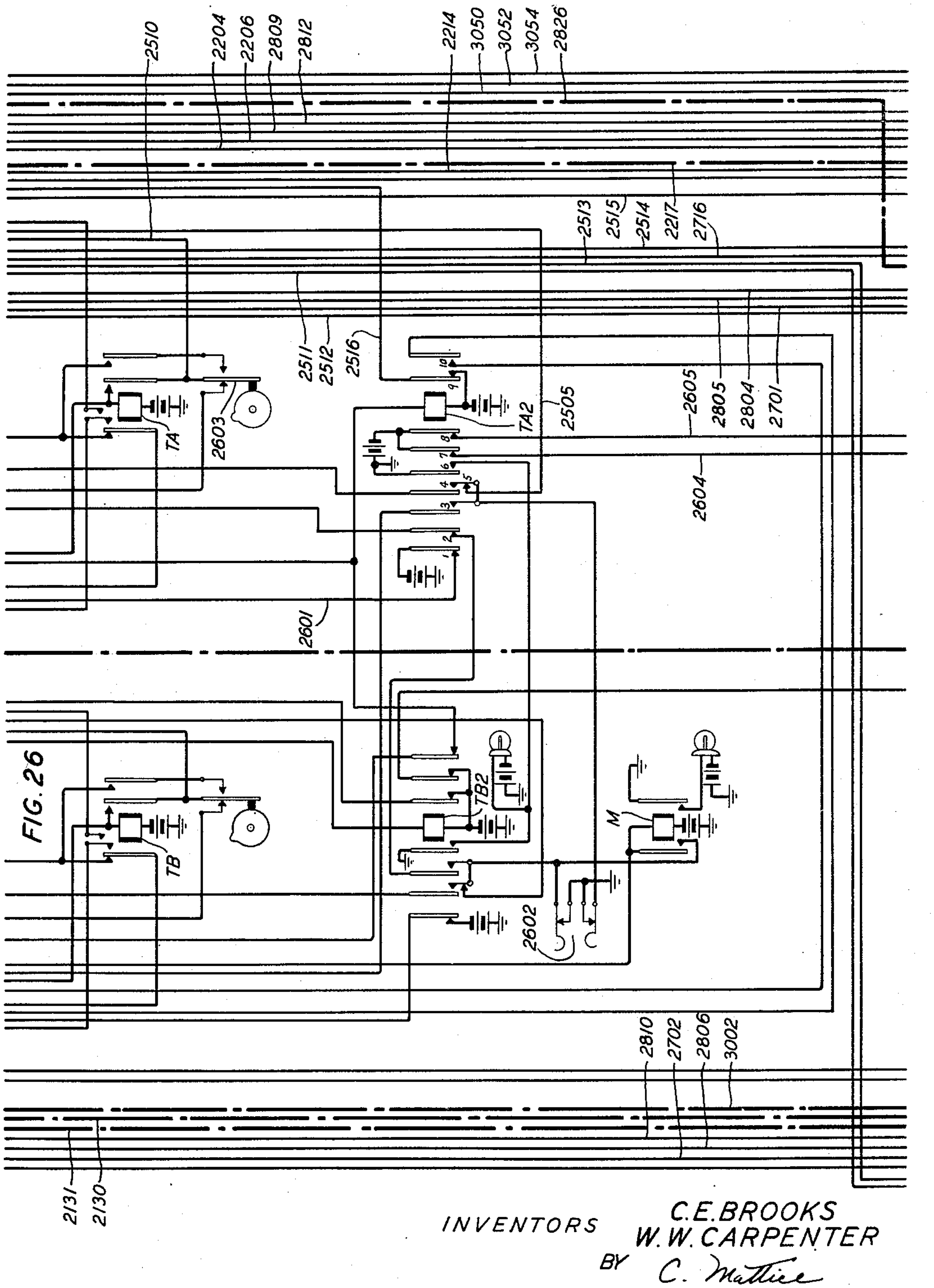

In Figs. 15, 18 and 21 are shown a primary line link frame, namely, frame 0, Fig. 21 showing three lines in the first and last switches of horizontal level 0, that is, in the switches appearing in vertical rows 0 and 6. The first and last line links of level 0, viz., links 00 and 09 are shown. Fig. 18 is a similar showing of horizontal level 1, omitting the switch contacts, while Fig. 15 shows in schematic form levels 8 and 9 of the primary line link frame 0. Figs. 22, 19 and 16 show switch 0, switch 1, switch 8 and switch 9 on the secondary line switch frame, secondary switch 0 being shown in detail and switches 1, 8 and 9 in schematic form.

The sender link and control circuit shown in Figs. 35 to 47 is individual to a district frame and includes a set of primary and secondary sender switches for connecting any district junctor on the frame with any idle sender, one hundred senders being provided. Since the circuits connecting a district junctor and a sender require more wires than are provided by the standard cross bar switch, two cross bar switches are operated in multiple. Five such pairs of switches make up the primary sender link switch, each switch having twenty vertical sets of terminals and ten horizontal sets of terminals, to connect one hundred junctors to fifty sender links. There are five secondary sender link switches, each switch having twenty verticals and ten horizontals. However, the horizontal strapping is cut to divide each switch into four sections, two sections operating in multiple to provide the necessary number of connecting circuits. Ten senders appear in the horizontals of each pair of sections, to the verticals of which are connected five sender links, one coming from each pair of primary switches.

Therefore, the effective result of this wiring is a set of five primary switches, and five secondary switches for connecting any one of one hundred district junctors to any one of one hundred senders by way of fifty links.

Figure 35:
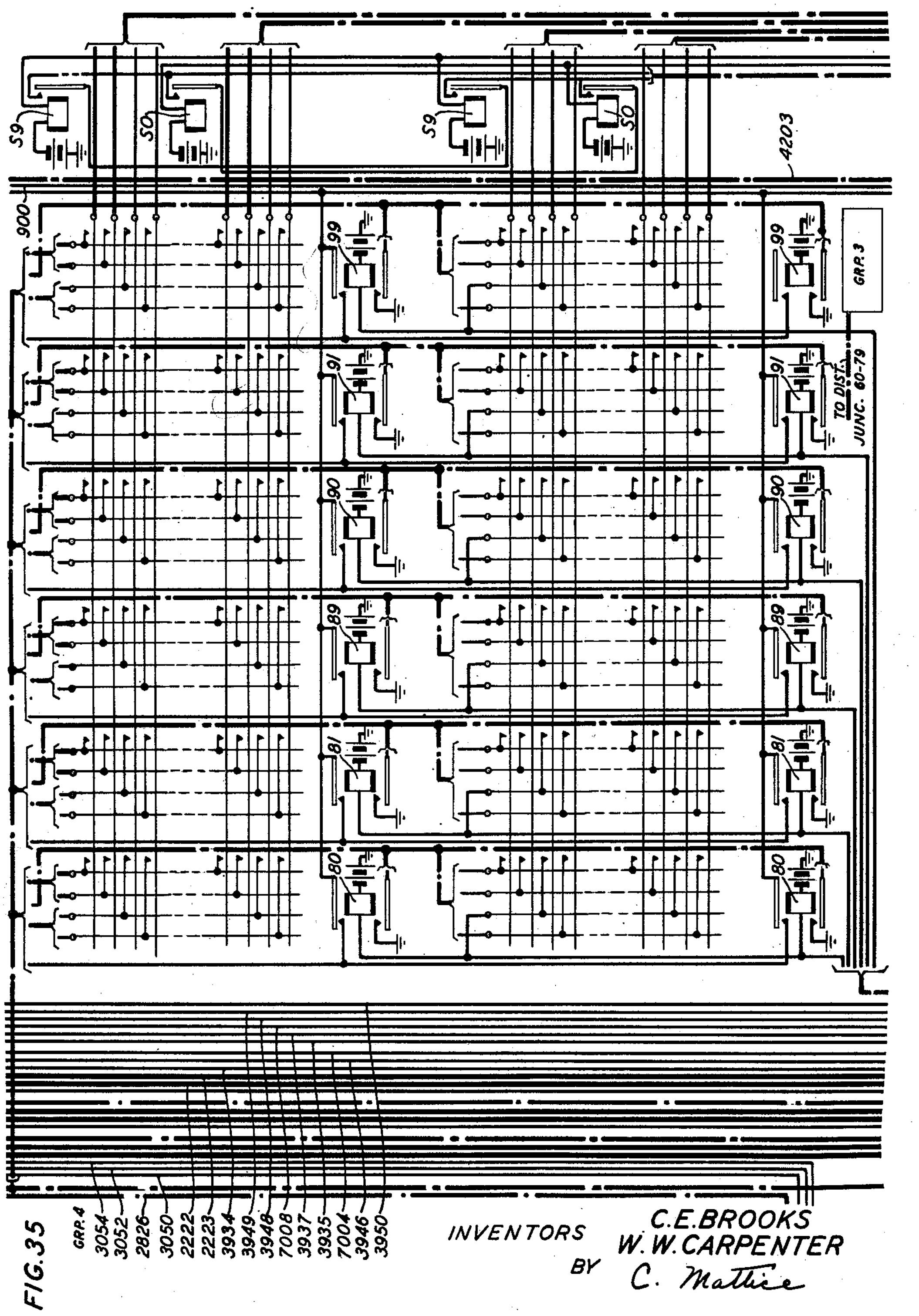
Figs. 35 to 63 show the sender, sender link switches and the sender link control circuit.
Figure 36:
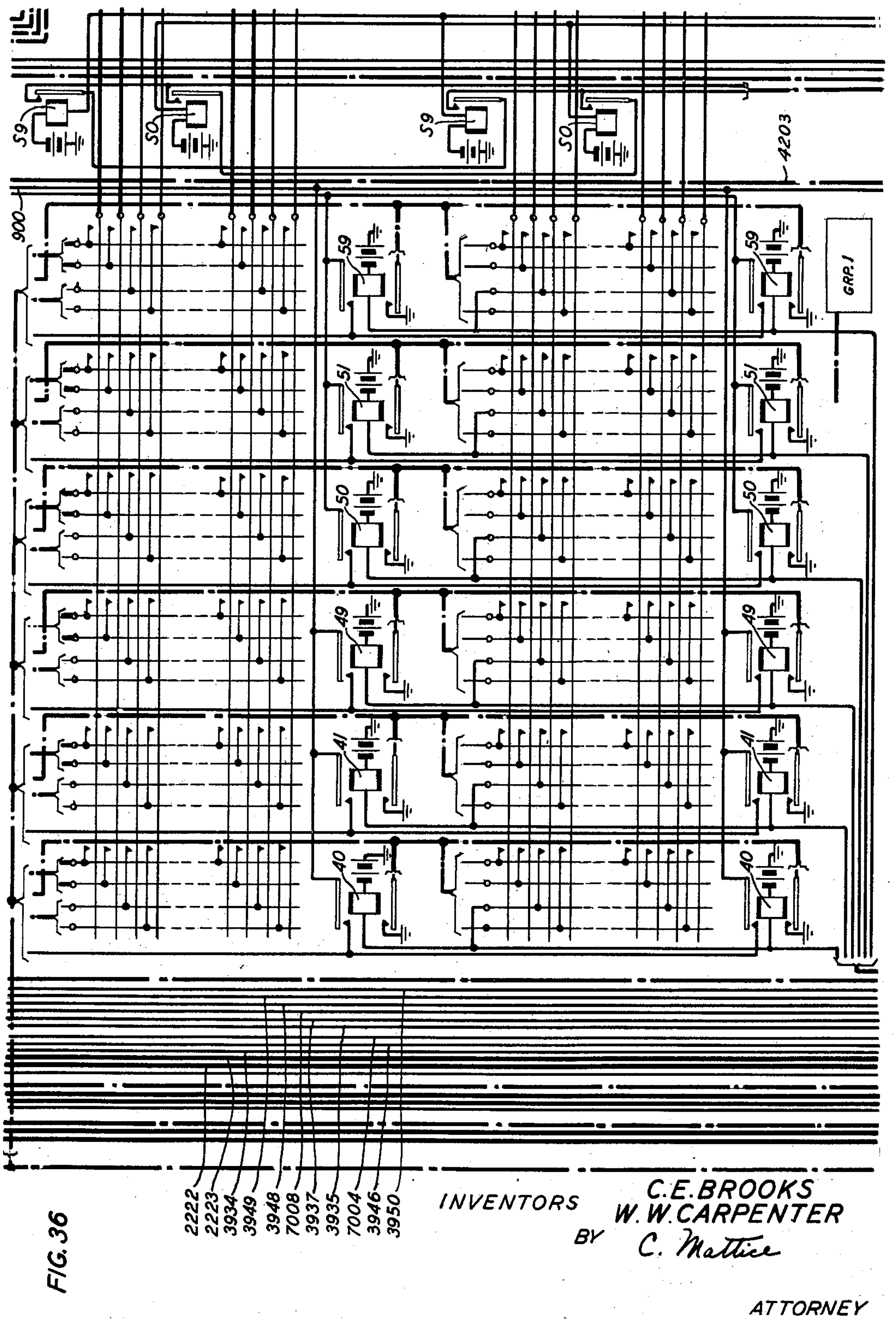
Figure 39:
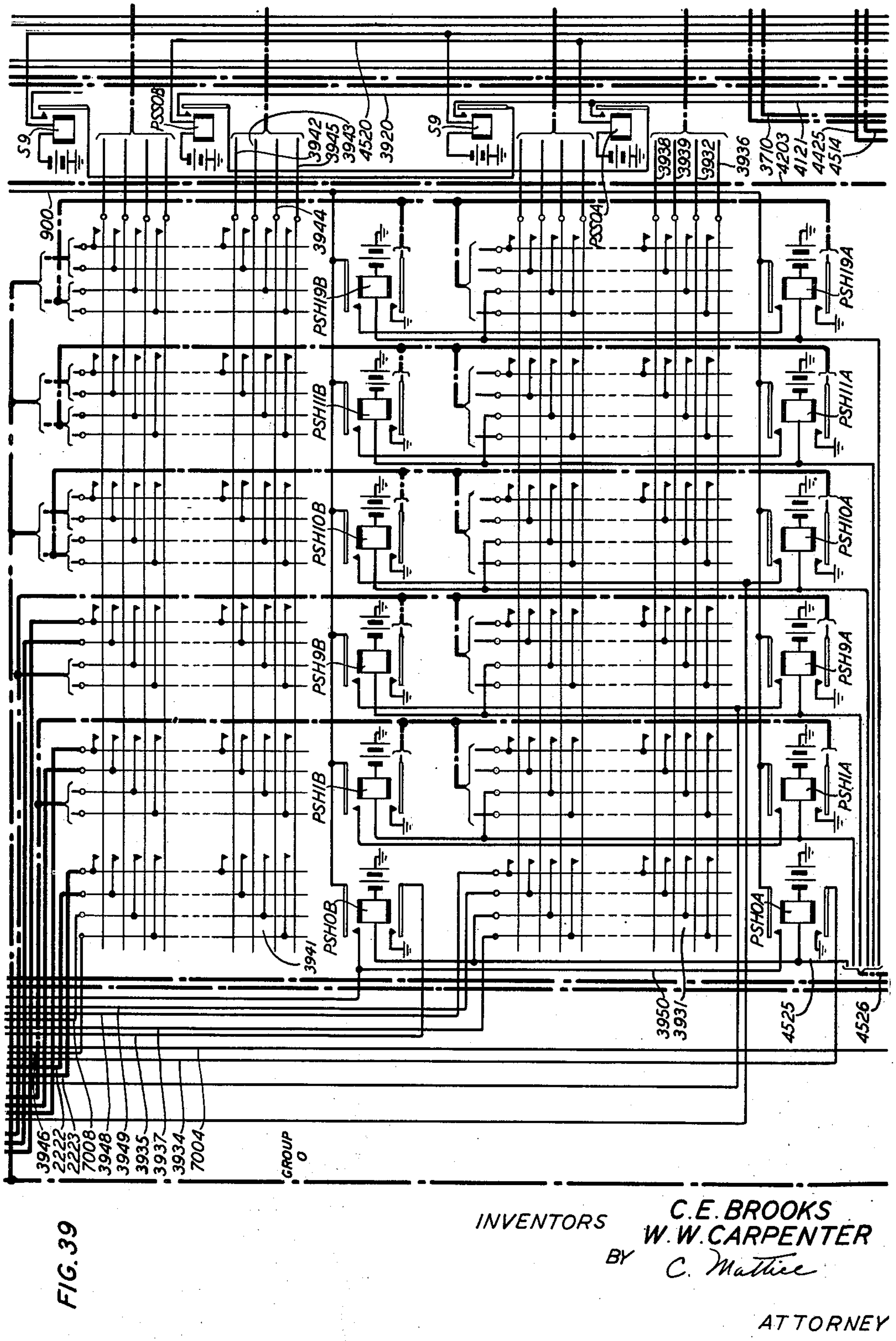

In Figs. 35, 36 and 39 are shown details of the primary sender link switches serving district junctor groups 0, 2 and 4 with the switches serving groups 1 and 3 indicated schematically. Verticals 0, 1, 9, 10, 11 and 19, corresponding to six district junctors, are shown in each switch together with horizontals 0 and 9 leading to two sender links. Two switches are shown in each figure, but it may be seen that the hold magnets and select magnets are connected in multiple so that each pair of switches constitutes one unit.

Figure 37:
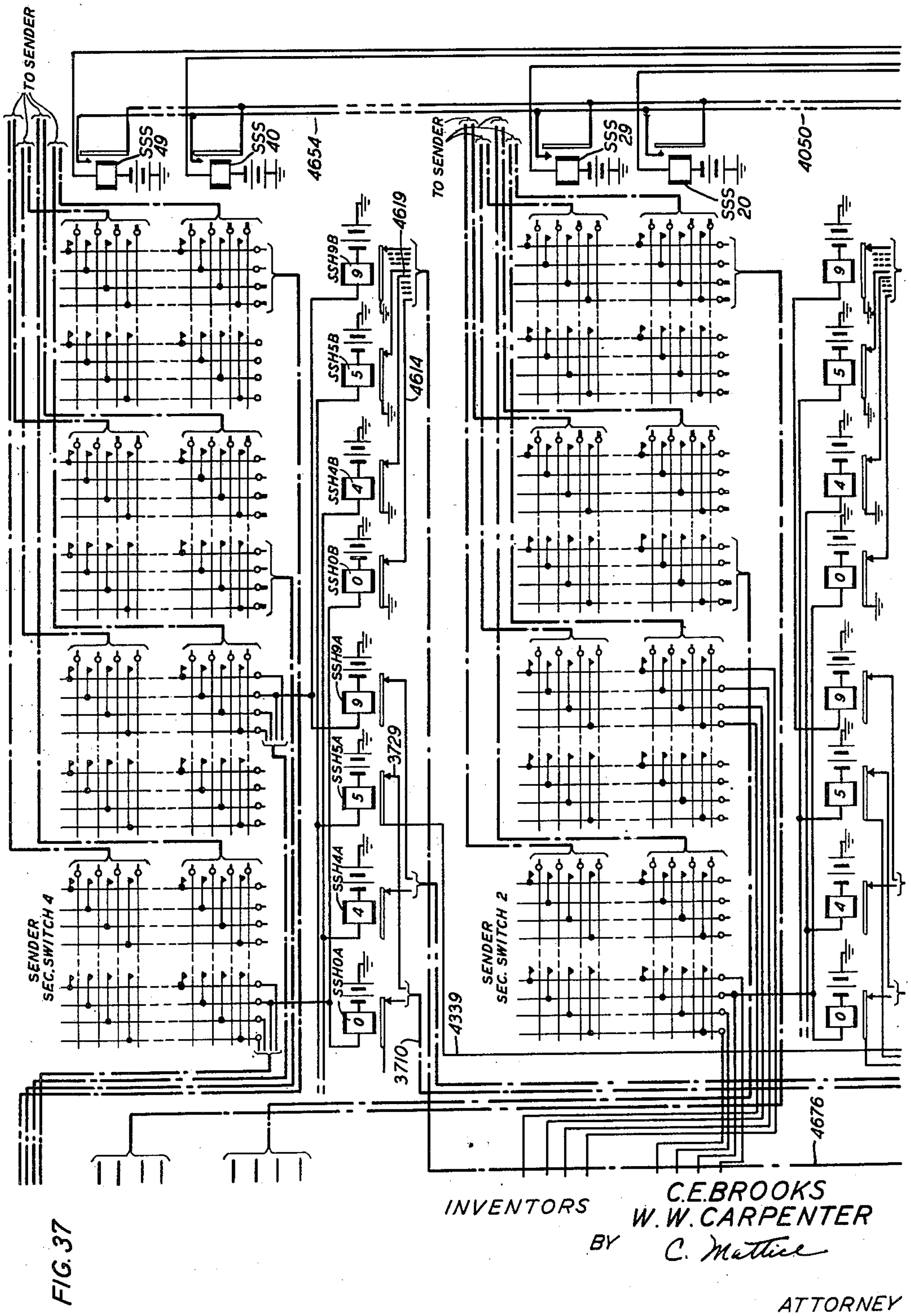
Figure 38:
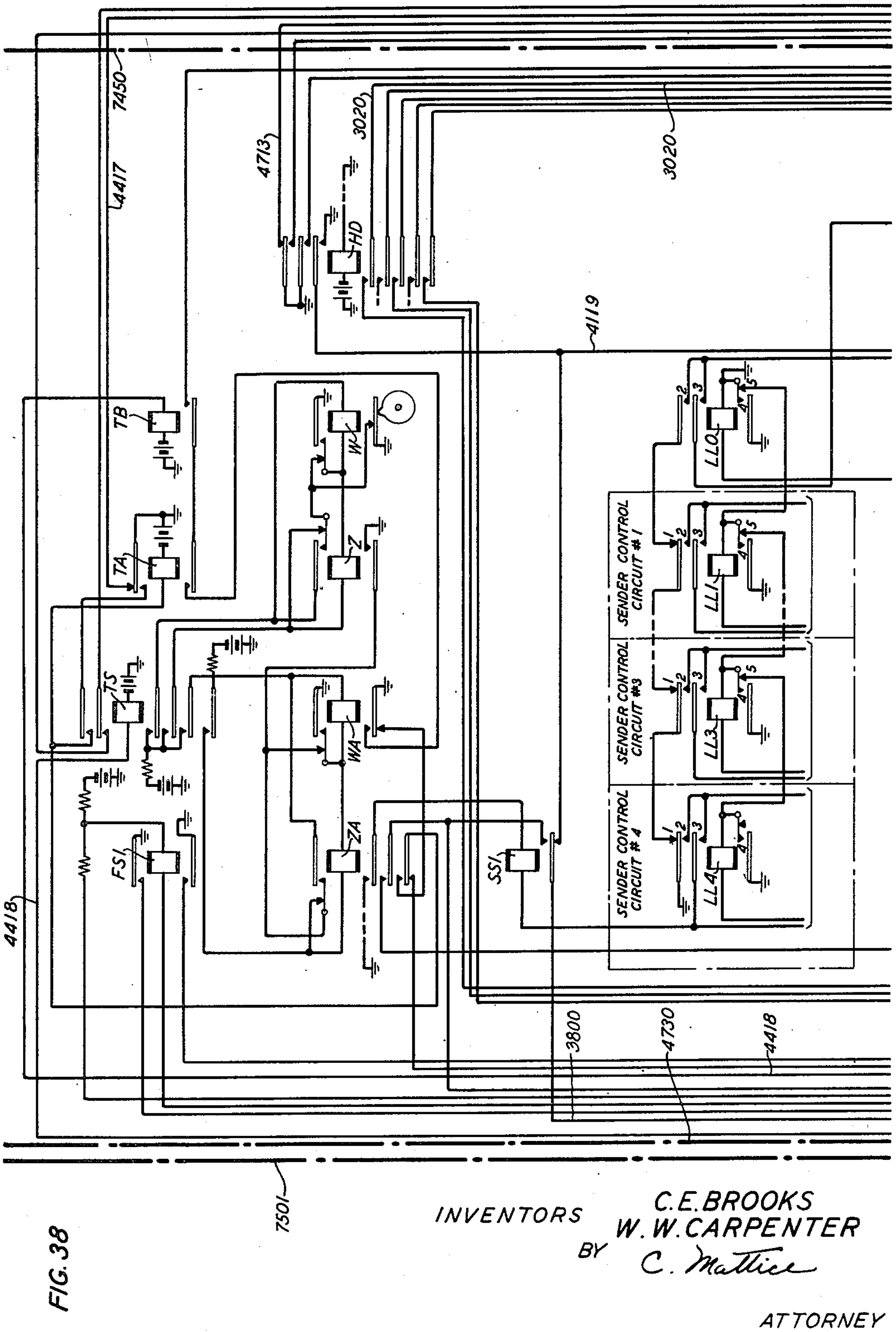
Figure 40:
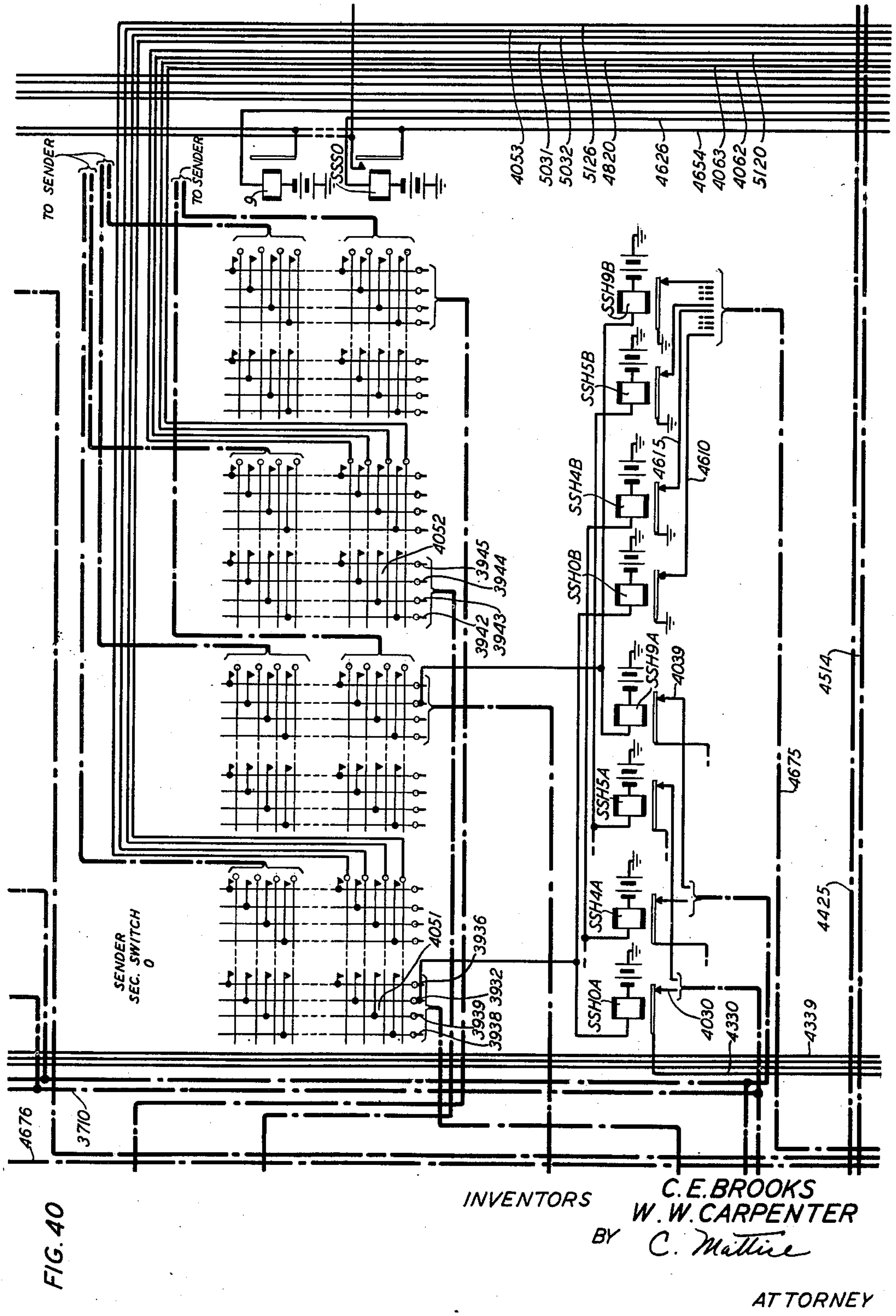
Figure 41:
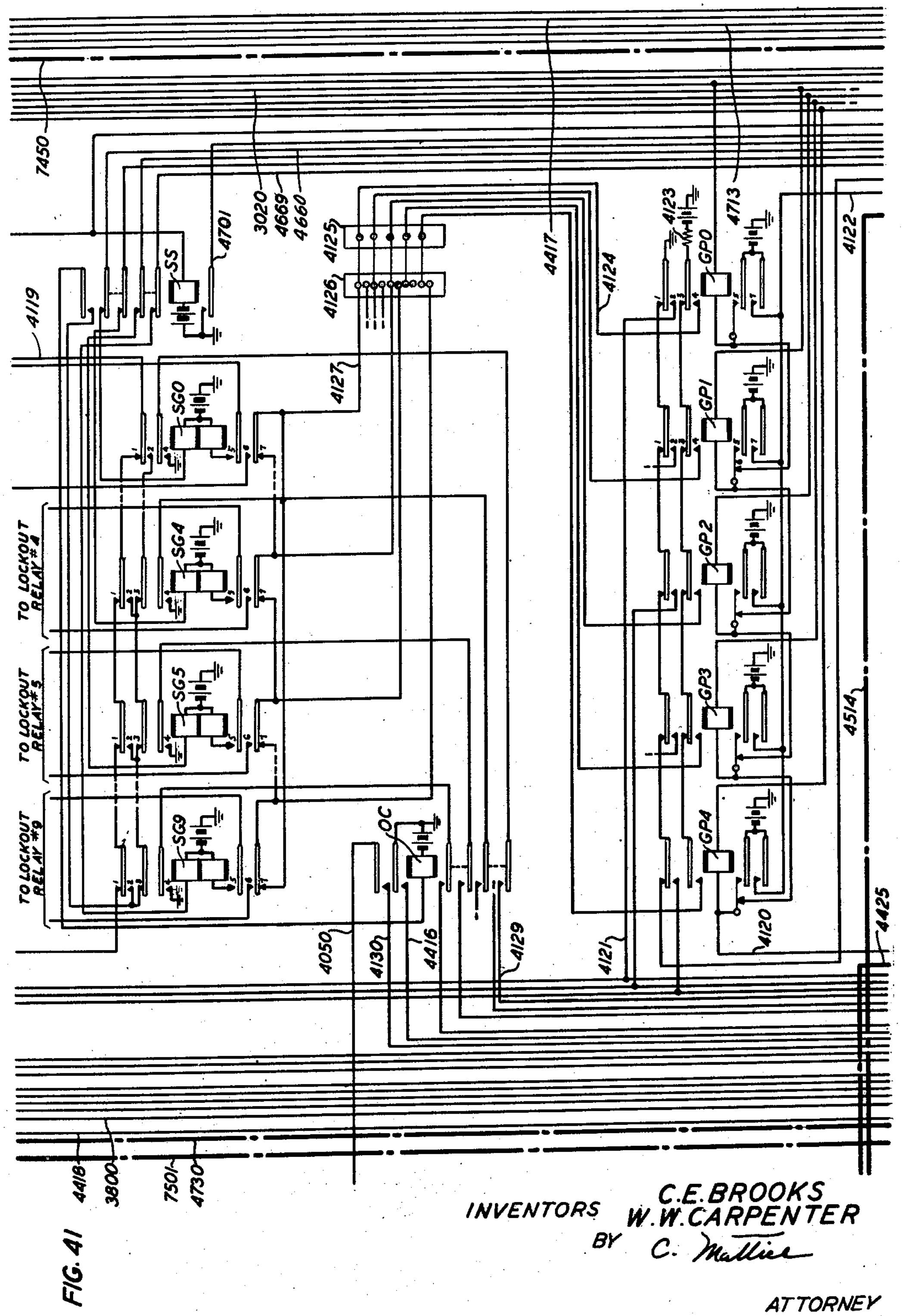
Figure 42:
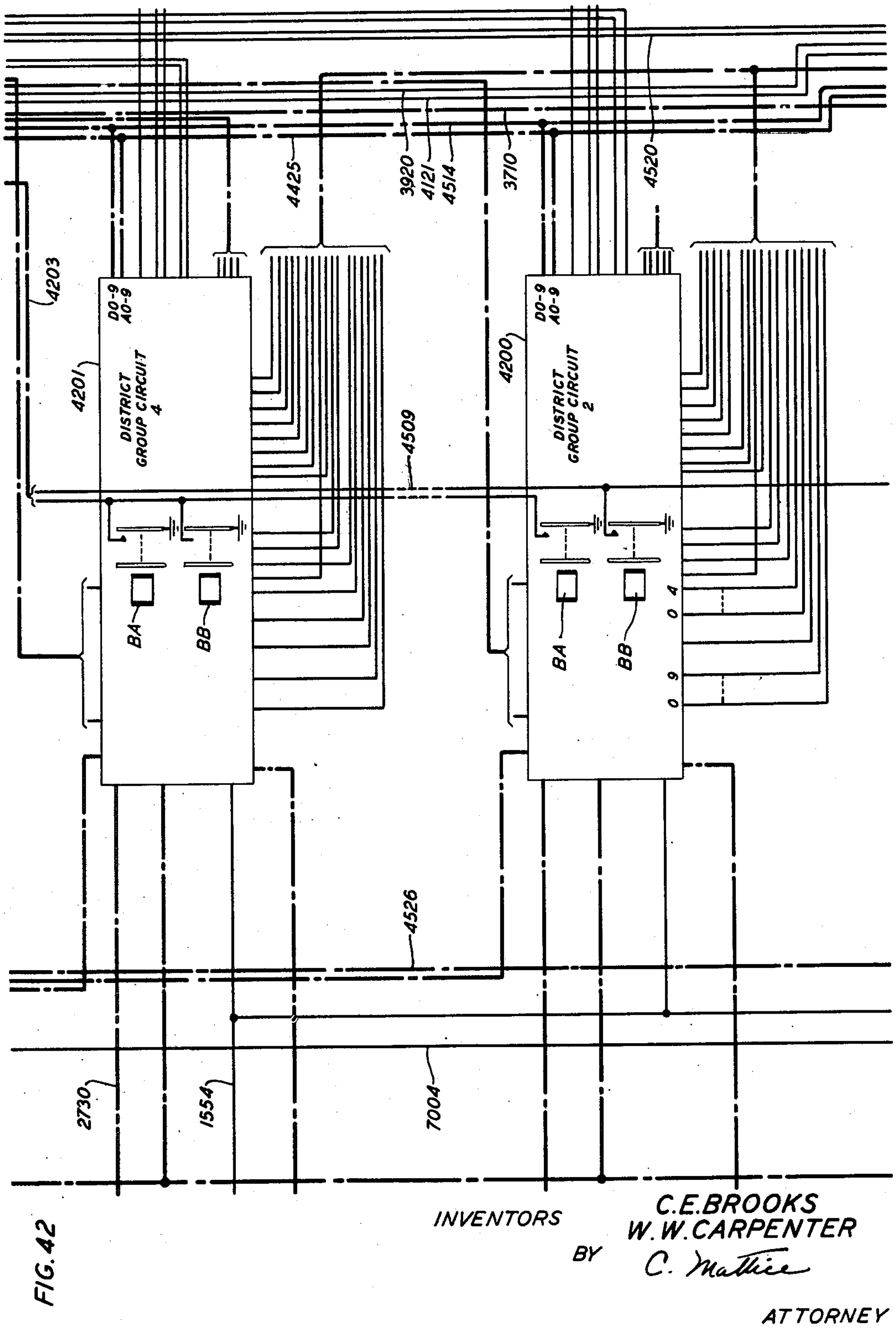

In Fig. 40 is shown one secondary sender link switch 0, with the horizontal strapping cut to form four sections. The select magnets are common to all four sections, while the correspondingly located hold magnets of the first and third sections are connected in multiple so that two cross-points are closed simultaneously to provide the necessary number of circuits through the link switches. The hold magnets of the second and fourth sections are similarly connected in pairs. Fig. 37 shows secondary switches 2 and 4, while secondary switches 1 and 3 have been omitted. Because of the division of the switch multiple, each secondary switch gives access to twenty senders, one of which is shown in Figs. 48 to 63.

The district junctor frame has a capacity of one hundred district junctor circuits arranged in five groups of twenty each. Each district junctor circuit is connected to three cross bar switches, namely, a secondary switch of a line link over which it is connected toward a calling line, a primary switch of a sender link which extends it toward a sender and a primary switch of the district link over which it is extended toward an outgoing trunk. The district link frame and the sender link frame are individual to the district junctor frame, but each group of district junctors is connected to a different line link frame or to a pair of line link frames connected in multiple. At the district link frame the district junctors are arranged in groups of ten, each served by twenty district links.

Figs. 64, 66, 68 and 70 indicate the arrangement of one district junctor frame to which the recorder of Figs. 8 to 13 is individual, district junctor 0 being shown in detail. District junctors 0 to 19 form one incoming group reached over secondary line switches 0 and 1 on frame 0.

Junctors 49 and 50 are reached over line switch frame 2, while junctors 80 to 89 are reached over line switch frame 4. All of the junctors shown are served by the sender link control circuit of Figs. 35 to 47.

District junctors 0 to 9 appear in the ten horizontal rows of contacts in the primary district switch 0, while district junctors 10 to 19 appear in the horizontal rows of contacts in primary district switch 1. Twenty district links serve each group of district junctors, appearing in the twenty verticals of the primary switches.

The markers and called number registers are connected with the sender by means of a marker and register connector which is essentially like that shown in the Carpenter patent above-mentioned to which reference is made for a complete disclosure of the control circuits. Briefly, the connector comprises a pair of multicontact relays for each sender, and multicontact relays for each marker and each register. The senders are divided into as many groups as there are markers and there is a multicontact relay for each marker in each group of channel so that all of the markers may serve senders simultaneously. As indicated, there are two called number registers which have a multicontact relay in each channel. A bare wire multiple serves as the contacts for the relays in each channel. For convenience, groups of conductors have been indicated by a single circuit passing through the connector.

There are two recorders like that shown in Fig. 8 to 13 for each district junctor frame, one serving district junctors 0 to 49 and the other serving junctors 50 to 99. The recorder comprises a tape punching mechanism having twenty-two punch magnets for punching holes at corresponding positions in a paper tape and a stepper magnet for advancing the tape after each punching operation. The circuits serve to operate the punch magnets to record the desired information.

The timing arrangement shown in Figs. 4 to 7 comprises a timing circuit individual to the recorder of Figs. 8 to 13 for indicating the time of the day and a timing circuit common to all recorders for indicating the day and month.

One day's time may be regarded as composed of 144 ten-minute intervals, each ten-minute interval being composed of 100 six-second intervals, so that the basic ten-minute interval can be indicated by three digits and the secondary, six-second interval may be indicated by two digits. Accordingly, the individual timer is made up of five rotary switches which are operated under the control of a master, six-second interrupter. Switches 700, 710 and 600 count the ten-minute intervals while switches 610 and 620 count the six-second intervals.

*Selection of line to be served*

Assume first that the subscriber at substation 2101, which is the tip party substation on line 2100, initiates a call. The removal of the receiver completes a circuit from battery through the winding of line relay L0 associated with level 0, back contact of hold magnet PLH0 of level 0, through substation 2101, back contact of magnet PLH0 to ground.

Relay L0, when operated in the circuit above traced, grounds conductors 2105 and 2106 for the purpose of starting the operation of the control circuit and to identify the calling line to the control circuit. The control circuit, as will be described hereinafter, in response to the grounding of these conductors first determines all of the levels in which a line is calling and prefers one level, then determines the vertical location of the individual switches of the preferred level in which calling lines are located, preferring one switch, and finally determines which lines in the preferred switch are calling and prefers one line for service.

The connection of ground to conductor 2105, which is common to the ten lines of the group including line 2100, completes a circuit which may be traced from conductor 2105 over an upper back contact of relay H–0, lower back contact of relay H–0, conductor 2108, back contact of relay GTA, winding of group start relay HA–0 to battery. Relay HA–0 locks over contact 6 to conductor 2108 and ground, independent of relay GTA. There is a relay like relay HA–0 for each level of the switch frame, relay HA–1 belonging to level 1 and relay HA–9, belonging to level 9, being shown. If a line in both level 1 and level 9 also originate calls at this time, relays HA–1 and HA–9 would also both operate and lock to their respective start circuits.

Any one of the relays HA–0, HA–1 or HA–9, in operating, closes a circuit for the start relay of the frame control circuit, which may be traced from battery, contact 1 of relay TA2, conductor 2601, winding of start relay CA(25), contact 5 of relay CB(25), contact 7 of relay LB, conductor 2503, contact 5 of relay HA–0 (or of relay HA–1 or relay HA–9), conductor 2404, contact 7 of relay TA1, conductor 2505, contact 5 of relay TA2, to ground at the contact of jack 2602. Relay CA(25) operates in this circuit, looking over its contact 3 to its operating circuit, independent of relay CB(25). Relay CA(25) also closes a circuit for relay FA which may be traced from battery on conductor 2601, winding of relay FA, contact 1 of relay CA(25), contact 1 of relay LA, to conductor 2503 and thence to ground as above traced.

At contact 4 relay CA(25) connects ground over contact 8 of relay LA to conductor 2510 and the armature of interrupter 2603 to start timing the operation of the control circuit.

Relay FA operates the connect relay AC(27), and HC0, HC1, HC2 and HC3 for connecting the frame circuits with the control circuit. The circuit of relay AC(27) may be traced from battery at contact 7 of relay TA2, conductor 2604, winding of relay AC(27), conductor 2701, contact 7 of relay FA, conductor 2511, contact 8 of release relay RL(34) to ground. Relay AC(27) operates in this circuit and locks in a circuit which extends as above traced to contact 7 of relay FA and thence over contact 6 of relay FA, and conductor 2512 to ground at the inner right contact of relay AC(27).

Relays HC0, HC1, HC2 and HC3 operate in a circuit which may be traced from battery at contact 8 of relay TA2, conductor 2605 through the windings of relays HC0, HC1, HC2 and HC3 in parallel, conductor 2804, contact 9 of relay FA, conductor 2513 to ground at contact 7 of release relay RL(34). Relay HC3 at contact 4 connects ground over conductor 2805 to contacts 8 and 9 of relay FA completing a locking circuit for relays HC0 to HC3.

With the connect relays operated, a circuit is closed from ground at the outer left contact of relay AC(27), conductor 2702, to the winding of gate relay GTA and battery. Relay GTA operates in this circuit, opening the operating circuits for the group start relays HA0, etc. to prevent any subsequent calls from operating a group start relay. At its inner left contact, relay GTA closes a locking circuit for itself over conductor 2405 to ground at contact 5 of relay CA(25). The home control circuit is now locked to the frame circuit. At its outer left contact, relay GTA completes a circuit from ground to conductor 2406, over contact 3 of relay LA, conductor 2514, contact 1 of relay HC3, conductor 2806, contact 2 of relay HA0, conductor 2407, winding of horizontal group relay HG0 and battery. With relay HG0 operated, the control circuit is individually associated with horizontal level 0, and the operation of this relay therefore serves to determine one item in the identity of the calling line as will appear hereinafter. Although relays HA1 and HA9 remain operated, they are ineffective until the calls in the preferred horizontal group have been served.

Since all lines in level 0 are served by the same group of line links, relay HG0 prepares these links for use by operating the corresponding select magnets in the secondary line switches to which they extend. For example, it closes an obvious circuit for select magnet SLS0 in secondary line switch 0, which has access to district junctors 00 to 09 and closes similar circuits for the select magnets associated with the zero sets of horizontal contacts in each of the secondary line switches. Select magnet ISLS0 which is connected in multiple with select magnet SLS0 serves the secondary line switch which has access to line junctors (not shown). Magnet SLS0 and the other select magnets prepare their corresponding sets of terminals for operation.

As soon as relay HC1 operates, a substitute locking circuit is closed for relay HA0 which may be traced over contacts 6 and 4 of relay HA0, conductor 2409, contact 6 of relay LA, conductor 2515, contact of relay HC1, conductor 2811 through cable 2830, to ground through the winding of relay S(31) and at the back contact of relay VT.

With relay HG0 operated, the seven start leads belonging to the seven switches, which may be multipled together in any one level, are extended to the control circuit. Conductor 2105 which was grounded by line relay L0(21) is extended over contact 2203 to common conductor 2204, contact of connect relay HC0, conductor 2807, back contact of relay VE, winding of relay V0 to battery. Relay V0 operates in this circuit and locks over contact 4 to conductor 2807 independent of relay VE.

Since the start conductors of the level are connected in multiple over the back contacts of relay H0, ground on conductor 2105 is extended over the other back contacts of relay H0 to the other start conductors, for example, to conductor 2109 and thence over contact 2205 of relay HG0 and conductor 2206, contact of relay HC0, conductor 2808, back contact of relay VE to the winding of relay V6 and battery. Relay V6 locks to conductor 2808 independent of relay VE. In a similar manner, relays V1 to V5 also operate and lock. As soon as any one of the relays V0 to V6 is operated, a circuit is closed which may be traced from ground at contacts 1 of relays V0 to V6 in parallel, conductor 3101, contact 10 of release relay RL(34), to battery through the winding of relay TT. With all of the relays V0 to V6 operated, a circuit is closed from battery through the winding of relay VT, conductor 3403, over the lower front contacts of relays V6 to V0 in series, conductor 3102, contact 6 of relay TT, conductor 3404, contact 2 of relay HC3, conductor 2809, contact 2207 of relay HG0, conductor 2208, back contact of relay H0 to grounded start conductor 2105.

Relay VT, in operating, closes a locking circuit for itself which may be traced over conductor 3403, winding of relay VS, conductor 3104, contacts of relay VT, conductor 3405, through cable 3402, to ground at a contact of relay AC(27), but relay VS does not operate, being shunted by the operating circuit of relay VT. At the same time, relay VT extends ground on conductor 3405 to conductor 3406, contact of relay HC1, conductor 2810, contact 7 of relay HA0, conductor 2408, winding of relay H0 to battery.

Relay H0 operates in this circuit and opens the multiple connection between the start leads of the switches of level 0. Therefore, all of the relays V0 to V6 release which are not locked to start leads of calling groups. It has already been assumed that the calling line is in group zero so that relay V0 is held locked. Assume also that a line is calling in group 6 and that, therefore, relay V6 also remains locked. All of the relays V1 to V5 release. Relay H0 also disconnects ground from conductor 2208, thereby opening the operating circuit for relay VT and permitting relay VS to operate in the locking circuit above traced.

With relay VS operated, a circuit is closed from battery through the winding of relay VE, contact 1 of relay VS, contact 5 of relay V0, conductor 2807 and thence as previously traced to ground on start conductor 2105. Relay VE opens the operating circuits for relays V0 to V6, thereby preventing the initiation of a call in any other group from interfering with the calls already locked in.

The selection of the tens group to be served now takes place. When relay VT operated, as above-described, it disconnected ground from the locking circuit of relay HA0, but relay HA0 remains operated through the winding of relay S(31), which relay now operates. When relay VE operates, a circuit is closed from ground, contact 9 of relay VE, front contact of relay S(31), contact 3 of relay V0, conductor 3110 through cable 2830, contact of relay HC1, conductor 2812, contact 2209 of relay HG0, conductor 2210, windings of relays LR0 and HM0 of the zero level to battery. Relays LR0 and HM0 are individual to the group of ten lines served by the primary line switch occupying the zero vertical row in the preferred level, level 0, and serve to extend to the control circuit, the individual identifying conductors and the hold magnet operating circuits belonging to the preferred switch.

Ground connected to conductor 2106 by line relay L0 now completes a circuit over contact 0 of relay LR0, conductor 2112, through cables 2110 and 2130, contact of relay AC(27), conductor 2703, through cable 2705, back contact of relay LE, winding of relay LT0 to battery. If any other line in this group is calling, the corresponding one of the relays LT1 to LT9 will also be operated. Relay LT0 in operating extends ground from conductor 2703 over its contact 7, conductor 3201, through the winding of relay RE to battery. Relay RE operates in this circuit and closes a circuit from the ground on conductor 2703, contact of relay LE, contact 6 of relay LT0, conductor 3202, contact 2 of relay RE, conductor 3408, winding of relay LS and battery. Relay LS locks in a circuit from battery through its winding, over its contacts 4 and 2, conductor 3204, contact 8 of relay VE, conductor 3101 to ground at contact 1 of relay V0. Relay LS extends this locking ground over its contact 3 to the winding of relay LE and battery, and over its contact 2 and conductor 3202, to the contact 6 and the winding of relay LT0 and battery. Relay LS at contact 6 also connects ground over conductor 3205 to the winding of relay VE, holding that relay operated. A branch of this circuit extends over contact 1 of relay VS, contacts 5 and 4 of relay V0 to battery through the winding of that relay to provide an auxiliary holding circuit for relay V0 and thereby for relay LS itself.

Relay LE, in operating, opened the operating circuits for relays LT1 to LT9 and, since the locking circuits for these relays extend over a series chain circuit including the contacts 5 of all lower numbered relays, the operation of relay LT0 prevents relays LT1 to LT9 from locking, and these relays release, following the operation of relay LE. Therefore, the zero line has been preferred for service, and relay LT0 closes circuits by which the calling line may be identified as line 0 in the switch which has already been identified as occupying vertical position 0 in horizontal level 0. Any other calling line may be similarly identified by its line number, vertical number and horizontal number.

Up to the operation of relay LS, the release of the connection has been under the control of the calling subscriber, since relay V0 was locked to start conductor 2105 and held relay TT operated. The abandonment of a call prior to the operation of relay LS releases relays V0 and TT to close a circuit for release relay RL(34) over conductor 3409, contact 2 of relays V6 to V0, contact of relay S(31) to ground at contact 9 of relay VE or over contact 4 of relay VS, conductor 3105, contact 7 of relay TT, conductor 3410 to ground at a contact of relay AC(27). The functions of release relay RL(34) will be described hereinafter. However, when relay LS is operated, relays V0 and LS are locked under mutual control, until released by the sender control circuit or the time alarm circuit.

While the foregoing operations are taking place, the selection of an idle district junctor and an idle sender is started.

As pointed out previously, each line switch frame has access to one hundred district junctors, which appear in groups of twenty on five district frames, each of which is served by a sender link control circuit for connecting a district junctor with an idle sender. Therefore, the line link control circuit, as a first step toward picking an idle district junctor, looks for a group of junctors which is associated with an idle sender control circuit, and which has an idle path available to a group of senders including idle ones. The first, or regular, test requires that there be at least two idle district junctors in the group. A reserve test, made if the regular test fails, makes use of groups containing a single junctor.

To start the regular test, the line link control circuit first determines which of the line links are available. Horizontal group relay HG0, when operated, closed test circuits for the ten line links 00 to 09 connecting the zero primary line switch level with each of the secondary line switches. The test circuit for line link 00 extends from sleeve conductor 2115, to contacts 2211 and 2213 of relay HG0. Over contact 2211, relay HG0 connects battery through retard coil 2212 to the sleeve conductor and over contact 2213, extends the sleeve conductor by way of conductor 2214, contact of relay AC(27), conductor 2704, to the winding of relay T0 and battery. The test circuit for line link 09 may be similarly traced to the winding of relay T9 and battery. When a line link is busy, ground is connected to the sleeve conductor from the district junctor or incoming junctor with which it is in use. Therefore, only those relays of the group T0 to T9 which correspond to busy line links are operated, while those corresponding to available line links remain normal.

When relays TT and VT operate, following the tens group determination, circuits are closed for determining which district junctor groups are available. For this purpose, group test relays G0 to G9 are employed, the relays being arranged in pairs, G0 and G1 to G8 and G9, each pair corresponding to the group of twenty district junctors connecting the calling line switch frame with one district frame. The circuit for relay G0 may be traced from battery through the right winding of relay G0, contact 5 of relay TT, back contact of relay T0, assuming the corresponding line link to be idle, back contact of relay GE, conductor 3412 through cable 3413, contact of relay AC(27), back contact of relay RS, conductor 2706, over the back contact of relay CA(45), conductor 4501, contact 6 of relay DP to conductor 4503. From conductor 4503 there lead 10 branches over back contacts of relays GB0, GB4, GB5 and GB9 corresponding to the ten subgroups of district junctors served by this sender link control circuit. The branch extending over the back contact of relay GB0 may be further traced over conductor 4610 through cable 4675 to ground at the back contact of hold magnet SSH0B of secondary sender switch 0. Three other branches are shown extending respectively over back contacts of relays GB5, GB4 and GB9, and conductors 4615, 4614 and 4619 to ground at the back contact of hold magnet SSH4B of secondary sender switch 0, at the back contact of hold magnet SSH0B of secondary switch 4 and at the back contact of hold magnet SSH4B of secondary switch 4. A similar circuit may be traced for the other relay of the pair, relay G1, over the back contact of relay GE to conductor 2707 and thence over the back contact of relay CB(45) to conductor 4501 and over the same circuit as traced for relay G0. The circuits for relays G8 and G9 extend over contacts of relay VT, contacts of link test relays T8 and T9 and thence as traced for the other group test relays to conductors 2708 and 2709 extending to a different sender link and control circuit.

Relays CA(45) and CB(45) are test relays for the corresponding subgroups of district junctors. These relays are operated, as will be described hereinafter, to apply a test to the junctor group each time that the sender link control circuit is released. If two or more junctors of each of the subgroups are idle, relays CA(45) and CB(45) are released; if less than two are idle the relay is held operated. Therefore, for those junctor subgroups of which less than two are idle, the group test circuit is open at the contact of a relay like relay CA(45). Relay DP is a group busy relay which is operated whenever the sender link control circuit is engaged with the associated group of junctors, and therefore the group test circuit is opened in busy sender link control circuits at the contact of a relay like relay DP. Each of the ten relays GB0 to GB9 corresponds to a group of senders and is released, as will appear later, as long as there is at least one idle sender in the group. Therefore, each busy group of senders opens one of the ten branches from conductor 4503. The hold magnets, such as magnet SSH0B, are held operated when the associated sender link is busy in a connection. Each branch of conductor 4503 extends to the back contact of the hold magnet belonging to the link which connects the primary switch serving the junctor group under test with the secondary switch serving the group of senders corresponding to the relay GB0, etc. controlling that branch. Therefore, the group test circuit is controlled by the hold magnet of each one of the links which might be used and is open at busy links.

From the foregoing it is clear how the completion of a group test circuit shows that there are at least two idle junctors in the group, that the associated sender link control circuit is idle, and that it has access over an idle sender link to a group of senders having at least one idle sender.

Assuming that conductors 2706, 2707, 2708 and 2709 are all grounded, relays G0, G1, G8 and G9 operate. The control circuit then expresses a preference for a particular district group.

Figure 33:
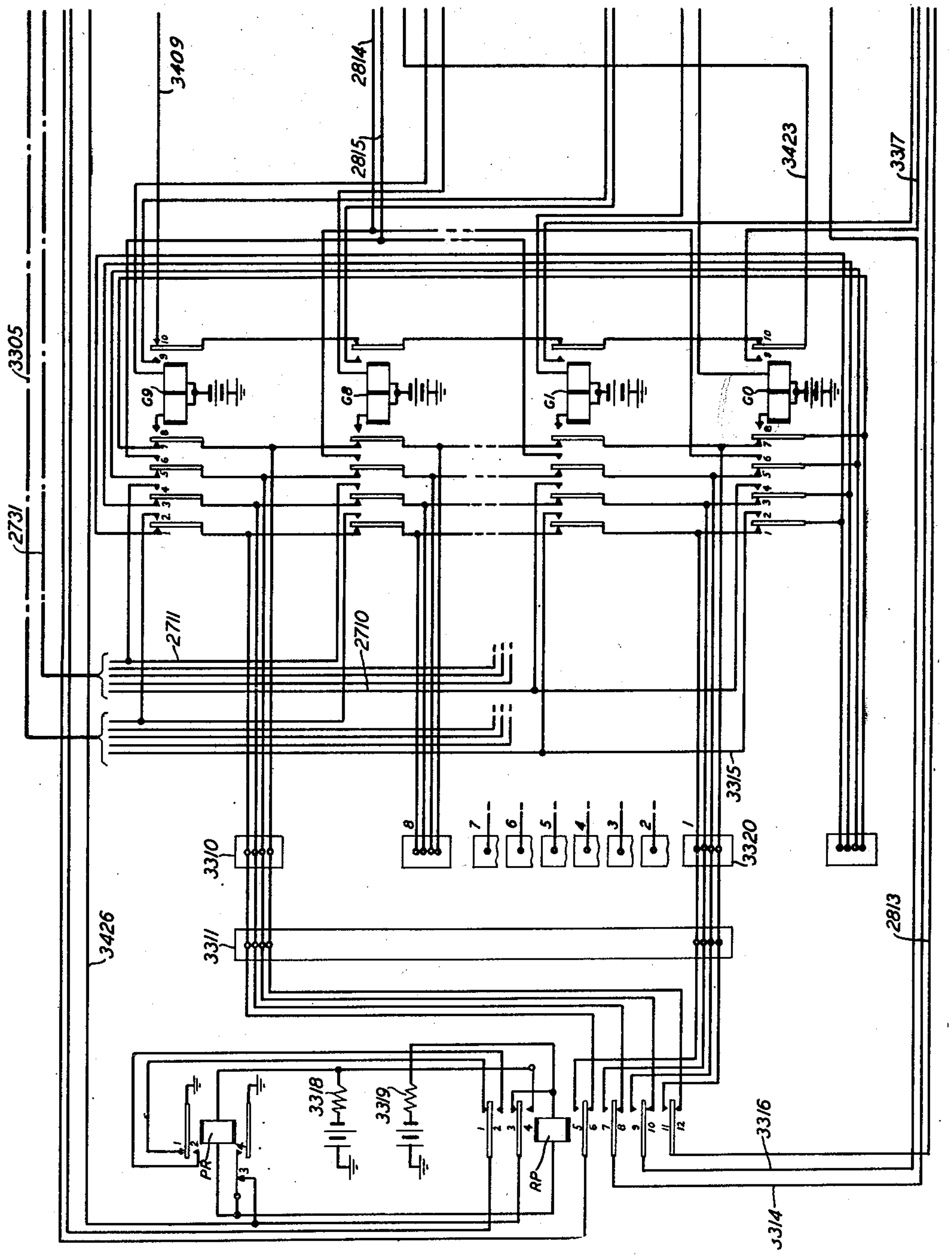
Figure 34:
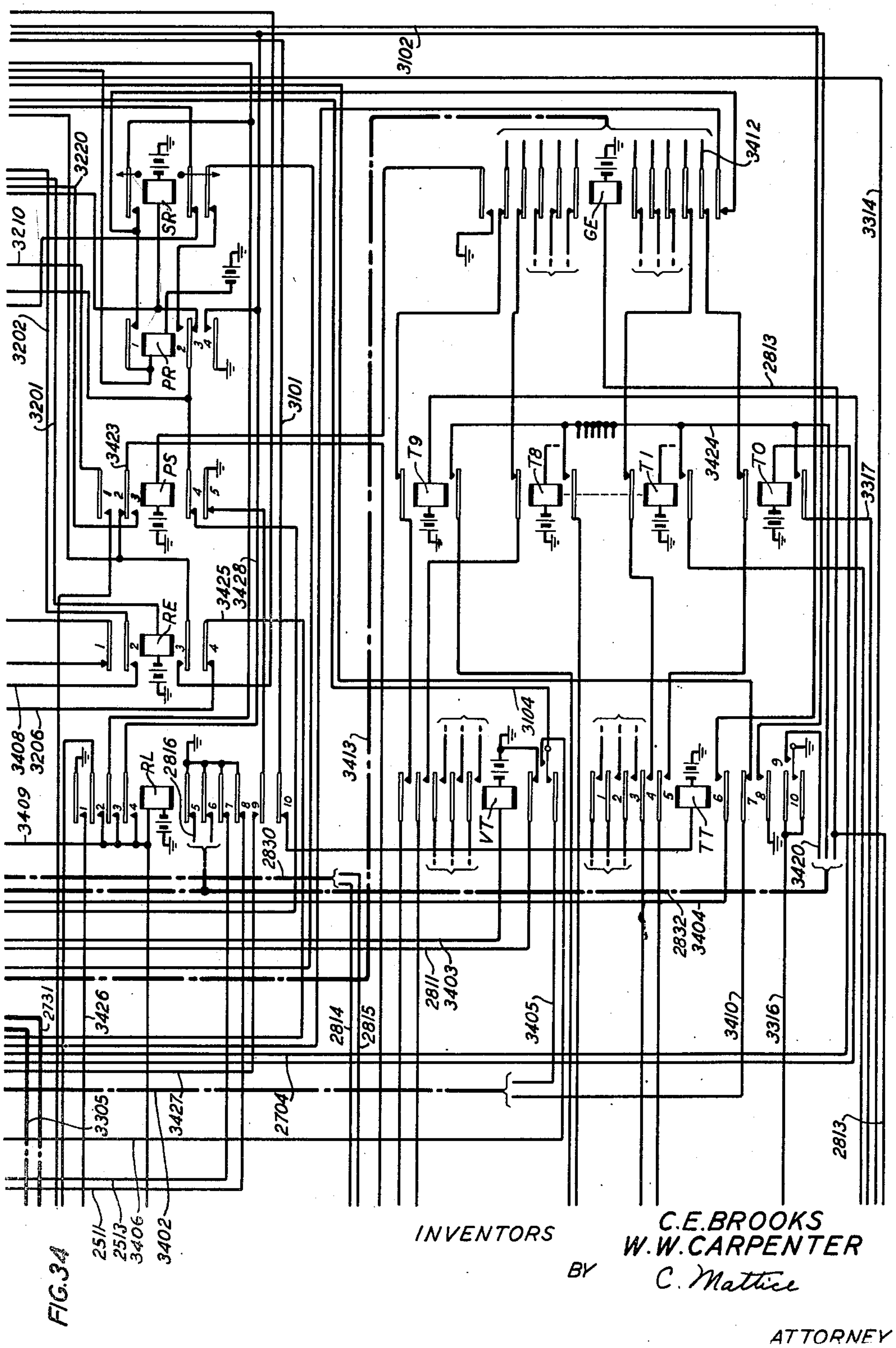

In order to spread the use of the district junctor groups, the contacts of the group relays G0 to G9 are connected to cross-connecting racks such as racks 3310 and 3311, where they may be cross-connected to the contacts of relay RP. In the various line link control circuits different group relays are so connected, thereby causing different district groups to be preferred by the different control circuits. Relays PR and RP are operated and released under the control of release relay RL(34) and different district group relays are connected to the front and back contacts of relay RP to vary the preference for successive calls. As shown in Fig. 33, the cross-connections give groups 0 and 9 preference on alternate calls.

Figure 30:
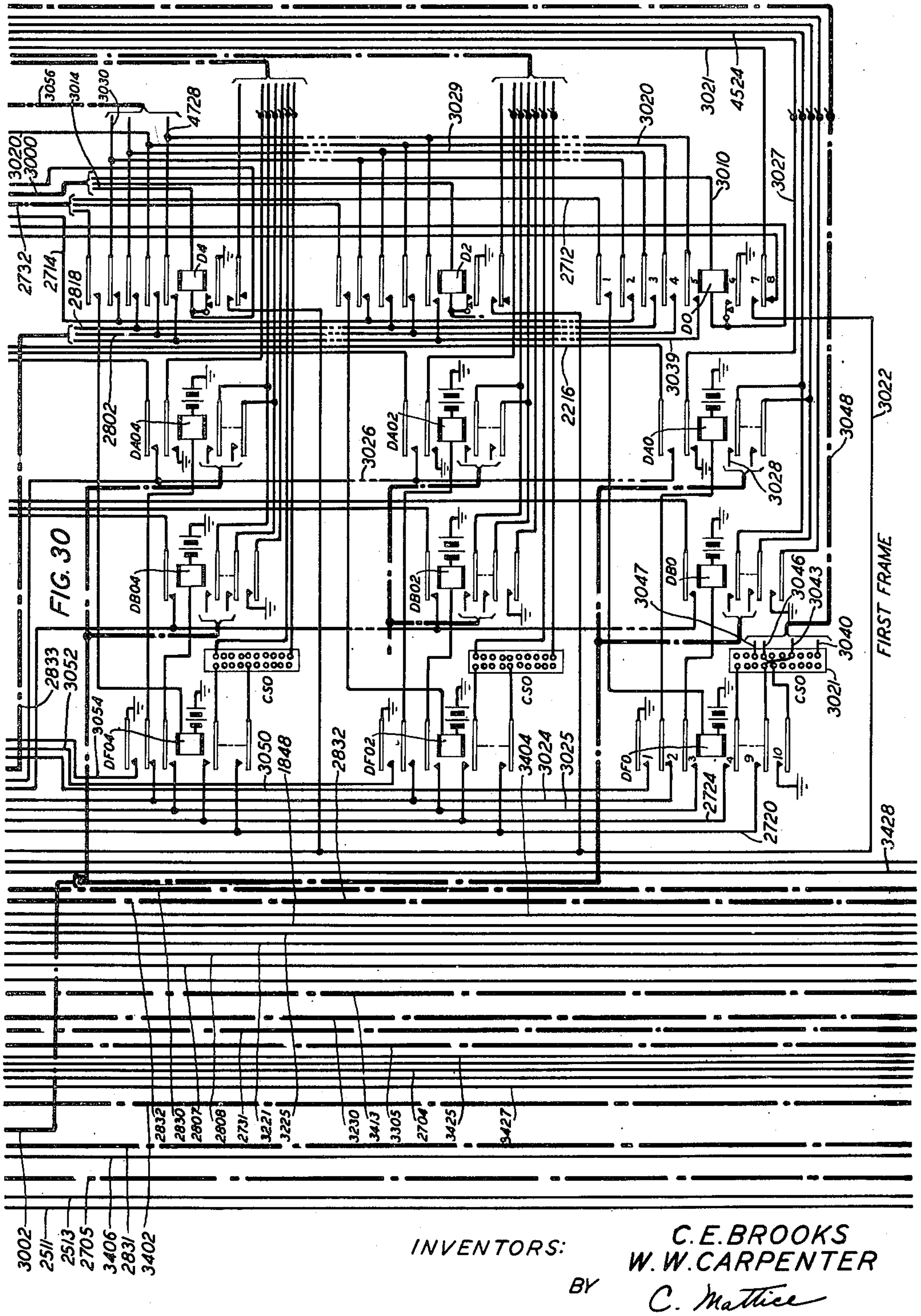
Figure 31:
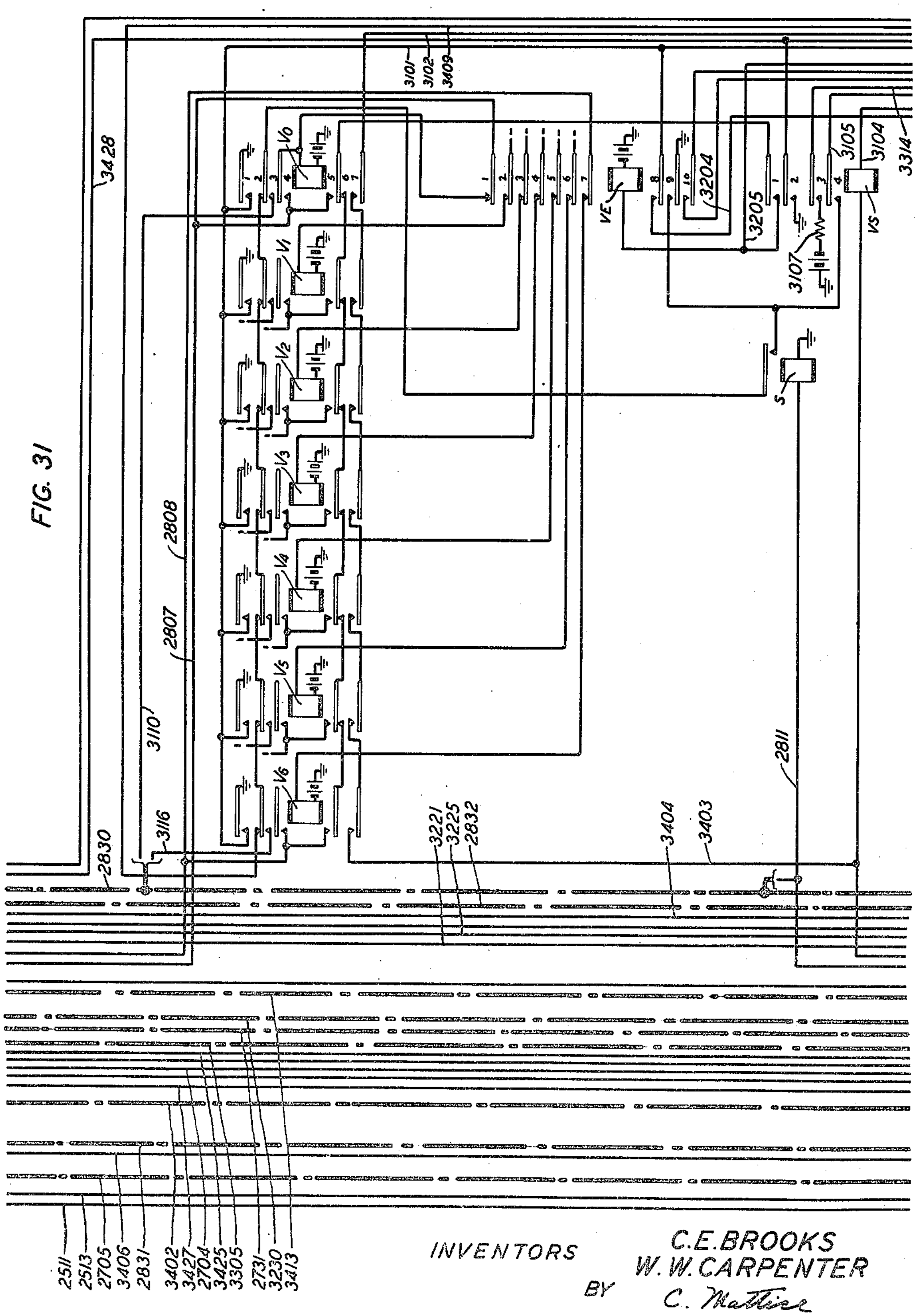
Figure 32:
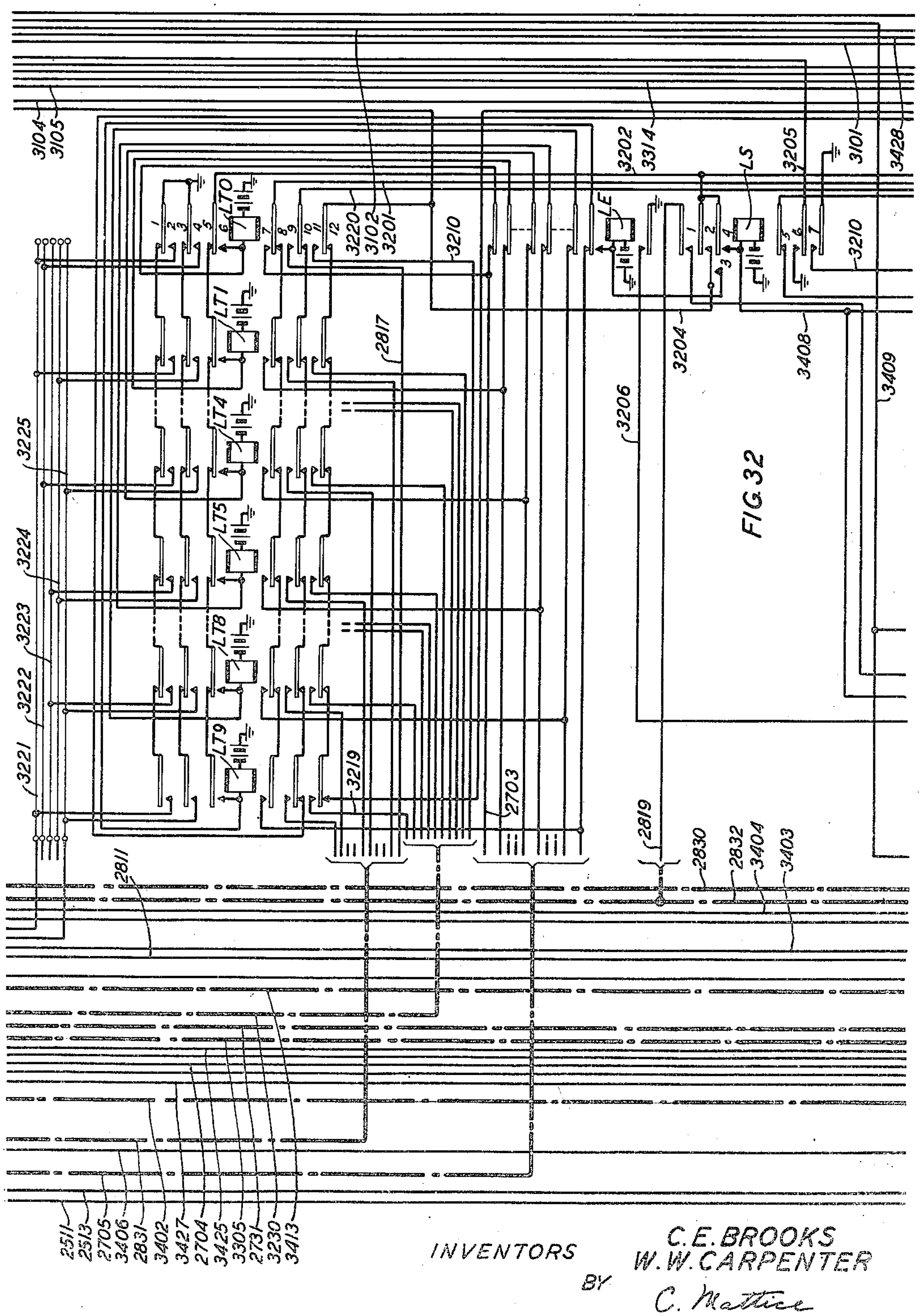

With relay G9 operated, the preference causes the attempted operation of lock-out relay D4 of this line link control circuit in a circuit which may be traced from ground at the normal contacts of relay D4 of the last line link frame, normal contacts of relays D4 of the intermediate line link frames, winding of relay D4 of Fig. 30, conductor 3014 through cable 3000, contact of relay AC(27), conductor 2711 through cable 2731, contact 4 of relay G9, cross-connections between racks 3310 and 3311, contact 8 of relay RP, conductor 3314, contact 3 of relay VS, resistance 3107 to battery.

Figure 29:
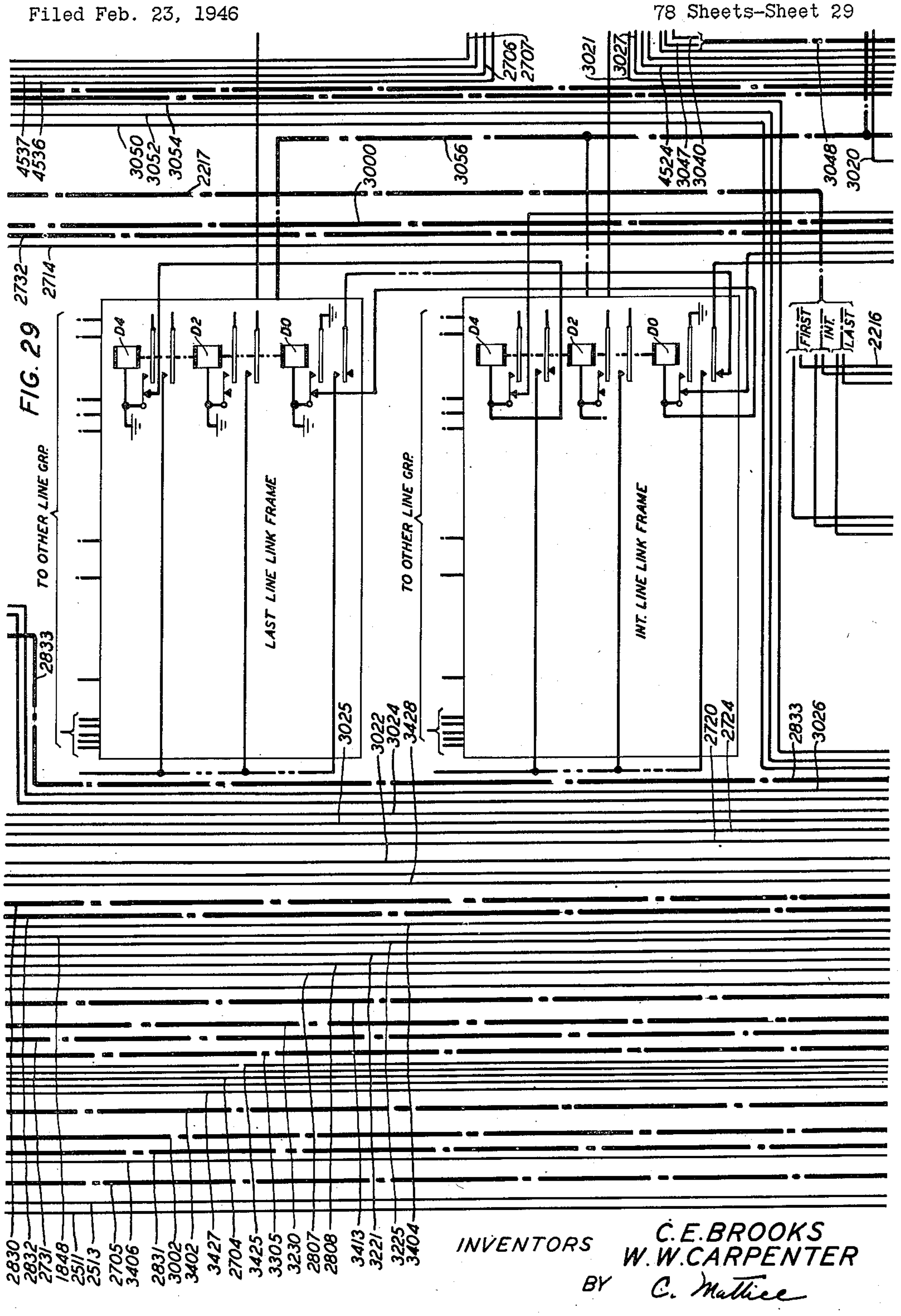

From a consideration of Figs. 29 and 30, it will be apparent that each group of twenty district junctors is represented by a relay at each line link frame having access thereto and that these relays are arranged in a chain circuit so that the line link frames have a particular order of preference. For example, the last group of district junctors to which the line switches of Figs. 16, 19 and 22 have access is represented by a relay D4 in the first line link frame, which is the one shown in detail, and by a relay D4 in the intermediate line link frame and the last line link frame indicated in Fig. 29, as well as in the two frames not shown. If all of the control circuits of these frames were ready to prefer a group of district junctors at the same time, each one would supply battery to the winding of the associated relay, but, because of the chain arrangement of the ground supply, the relay D4 in the last control circuit would operate from the ground connected directly to its winding and open the chain circuit to the other D4 relays, thereby preventing their operation.

Assuming that relay D4 in the last frame has been thus operated by another line link frame, its operation results, in the manner to be described, in opening the operating circuits for relays G8 and G9 and causing them to release. A new preference circuit now exists, from battery to the armature of relay G9 as above traced, but now extending over contact 3 of relay G9, contact 4 of relay G0, conductor 2710, contact of relay AC(27), conductor 3010, winding of relay D0 of Fig. 30 to ground over normal contacts of the D0 relays of the other line link frames.

Assuming that no other line link frame is competing for this district junctor group, relay D0(30) operates and locks to ground at its contact. With relay D0(30) operated, the line link control circuit signals the sender link control circuit associated with the preferred junctor group that it desires to extend a connection by means of that group. This circuit may be traced from ground at contact 9 of relay TT, conductor 3420 through cable 2832, contact 7 of relay HC3, conductor 2802 through cable 2833, contact 4 of relay D0(30), conductor 3020 and thence in the sender link control circuit, to the winding of relay GP0, normal contacts 6 of relays GP1 to GP4, conductor 4120, contacts 3 of relays D9 to D0(44), conductor 4410, contact of relay TL, contact 6 of relay ON(44) to battery.

The five relays GP0 to GP4 are individual to the five groups of twenty trunks appearing on the district frame, each group incoming from a different line switch frame. These operating circuits are arranged in a chain so that, if more than one line switch frame desires service, a higher numbered relay, in operating opens the operating circuit for the lower numbered relays and gives preference to the corresponding trunk group and the associated line switch frame. Assuming that no other line switch frame is seeking service, relay GP0 operates, locking to battery over its contact 5. At contact 2, relay GP0 closes a circuit from ground over conductor 4121, winding of group relay G to battery. Relay G individualizes the sender link control circuit to the corresponding group of junctors and transmits a signal to the line link control circuit associated therewith by closing the locking circuit for relay G0. This circuit may be traced from battery through the locking winding and contact 8 of relay G0, contact 7 of relay G9, cross-connections at racks 3311 and 3310, contact 12 of relay RP, conductor 2813 through cable 2832, contact 11 of relay HC3, conductor 3022, contact 7 of relay D0(30) to conductor 3021 from which it may be further traced over contact 4506 of relay G, conductor 4507, back contact of relay OS, conductor 4701, contact 4508 of relay G, to conductor 4503 and thence to ground at a hold magnet contact as previously traced. A branch of conductor 2813 extends to the winding of relay GE and battery. Relay GE operates, opening the operating circuits for relays G0 to G9. With the exception of relay G0 which has just been locked, all of the operated group test relays now release.

Relay GE also closes an obvious circuit for relay PS. With relay PS operated, a circuit is completed from ground at contact 7 of relay LS, contact 1 of relay PS, contact 6 of relay RP, cross-connections at racks 3311 and 3310, contact 1 of relay G9, contact 2 of relay G0, conductor 3315 through cable 3305, contact of relay AC(27), conductor 2712 through cable 2732, contact 1 of relay D0(30), winding of relay DF0 to battery. Relay DF0, like relay D0(30), is representative of the preferred group of twenty district junctors and its operation completes the process of selecting the twenty-group. At contacts 2 and 3, relay DF0 extends the circuits of relays DA0 and DB0 by way of conductors 3024 and 3025, contacts of relay HC1, conductors 2814 and 2815 through cable 2830, to contacts of the even and odd group relays G0 to G9, where, since only relay G0 is locked operated, the circuit of relay DA0 is extended from conductor 2814, over contact 6 of relay G0, contact 5 of relay G9, cross-connections at racks 3310 and 3311, contact 10 of relay RP, conductor 3316 to ground at contact 10 of relay TT. Therefore, relay DA0, representing the first ten of the group of twenty district junctors, is the one to operate. Relays D0(30), DF0 and DA0 establish a plurality of circuits interconnecting the line link control circuit with the sender link control circuit associated with the selected group of district junctors.

In addition, the selection of the subgroup of ten district junctors determines which secondary line switch will be used, and thereby, which one of the ten line links serving the calling line will be used. Therefore, relay DA0 closes the circuit for the primary select magnets associated with that line link. This circuit may be traced from battery through the windings of the seven select magnets PLS0 to PLS60, etc. belonging to the seven primary line switches located in level 0, conductor 2122, contact 2215 of relay HG0, conductor 2216 through cable 2217, contact of relay DA0, conductor 3026, contact 5 of relay HC3, conductor 2816 through cable 2832, to ground at the contact 5 of release relay RL(34).

Subscribers' lines requiring the same class of service are placed in the same relative positions in each group of ten lines. Therefore the individual line test relays LT0, LT1, etc. operated by the calling line is an indication of the class of service required by that line. Contacts 11 of the ten relays LT0 to LT9 are connected to ten conductors 3210 to 3219, respectively. These conductors extend, through cable 3230 to contacts of relay AC(27) and thereover to cross-connecting rack 2718 where they are cross-connected to rack 2719 and five conductors 2720 to 2724. With relay DF0 operated these conductors are extended over contacts of relay DF0 to another cross-connecting rack 3021 at which they are cross-connected to eight conductors 3040 to 3047 leading through cable 3048, to the sender link control circuit.

*Selection of district junctor and sender*

With relay DA0 operated as described, ground is connected to conductor 3027 to identify the selected subgroup of ten junctors in the group of twenty junctors. Ground on conductor 3027 operates subgroup relay BA which prepares test circuits for the district junctors and operates relay DA. Relay DA closes a holding circuit for relay G and prepares the operating circuits for the hold magnets of the primary sender link switch. Relay BA also initiates the operation of the tape recorder to record the calling line number as will be described hereinafter.

When relay GP0 operated as above described, it closed a circuit from battery at its contact 7 over conductor 4122, contact 6 of relay DS(47), conductor 4703, winding of relay RS to ground. Relay RS closes a circuit from ground through the winding of relay DE, to battery at the normal contact of relay TM. Relay DE operates in this circuit, preparing the circuits for the individual district test relays D0(44) to D9.

When relay G operated, it closed a circuit from ground over contact 4505, conductor 4512, to the winding of relay ON(44) and battery. Relay ON(44) at contact 6 removes battery from the chain operating circuit for relays GP0 to GP4. At contacts 3, 4 and 5 it connects ground to the windings of relay D0(44) to D9. At contact 2 it connects ground to off-normal ground conductor 4416. At contact 1 relay ON(44) closes a circuit from battery through the winding of relay ON1(44), contact 1 of relay ON(44), conductor 4417 to ground at the back contact of relay TA(38). At contact 8, relay ON1(44) connects ground over conductor 4418 to battery through the winding of relay TS, to start the operation of the timing relays.

At contacts 2 to 6, relay ON1(44) closes circuits for operating the group busy relays in each of the five district group circuits of the frame served by the sender link control circuit. Five such circuits are provided, one shown in detail in Fig. 45 and two indicated by rectangles 4200 and 4201 in Fig. 42. The circuit closed by ground at contact 6 of relay ON1(44) may be traced over conductor 4419 to the left winding of relay DP and battery. Relay DP opens the group test circuit and prepares circuits for relays CA(45) and CB(45) which become effective hereinafter. It also closes shunts around the windings of relays A(45) and B(45) to prevent their false operation. The operation of relays corresponding to relay DP in the other group circuits marks this sender control circuit as unavailable to other line link frames.

With relays ON(44) and DE operated, circuits are closed for testing the individual junctors of the selected subgroup of ten. These test circuits extend from ground at contacts of relay ON(44), windings of relays D0(44) to D9 over contacts of relay DE, through cable 4514 and over contacts of relay BA to the ten district junctors of Figs. 68 and 70. District junctor 0 is shown in full in Fig. 70, while junctors 1 and 9 are indicated by rectangles 6801 and 6809. An idle district junctor is marked by battery connected to the busy test conductor. For example, assuming the zero junctor is idle, the test circuit may be traced from battery through resistance 7000, contact 3 of relay TP(70), contact 7 of relay T(70), contact 2 of relay SI(70) to test conductor 7004 leading to the sender link control circuit, where it is extended by relay BA in the district group circuit 0 to conductor 4513 through cable 4514, contact of relay DE, winding of relay D0 to ground at contact 5 of relay ON(44). Relay D0(44) and any other relays corresponding to idle districts, operate and lock over their contact 4 to battery. At contact 5 relay D0(44), as well as any other operated relay of the group, closes a circuit over conductor 4429, contact 1 of relay ON1(44), conductor 4420, winding of relay DS(47), conductor 4704, contact 4510 of relay G to ground at the normal contact of relay BB. Relay BB corresponds to relay BA but is individual to the other subgroup of ten trunks and should, therefore, not be operated. Therefore, the operation of relay DS(47) is a check that only one of the subgroup relays has been operated. Relay DS(47) at contacts 2 and 3 connects ground to conductors 4717 and 4718 which extend over contacts 4528 and 4529 of relay G to the windings of relays CA and CB and battery. Relays CA and CB operate and lock.

If more than one district junctor of the subgroup is idle, so that at least two of the district junctor test relays are operated, for example relays D0(44) and D4, a circuit is closed from ground, winding of relay TM, contact 9 of relay ON1(44), contact 6 of relay D0(44), contact 2 of relay D4 to battery on conductor 4429 supplied from contact 5 of either relay D0(44) or relay D4. Relay TM operates in this circuit and locks to battery at its alternate contact, at the same time opening the circuit of relay DE, to disconnect the junctor selecting relays from the district junctors. If only one district junctor is idle the circuit of relay TM cannot be closed. When relay DS(47) operates as above described, it opens the circuit of relay RS and relay RS, releasing slowly, after an interval opens the circuit of relay DE.

The district junctor to be used in extending the call has now been determined from the operated junctor select relays, the chain wiring over their contacts and the preference wiring, which will be described hereinafter.

Figure 43:
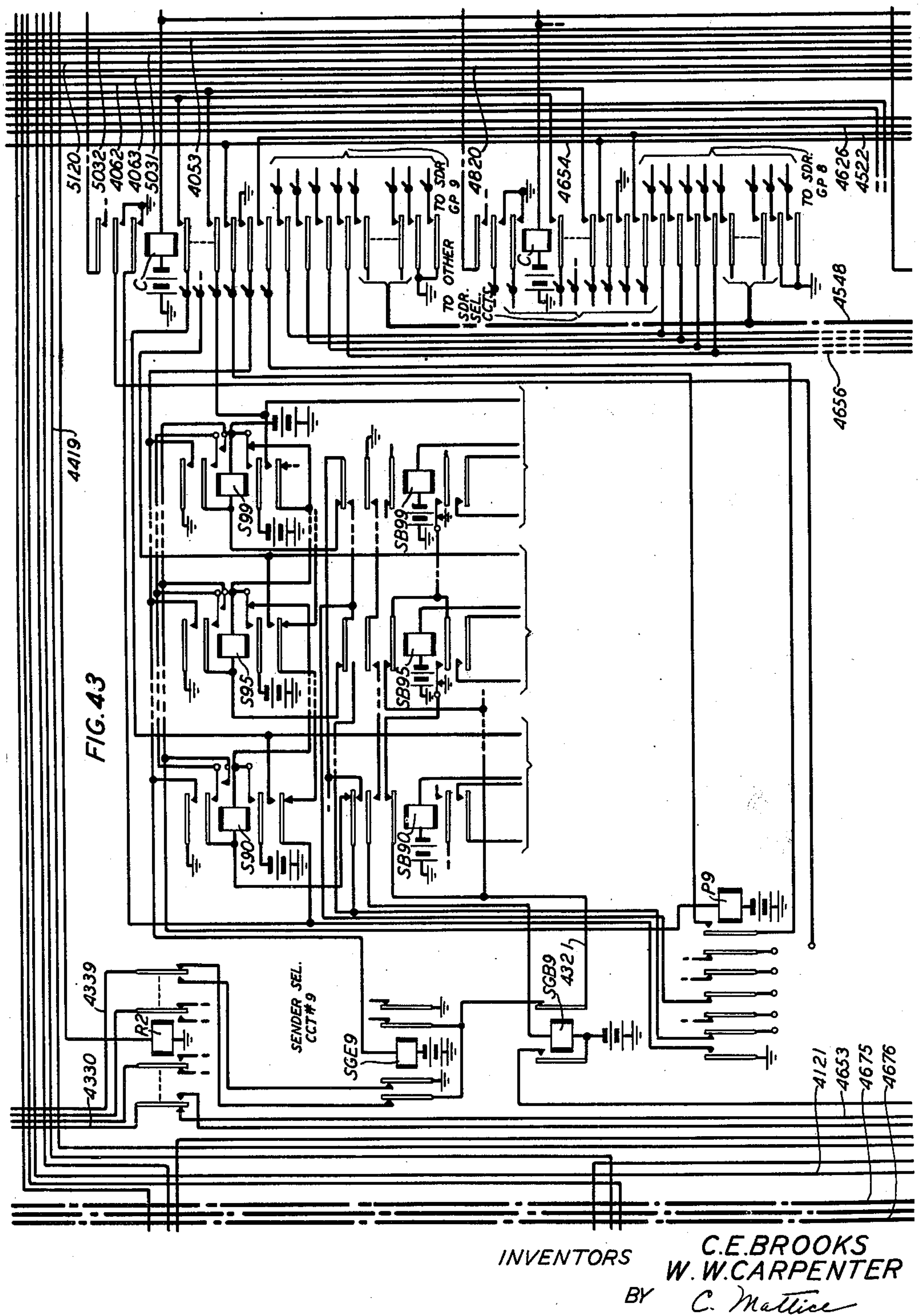
Figure 44:
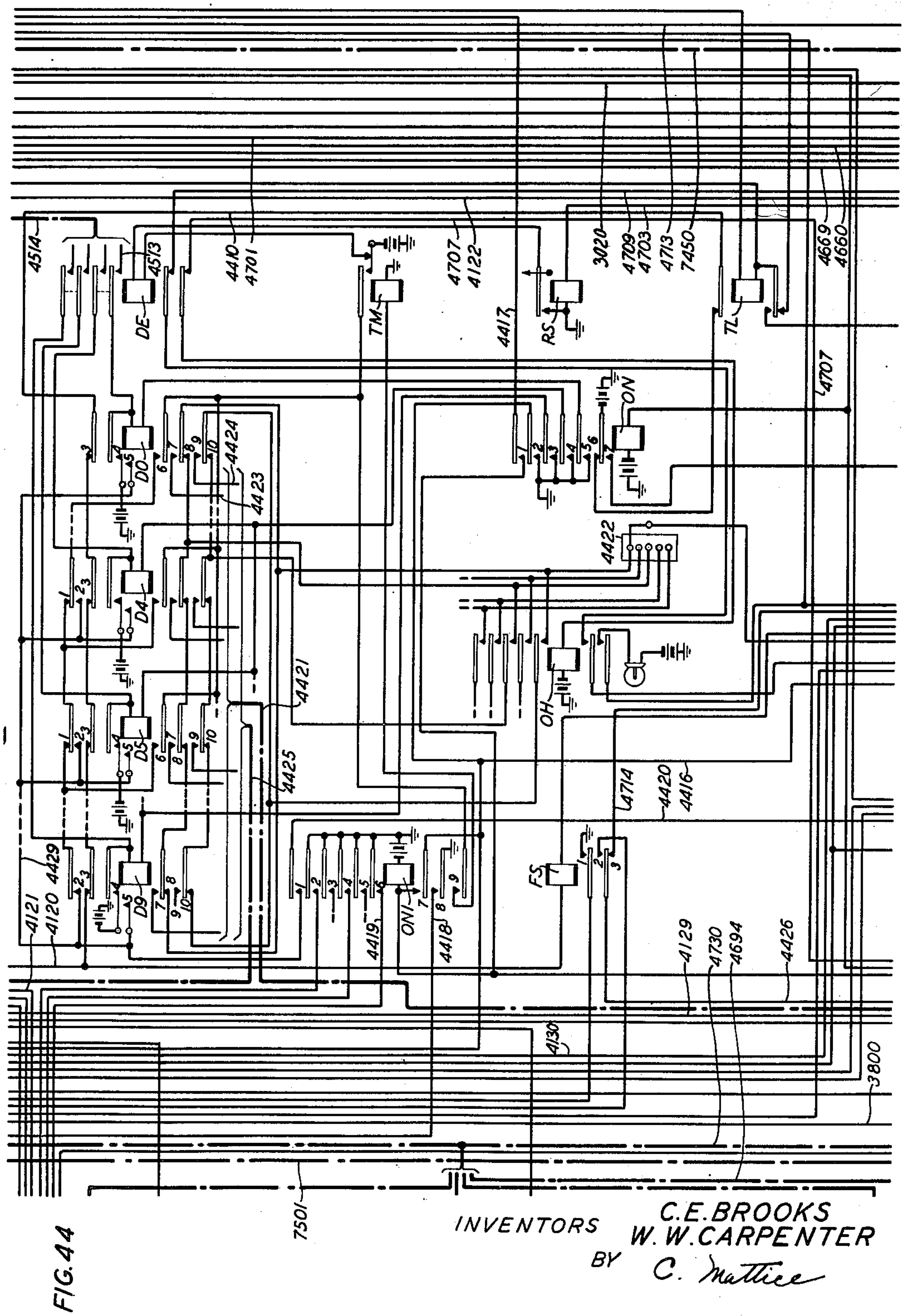
Figure 46:
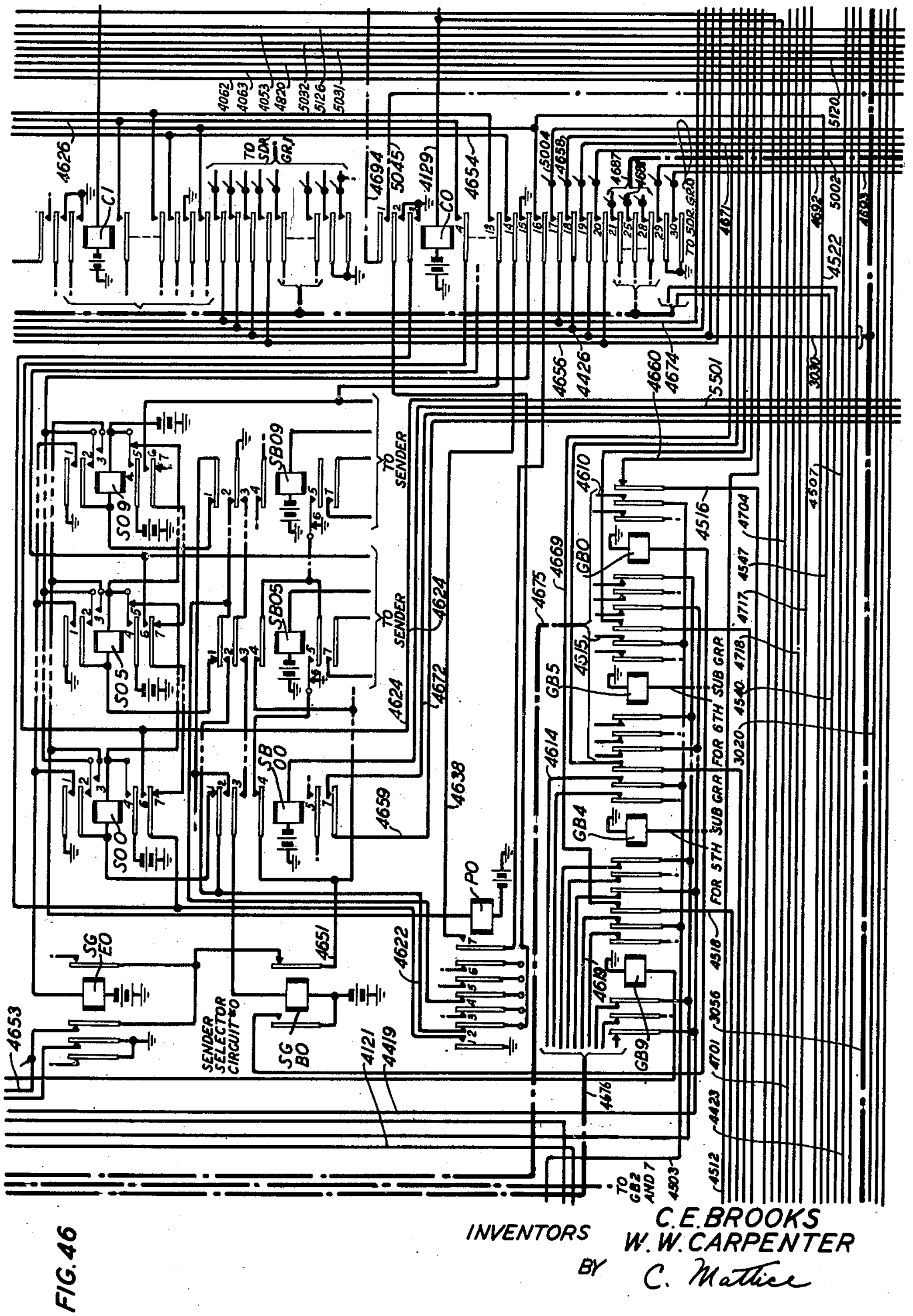
Figure 47:
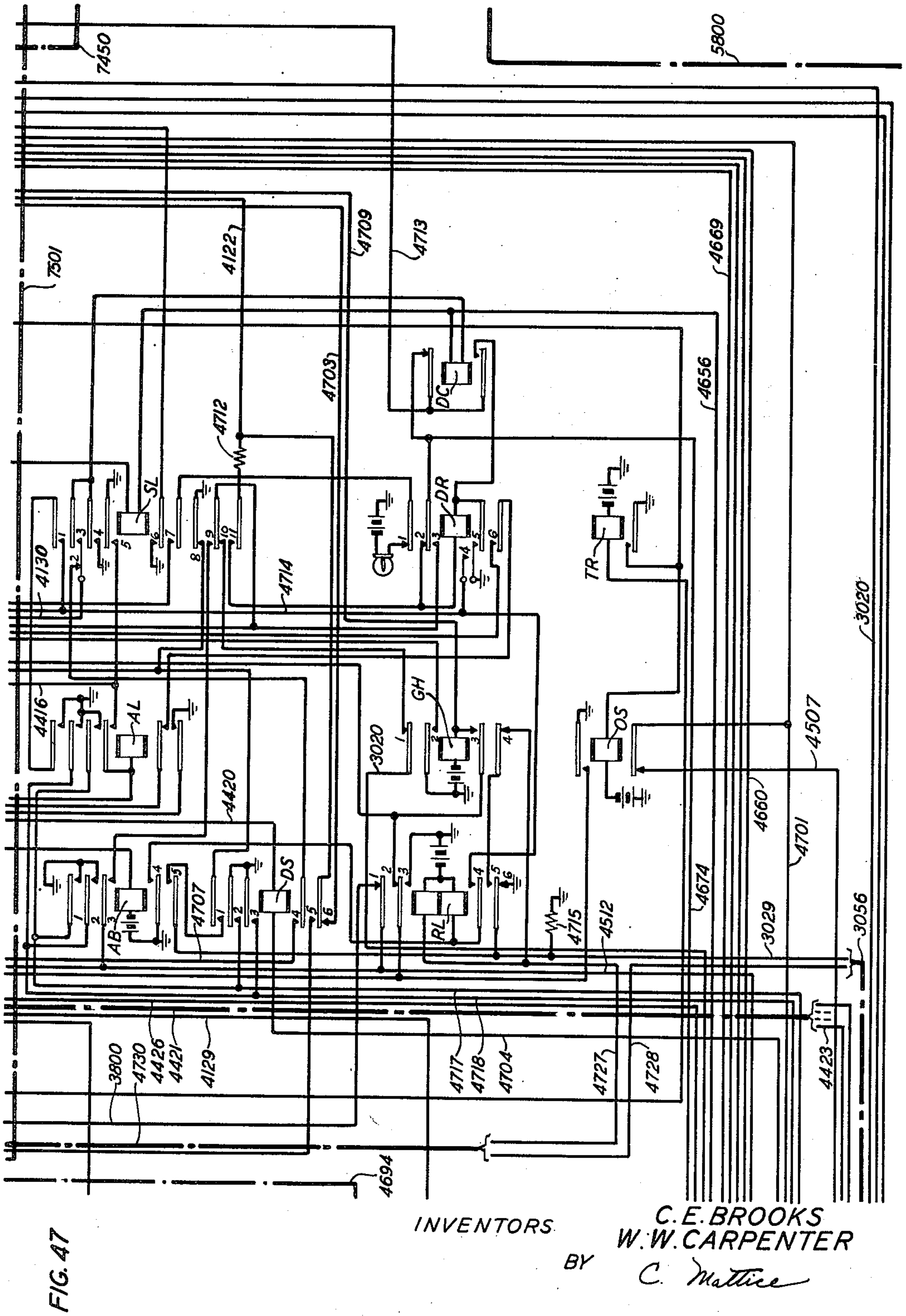
Figure 48:
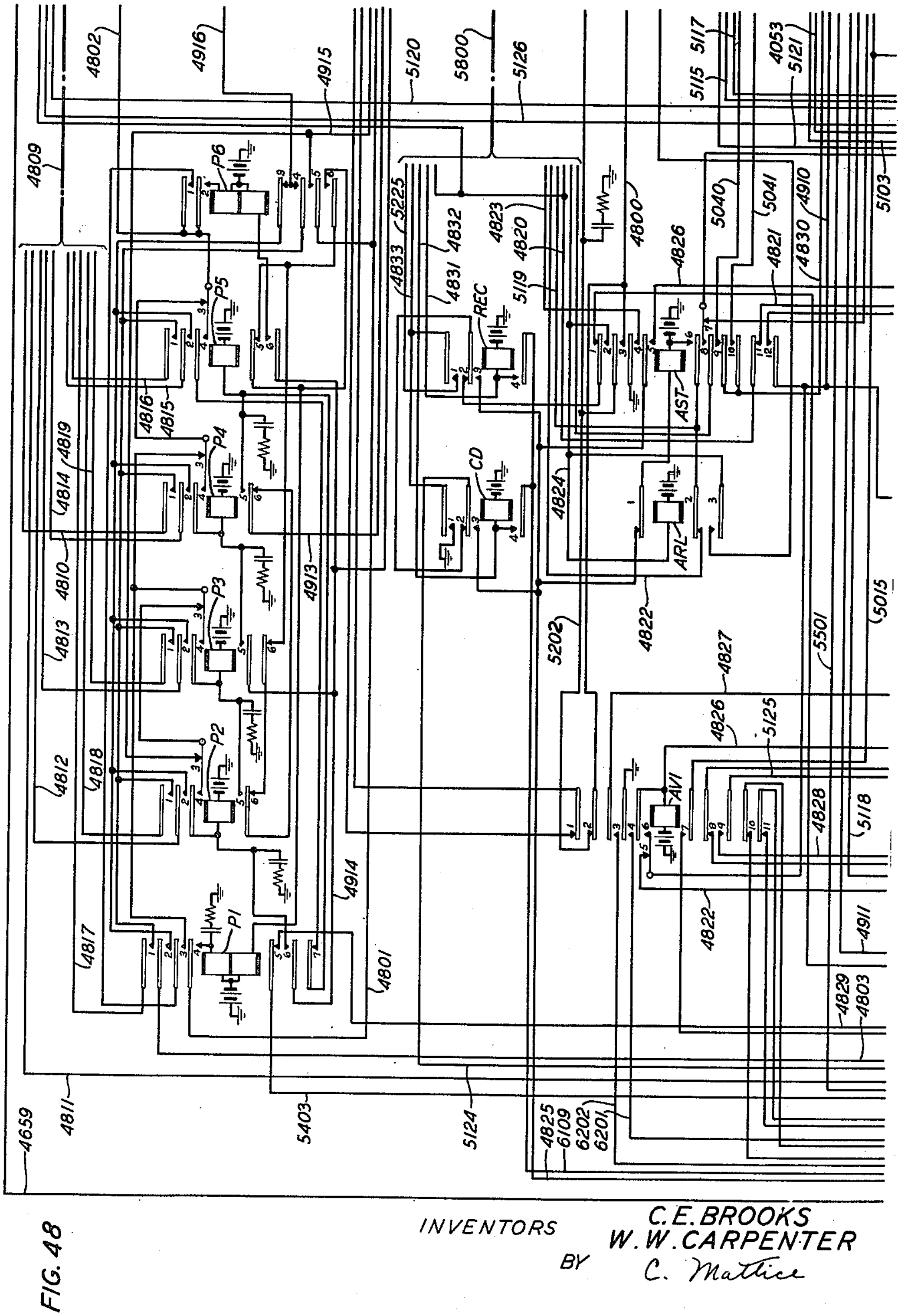
Figure 49:
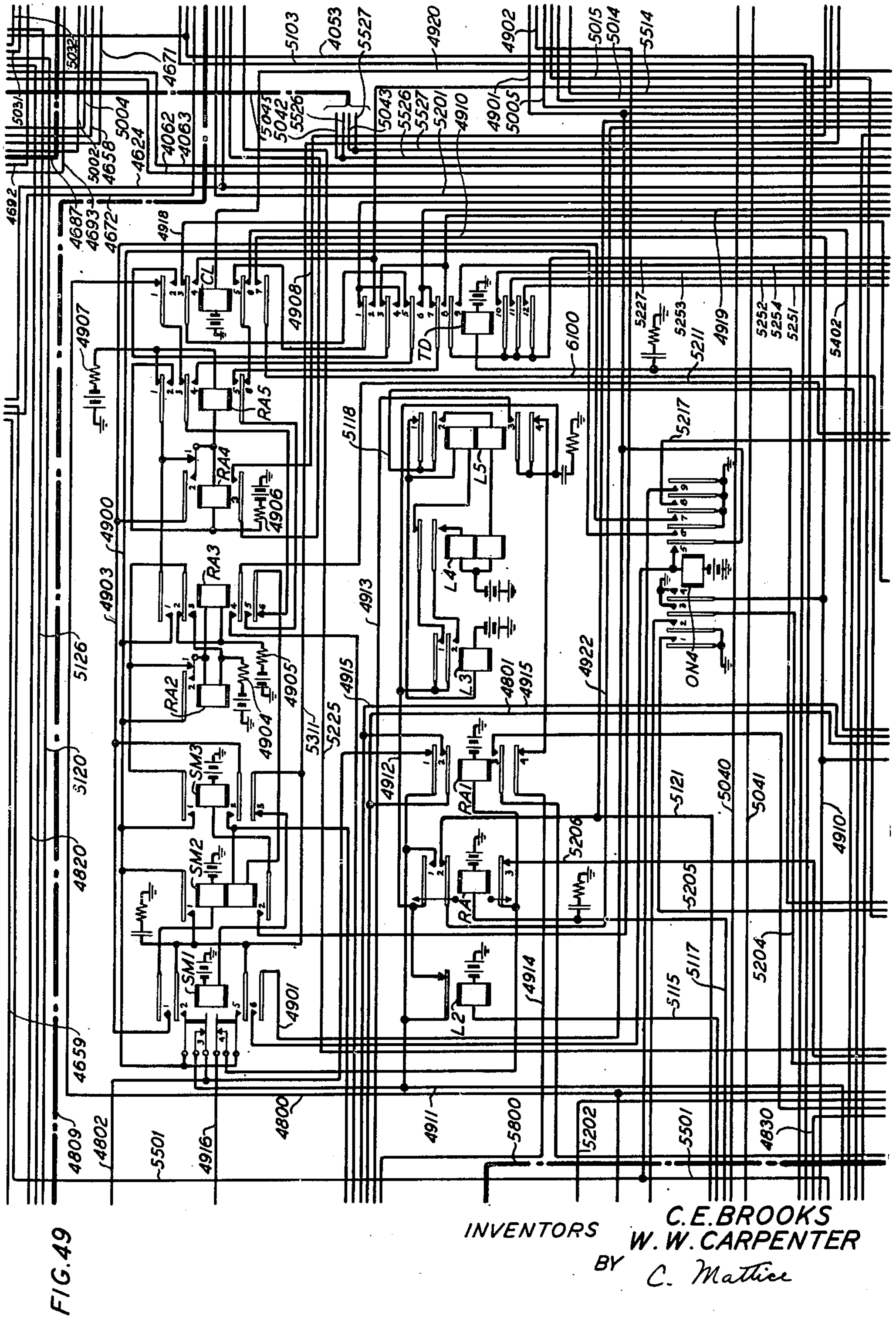
Figure 50:
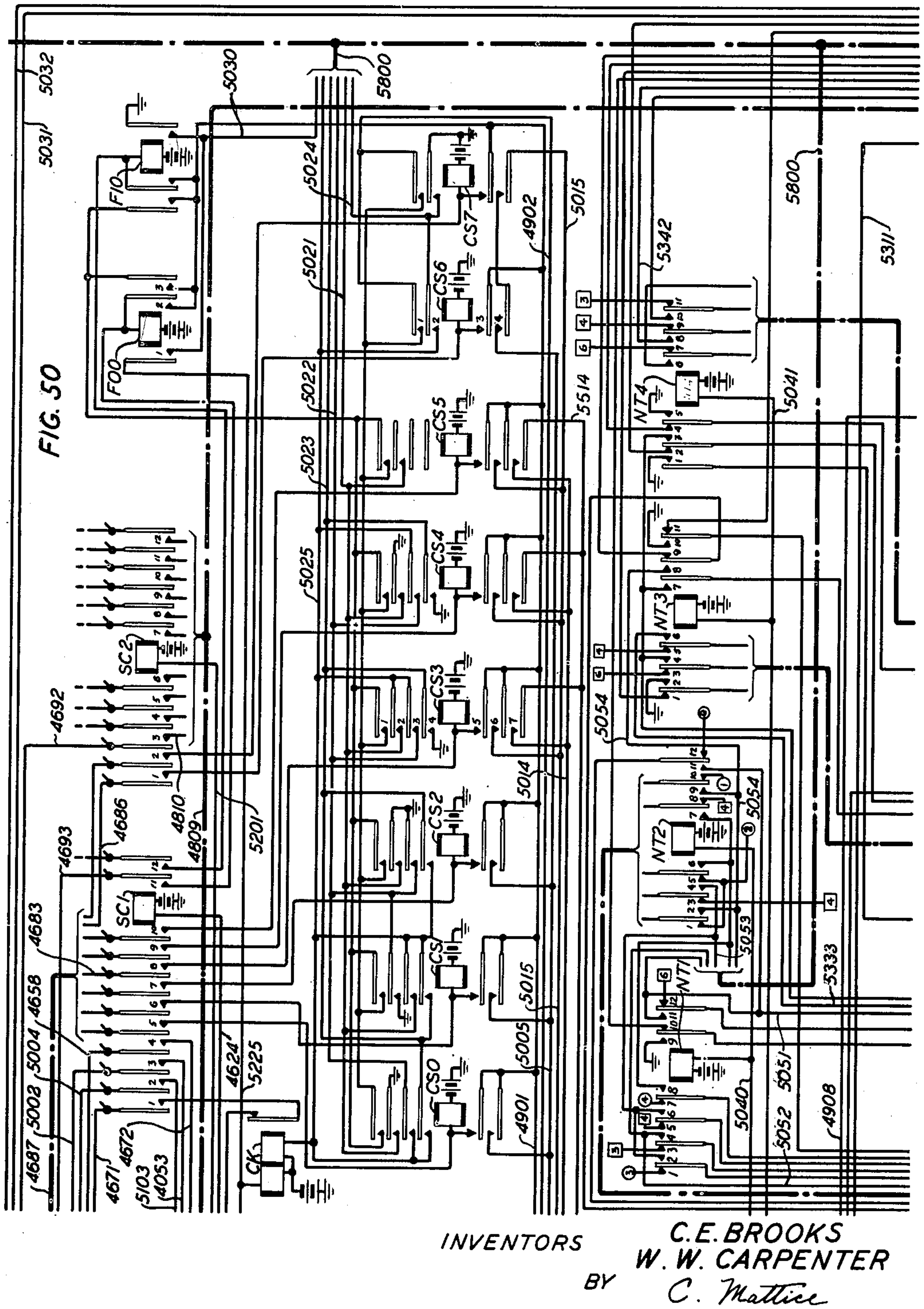
Figure 51:
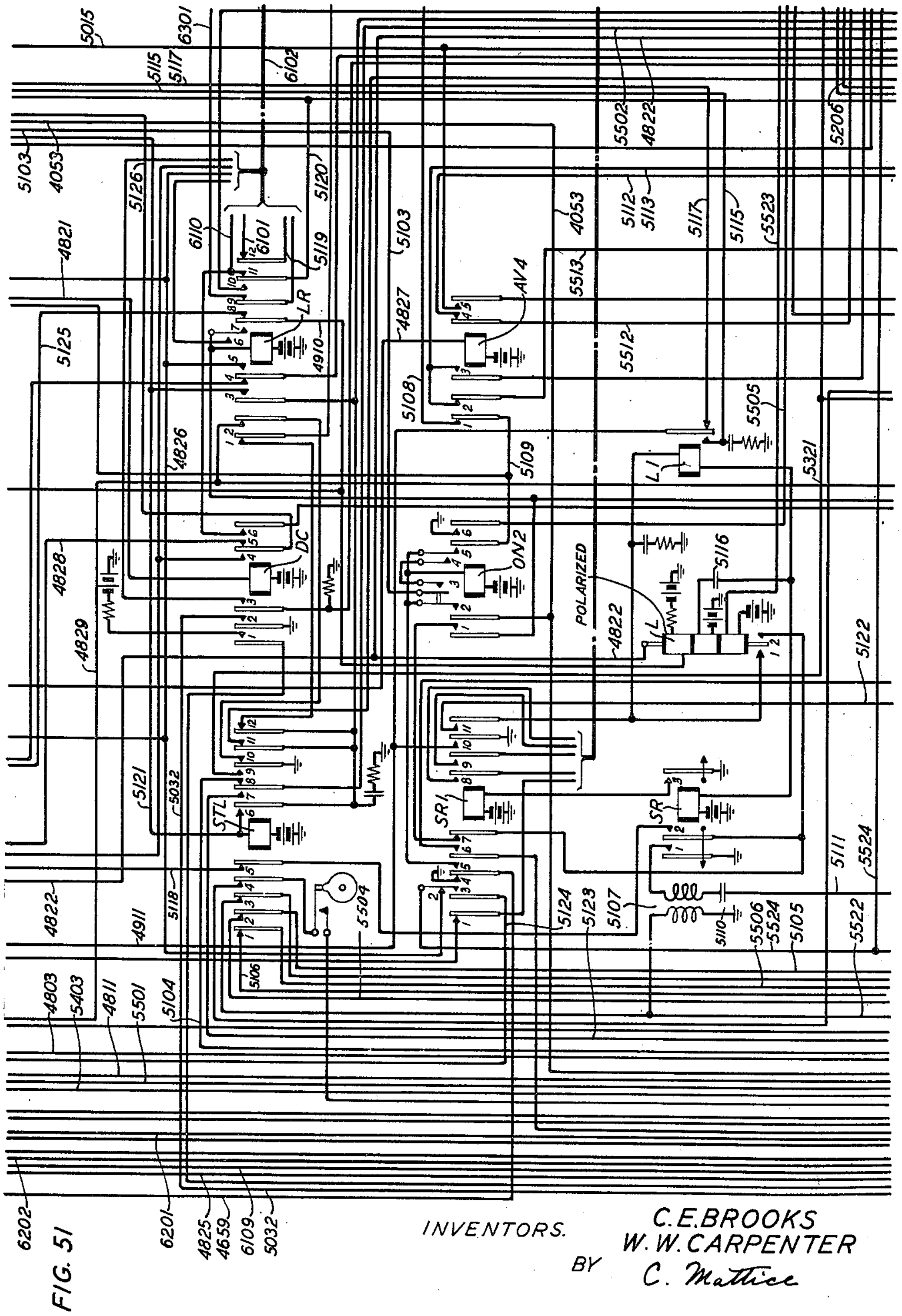
Figure 52:
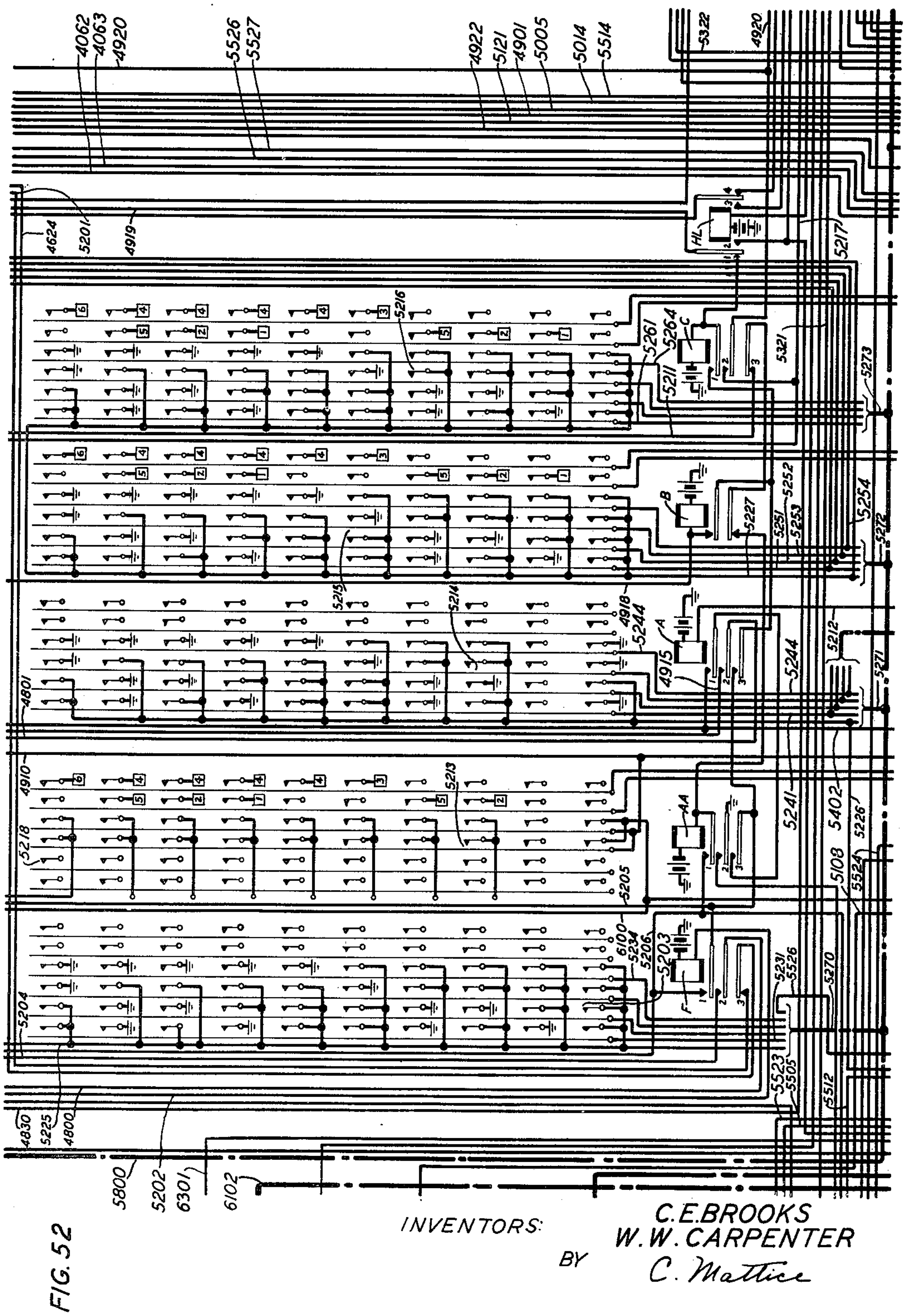
Figure 53:
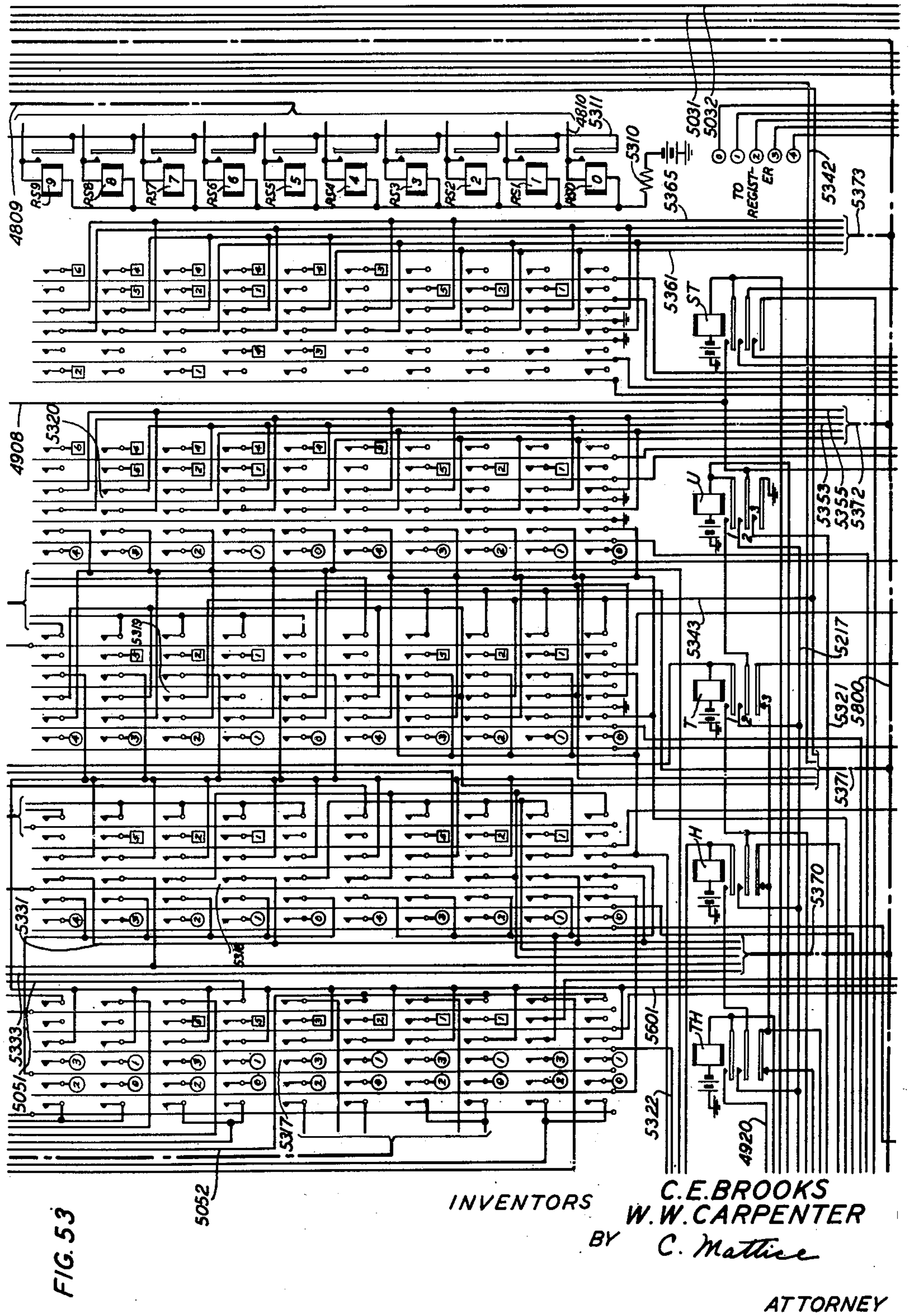
Figure 54:
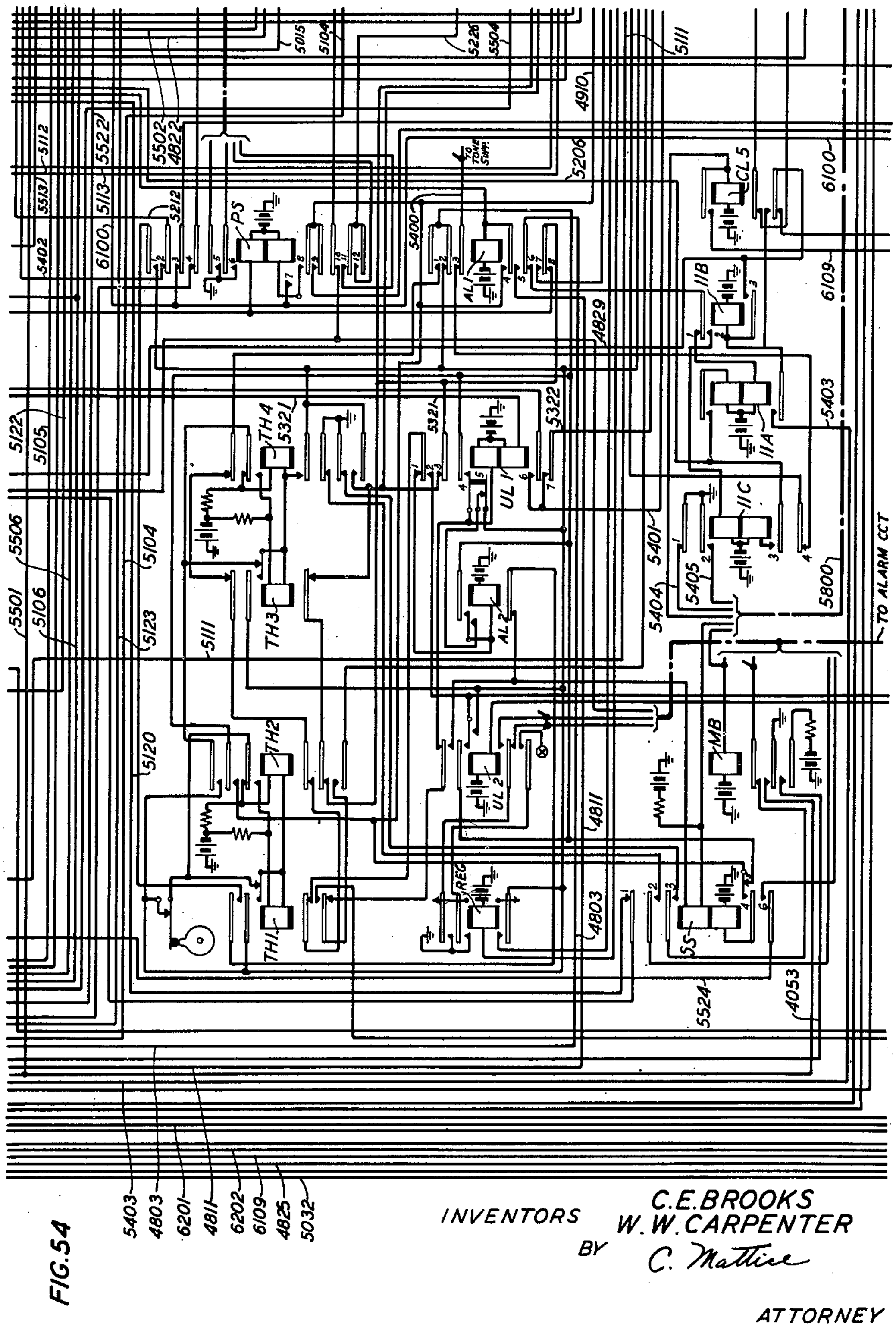
Figure 55:
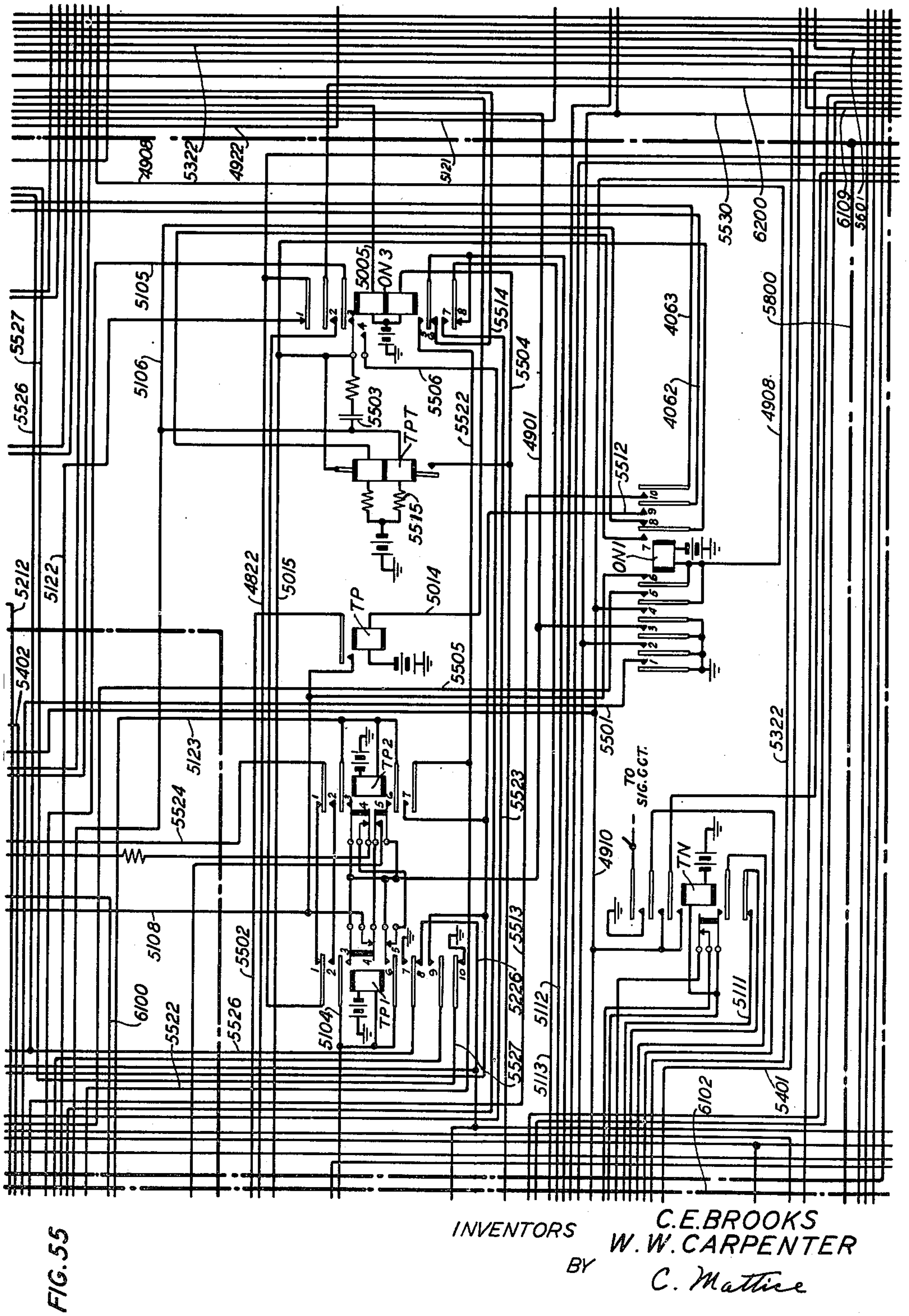
Figure 56:
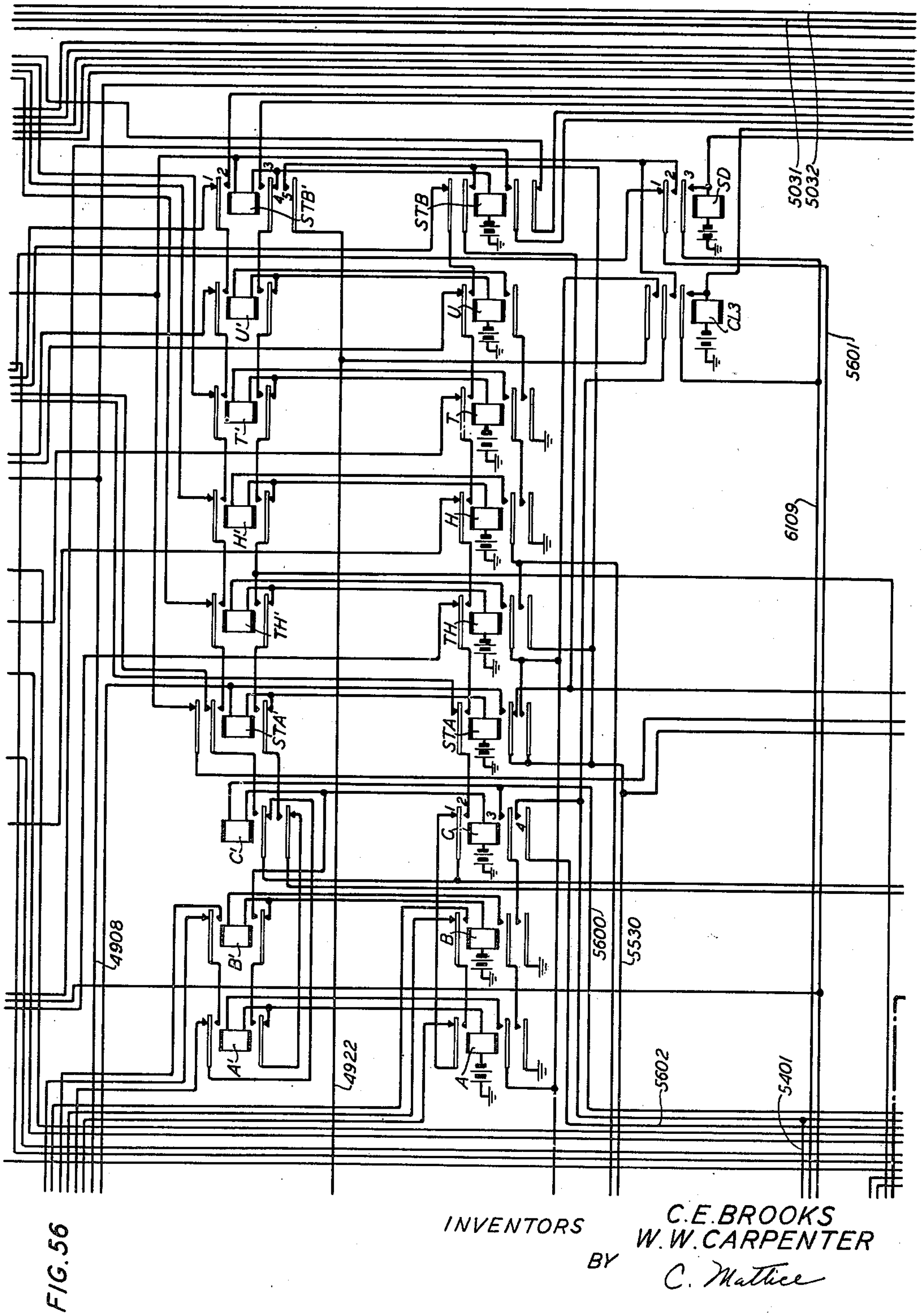
Figure 57:
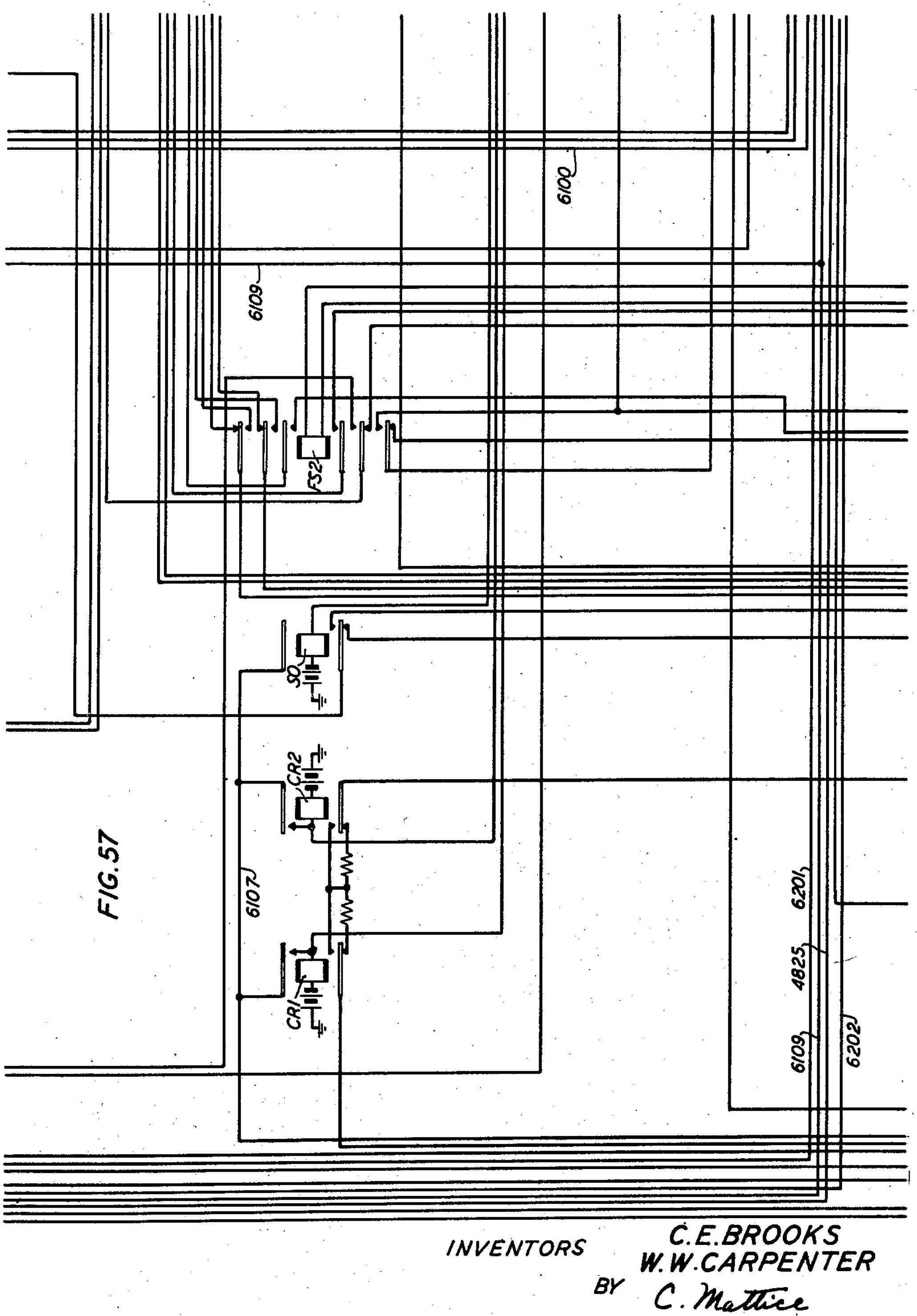
Figure 58:
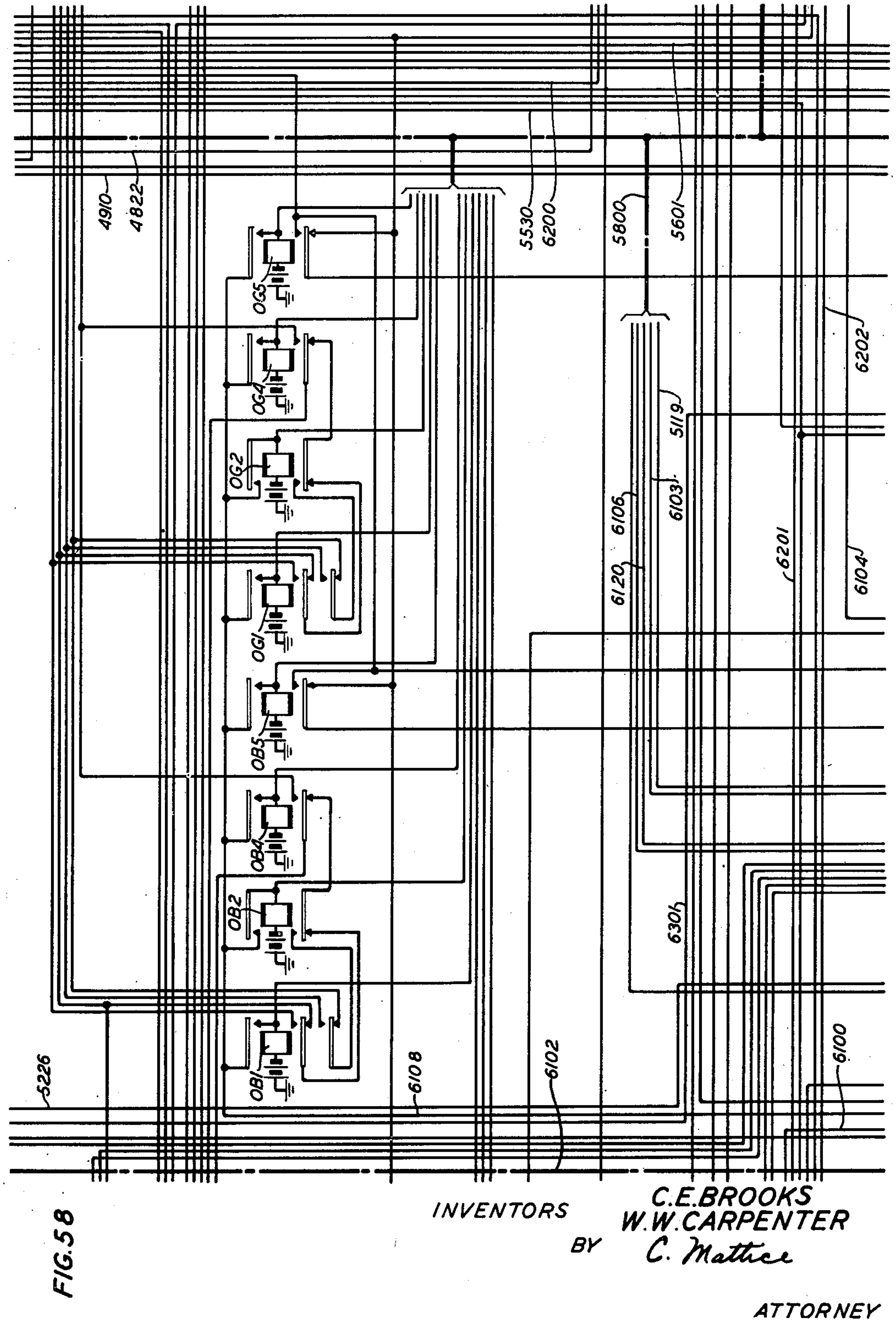
Figure 59:
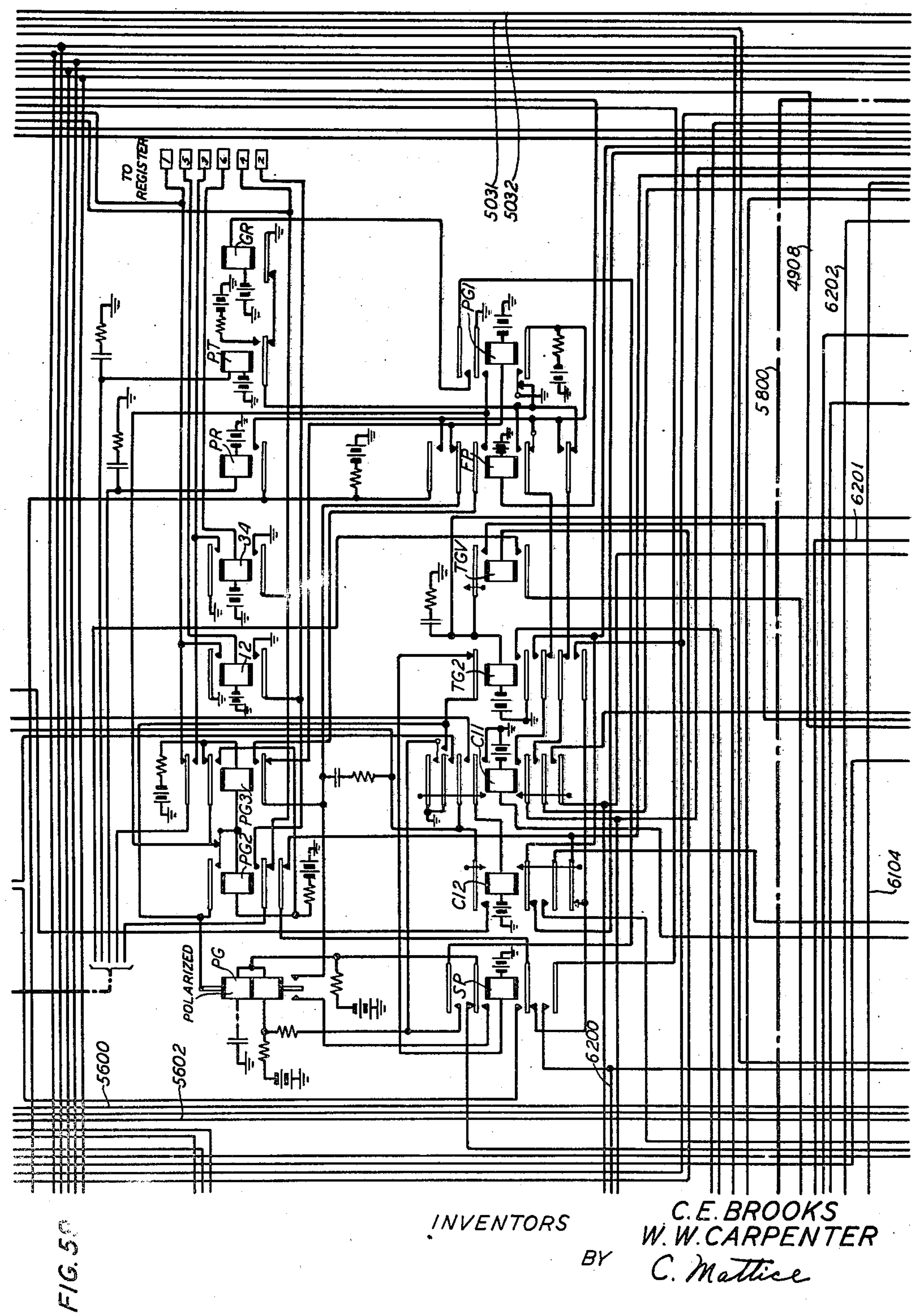

In the meantime, the sender control circuit has been selecting an idle sender for use. When the district group relay G operated, it closed circuits for testing the groups of senders for those including at least two idle senders and having an idle sender link giving access thereto. Each sender has an individual sender busy relay, which relay is operated whenever the sender is in use. Three such relays SB00, SB05 and SB09, belonging to the first or zero group of senders, are shown in Fig. 46 and those belonging to the last group or group 9 are shown in Fig. 43. When all the senders of a group are busy, the group busy relay, relay SGB0, relay SGB9, etc. is operated over a chain circuit closed by the sender busy relays. The contacts of the sender busy relays are so arranged that, if any two senders are idle and their busy relays therefore are not operated, ground will be applied to a group test conductor, such as conductor 4321, 4651, etc. For example, if relays SB00 and SB09 are released and relay SB05 is operated, ground will be connected to conductor 4651 over contact 4 of relay SB00, contact 5 of relay SB05 and contact 6 of relay SB09.

With a district junctor group relay such as relay G operated in one of the sender link control circuits, the sender group test conductors are connected to the windings of sender group test relays SG0 to SG9. For example, ground connected to conductor 4651 by sender group 0 completes a circuit which may be traced over the back contact of relay SGB0, back contact of relay SGE0, conductor 4653, back contact of relay R2, conductor 4330, back contact of hold magnet SSH0A associated with the secondary sender switch 0, the A section of which has access to sender group 0, conductor 4030 through cable 3710, contact 4515 of relay G, conductor 4516, back contact of relay GB0, conductor 4660, back contact of relay SS(41), upper winding of relay SG0 to battery. A similar circuit is completed from sender group test conductor 4321 associated with sender group 9, over the back contacts of relays SGB9, SGE9 and R2, conductor 4339, back contact of secondary hold magnet SSH5A associated with the B section of secondary sender switch 4 which has access to sender group 9, conductor 3729 through cable 3710, contact 4517 of relay G, conductor 4518, back contact of relay GB9, conductor 4669, back contact of relay SS(41), upper winding of relay SG9 to battery. In this manner a circuit is closed for testing for sender groups available to the selected group of district junctors, the circuit of a sender group test relay being opened if the entire group is busy, if only one sender is idle, or if the link having access to the group is busy.

Assuming that the zero group of senders is available, relay SG0 operates and attempts to select the corresponding group by operating a lock-out relay belonging thereto. Relays LL0, LL1, LL3 and LL4 are lock-out relays individual to the zero group of senders in four of the sender link control circuits, there being a similar chain of relays for each group of senders. In order to rotate the use of the sender groups, the operating circuits for the sender group lock-out relays are completed over a preference circuit including contacts on the sender group test relays SG0 to SG9 which are in turn cross-connected to contacts of the district junctor group relays GP0 to GP4, whereby different sender groups are preferred for different district junctor groups and this preference may differ in the various sender link control circuits.

Since district junctor group relay GP0 has been operated as previously described, the operation of relay SG0 completes a circuit from battery through resistance 4123, contact 4 of relay GP0, conductor 4124 cross-connected at racks 4125 and 4126 to conductor 4127, contact 6 of relay SG0, winding of lock-out relay LL0 to ground. Relay LL0 operates in this circuit, disconnecting ground at contact 5 from the windings of relays LL1 to LL4 to render this group of senders temporarily unavailable to other sender link control circuits. At contact 2, relay LL0 closes a locking circuit for relay SG0 from battery through the lower winding and over contact 5 of that relay, contact 2 of relay LL0, contacts 1 of the other relays of the chain, relays LL1, LL3, LL4, etc. to ground.

At contact 3, relay LL0 also completes a circuit from battery, through the winding of gate relay SS(41) to the same chain ground. Relay SS(41) at its upper contacts opens the operating circuits of the sender group relays SG0 to SG9 permitting all of them to release with the exception of relay SG0 which is locked as just described. At its lower contact, relay SS(41) closes a circuit from ground to conductor 4701 to hold the group relay G0 of the line link control circuit in case the paths available circuit should be opened due to the use of the last available path.

When the non-locked sender group test relays release, a circuit is closed from battery, through the winding of relay OC, front contact of relay SS(41), contacts 3 of relays SG9, SG5, SG4 and the other released sender group test relays, contact 2 of relay SG0, conductor 4119, back contact of relay SS1(38), conductor 3800, contact 1 of release relay RL(47) of the sender link control circuit to ground on conductor 4512. Relay OC supplies a supplementary ground to conductor 4416 and closes the circuits for the connector relays which serve to associate the sender group circuits with the sender link control circuit. Since relay SG0 is operated, the operation of relay OC closes a circuit from ground at contact 4 of relay SG0, contact of relay OC, conductor 4129, winding of relay C0 to battery. Relay C0 connects the zero group of senders with the sender link control circuit. The selection of the sender group also determines the sender link to be used and, therefore, a branch of the operating circuit of relay C0 extends over contact 4519 of relay G, conductor 4520, winding of select magnets PSS0A and PSS0B to battery to prepare the zero horizontals of the zero primary sender link switches.

Each group of senders has, in addition to its sender busy relays, a set of selection relays, one for each sender, connected in the usual chain arrangement so as to select their respective senders according to a certain order of preference. The sender preferred depends on the sender busy relays operated and varies with the different sender groups in accordance with cross-connections between a set of preference leads and the connector relays. The zero group of senders which has been selected has a set of busy relays SB00 to SB09 and a set of selection relays S00 to S09. The preference circuit for this group is shown extending from ground over contact 2 of connector relay C0, cross-connected to contact 2 of preference relay P0, conductor 4622 to the upper armature of relay SB00. If the zero sender is idle the circuit extends over contact 1 of relay SB00 to the winding of relay S00, contacts 5 on the other sender selection relays to battery. If the zero sender is busy the preference circuit extends over contact 2 of relay SB00 to the upper armature of the tenth sender busy relay and thence to the winding of relay S09 or to the next busy relay according as the tenth sender is idle or busy.

Assuming that the zero sender is idle, relay S00 operates in the circuit above traced, locking in a circuit from battery at its contact 4 through its winding and contact 2 to ground at contact 15 of relay C0. Relay S00 extends its locking ground to the winding of relay P0 and battery causing that relay to operate and open the preference circuit.

At contact 1, relay S00 closes a circuit for relay SGE0 which opens the sender group test circuit, not only to the sender link control circuit shown but also to the other control circuits, thereby making this group of senders unavailable for other calls until the sender has been connected with the calling line through the link switches.

In addition, relay S00 closes a circuit for operating the select magnet individual to the selected sender. This circuit may be traced from ground at contact 1 of relay P0, or at contact 3 of relay C0, contact 6 of relay S00, conductor 4624, contact 4 of relay C0, conductor 4626, winding of select magnet SSS0 of secondary sender switch 0 to battery. Magnet SSS0 prepares the zero level in the zero secondary sender link switch. Furthermore, relay S00 also closes a start circuit for the sender which may be traced over a branch of conductor 4624, to the winding of relay SC1 and battery and over contact 3 of frame hold magnet F of the sender cross bar register and conductor 5201 to the winding of relay SC2 and battery. Relays SC1 and SC2 operate to connect certain registering and control conductors from the sender link control circuit to the sender.

With relays SC1 and SC2 operated, the class of the calling line, the frame on which the district junctor is located and certain other matters are recorded in the sender by means of circuits extended thereto by relay C0, as will be described hereinafter. While these registrations are being made, preparations are made in the sender link control circuit for operating the primary hold magnet of the selected sender link.

When relay P0 operated as above described, it closed a circuit from ground on conductor 4121, supplied at one point by a front contact of relay DA over front contacts of primary select magnets PSS0A and PSS0B which were operated in parallel, conductor 3920, contact 4521 of relay G, conductor 4522, contact 16 of relay C0, contact 7 of relay P0, conductor 4638, contact 14 of relay C0, conductor 4654, front contact of secondary select magnet SSS0, conductor 4050, front contact of relay OC, conductor 4130, contact 2 of relay SL, contact 4 of relay DS, conductor 4707, back contact of relay DE to the winding of relay OH and battery. The operation of relay OH, therefore, checks the operation of both the primary and secondary select magnets and, therefore, the fact that the link switches are ready for the operation of the hold magnets.

Relay OH, operated, closes a circuit from battery, through the winding of relay GH, conductor 4709, back contact of relay DE, front contact of relay OH, contact 2 of relay RL(47), contact 7 of relay ON1(44) to off-normal ground conductor 4446. Relay GH operates in this circuit and locks over its contact 3 and contact 2 of relay RL(47) to ground as traced for its operating circuit. With relay GH operated, two circuits are completed under the control of the district junctor test relays D0(44) to D9, one for operating the hold magnet of the secondary line link switch and the other for operating the hold magnet of the primary sender link switch, both of which are determined from the identity of the selected district junctor. As in other cases, a distribution of traffic is obtained as a result of giving different circuits preference in the various control circuits by means of a variable cross-connection at rack 4422 between the ground supplied by relay GH and the chain circuit contacts of relays D0(44) to D9. Assuming a cross-connection as shown and relay D0(44) operated as previously described, the one circuit extends from ground at contact 2 of relay GH to rack 4422 and thence over contact 7 of relay D0(44), conductor 4423, through cable 4421, contact 4523 of relay G, conductor 4524, contact of relay DA0, conductor 3028, through cable 3002, to battery through the winding of hold magnet SLH0 of secondary line switch zero. Since select magnet SLS0 is operated, the operation of hold magnet SLH0 closes cross-point 2221.

The second circuit may be traced from ground connected to rack 4422, contact of relay OH, contact 9 of relay D0(44), conductor 4424 through cable 4425, contact of relay DA, conductor 4525, through cable 4526, to the windings of hold magnets PSH0A and PSH0B of the two switches constituting the primary sender link switch zero. Since select magnets PSS0A and PSS0B of these switches are operated, the operation of hold magnets PSH0A and PSH0B closes cross-points 3931 and 3941. The closure of cross-point 3931 connects the operating ground for magnet PSH0A to the sleeve conductor 3932 of the sender link 0, completing a circuit through the windings of hold magnets SSH0A and SSH0B of secondary sender link switch zero. Since select magnet SSS0 is operated, hold magnets SSH0A and SSH0B, in operating, close cross-points 4051 and 4052. Magnet PSH0A connects ground to conductor 3934 and over contact 1 of relay I to resistance 7006 and sleeve conductor 2224 of the district junctor. Magnet PSH0B connects ground to conductor 3935, completing a circuit through the winding of relay S1(70) to battery. Relay S1(70) operates and disconnects battery from conductor 7004 to mark the district junctor busy to the sender link control circuits.

With cross-point 4051 closed, the operating ground of magnets SSH0A and SSH0B is extended to the sleeve conductor 4053 leading to the sender where it is connected over contact 3 of relay SC1 to conductor 5002, and thence over contact 20 of relay C0, conductor 4656, winding of relay SL to battery at contact 7 of relay ON(44). Relay SL operates in this circuit, as a check that the cross-points of the sender link have been closed, and closes a locking circuit for itself from battery at contact 7 of relay ON(44), winding of relay SL, winding of relay DC(47), to ground at contact 4 of relay SL. Relay DC(47) cannot operate at once, being shunted by the operating circuit of relay SL. At contact 2, relay SL opens the operating circuit of relay OH, causing relay OH to release and open the operating circuits of the sender link magnets and relay SL. However, these magnets are held operated by the locking ground of relay SL connected thereto through the winding of relay DC(47). The removal of ground from the operating circuit of relay SL permits relay DC(47) to operate, provided no double connections exist between the present connection and any other connection.

Relay DC(47) in operating closes a circuit from battery, connected to conductor 4122 by relay GP0 as above described, resistance 4712, contact 11 of relay SL, winding of relay DR, front contact of relay DC(47), conductor 4713, to ground at the back contact of relay HD. Relay DR operates and locks to ground at its contact 5 and at contact 4 connects ground to conductor 4714, for a purpose to be explained hereinafter.

When hold magnet SLH0 of the secondary line switch operates in the circuit previously traced, it closes cross-point 2221 and extends its operating ground over its auxiliary contact and a contact of cross-point 2221 to conductor 2115, and thence over the line link test circuit which may be retraced over conductor 2115, contact 2213 of relay HG0, conductor 2214, contact of relay AC(27), conductor 2704, to the winding of relay T0 and battery. Relay T0, which was previously unoperated to indicate that line link 00 was idle, now operates to indicate that the secondary cross-points have been closed. Relay T0, when operated, closes a circuit from battery through the winding of hold magnet PLH0 individual to line 2100 in the primary line switch 0, contact of relay HM0, conductor 2123 through cables 2125 and 2131, contact of relay HC2, conductor 2817 through cable 2831, contact 9 of relay LT0, conductor 3220, contact 3 of relay PS, conductor 3423, contact 9 of relay G0, conductor 3317, front contact of relay T0, conductor 3424 through cable 2832, contact 9 of relay HC3, conductor 2818 through cable 2833, contact 3 of relay D0(30), conductor 3029 through cable 3056, to the sender link control circuit where it extends to ground through resistance 4715 and over contact 6 of relay RL(47).

Since select magnet PLS0 is operated, the operation of hold magnet PLH0 closes cross-point 2124, connecting the calling line 2100 with the selected sender. Magnet PLH0 also opens the circuit of line relay L0, causing that relay to release. Relay L0 in releasing, disconnects ground from conductors 2105 and 2106, thereby releasing relay RE. Therefore, the release of relay RE indicates that the calling line has been connected to the sender and that the line relay has been released, and registers that fact by preparing a circuit from ground at the lower contact of relay LE, conductor 3206, contact 4 of relay RE, conductor 3425, contact of relay AC(27), conductor 2714, contact 2 of relay D0(30), conductor 3030 through cable 3056, contact 19 of relay C0, to conductor 4671 leading to the sender.

When the sender was seized and relays SC1 and SC2 operated, these relays established a plurality of temporary connections between the sender link control circuit and the sender. Included in these connections are circuits for registering the identity of the district junctor frame with which the sender has been connected and the class of service to which the calling line is entitled. Relay SC2 at contacts 3 to 12 connects the select magnets of the cross bar register switch shown in Figs. 52 and 53 to the frame units conductors leading to the contacts of sender group connector relays such as relay C0 in each of the sender link control circuits while at contacts 11 and 12, relay SC1 connects the frame tens conductors to the windings of relays F00 and F10.

There is a relay like relay C0, individual to the zero group of ten senders to which the selected sender belongs, in each sender link control circuit, and, since each sender link control circuit is individual to a district junctor frame, these relays are used to inform the sender of the identity of the district frame to which it has been connected. At contact 29, relay C0 connects ground to conductor 4692 which is one of the ten frame units conductors which correspond to the units digit of the number of the frame with which relay C0 is associated, in this case the digit zero, and at contact 30 connects ground to conductor 4693 which is one of the two frame tens conductors. Relay C0 also extends the class of service conductors to the sender.

Figure 27:
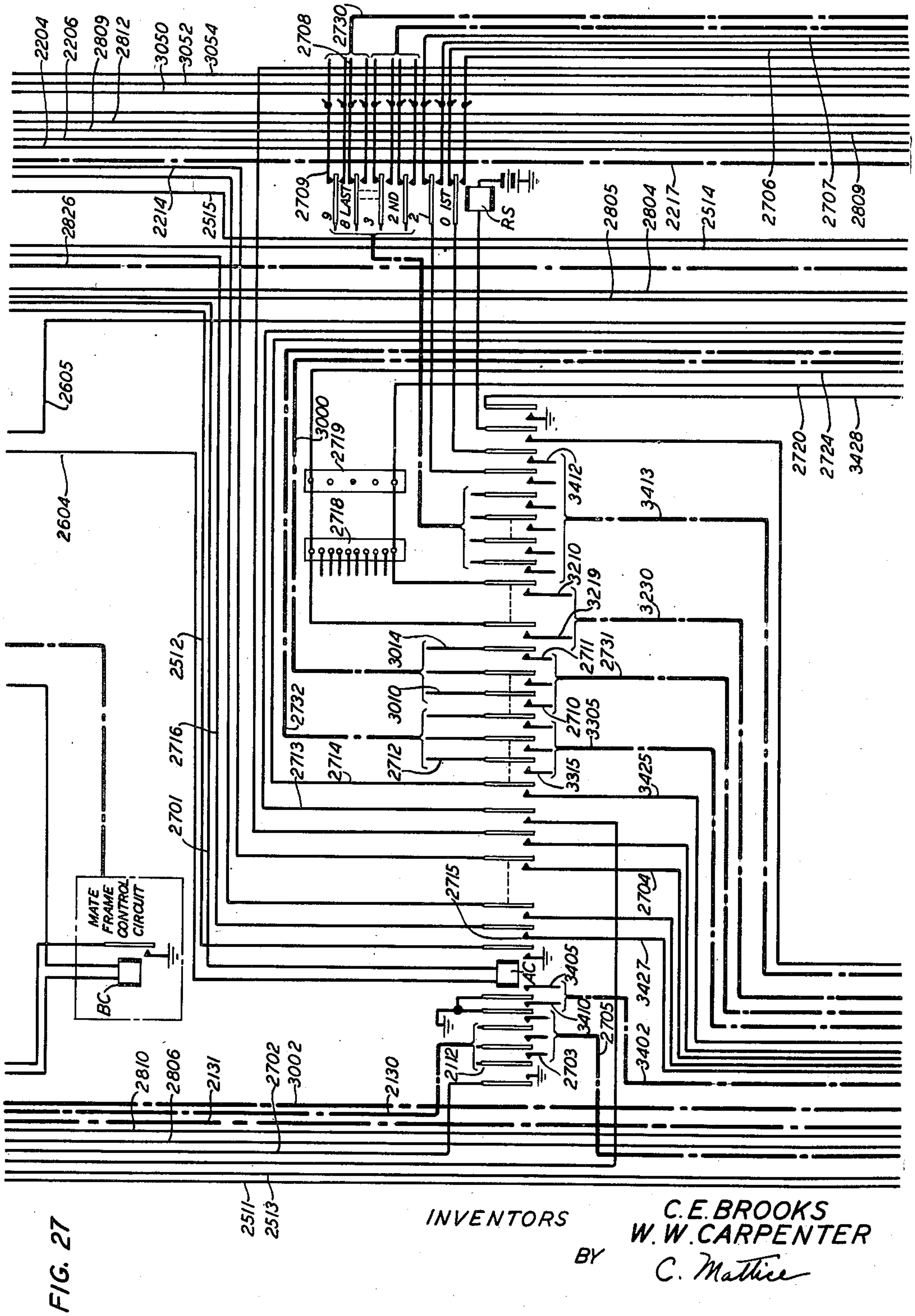
Figure 28:
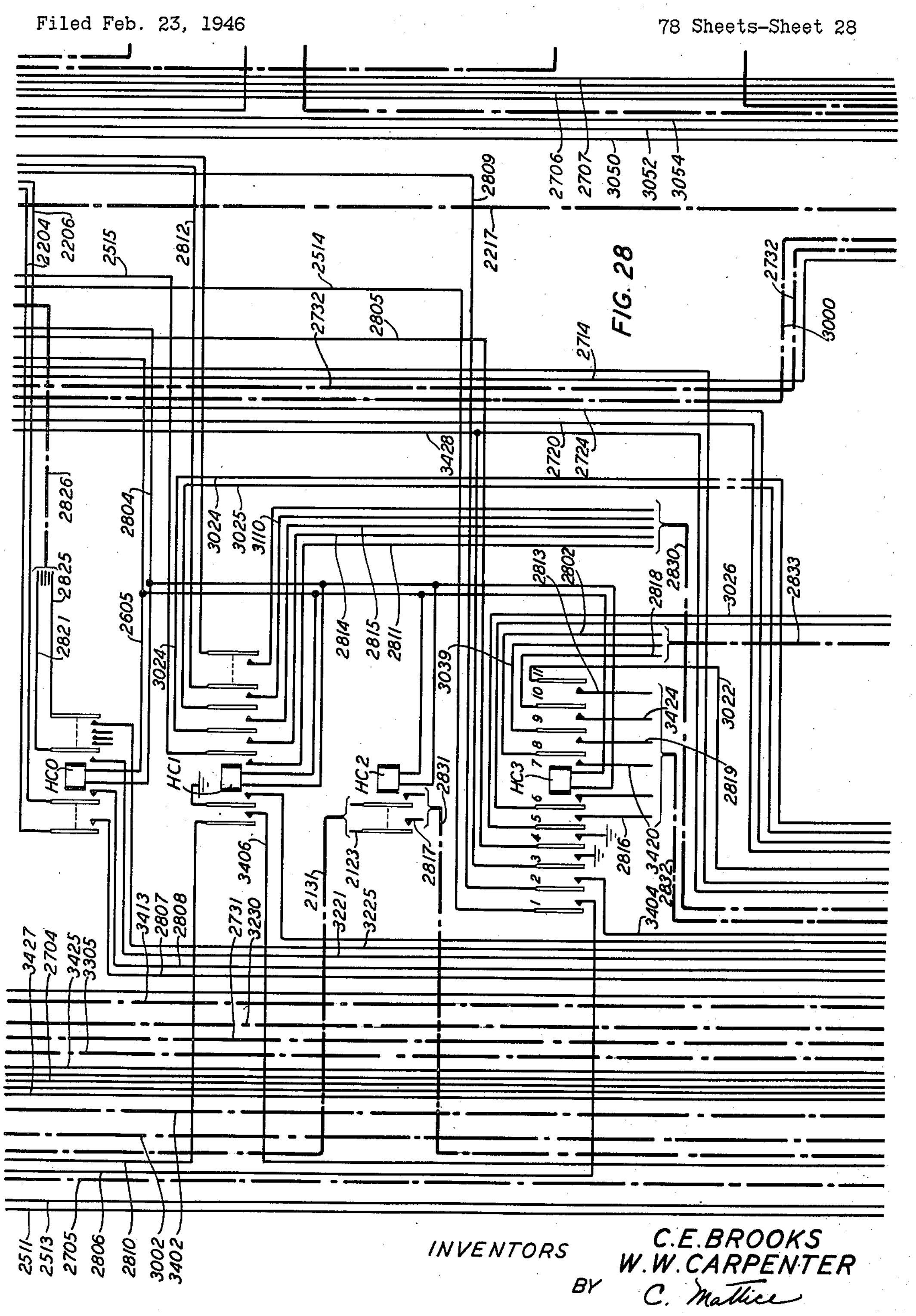

Relay SC1, at contacts 5 to 10 connects six of the class of service conductors to relays CS0 to CS5, while relay SC2 at contacts 1 and 2 connects two other classes of service conductors to relays CS6 and CS7. With relay LT0 operated and the cross-connections shown in Figs. 27 and 30, ground is connected from contact 1 of relay V0, contact 8 of relay VE, conductor 3204, contact 11 of relay LT0, conductor 3210, through cable 3230, contact of relay AC(27), cross-connection at racks 2718 and 2719, conductor 2720, contact 9 of relay DR0, cross-connection at rack 3021, conductor 3043 through cable 3048, contact of relay G, contact 25 of relay C0, conductor 4683 through cable 4687, contact 8 of relay SC1, winding of relay CS3 to battery. Ground is also connected over contact 10 of relay DF0, cross-connection at rack 3021, conductor 3046 through cable 3048, contact of relay G, contact of relay C0, conductor 4686 through cable 4687, contact 1 of relay SC2 to the winding of relay CS6 and battery.

Ground connected to conductor 4693 by relay C0 completes a circuit over contact 11 of relay SC1 to the winding of relay F00 and battery, operating that relay to indicate that the district frame number is less than ten. Ground connected to conductor 4692 by relay C0 completes a circuit over contact 3 of relay SC2, conductor 4810, through cable 4809, through the winding of the sender register select magnet RS0 and resistance 5310 to battery. Select magnet RS0 prepares the contacts in the zero level of the register for operation, and at its auxiliary contact extends its operating ground over conductor 5311, contact 3 of relay SM3 to the winding of relay SM1 and battery operating relay SM1. Relay SM1, at contact 6 closes a circuit from battery through the winding of relay ON4, to conductor 4901, contact 5 of relay CS3 to the operating ground for relay CS3. Relay ON4 operates and locks over its contact 5 to conductor 4901. At contact 9, relay ON4 connects ground to conductor 5501 and thence to the winding of relay SB00, individual to this sender. At contact 4, relay ON4 connects ground to conductor 4910, which supplies locking ground for many relays. Ground on conductor 4910 extends over contact 5 of relay SS(54), contact 2 of relay AL1 to the interrupter TM to start timing the operation of the sender.

With relays SM1 and ON4 operated, a circuit is closed from battery through the upper winding of relay SM2, contact 1 of relay SM1, conductor 4903, to ground at contact 7 of relay ON4. Relay SM2 operates and closes a holding circuit for select magnet RS0 and relay SM1 by connecting conductor 5311, over contact 1 of relay SM2, to ground over conductor 4900 and contact 6 of relay ON4. Relay SM2 also closes a circuit from battery through the winding of relay SM3, contact 2 of relay SM2, conductor 4902, contact 1 of relay CS6, contact 1 of relay CS3, contact 3 of relay F00 to ground on conductor 4901. The operation of relay SM3 therefore indicates that the frame tens digit and frame units digit have been registered as well as the complete class of service indication.

Relay SM3 at contact 3 opens the operating circuit of relay SM1 and at contact 2 closes a holding circuit for relay SM2 and an operating circuit for hold magnet F which may be traced from battery through the winding of magnet F, conductor 5202, contact 2 of relay AV1, conductor 4800, contact 1 of relay CL(49), contact 3 of relay RA5, contact 6 of relay RA3, lower winding of relay SM2, contact 2 of relay SM3, conductor 4903 to ground at contact 7 of relay ON4. Relay SM2 is held operated in this circuit and magnet F operates to close cross-point 5203 which was prepared by the operation of select magnet RS0, thereby locking in the registration of the units digit of the frame number. Magnet F opens the circuit of relay SC2, permitting that relay to release. Relay SM3 also closes a circuit from battery through resistance 4904, winding and contact 1 of relay RA2, contact 1 of relay SM3 to grounded conductor 4900. Relay RA2 operates in this circuit and locks over its contact 2 directly to conductor 4900, at the same contact closing a circuit from battery through resistance 4905 and the winding of relay RA3 to ground on conductor 4900. Relay RA3 does not operate, being shunted by ground from conductor 4900 over contact 1 of relay SM3 and contact 2 of relay RA3.

Hold magnet F, when operated, also closes a locking circuit for itself over conductor 5202, contact 2 of relay AV1, conductor 4800, contact 2 of magnet F, conductor 5204, to ground at contact 3 of relay ON4. The closure of this locking ground to conductor 4800 short-circuits relay SM2, causing that relay to release and in turn release select magnet RS0 and relay SM3. With relay SM3 released, the shunt around the winding of relay RA3 is opened and that relay operates to indicate that the frame designation has been registered. Relay RA3 closes a circuit from battery through resistance 4906, winding of relay RA4 and its contact 1, contact 1 of relay RA3 to grounded conductor 4900. Relay RA4 locks over its contact 2 to ground on conductor 4903 and closes a circuit from battery through resistance 4907, winding of relay RA5, contact 2 of relay RA4 to grounded conductor 4903, but relay RA5 cannot operate being shunted by ground over the operating circuit of relay RA4 and contact 1 of relay RA5. With relay RA4 operated the circuit above traced from ground to conductor 4671 may be further traced over contact 1 of relay SC1, back contact of relay CK, contact 3 of relay RA4, conductor 4908, winding of relay ON1(55) to battery. Relay ON1(55) at contact 3 connects ground to conductor 4901 to provide locking ground for the class of service relays CS0 to CS7, and for the frame tens relays F00 and F10, etc.

With relay ON1(55) operated, the continuity of the dialing conductors is tested and, since the operation of relay CS3 indicates that a two-party line is calling, a test is made for the 1000-ohm ground which identifies the tip party. These conductors may be traced from the calling substation 2101 over line 2100, tip and ring contacts of cross-point 2124 of the primary line switch, conductors 2116 and 2117 of line link 00, contacts of cross-point 2221 of the secondary line switch, conductors 2222 and 2223 of the district junctor, contacts of cross-point 3941 of the primary sender switch, conductors 3942 and 3943 of the sender link 0, contacts of cross-point 4052 of the secondary switch, conductors 4062 and 4063, contacts 9 and 10 of relay ON1(55), conductors 5512 and 5513, contacts 4 and 2 of relay AV4, conductors 5112 and 5113 to contacts 6 and 8 of relay ON3, where they are connected together and extend over conductor 5514, contact 7 of relay CS3, conductor 5014, to the winding of relay TP(55) and battery. Since it was assumed that the tip party is calling, relay TP(55) operates and closes a circuit from the operating ground of relay ON1(55), contact 6 of that relay, contact of relay TP(55), conductor 5502, contact 8 of relay STL, conductor 5104, winding of relay TP1 to battery. Relay TP1 operates and locks to ground at contact 3 of relay ON1(55). When relay CS3 operated, it connected ground from conductor 4901, over its contact 6, and conductor 5015 to the armature of relay TPT, and to one side of condenser 5503, and over contact 8 of relay ON1(55) and conductor 5106 to the other side of condenser 5503 and through the lower winding of relay TPT to battery, thereby discharging condenser 5503 and energizing relay TPT in a direction to hold its contact open. When relay ON1(55) operated as above described, it disconnected ground from the lower winding of relay TPT and condenser 5503 and connected ground over its contact 7 to the upper winding of relay TPT energizing that winding in a direction to cause the relay to close its contact. However, a charging current for condenser 5503 flows through the lower winding of relay TPT which is strong enough to hold the armature of relay TPT against its back contact for a short time. As the condenser charges, the current in the lower winding of relay TPT decreases until the upper winding becomes effective to close the contact, at which time relay ON3 operates through its lower winding. Relay ON3 closes a locking circuit for itself which may be traced from battery through its lower winding, conductor 5504, contact 2 of relay STL, conductor 5105, contact 3 of relay ON3, to ground over conductor 5015 as previously traced. Relay ON3 also connects ground from conductor 5015, over contact 4 of relay ON3, conductor 5506, contact 1 of relay STL to conductor 5106, thereby discharging condenser 5503 and energizing relay TPT in a direction to open its contact and hold it open.

If the calling line had not been a two-party line, one of the relays CS0 to CS2 would have been operated, in place of relay CS3 and a circuit would have been closed from ground on conductor 4901 over contact 6 of the operated one of the relays CS0 to CS2, conductor 5005 to the upper winding of relay ON3 and battery, operating relay ON3 at once, without waiting for the timing operation performed by relay TPT.

With relay ON3 operated, the tip and ring conductors are disconnected from one another and from relay TP(55), the tip conductor 5112 being extended over contact 5 of relay ON3, and conductor 5522 to the primary winding of dial tone coil 5107, while the ring conductor 5113 is extended over contact 7 of relay ON3, conductor 5523, through the lower winding of line relay L to battery.

When relay ON4 operated, it grounded conductor 4910, closing a polarizing circuit for relay L through its upper winding to battery, causing relay L to hold its contact 2 closed. Ground is also supplied to the armature of relay L from ground on conductor 4910, by way of contact 5 of relay AV1 and conductor 4822. When relay ON1(55) is operated, it also supplies ground to conductor 4910 over its contact 4.

When the ring conductor is extended to the lower winding of relay L, that relay is energized in the reverse direction and closes its contact 1, completing a circuit from ground on its armature through the windings of relays L1 and SR(51) to battery. Relays L1 and SR(51) operate, relay SR(51) also operating relay SR1.

With relay SR1 operated, a circuit is closed to test whether the sender busy relay has been operated. This circuit extends from ground at contacts 4 and 5 of relay DR in the sender link control circuit, over conductor 4714, contact 3 of relay FS, conductor 4426, contact 18 of relay C0, conductor 4658, contact 4 of relay SC1, conductor 4672, contact 7 of relay SB00, conductor 4659, contact 5 of relay SR1, winding of relay ON2 and battery. Relay ON2 operates in this circuit, closing a locking circuit for itself and relay ON1(55) from battery, through the winding and contact 5 of relay ON2, conductor 5109, contact 1 of relay AV4, conductor 5108, contact 6 of relay ON1(55) and in parallel therewith from battery through the winding of relay ON1(55), extending thence over contact 5 of relay ON1(55), conductor 5505 to ground at contact 6 of relay ON2.

Relays ON1(55) and ON2 are therefore held operated under the control of relay AV4, relay ON1(55) at contact 3 grounding conductor 4901 to hold relay ON4 operated. The line link and sender link hold magnets are held operated by ground connected to the sleeve conductor 4053 over contacts 2 and 5 of relay ON2 to grounded conductor 5109. Relay ON2 also extends its locking ground from conductor 5109 over its contacts 5, 4 and 3 to conductor 5103, contact 2 of relay SC1, conductor 5004, to the sender link control circuit when it is further extended over contact 17 of relay C0, conductor 4674, contact 3 of relay DR to the winding of relay AB and battery.

Relay AB operates in this circuit and closes a locking circuit for itself from battery through its winding, contact 9 of relay SL, contact 3 of relay AB to ground over conductor 4512. At contacts 1 and 2, relay AB connects ground to conductors 4717 and 4718, and, at contact 4, closes a circuit through the lower winding of release relay RL(47) to battery. Relay RL(47) operates and locks under the control of relay GH. At contact 1, relay RL(47) opens the circuit of relay OC which releases, in turn releasing the select magnets PSS0A and PSS0B as well as the connector relay C0 thereby disconnecting the sender from the sender link control circuit. The release of relay C0 also opens the circuit of select magnet SSS0 and of relay S00. At contact 3, relay RL(47) connects ground to the winding of off-normal relay ON1(44) to hold that relay operated. At contact 2, relay RL(47) opens the locking circuit of relay GH, permitting that relay to release.

With relay RL(47) operated, and relay GH released, a test is made of the continuity of the sleeve conductor through the line and sender link switches. If at this time the sleeve conductor through the line link switches is properly closed, ground from the front contact of hold magnet PSH0A of the primary sender link switch, extends over conductor 3934 to the district junctor and there over contact 1 of relay I, conductor 7011, through resistance 7006, to the incoming sleeve conductor 2224 of the district junctor, extending over the sleeve contact of cross-point 2221, sleeve conductor 2115 of line link 00, sleeve contact of cross-point 2124, and in the line link control circuit over contact of relay HM0, conductor 2123 through cables 2125 and 2131, contact of relay HC2, conductor 2817 through cable 2831, contact 9 of relay LT0, conductor 3220, contact 3 of relay PS, conductor 3423, contact 9 of relay G0, conductor 3317, contact of relay T0, conductor 3424 through cable 2832, contact 9 of relay HC3, conductor 2818 through cable 2833, contact 3 of relay D0(30) to conductor 3029 through cable 3056 leading to the sender link control circuit where it extends over contact 5 of relay RL(47), contact 4 of relay GH to battery through the upper winding of relay RL(47) to hold that relay operated and over conductor 4727 through cables 4730 and 7301, contact 10 of relay AC(9) or contact of relay LK2, as an indication that the recorder has completed the record of the line identification, conductor 4728 through cables 4730, 7301 and 3056, to the line link control circuit and there over contact 5 of relay D0(30), conductor 3039, through cable 2833, contact 8 of relay HC3, conductor 2819 through cable 2832, contact 1 of relay LS, contact 1 of relay RE to the winding of the line link release relay RL(34) and battery.

The operation of release relay RL(34) restores the line link control circuit to normal, resulting in the removal of ground from conductors 3020 and 3027. The removal of ground from conductor 3020 releases relay GP0, in turn releasing relay DR and relay LL0. Relay LL0 restores ground to the operating chain for relays LL1 to LL4 so that another relay may be operated by its associated sender link control circuit to seize the corresponding group of senders. Relay LL0 opens the operating circuit of relay SS(41) and also opens the locking circuit of relay SG0 which also releases.

The removal of ground from conductor 3027, releases relay BA, in turn releasing relay DA. Relay GP0 opened one branch of the circuit for group relay G while relay DA opens the other branch and relay G now releases, freeing the district junctor group. With relay G released, the circuit of relay ON(44) is opened and that relay also releases. Relay ON(44) disconnects ground from the windings of relays D0(44) to D9, releasing relay D0(44) as well as any other relays of the group which may have been operated, followed by the release of relay DS(47). In addition, relay ON(44) opens the circuit of relay SL, which releases, opening the holding circuit for relay SS(41) and that relay releases. Relay SL also removes ground from the off-normal ground conductor 4416 and opens the locking circuit for relay AB which releases. With relays AB and DR normal, relay RL(47) is released and in turn releases relays ON1(44), DP and TS. Relay TS resets any of the timing relays which may have been operated and thereby completes the return of the sender link control circuit to normal.

When relay CA(45) operated as previously described, it connected the busy test conductors like conductor 7004, from the subgroup of district junctors of the associated subgroup, through individual resistances like resistance 4532 in multiple to the windings of relays RA and A in series. The other side of the winding of relay A is connected to ground over the locking circuit of relay CA(45). However, neither relay RA nor relay A(45) can operate, since ground from conductor 4717 is also connected over contact 4533 of relay G to the multipled resistances 4532, etc., relay A(45) also being short-circuited at contact 5 of relay DP as previously described. Relay DP is locked over a circuit from battery through its right winding, back contacts of relays RA and RB in series, and thence over its contact 3 to ground over the locking contact of relay CB(45) or over its contact 4 to ground over the locking contact of relay CA(45). When relays DS(47) and AB release as above described, ground is removed from conductors 4717 and 4718, removing ground from in shunt of the windings of relays RA and RB. Since battery is connected to the busy test conductors of idle district junctors, relays RA and RB, which are sensitive relays, can operate if there is at least one idle junctor in each group. The operating circuit of relay DP has been opened, but relay DP remains operated in the locking circuit above traced. If either relay RA or relay RB operates, relay DP releases, opening the shunt around the windings of relays A(45) and B(45). The latter relays are low resistance, marginal relays and will only operate if there are at least two idle junctors. Relay A(45), in operating, connects ground through its winding to resistance 4535 in shunt of the winding of relay CA(45) causing relay CA(45) to release and in turn release relay A(45). Similarly, relay B(45) in operating releases relay CB(45) and itself.

Figure 45:
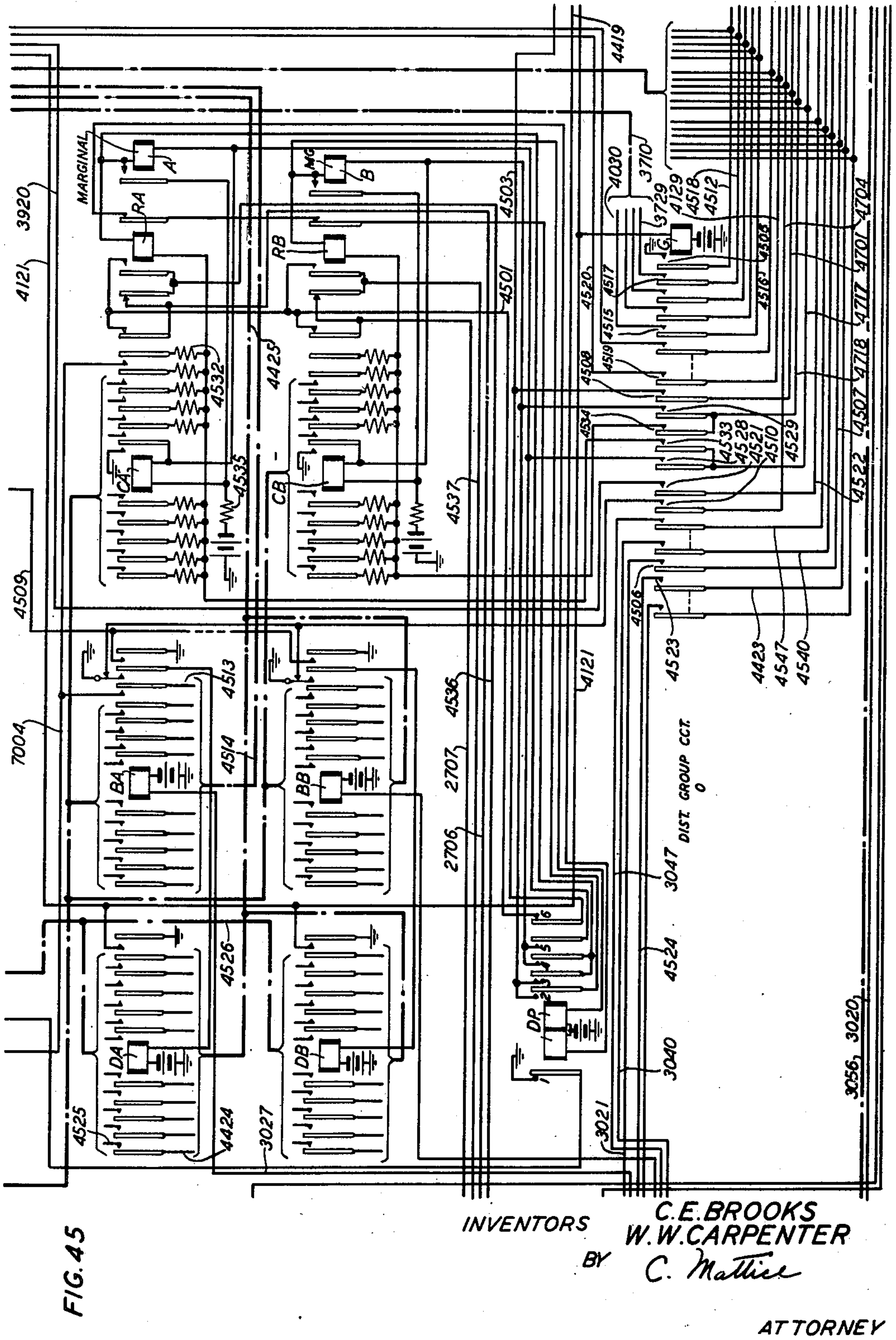

From the foregoing discussion, it will be apparent that, if all of the district junctors of the group, with which the group circuit of Fig. 45 is associated, are busy, relay DP remains locked holding the paths-available circuit open at its contact 6. If only one junctor is idle, relay DP will be released, and the paths-available circuit will be extended either over the front contact of relay RA to conductor 4536 or over the front contact of relay RB to conductor 4537. Under this condition relays CA(45) and CB(45) remain operated to hold the paths-available circuit disconnected from conductors 2706 and 2707. Conductors 4536 and 4537 are used for the reserve test which has not been described. Reference may be made to the Carpenter patent above cited for such a description.

When relay RL(34) of the line link control circuit operates from ground supplied by the sender link control circuit, it connects ground to conductor 3426 to control relays RP and PR to change the district group preference for the next call. Assuming that relays RP and PR are normal, ground on conductor 3426 completes a circuit over contact 3 of relay PR, through its winding to battery through resistance 3318. Relay PR operates in this circuit and locks to ground at its contact 4 at the same time closing a circuit from this ground through the winding of relay RP to battery through resistance 3319. However, relay RP cannot operate, being shunted by ground on conductor 3426 over its contact 3. With relay PR operated and relay RP normal, one locking circuit of relay RL(34) is opened. When the release relay RL(34) releases, relay RP operates, switching the preference circuits from the cross-connections over rack 3310 to those over rack 3320. At the end of the next call, when ground is again connected to conductor 3426, a circuit is completed over contact 4 of relay RP to resistance 3318, in shunt of the winding of relay PR, causing that relay to release while relay RP is held operated over conductor 3426 and contact 3 of relay PR. At this time the locking circuit of relay RL(34) is opened and when relay RL(34) finally releases, relay RP also releases, restoring the preference circuits to cross-connecting rack 3310.

At contacts 7 and 8 relay RL(34), when operated, opens the operating circuits of relays AC(27), HC1, HC2, and HC3 but these relays are held operated under the control of relay FA. At contact 5, relay RL(34) disconnects ground from conductor 2816, opening the circuit of the select magnets PLS0 to PLS60.

When the sender link control circuit releases relays G0 and GE as previously described, the circuit of relay D0(30) is opened and that relay releases, in turn releasing relays DF0 and DA0. Relay GE opens the circuit of relay PS, and that relay closes a circuit from ground at contact 5 of relay PS, contact 9 of relay RL(34), conductor 3427, contact 2715 of relay AC(27) conductor 2716, winding of relay LA, conductor 2516 to battery at contact 9 of relay TA2. At contact 8, relay LA disconnects ground from conductor 2510 to stop the timing operation and to release relay TA(26) if operated. At contact 1, relay LA opens the circuit of relay FA which releases. At contact 6, relay LA opens the locking circuit of relay HA0 causing relay HA0 to release, as well as relay S(31). At contact 3, relay LA opens the circuit of the horizontal group relay HG0.

Relay HG0 releases and in turn releases the select magnets SLS0 and ISLS0 of the secondary line switch. Relay HG0 also opens the line link test circuits, thereby releasing relay T0 and any other ones of the relays T1 to T9 which may have been operated from busy line links.

The release of relay FA opens the locking circuits of the connector relays AC(27) and HC0 to HC3, disconnecting the frame from the control circuit and thereby releasing the line group relays LR0 and HM0 and relay LA as well as relays VT and VS, followed by relays V0, VE, LT0, LE and LS.

*Operation of sender*

With relays ON2 and ON1(55) operated and locked, the sender is now ready to receive the called line number, and signals the calling subscriber by completing a circuit from ground at contact 1 of relay SR(51), secondary winding of dial tone coil 5107, condenser 5110, conductor 5111, contact of relay TN, contact 4 of relay IIC, contact 3 of relay AL1 to the tone supply source over conductor 5460. Dial tone is now received by the calling suoscriber, who responds by operating his dial in accordance with the wanted subscriber's designation.

It will be remembered that relay L operated over the dialing circuit, operating relays SR(51) and L1, relay SR(51) in turn operating relay SR1 and relay L1 closing a circuit from ground at contact 10 of relay SR1, front contact of relay L1, conductor 5115, to the winding of relay L2 and battery. At each opening of the dialing circuit by the dial, relay L releases momentarily, its release and operation being made quicker and more energetic by the effect of its middle winding which is connected in series with condenser 5116, in parallel with relay SR(51). Relays L1 and L2 also release at each release of relay L. Relays SR(51) and SR1 are slow to release and remain operated until relay L remains released when the call is completed or abandoned.

At the first opening of the dialing circuit, relay L1 closes a circuit from ground at contact 10 of relay SR1, back contact of relay L1, conductor 5117, winding of relay RA(49) to battery. Relay RA(49) is slow to release and remains operated until relay L1 remains operated at the end of the digit. Relay RA1 was operated in response to the operation of hold magnet F in a circuit from battery through the winding of relay RA1, contact 3 of relay RA(49), conductor 5206, contact 1 of magnet F, conductor 5205 to ground at contact 1 of relay ON4. When relay RA(49) operates during the dialing of a digit, relay RA1 releases and when relay RA(49) releases during the interdigital intervals, relay RA1 is operated.

At each opening of the dialing circuit, relay L closes a circuit from ground, connected to its armature as previously traced, over its contact 2, contact 2 of relay SR, contact 5 of relay STL, conductor 5118, contact 1 of relay L5, winding of relay L3 and battery. Relay L3 operates in this circuit, locking through the upper winding of relay L5, back contact of relay L4, contact 1 of relay L3, contact 1 of relay RA(49), conductor 4911 to ground at contact 10 of relay SR1, but relay L5 cannot operate, being shunted by ground on conductor 5118. When relay L reoperates at the end of the first pulse, it removes ground from conductor 5118 and permits relay L5 to operate. With relay L5 operated, ground from conductor 4911 is connected over contact 1 of relay RA(49), conductor 4912, contact 3 of relay L5 to conductor 4913. At the release of relay L in response to the second dial pulse, ground on conductor 5118 completes a circuit over contact 2 of relay L5 and the lower winding of relays L5 and L4 to battery. Relay L4 opens the locking circuit of relay L3 and that relay releases. When relay L operates after the second pulse, relays L3, L4 and L5 are all released and ground is extended from conductor 4912 over contact 4 of relay L5 and contact 4 of relay RA1 to conductor 4914. It will be apparent from the foregoing that after each odd pulse ground is connected to conductor 4913 and after each even pulse, ground is connected to conductor 4914. The connection of ground to conductors 4913 and 4914 serves to control the operation of the pulse counting relays P1 to P6.

The first connection of ground to conductor 4913 completes a circuit over contact 6 of relay P4, contact 6 of relay P2, contact 6 of relay P3, contact 5 of relay P5, lower winding of relay P1 and battery. Relay P1 locks over contact 4 of relay P1, conductor 4801, contact 2 of relay RA1, conductor 4915, contacts 3 of relays P2, P3, P4 and P5, conductor 4802 to ground over contact 1 of relay RA1 or over contact 3 of relay SM1 and conductor 4911.

When ground is connected to conductor 4914 following the second dial pulse, it completes a circuit over contact 6 of relay P1, winding of relay P2 and battery. Relay P2 locks over its contact 4 and a chain circuit over contacts 3 of relays P3, P4 and P5 to ground by way of conductor 4802 as above traced. At contact 3, relay P2 opens the locking circuit of relay P1 which now releases.

Ground on conductor 4913 following the third dial pulse completes a circuit over contact 6 of relay P4, and contact 5 of relay P2 to the winding of relay P3 and battery. Relay P3 locks over its contact 4 and the chained contacts 3 of relays P4 and P5 to ground over conductor 4802, and at contact 3 opens the locking circuit of relay P2 which releases.

The fourth pulse operates relay P4 over contact 5 of relay P3 and the fifth pulse operates relay P5 over contact 5 of relay P4, relay P4 locking over its contact 4 and contact 3 of relay P5 and releasing relay P3, while relay P5 locks over contact 7 of relay P1 and contact 4 of relay P5 to conductor 4802 and releases relay P4.

Ground on conductor 4914, following the sixth pulse, operates relay P6 which locks directly to conductor 4802 and therefore remains operated throughout the remaining pulses. With relay P6 operated, ground on conductor 4913 following the seventh pulse operates relay P1, the circuit including contact 6 of relay P6 in place of contact 5 of relay P5. Relay P1 locks over contact 5 of relay P6 to conductor 4915 and the previously traced chain locking circuit and at contact 7 releases relay P5.

The circuits for operating relays P2, P3 and P4 in response to the eighth, ninth and tenth pulses of a digit are the same as those by which they operated in response to the second, third and fourth pulses, these relays operating, locking and releasing the previously operated relays as described before.

The pulse counting relays record the value of the digit dialed by grounding one of the conductors 4810 to 4819. When relay RA(49) releases between digits, the operating circuit of relay RA1 is again closed, and ground over a branch of that circuit extends over contact 4 of relay SM1 to conductor 4916. With relay P6 normal, that is, with any digit from 1 to 5 counted, ground on conductor 4916 extends over contact 3 of relay P6 to contacts 2 of relays P1 to P5 and over the contact of any operated one of relays P2 to P5 to any one of conductors 4812 to 4815, respectively. With relay P6 operated, conductor 4916 is connected over contact 4 of relay P6 to contacts 1 on relays P1 to P5 and over the contact of any operated one of relays P5 and P1 to P4 to any one of conductors 4816 to 4810. Since the digit 1 is never employed alone as the first digit of a subscriber's designation, the connection between contact 2 of relay P1 and conductor 4811 is extended by way of conductor 4803 and contact 5 of relay AL1, the operation of which follows the registration of the first digit as will be described hereinafter.

For the purpose of describing the operation of the cross bar register, let it be assumed that the called line number is Chelsea 3–5678. The first digit dialed will be two, resulting in the operation of relay P2 and, when relay RA(49) releases, in the grounding of conductor 4812. Ground on conductor 4812 completes a circuit for select magnet RS2 which operates, prepares the second level of the register, and extends its operating ground to conductor 5311, contact 3 of relay SM3, winding of relay SM1 and battery. As previously described, relay SM1 locks to conductor 4900 and operates relay SM2, which in turn operates relay SM3. With relay SM3 operated, a circuit is closed from battery through the hold magnet AA, controlling one of the two verticals for registering the first office code digit, back contacts of hold magnets B and C, conductor 5211, contact 4 of relay RA3, contact 1 of relay AV1, contact 2 of relay SM3 to ground over conductor 4903. At the same time a circuit is closed from battery through the winding of hold magnet A controlling a second vertical, also for registering the first office code digit, conductor 5212, contact 2 of relay PS, conductor 5402, contact 6 of relay CL(48), contact 6 of relay RA5, contact 5 of relay RA3, lower winding of relay SM2, contact 2 of relay SM3 to ground over conductor 4903, thereby holding relay SM2 operated. At contact 1, relay SM3 connects ground from conductor 4900 over contact 3 of relay RA3 to resistance 4904 and battery, in shunt of the winding of relay RA2, causing that relay to release, but holding relay RA3 operated over contact 1 of relay RA2. At contact 3, relay SM3 opens the operating circuit of relay SM1, causing that relay to release.

Hold magnet AA operates in the circuit above traced, closing cross-point 5213 and locks over its contact 1 and contact 1 of hold magnet F to grounded conductor 5205. Hold magnet A also operates, closing cross-point 5214, and completes a locking circuit for itself over conductor 5212, contact 2 of relay PS, conductor 5402, contact 1 of magnet A, contact 3 of magnet AA, to grounded conductor 5205. Magnet AA at contact 2, closes an operating circuit for relay AL1, which operates and locks to grounded conductor 4910. Relay AL1 at contact 5 connects conductors 4802 and 4811, as above mentioned, to permit the use of the digit 1 as the second or subsequent digit of the called number. At contact 3, relay AL1 disconnects tone source 5400 from the coil 5107 removing dial tone from the calling line. At contact 2, magnet A connects conductors 4801 and 4915 together independent of relay RA1.

The locking ground for magnet A short-circuits relay SM2, causing that relay to release, in turn releasing relay SM3. The release of relay SM3 opens the holding circuit for relay RA3 and that relay also releases. At contact 1 of relay RA3, the shunt around the winding of relay RA5 is opened and that relay operates in the circuit previously traced. Therefore, at the end of the first digit, relays RA2 and RA3 are both normal and relays RA4 and RA5 are both operated.

After the first digit has been dialed, relay L remains operated and relay RA(49) releases, permitting relay RA1 to reoperate and open one branch of the locking circuit of relay P2. When relay SM1 operates, it opens the second branch of the locking circuit of relay P2 and that relay releases. Relay SM1 also opens the operating circuit of the select magnet RS2, but first closes a locking circuit for itself from battery through its winding, contact 3 of relay SM3, contacts 2 and 5 of relay SM1, to ground over conductor 4900. It also closes a locking circuit for select magnet RS2 which may be traced from battery through resistance 5310, winding and contact of magnet RS2, conductor 5311, contacts 2 and 5 of relay SM1 to ground over conductor 4900. Relay SM2, in operating, at contact 1 connects conductor 5311 to conductor 4900 to hold the select magnet RS2 operated, thereby insuring that the select magnet remains operated until after the hold magnets have operated. When the locking ground for the hold magnet short-circuits and releases relay SM2, the select magnet is also released. The pulse counting and registering circuits are now ready to receive the next digit.

The second digit, which has been assumed to be the letter H, equivalent to the numerical digit 4, leaves relay P4 operated, following the fourth dial pulse. Relay P4 causes the operation of select magnet RS4, which operates relay SM1 followed by relays SM2 and SM3 in the manner previously described. With relays RA2 and RA3 released and relays RA4 and RA5 operated, when relay SM3 closes the holding circuit for relay SM2, that circuit extends from grounded conductor 4903, contact 2 of relay SM3, lower winding of relay SM2, contact 6 of relay RA3, contact 4 of relay RA5, contact 5 of relay TD, contact 3 of relay CL(49), conductor 4918, winding of hold magnet B to battery. Hold magnet B locks over its front contact, contact 3 of magnet A, to grounded conductor 5205. Since select magnet RS4 was operated, hold magnet B closes cross-point 5215. Relay SM2 is released followed by relay SM3 and select magnet RS4 in the manner previously described.

When relay SM3 operated it closed the previously traced circuit for relay RA2, which operated, locked and prepared the circuit for relay RA3. When relay SM3 released, relay RA3 also operated, connecting ground from conductor 4900 over contact 1 of relay RA3, contact 2 of relay RA5 to resistance 4906 and battery in shunt of the winding of relay RA4 and causing relay RA4 to release. Relay RA5 is held operated over contact 1 of relay RA4 and contact 1 of relay RA3.

In response to the dialing of the third digit of the office code, digit 3, relay P3 is operated, in turn operating select magnet RS3. Magnet RS3 operates relay SM1, followed by relays SM2 and SM3 as before. The holding circuit for relay SM2 extends from its lower winding, over contact 5 of relay RA3, contact 5 of relay RA5, contact 7 of relay TD, conductor 4919, contact 1 of relay HL, winding of hold magnet C to battery. Magnet C locks over its contact 1, contact 3 of magnet A to grounded conductor 5205, closing cross-point 5216 and releasing relay SM2 and select magnet RS3. Relay SM3 when operated released relay RA2, and when released, released relay RA3 as before. Relay RA3 on releasing, opened the holding circuit for relay RA5 so that relays RA2, RA3, RA4 and RA5 are now all released, ready for a new cycle.

Hold magnet C in operating also closes a circuit from battery, through the winding of relay CL(49), conductor 4920, contact 2 of magnet C, conductor 5217, to ground at contact 8 of relay ON4. Relay CL(49) transfers the hold magnet operating circuits from the frame and office code hold magnets to the hold magnets which control the verticals registering the numerical digits. Relay CL(49) also closes a circuit for relay DST which causes the association of the sender with a marker as will be described hereinafter.

The sender is arranged to handle calls for offices identified by either two-digit codes or three-digit codes. All two-digit codes are identified by the initial digit, and the winding of relay TD is cross-connected to the cross-point in vertical AA which corresponds to that digit. As shown, an initial digit 9 represents a two-digit code and when cross-point 5218 is closed in response to the dialing of the digit 9, relay TD is operated over contacts of cross-point 5218 to grounded conductor 4910. With relay TD operated, the circuit previously traced for operating the hold magnet B is opened at contact 5 of relay TD and extended over contact 6 to conductor 4919 and the winding of the hold magnet C. Likewise, the circuit for operating the hold magnet C is opened at contact 7 of relay TD and extended over contact 8 to the winding of the thousands hold magnet TH. Similarly, each hold magnet operating circuit is transferred to the next hold magnet. Therefore, with relay TD operated, no digit is registered on the B vertical, but the second digit of the two-digit office code is registered on the C vertical and the numerical digits are registered on the same verticals as usual.

In response to the numerical digits, the pulse counting relays count the pulses and operate the select magnets. Relays SM1, SM2 and SM3 function as before, operating relays RA3 to RA5 in the manner described and progressively operating the hold magnets TH, H and T of the thousands, hundreds and tens verticals. Magnet H when operated closes a circuit from battery through the winding of relay HL, contact of magnet H to ground over conductor 5217. Relay HL prepares the circuits for operating the units and stations verticals. Since it was assumed that the called line number was 5678, cross-points 5317, 5318, 5319 and 5320 will be closed in the thousands, hundreds, tens and units verticals, respectively. Since no stations digit is dialed, no cross-point will be closed in the stations vertical.

Figure 74:
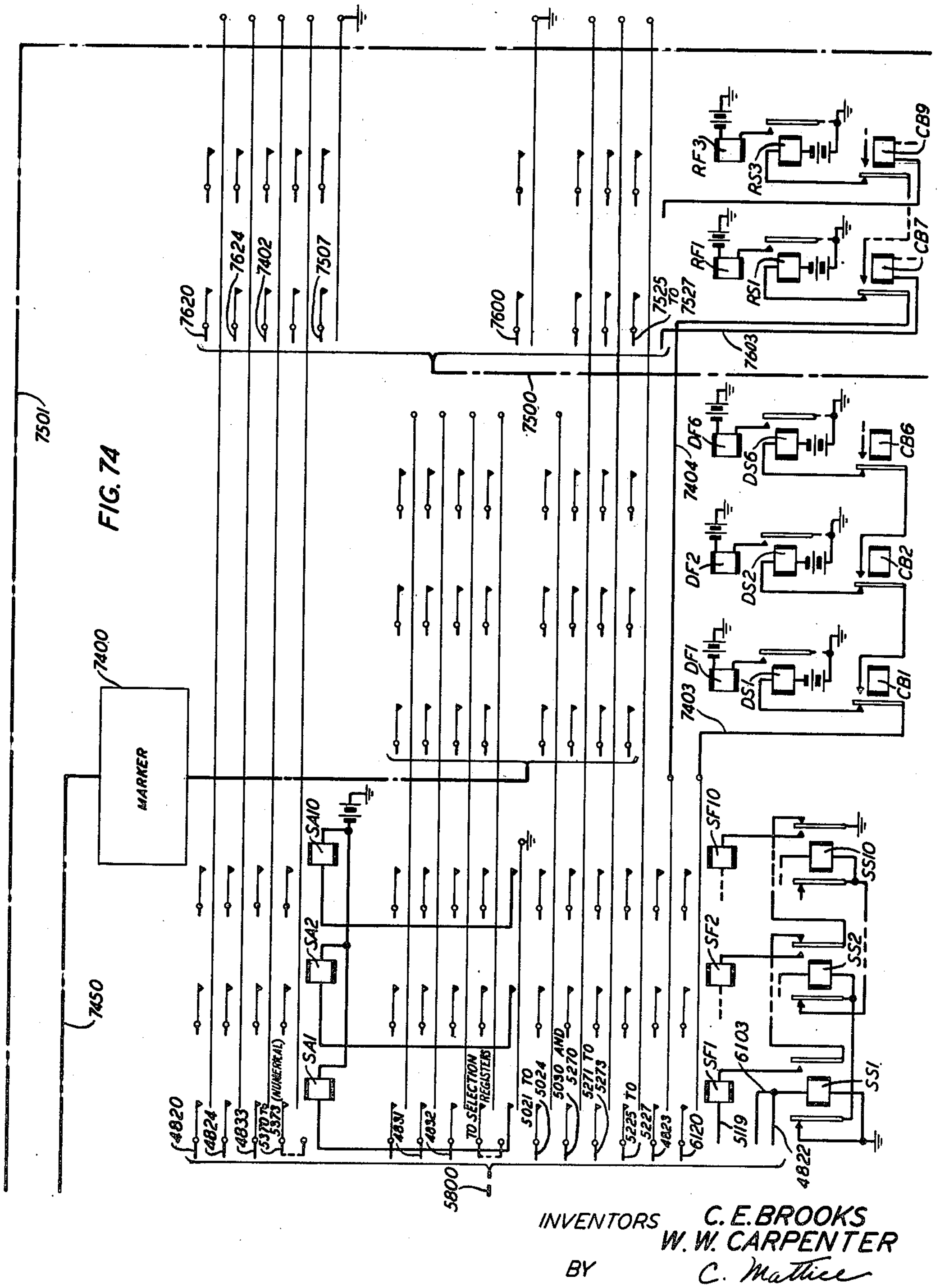
Fig. 74 shows the marker and register connector.
Figure 75:
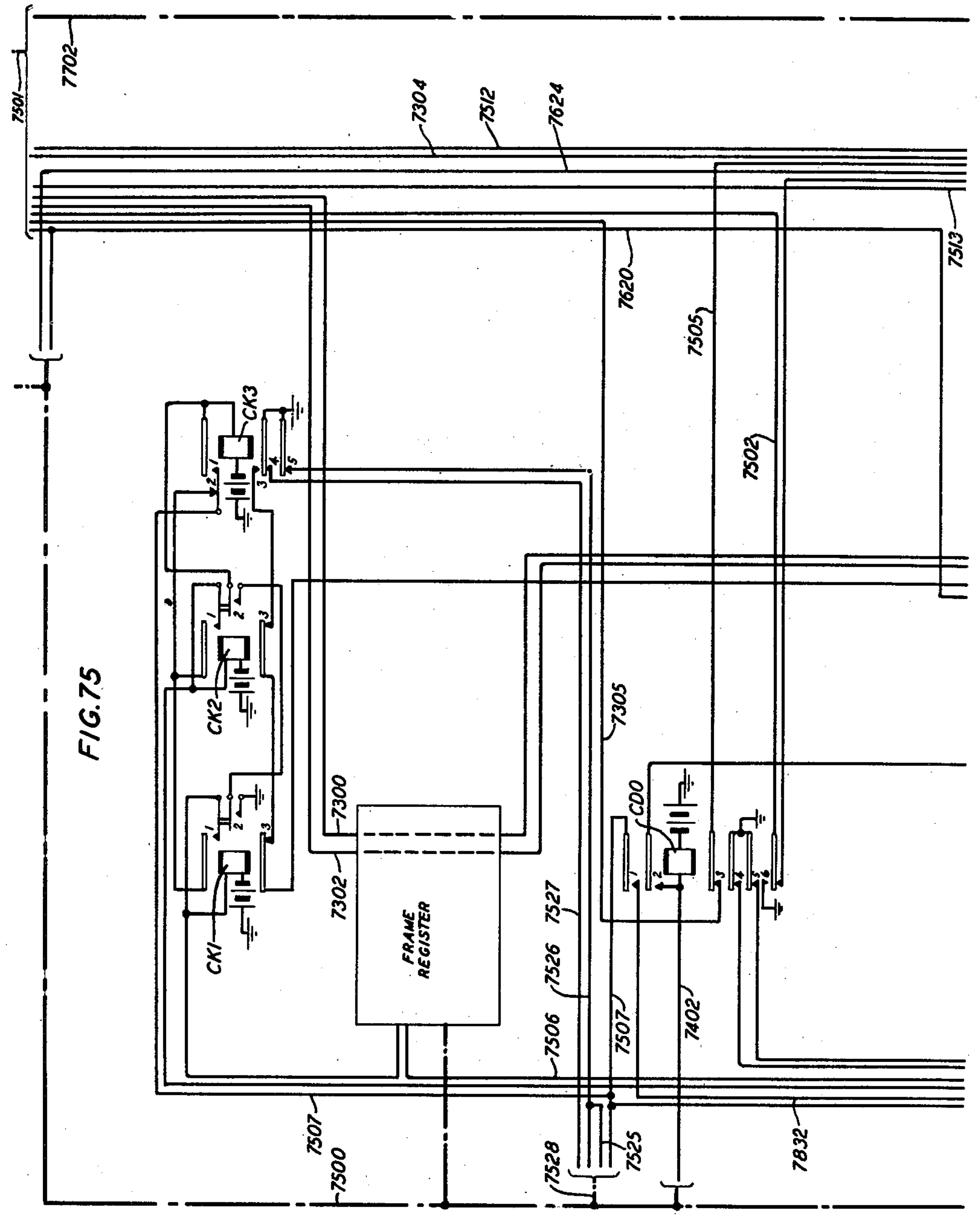
Figure 76:
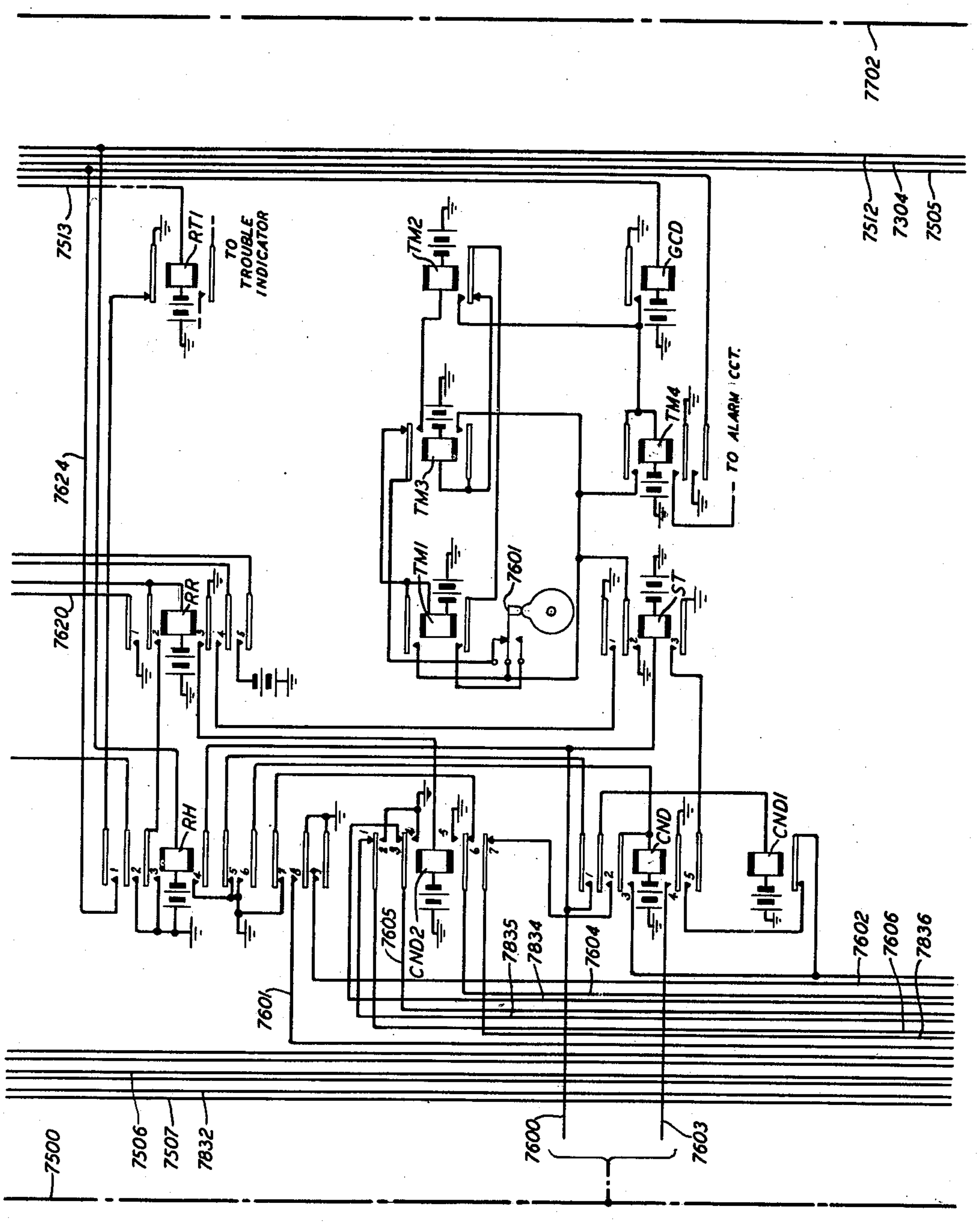
Figure 77:
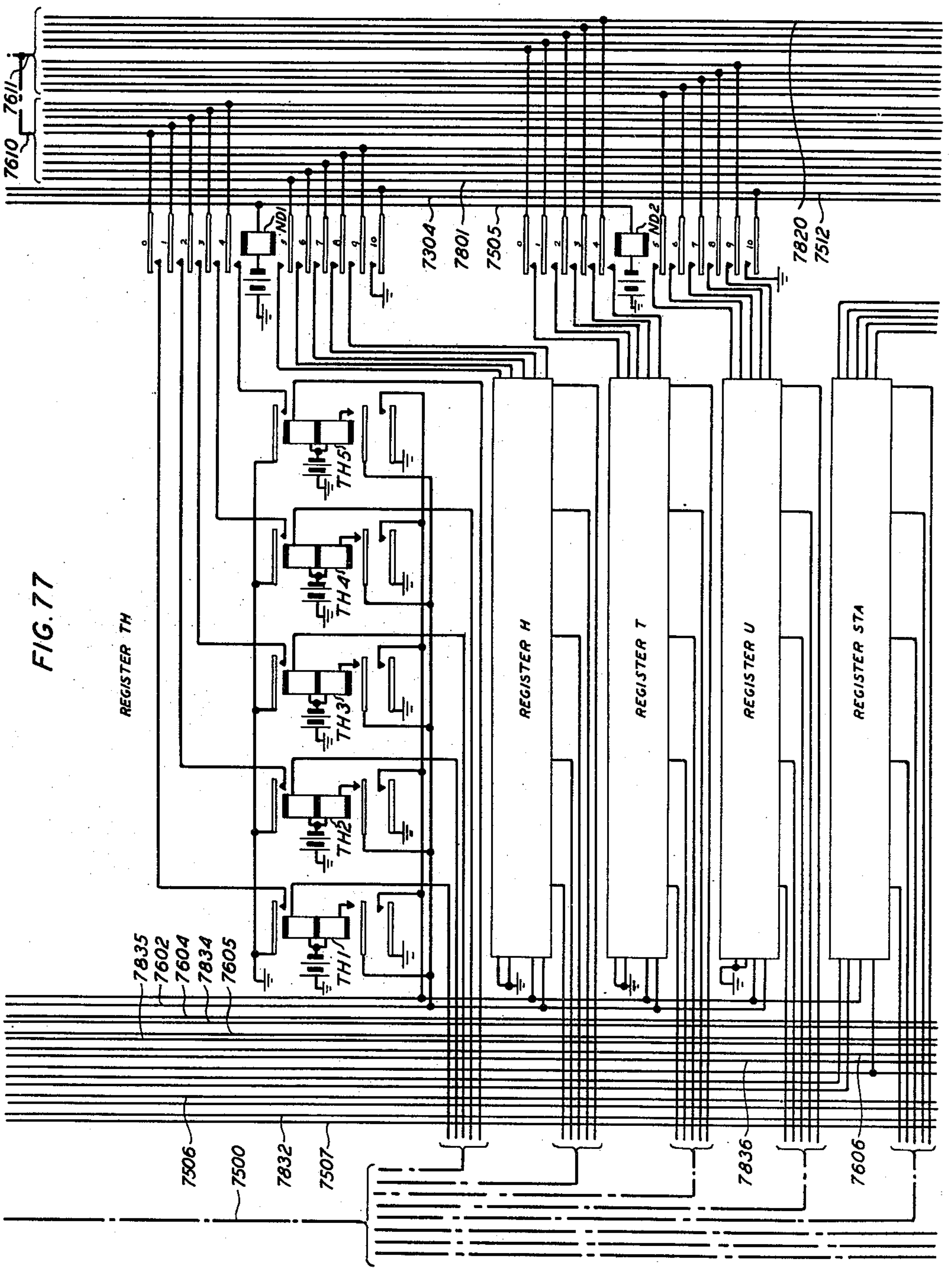

When relay CL operated, following the registration of the last office code digit, it closed a circuit from battery, through the winding of relay DST, contact of relay TR1(61), conductor 6100, contact 7 of relay CL(49), conductor 4910 to ground at contact 4 of relay ON4. Relay DST operates in this circuit and closes a locking circuit for itself over contact 1 of relay TR1(61), contact 12 of relay DST, conductor 4910 to ground. At contact 3, relay DST connects battery over conductor 6101, through cable 6102, contact 12 of relay LR(51), conductor 5119 through cable 6102, contact 3 of relay DRL to conductor 6103 which extends through cable 5800 to the marker and register connector of Fig. 74 where it completes a circuit for relay SS1(74) of the marker connector. A branch of conductor 5119 also extends to the marker connector independent of relay DRL to supply battery to the multicontact relay SF1 individual to this sender.

Figure 63:
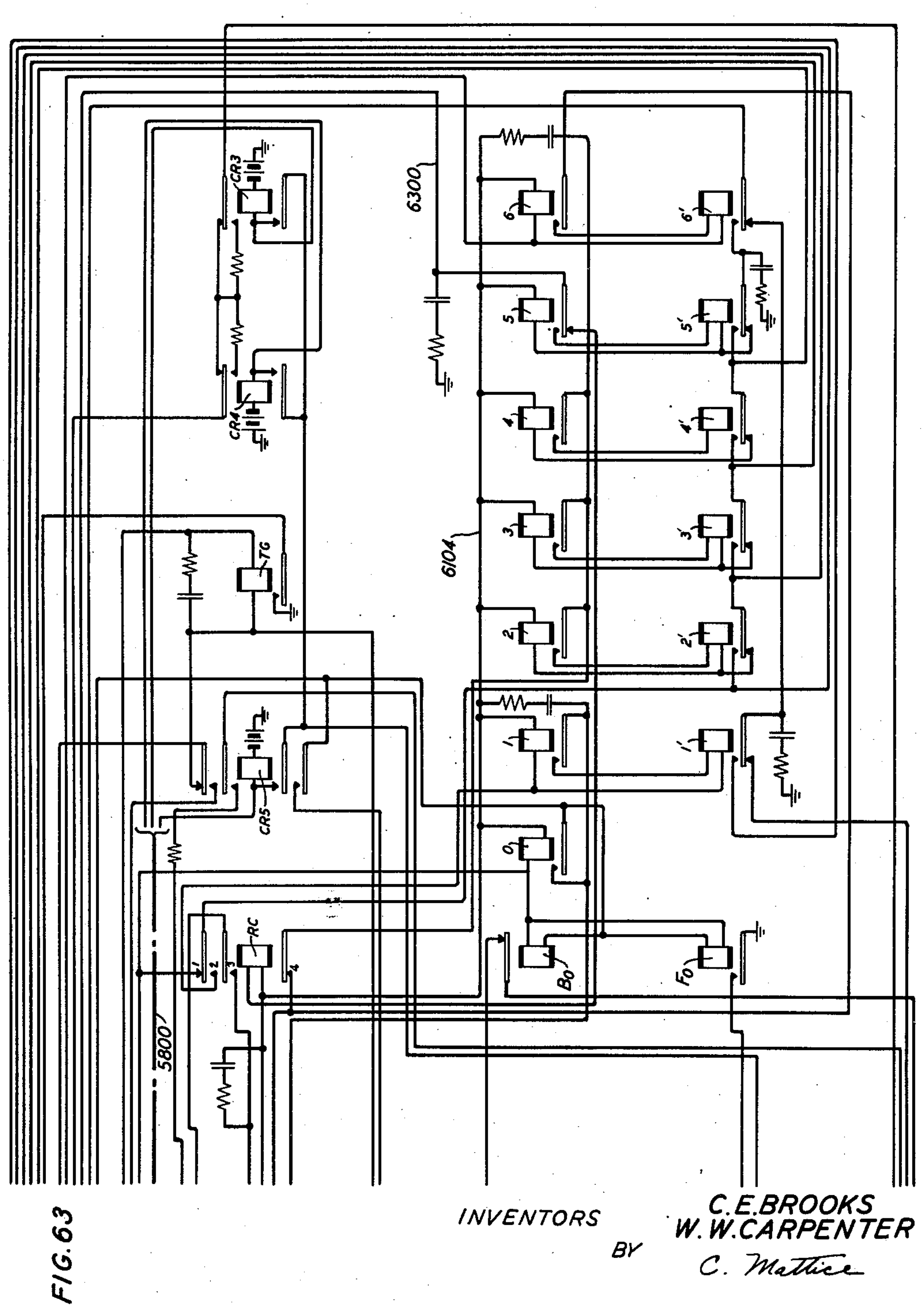
Figure 64:
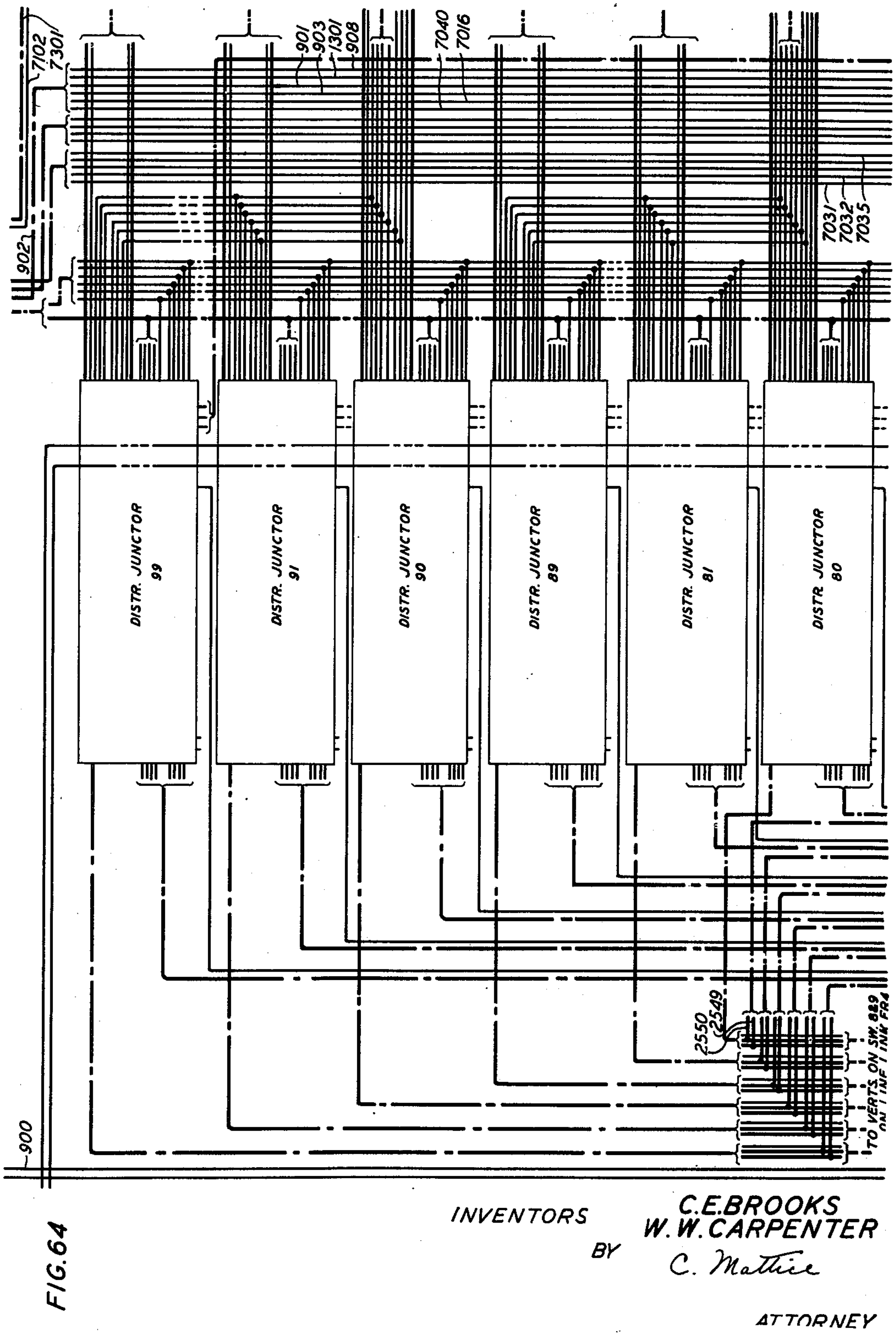
Figs. 64 to 73 show the district junctor frame and district frame connector.
Figure 65:
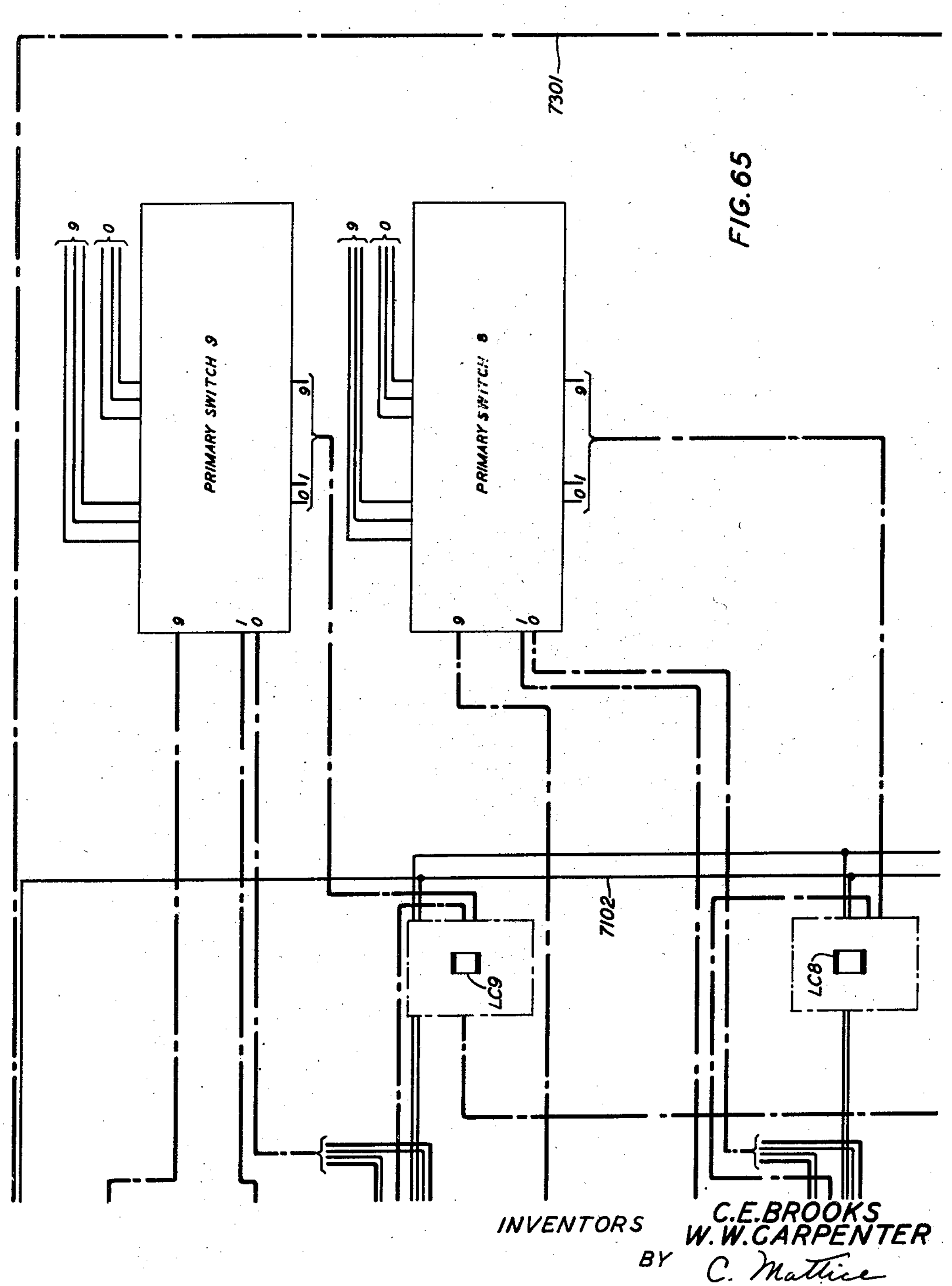
Figure 66:
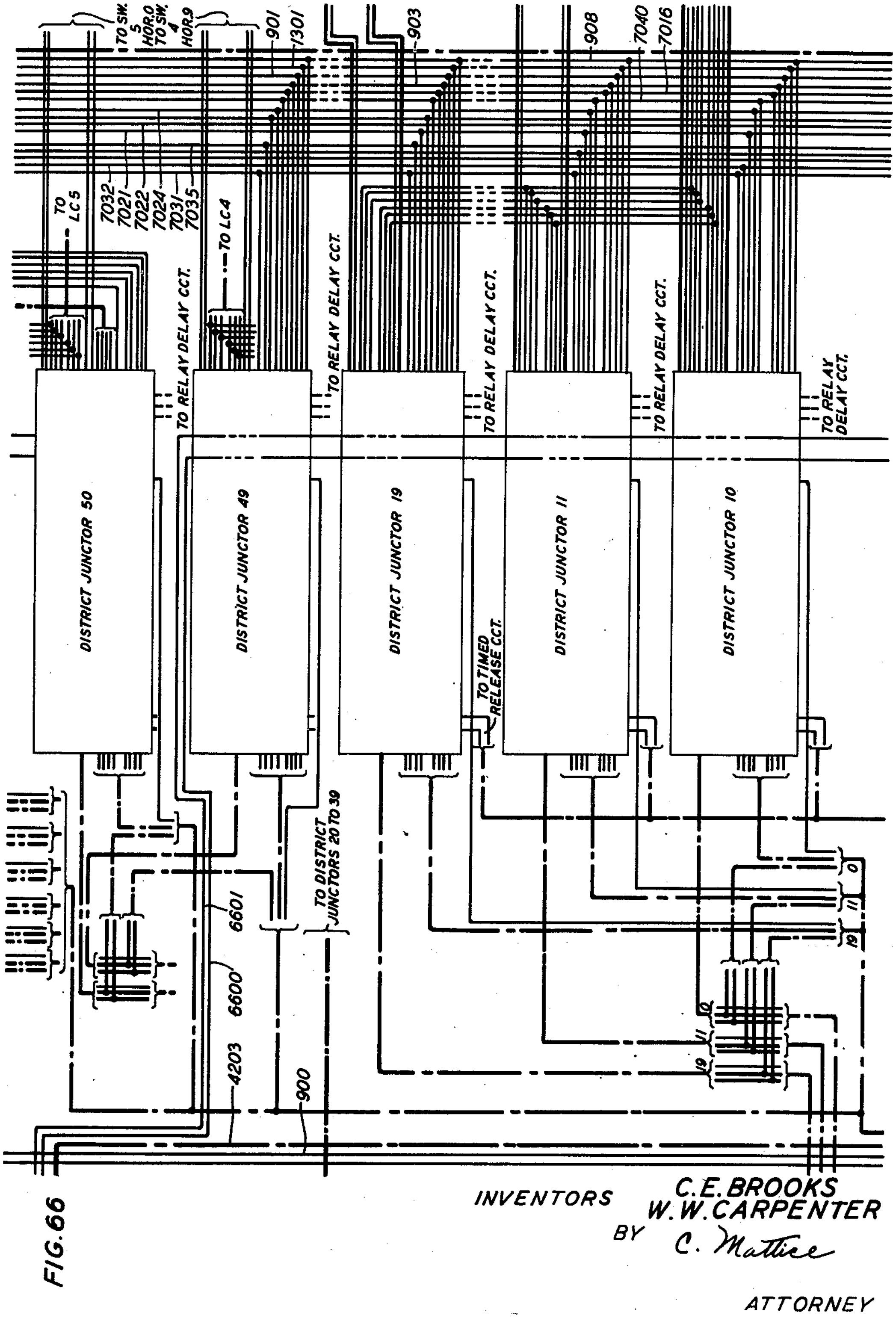
Figure 67:
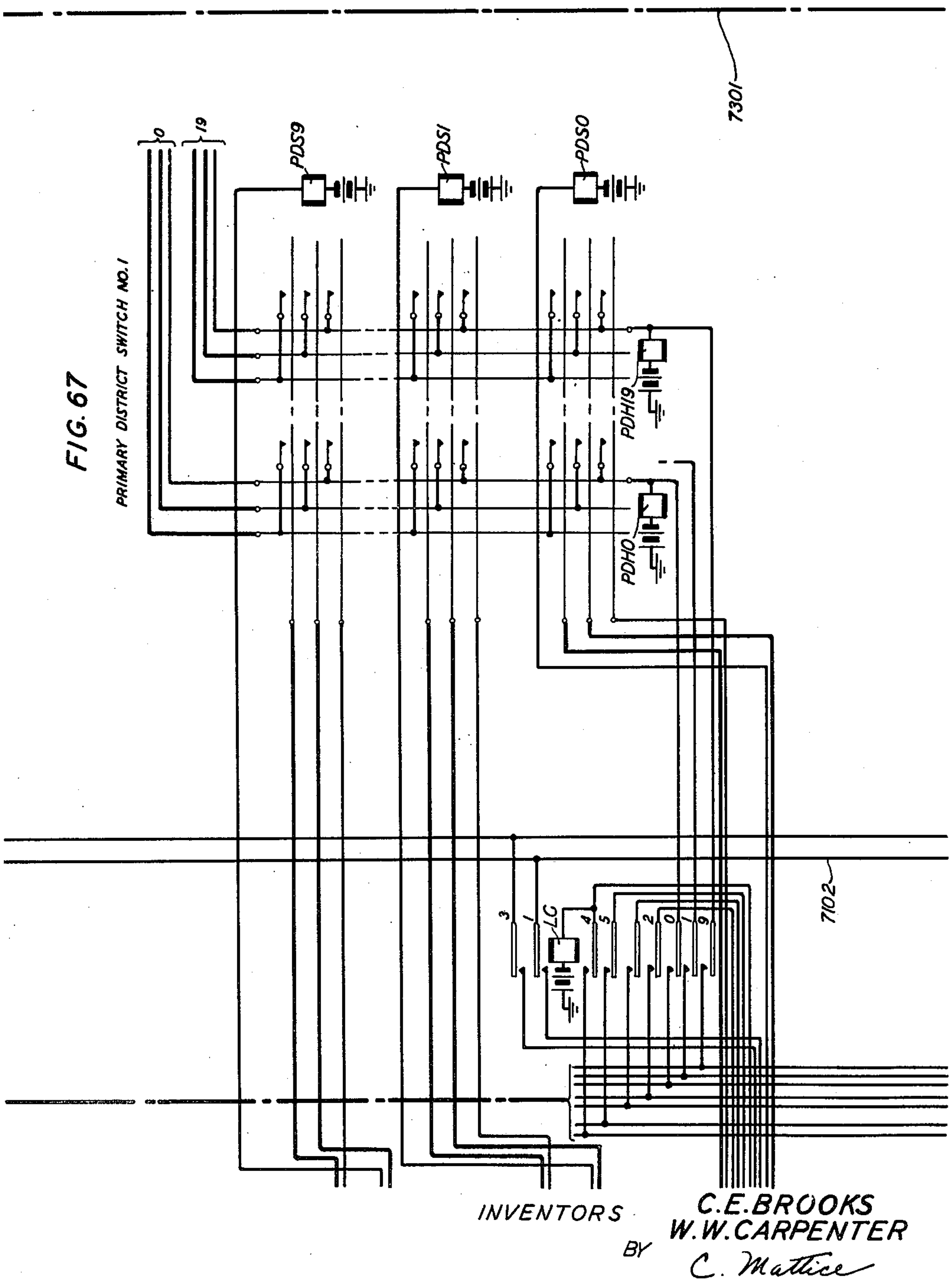
Figure 68:
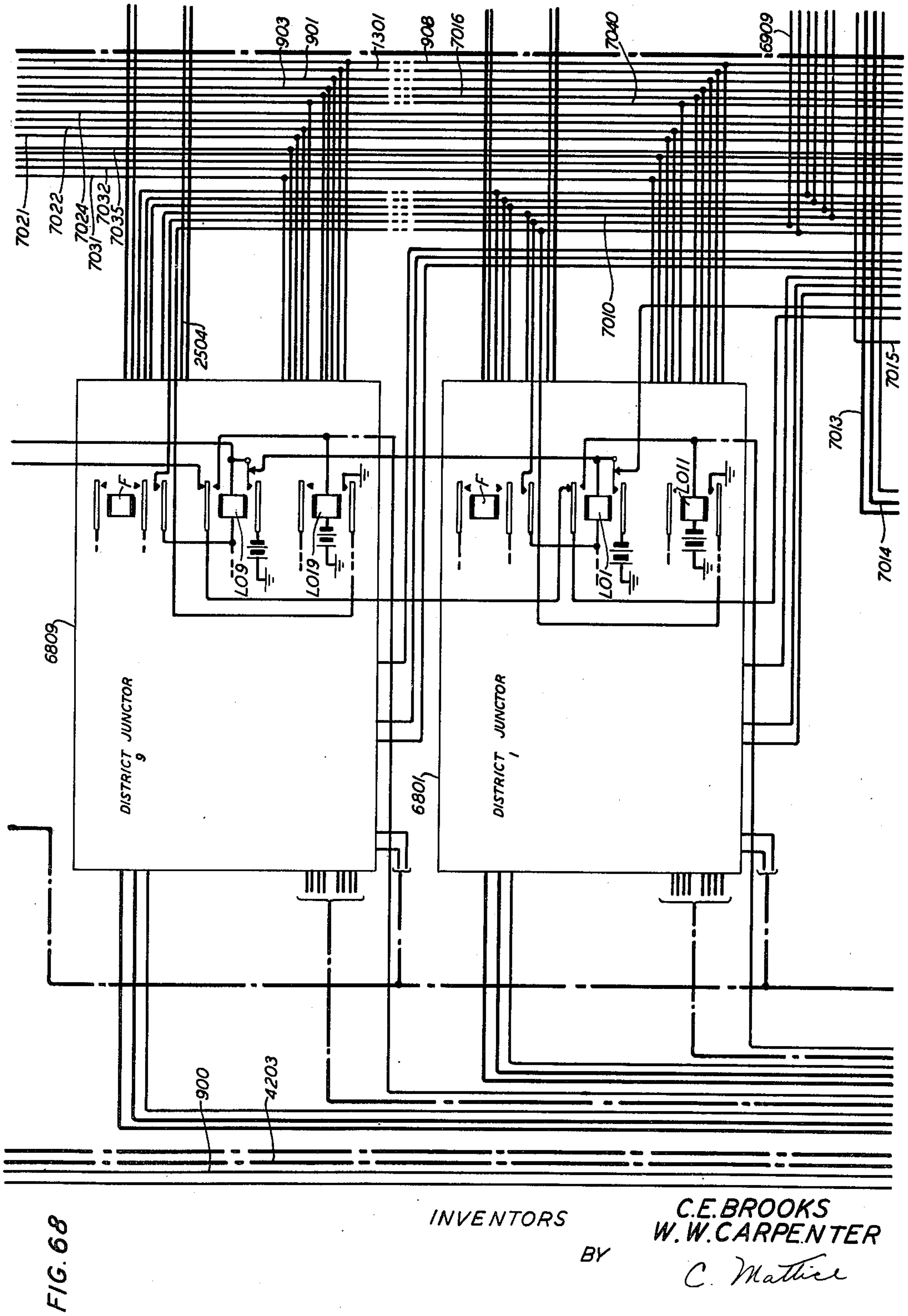
Figure 69:
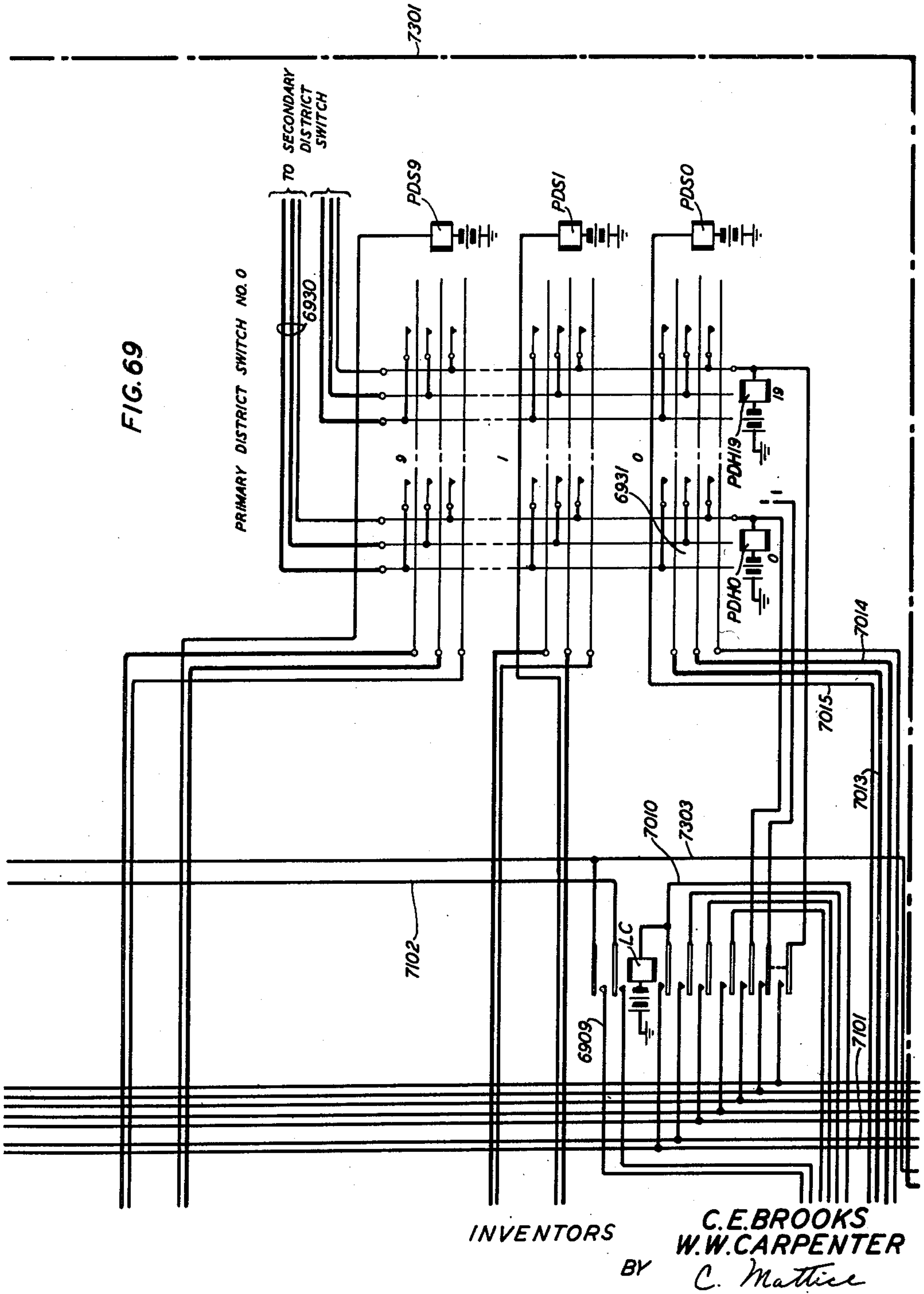

At contact 7, relay DST connects battery to conductor 6104 to prepare the counting relays of Fig. 63 for operation. Similarly, at contact 9, relay DST connects battery to conductor 6105 to prepare the steering relays of Fig. 60.

With relay SF1 operated, ground connected to conductor 6120 by relay DST is extended to conductor 7403 and, if the first marker is idle, over the back contact of relay CB1 to the winding of relay DS1 and battery. Relay DS1 operates relay DF1(74). These functions take place as described in the above-identified Carpenter patent and serve to connect the sender to the marker 7400 over a plurality of circuits by means of which information is transmitted to and received from the marker.

The class of service relays ground one or more of the class of service conductors 5021 to 5024 in various combinations. With relays CS3 and CS6 operated, as previously assumed, conductor 5023 is grounded directly by relay CS3. The marker supplies a temporary ground to conductor 5025, which relay CS3 connects at contacts 2 and 3 to conductors 5021 and 5022, respectively, while relay CS6, at contact 2 connects this temporary ground to conductor 5024. Relay CK, which operates ineffectively at this time, serves to detect a false permanent ground on conductors 5025 or 5225, or the operation of both relays F00 and F10.

The tens digit of the frame registration is transferred to the marker by the grounding of conductor 5030, either directly by relay F10 or by means of a temporary ground supplied by the marker to conductor 5225 and connected to conductor 5030 over contact 1 of relay F00. The units digit of the frame designation is transmitted to the marker by grounding one or more of conductors 5231 to 5234 over contacts of the cross-point closed in the frame vertical of the cross bar register. Since it was assumed that cross-point 5203 was closed, none of these conductors is grounded directly but all are grounded from the temporary ground supplied by the marker to conductor 5225.

The office designation is transmitted to the marker by grounding one or more of four conductors for each digit, that is, conductors 5241 to 5244 for the A digit, 5251 to 5254 for the B digit and 5261 to 5263 for the C digit. Since cross-points 5214, 5215 and 5216 have been closed, direct ground is connected to conductors 5242, 5253, 5261 and 5262. Temporary ground supplied by the marker to conductors 5226 and 5227 is connected to the remaining conductors.

In addition, relay TP1 grounds conductor 5526 to indicate that the tip party is calling and temporary ground on conductor 5226 is connected over contact 2 of relay TR2(61) to conductor 6106. Relay TR2(61) grounds this conductor directly when a marker is called in on a second trial.

The originating marker 7400 takes this information, uses the frame registration to obtain access to the district junctor to which the call has been extended, translates the office code to operate a route relay and, under the control of that route relay, selects a trunk leading to the wanted office and connects the district junctor thereto. It also derives certain information regarding the manner in which the call is to be terminated and transmits that information back to the sender.

This information includes the nature of the record to be made on the tape, namely whether the entire number is to be recorded or only the office code. In the former case, relay REC is operated over conductor 4831, in the latter case relay CD(48) is operated over conductor 4832. Either relay, when operated, locks to conductor 6109 when the marker signals for disconnection.

It also includes an indication of the class of the terminating office for guiding the manner in which the call is to be completed, which is indicated by the operation of one or more of the relays CL1 to CL5. With none of these relays operated, the call is to be directed to a panel office. Relay CL1 (Fig. 61) operated alone, indicates a call to a cross bar office. Relays CL2 (Fig. 61) and CL4 (Fig. 62), operated together, indicate a call to be extended by call indicator pulses, when operated with no other class relay they indicate a tandem call; with relay CL1 they indicate a direct call; with relay CL3 (Fig. 56) they indicate an official code and with relay CL5 (Fig. 54) they indicate that the designation is to be transmitted in two stages. Relays CL3 and CL4 are operated together for calls to an operator in response to permanent signal, official code, etc. Relay CL4 operated alone indicates a call to a restricted code rerouted to an operator. Relays CL1 to CL5 also lock over conductor 6109.

In addition the marker controls relays CR1 and CR2 to give four values of compensating resistance in the fundamental circuit during office test and selections and relays CR3 and CR4 to similarly vary the compensating resistance during later selections. Relay CR5 is operated whenever a particular type of incoming selector will be employed. Relays CR1 to CR5 lock over conductor 6107 which is not grounded until the marker is ready to release.

The outgoing connection may or may not include a tandem or two-wire selector. If no such selector is included, relay S0 (Fig. 57) is operated, while if such a selector is included, relays OB1 to OB5 and OG1 to OG5 are operated to determine the selections to be made by that selector. Relays OB1 to OB5 and OG1 to OG5 lock to conductor 6108.

For the operation of the marker, reference is made to the above-identified Carpenter patent as well as for the operation of the sender in the completion of a connection to a called line.

After the marker has finished decoding the office code and has performed certain other functions, it connects ground to conductor 4820, completing a circuit over contact 11 of relay AST, conductor 4821 to the winding of relay DC(51) and battery and also over contact of cross-point 4052, conductor 3944 of the sender link, contact of cross-point 3941 to conductor 7008, extending in the district junctor to the winding of relay F and battery. Relay F operates, extending its operating ground over contact 7 and conductor 7010 to the winding of relay LC(69) and battery.

Figure 70:
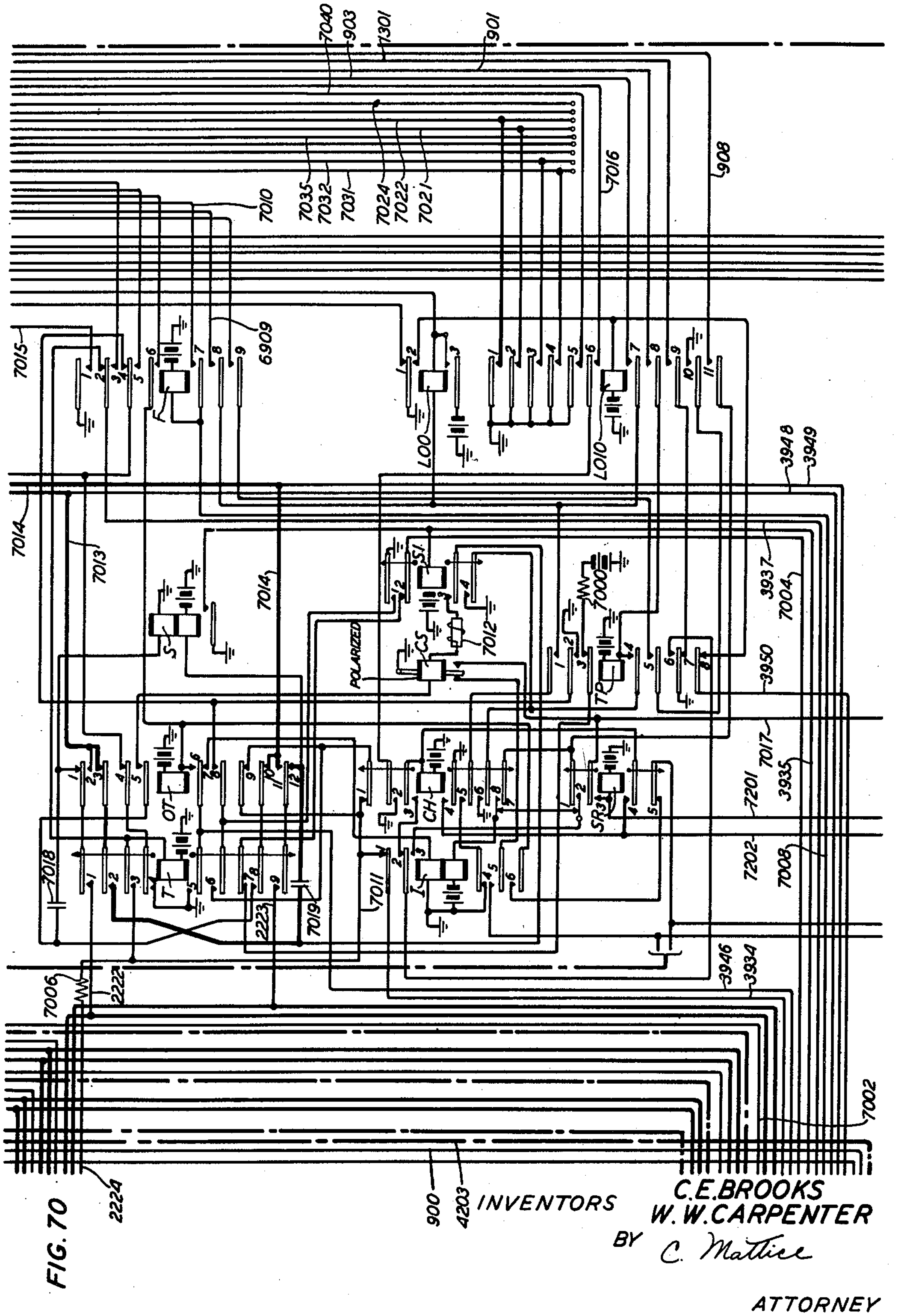
Figure 71:
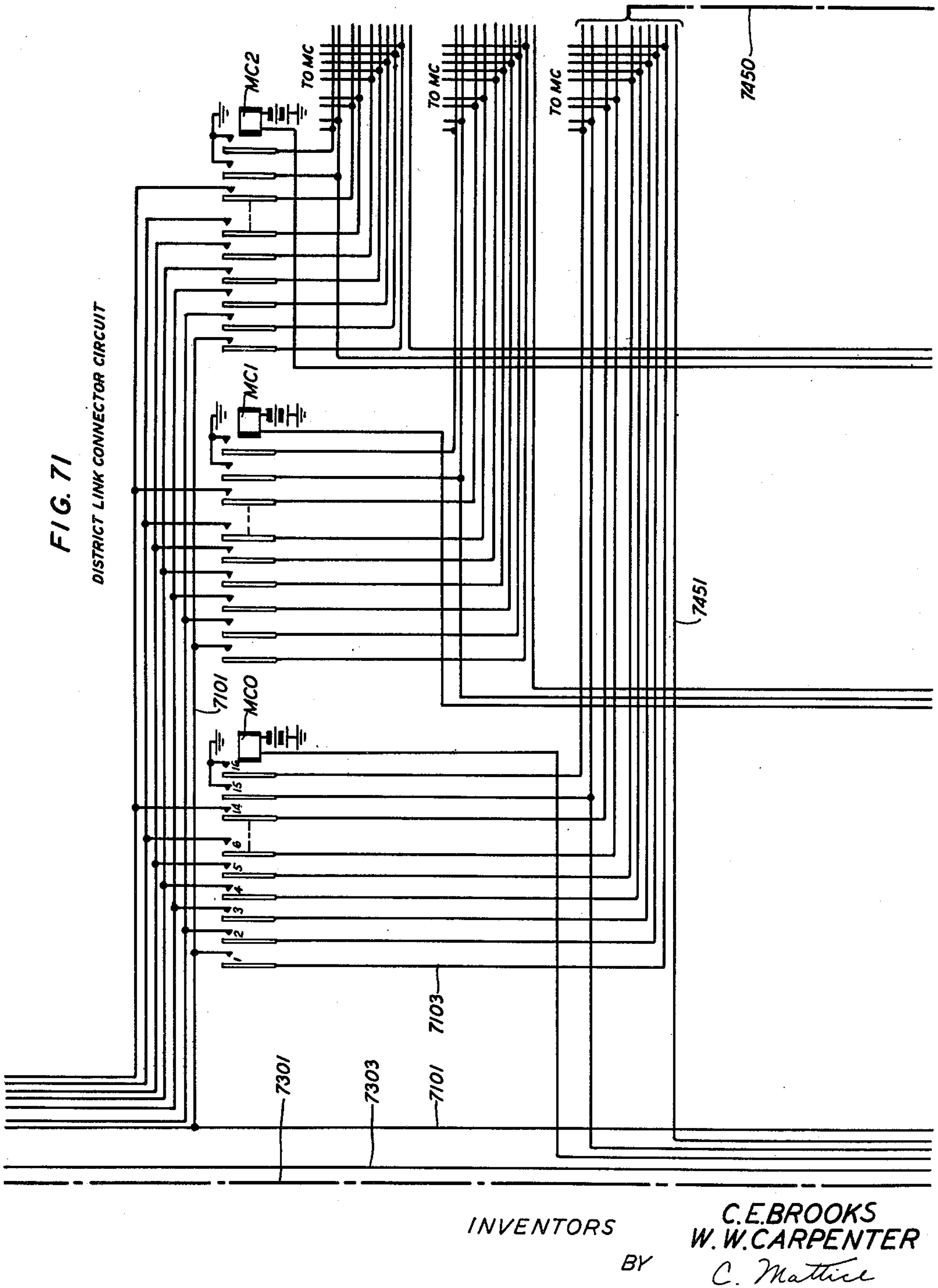

When the marker 7400 wishes to connect with the district junctor frame on which the junctor of Fig. 70 is located, it connects battery to the start conductor 7451 leading to the district link connector associated with this frame and thence to the winding of the marker preference relay MP0 and ground. Relay MP0 has the preferred position for operating and may operate even though some other marker preference relay has already operated, but becomes effective only when the subsequent relays in the chain release to connect ground over their normal contacts to contact 2 of relay MP0 and thereby complete the operating circuit for the corresponding multicontact relay MC0. Relay MC0 in operating locks over contacts 2 and 3 of relay MP0 to ground at its own contact 15. With relay MC0 operated, relay LC(69) extends its operating ground by way of conductor 7101, contact 1 of relay MC0 and conductor 7103 through cable 7450 to the marker which responds to the signal and then connects ground to conductor 7103 to hold relays LC(69), F and DC(51) operated. Relay LC(69) is common to the ten district junctors 0 to 9 and connects the marker to that group of junctors. Relay F which is individual to the district junctor completes certain control circuits between the marker and the junctor and also connects ground to conductor 7015 to operate the select magnet PDS0 which prepares the horizontal row of contacts individual to this junctor. The marker tests the district links by means of circuits extending over contacts of relays MC0 and LC(69) and, after selecting an idle channel connecting the district junctor with the outgoing trunk, employs one of these circuits to operate the associated hold magnet, for example, magnet PDH9, to extend the district junctor to the district link 6930 over which it is further extended to the selected trunk.

Having established this indirect connection with the sender, the marker signals for the release of the direct connection by way of the marker connector. For this purpose it connects ground to conductor 6111, operating relay DRL. Relay DRL closes a locking circuit for itself over its contact 2, contact 11 of relay DST, to ground at contact 5 of relay DRL. Ground over contact 5 of relay DRL is extended over contact 2 of relay DST to conductor 6109, over contact 8 of relay DST to conductor 6108, and over contact 10 of relay DST to conductor 6107, thereby locking in the registrations set up by the marker. At contact 3 relay DRL disconnects battery from the marker connector start conductor 6103, thereby releasing the marker connector and disconnecting the sender from the marker.

When the marker has completed its functions, it disconnects ground from 7103, releasing relay F in the district junctor and relay DC(51) in the sender.

When relay DST connected battery to conductor 6104, a circuit was completed for relay RC over the back contact of the No. 5 counting relay, conductor 6300 to ground at contact 1 of relay F02. Relay RC closes a circuit from battery on conductor 6104, winding of relay F03, contact 3 of relay RC to ground at contact 2 of relay F02. When relay DC(51) operated, it closed a circuit either for steering relay S3 or for steering relay S6, depending on whether the skip office relay S0 is normal or operated. Relay S3, if operated, locks through the winding of relay S3′ but relay S3′ cannot operate, being shunted by the operating circuit of relay S3. When relay DC(51) releases, relay S3′ operates and the sender proceeds to test the office selector, after which the office selections are made.

Figure 60:
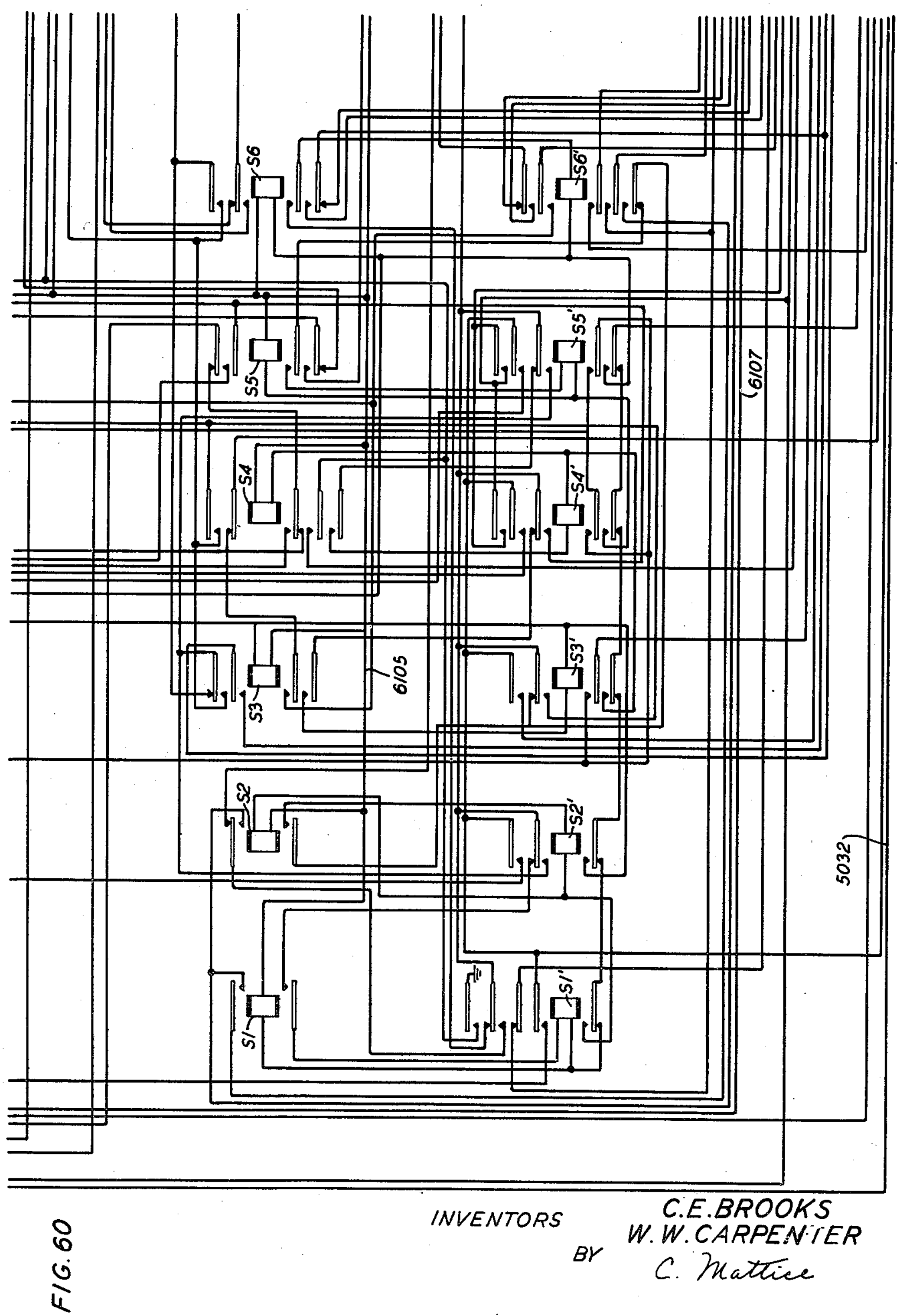
Figure 61:
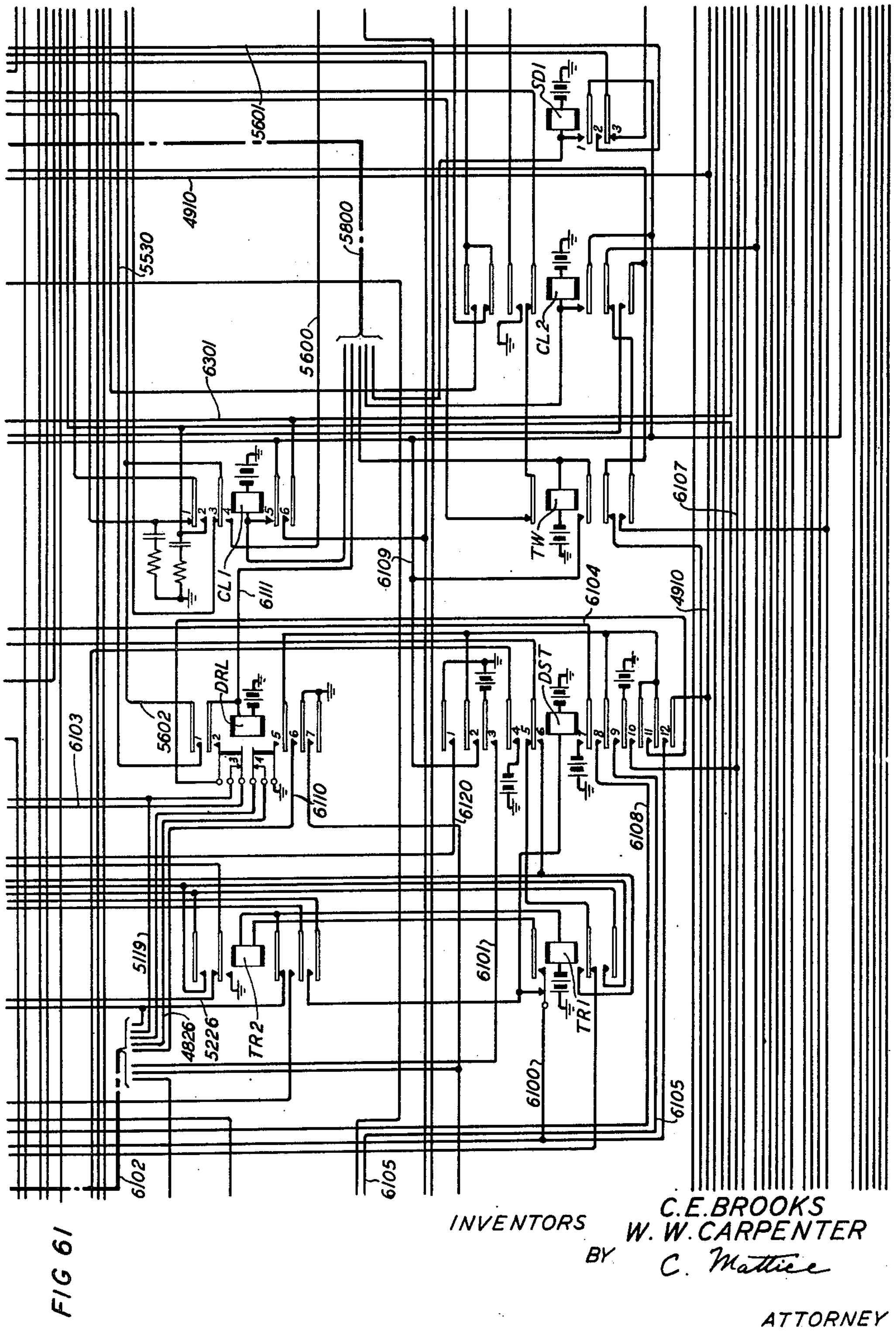
Figure 62:
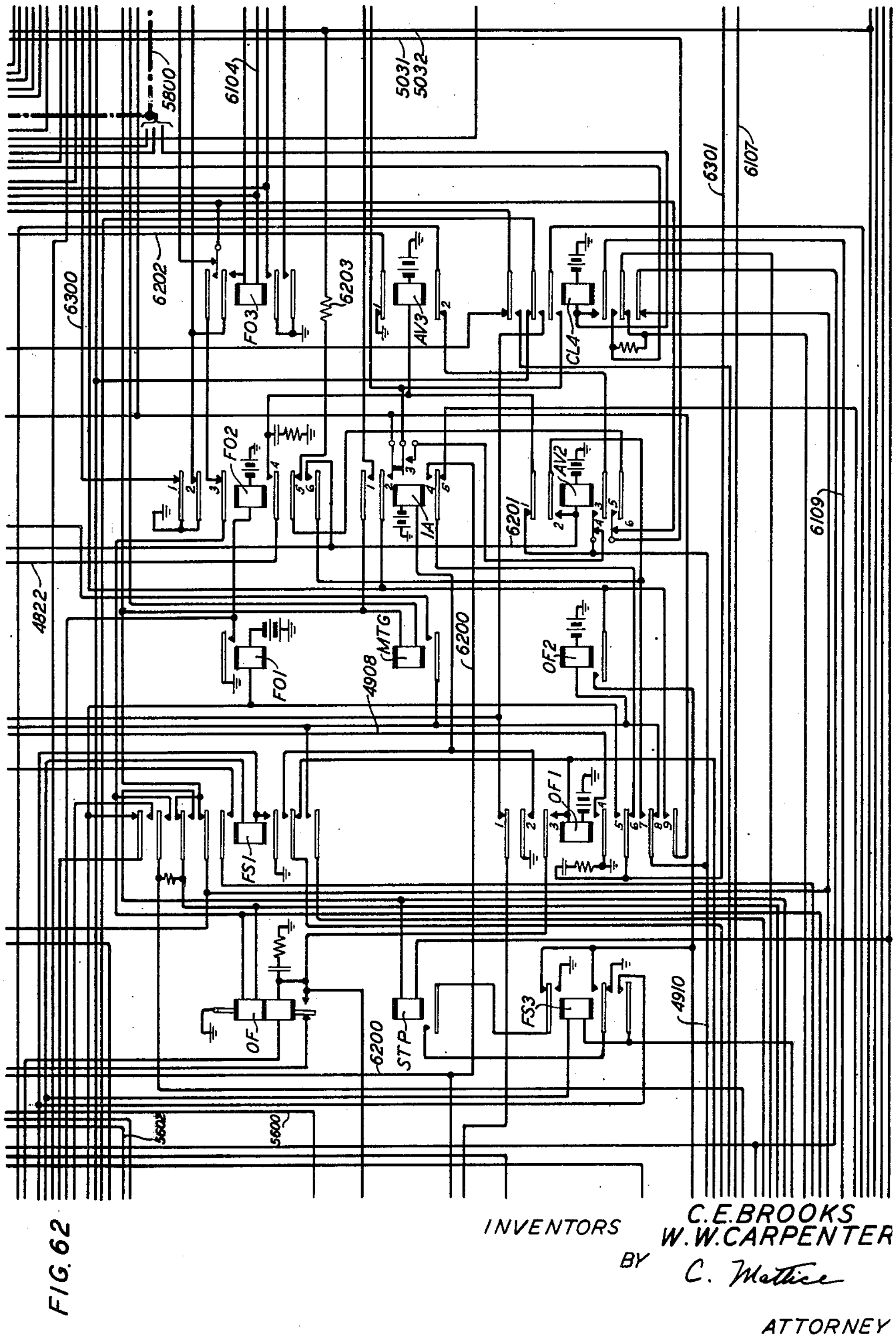

Calls to panel or cross bar offices are completed by means of revertive pulses from the called office which act on stepping relay STP and are counted by the counting relays of Fig. 63, the successive selections being controlled by contacts on the thousands, hundreds, tens and units verticals of the cross bar register, which are progressively made effectively by the steering relays of Fig. 60.

If the call is routed to an office equipped to receive call indicator pulses, pulses are generated by relays PG, PG1, PG2, and PG3, assisted by relays GR, PT, PR, 12 and 34. The codes to be transmitted are determined by the cross-points closed in the cross bar register which are made effective in order by the progress relays of Fig. 56.

For a complete description of the operation of the sender in controlling the completion of a connection, reference may be made to the Carpenter patent previously identified.

Before the sender can be released when handling a charge call from a two-party line, it must make a second party test and transfer the called line number to the called number register. To prepare for the party test a number of operations must take place. Assuming, for example, that the call is outgoing to another cross bar office and that the entire number is to be recorded for charging purposes, the marker operates relays SD and SD1 to indicate that no five-digit number may be expected, class of call relay CL1, charge relay REC, and, finally the marker release relay DRL. With these relays operated, a circuit is closed from battery through the windings of relay C(56) and C′ in series, conductor 5609, contact 4 of relay CL1, contact 1 of relay DRL, conductor 5530, to ground at contact 2 of relay ON1(55). In addition, when hold magnet U operates, to indicate that the units diget has been registered, that magnet closes a circuit from ground at its contact 3, conductor 5321, lower winding of relay UL1 to battery. Relay UL1 locks in a circuit from battery through its upper winding and contact 4, contact 5 of relay SS(54) to grounded conductor 4910. With relay UL1 operated a circuit is closed from battery through the windings of relays STB and STB′, contact 2 of relay SD, conductor 5601, contact of cross-point 5317, conductor 5322, contact 7 of relay UL1, conductor 5401, contact 4 of relay C, conductor 5602, contact 1 of relay DRL to ground over conductor 5530. The path for operating relays STB and STB′ varies with the type of call and other circuit operations which need not be considered here.

Relay STB′ closes a circuit from battery through the winding of relay STL, conductor 5121, contact 2 of relay RA(49), conductor 4922, contact 5 of relay STB′, to ground over conductor 5530.

Relay STL in operating opens the locking circuit for relay ON3 and that relay releases, disconnecting the tip and ring conductors from relay L and tone coil 5107 and connecting them together and to the winding of relay TP(55) as previously traced. If the tip party ground is still present, the relay TP(55) operates, closing a circuit from grounded conductor 5108, contact of relay TP(55), conductor 5502, contact 7 of relay STL, conductor 5123 to the winding of relay TP2 and battery. Relay TP2 locks over its contacts 3 and 6 to grounded conductor 4901. Relay ON3, released, closes a holding circuit for relay SR(51) and L1 over contact 11 of relay SR1, conductor 5122, contact 1 of relay ON3, conductor 4622, contact 5 of relay AV1 to grounded conductor 4910. Relay STL in operating disconnects ground from the lower winding of relay TPT but current continues to flow while condenser 5503 is charged to measure a time interval for the tip party test. When this flow ceases, relay TPT closes its contact.

When relay TPT closes its contact, it again operates relay ON3, but relay ON3 cannot lock, since relay STL has opened the locking circuit. Relay STL also opened the circuit for restoring relay TPT so that relays TPT and ON3 now remain operated and relay ON3 restores the tip and ring conductors to tone coil 5107 and relay L, at the same time opening the holding circuit for relays SR(51) and L1.

The party test takes place while the sender is controlling the completion of the call at the called office. When the sender has completed these operations, relays STP, OF(62), B0, F0 and IA are operated as described in the previously mentioned Carpenter patent. Relay IA closes a circuit from ground at the contact of relay F0, conductor 6301, contact 6 of relay OF1, contact 4 of relay IA, conductor 6200, contact 2 of relay ON3, contact 2 of relay TP1, contact 2 of relay TP2, conductor 5524, contact 3 of relay SR1, conductor 5124, contact 2 of relay CD(48), contact 3 of relay REC, contact 1 of relay ARL, winding of relay AST to battery. Relay AST initiates the transfer of the wanted number to the called number register of Figs. 75 to 78, by connecting battery over its contact 6 and contact 2 of relay ARL to the start conductor 4822 and directly to battery supply conductor 5119 leading to the marker and register connector of Fig. 74. At contact 3, relay AST closes a substitute holding circuit for hold magnet F of the frame vertical and thereby for the other hold magnets. At contact 12 it closes a supplementary locking circuit for relay ON1(55) under the control of relay ON4. At contact 11, relay AST disconnects relay DC from the district junctor.

At contact 5, relay AST closes a circuit from ground, connected to conductor 4825 as above traced for the operating circuit of relay AST, to conductor 4826 and the winding of relay AV1. Relay AV1 operates and locks over its contact 6 to grounded conductor 4910. When conductor 4910 was grounded, relay AV3 operated in a circuit from that ground over contact 1 of relay AV2, winding of relay AV3 and battery and remains operated throughout the operation of the sender. Relay AV1, in operating, closes a circuit from battery through the winding of relay AV2, conductor 6201, to ground at contact 4 of relay AV1. Relay AV2 opens the circuit of relay AV3 and that relay releases slowly to measure a time interval.

Relay AV1, when operated, closes a circuit from ground on conductor 4910, contact 8 of relay LR(51), conductor 5125, contact 9 of relay AV1, conductor 4808, contact 5 of relay DC(51), conductor 5126, contact of cross-point 4051, conductor 3936 of the sender link, contact of cross-point 3931, conductor 3937, contact 2 of relay F in the district junctor, winding of relay T(70) and battery. Relay T(70) operates in this circuit and locks over its contact 3 to conductor 7011 to which ground is connected from the sender at this time. At contacts 1 and 9, relay T(70) extends the tip and ring conductors 2222 and 2223 over contacts 1 and 12 of relay OT to ground and battery through the windings of relay S(70). If the substation switchhook contacts are still closed, relay S(70) operates, closing an obvious circuit for relay S1(70). Relay S1(70) connects ground over its contact 1, contact 6 of relay T(70) and contact 9 of relay OT to conductor 7011 holding relay T(70) operated as well as the hold magnets of the line link switches. With relay S1(70) and relay T(70) operated the outgoing tip conductor 7013 is connected over contact 3 of relay OT, contact 2 of relay T, contact 3 of relay S1(70), through coil 7012, winding of relay CS, contact 5 of relay OT, contact 8 of relay T(70), contact 10 of relay OT to ring conductor 7014. Conductors 2222 and 2223 are connected to conductors 7014, 7015, respectively, through condensers 7018 and 7019 to provide a talking circuit.

When relay AV2 operates, as above described, it connects resistance 6203 between conductors 5031 and 5032 which form part of the fundamental circuit over which control of the distant office was performed. Conductors 5031 and 5032 are connected over contacts of cross-point 4051, conductors 3938 and 3939 of the sender link, contacts of cross-point 3931, conductors 3948 and 3949, to conductors 7013 and 7014 leading toward the called office through cross-point 6931 of the primary district switch, so that the connection of resistance 6203 to conductors 5031 and 5032 provides a trunk closure for those offices requiring such a closure to complete the conversational connection.

Relay AV3 is slow to release to provide time for the functions of the district junctor, above described, to take place. Relay AV1, in operating, at contact 5 disconnects ground from the armature of relay L, permitting relays L, SR(51) and SR1 to release. At contact 2, relay AV1 opens the operating and holding circuit of hold magnet F, but this circuit is held closed at contact 1 of relay AST. When the record is completed in the called number register, ground is connected to conductor 4824, operating relay ARL, which opens the register start circuit and the operating circuit of relay AST, releasing relay AST, opening the holding circuit for relay ON2, and permitting the hold magnets to release in cascade. At contact 1, relay AST also opens the operating circuit of hold magnet AA.

When relay AV3 releases, it closes a circuit from ground over its contact 1, conductor 6202, contact 3 of relay AV1, conductor 4827 to the winding of relay AV4 and battery. Relay AV4 operates in this circuit, opening the locking circuit for relays ON1(55) and ON2 and disconnecting the tip and ring conductors from the winding of relay L. The release of relay ON2 opens the holding circuit for hold magnets PSH0A, PSH0B, SSH0A and SSH0B, releasing the sender link switches.

Relay ON1(55), releasing, opens the locking circuit for relay ON4 and, with relays ON1(55), ON2 and ON4 released, the sender is restored to normal.

In the case of calls for which no charge is to be made, provision is made for operating relay AV1 independent of relay AST. For example, for calls to an operator the marker operates relay CL4 which closes a circuit for relay AV1 which becomes effective as soon as trunk test is completed by the sender. Similarly, if the calling subscriber abandons the call before the connection is completed, relay LR is operated and controls the operation of relay AV1 independent of relay AST.

*Operation of district junctor*

Figure 72:
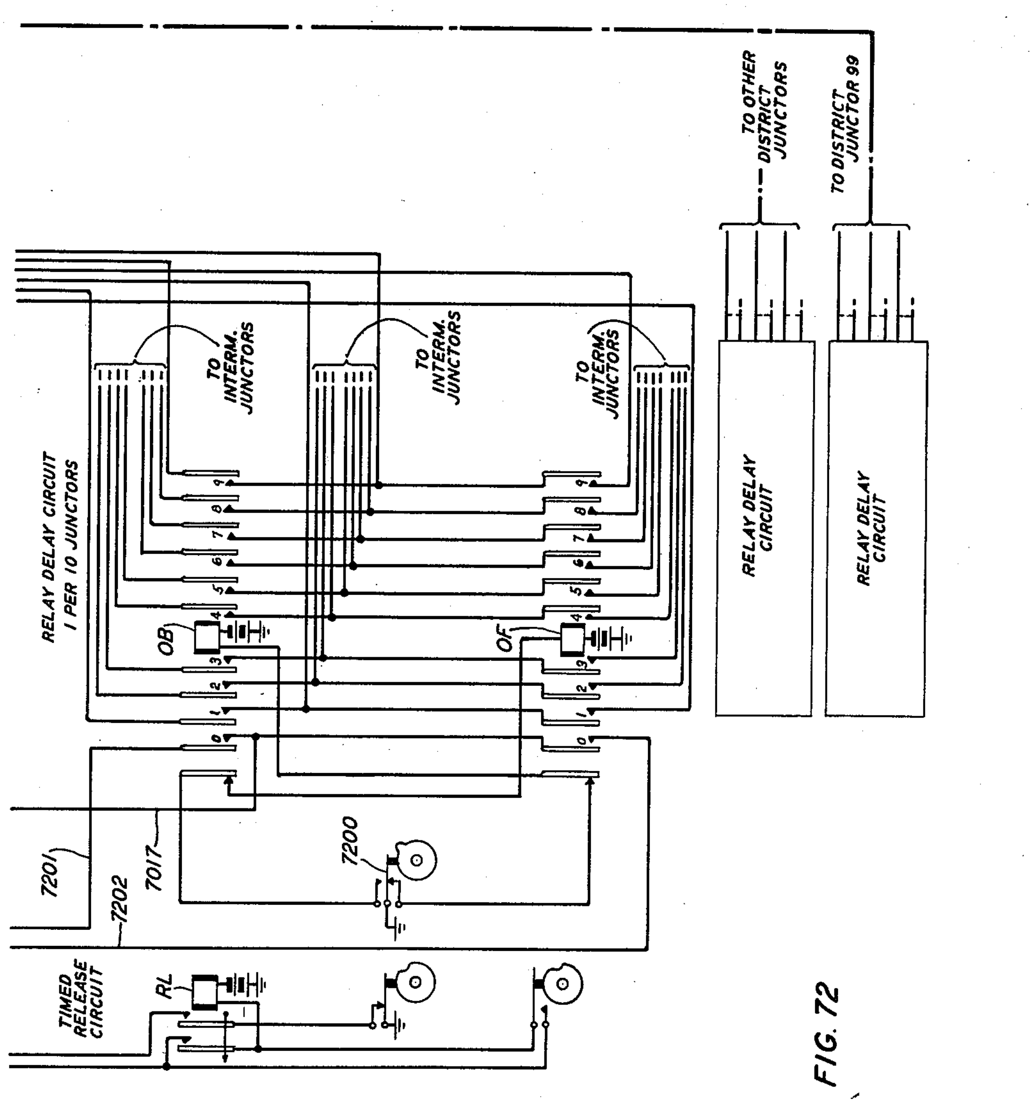

When the connection has been extended to the called line a circuit is completed at the incoming junctor of the called office over the office switches and the district secondary switch to the tip conductor of district link 6930, and the tip contact of cross-point 6931, tip conductor 7013, contact 3 of relay OT, contact 2 of relay T(70), contact 3 of relay S1(70), retard coil 7012, winding of supervisory relay CS, contact 5 of relay OT, contact 8 of relay T(70), contact 10 of relay OT to ring conductor 7014, ring contact of cross-point 6931, ring conductor of link 6930 and back to the incoming junctor at the called office. Relay CS is polarized and the current flow in its circuit at this time is in the direction to hold its left contact closed which is ineffective. When the called subscriber answers, the direction of current flow in this circuit is reversed and relay CS closes its right contact, connecting ground to conductor 7017 leading to the delay circuit of Fig. 72 which is common to a group of ten junctors. Interrupter 7200 is constantly operating, alternately closing its upper contact to operate relay OF(72) over a back contact of relay OB and closing its lower contact to operate relay OB over a back contact of relay OF(72). At the first operation of relay OB following the grounding of conductor 7017 by the operation of relay CS, a circuit is completed from ground on conductor 7017, contact of relay OB, conductor 7201, winding of relay SR(70) and battery. Relay SR(70) operates and locks over contact 3 to ground on conductor 7017. With relay SR(70) operated, the next operation of relay OF(72) closes a circuit from ground on conductor 7017, contact of relay OF(72), conductor 7202, contact 4 of relay SR(70), winding of relay CH and battery. Relay CH operates and locks over its contact 3, contact 2 of relay I, to ground at contact 6 of relay TP(70) and also locks over contact 4 of relay SR(70) to ground at contact 4 of relay CH.

With relay CH operated, if the recorder is free, relay L00 is operated from battery at contact 7 of relay ON(13) in the recorder over a chain circuit including normal contacts on the L0 relays of the other district junctors served by the same recorder to the winding relay L00, contact 1 of relay TP(70), contact 5 of relay CH, contact 4 of relay I to ground. Relay L00 closes an obvious circuit for relay L010. A circuit is now closed from ground at contact 2 of relay CH, and contact 6 of relay L010 to conductor 7016 to tell the recorder the type of record to be made. The district junctor number is recorded on the tape along with the time at which the subscriber answered. When the record has been made, the recorder connects ground to conductor 908, completing a circuit over contact 11 of relay L010, contact 8 of relay CH to the lower winding of relay I, operating relay I which opens the circuit of relay L00, disconnecting the tape recorder from the district junctor. Relay I locks in a circuit from battery, through its lower winding, contact 8 of relay CH, contact 2 of relay SR(70), contact 3 of relay I to ground at contact 6 of relay TP(70). Relay I also opens one holding circuit of relay CH, but that relay remains operated under the control of relays SR(70) and CS.

When the call is terminated, the current through relay CS is again reversed and that relay recloses its left contact. The opening of the right contact of relay CS opens the locking circuit of relay SR(70) and that relay releases after an interval, due to its slow to release characteristic. When relay SR(70) releases, it opens the locking circuits of relays CH and I, but relay I releases before relay CH which is slow to release, and recloses its holding circuit for relay CH. With relay I released and relay CH operated, the operating circuit for relay L00 is reclosed and the district junctor is connected with the tape recorder to record the time of disconnect. As before, the completion of the record causes the operation of relay I and, since relay SR(70) has been released, relay CH also releases. Relay TP(70) is held operated under the control of relay S(70) which is operated over the calling line. Therefore, if the called subscriber should again remove his receiver and later restore it, records of these times would be made.

If the calling subscriber restores his receiver first, relay TP(70) is held under the control of relay CH. The release of relay S(70) in turn releases relays S1(70) and T(70) and the line link switches. The district and office switches are held by ground supplied at contact 2 of relay TP(70). When, now, the called subscriber releases, the record is made as above-described, but when relay CH releases, relay TP(70) also releases, thereby restoring the district and office switches.

*Operation of the recorder*

The operation of the recorder in connection with a call, as indicated in the general description, takes place in four stages. The calling line number is recorded from information set up in the line link control circuit during the brief interval that the line link control circuit and sender link control circuit are associated. The called line number is obtained from the called number register to which it is transferred prior to the release of the sender and the time of answer and the time of release are obtained from the district junctor itself.

The line link control circuit sets up an identification of the calling line for call charging purposes as follows: It may be remembered that, as was stated previously, a line may be identified by identifying the frame on which it is located, the horizontal level and the vertical row in which the line switch serving the line appears on the frame and the set of terminals in the line switch which are individual to the calling line.

The horizontal group relays HG0 to HG9 ground two conductors of the group of conductors 2341 to 2345, in accordance with a predetermined code as follows:

| Digit | Conductors |
|---|---|
| 0 | 2341 and 2342 |
| 1 | 2341 and 2344 |
| 2 | 2342 and 2344 |
| 3 | 2344 and 2345 |
| 4 | 2342 and 2345 |
| 5 | 2343 and 2344 |
| 6 | 2341 and 2343 |
| 7 | 2342 and 2343 |
| 8 | 2343 and 2345 |
| 9 | 2341 and 2345 |

In accordance with this code, relay HG0 grounds conductors 2341 and 2342 to identify horizontal level 0. Relay HG1 grounds conductors 2341 and 2344 to identify horizontal level 1; relay HG8 grounds conductors 2343 and 2345 to identify horizontal level 8, and the other horizontal group relays similarly identify the corresponding horizontal levels.

For convenience, the line frame number and vertical row number have been combined, each vertical row being given a three-digit number, of which the first two digits represent the frame number and the last digit represents the number of the vertical row on the frame. When the vertical row in the calling frame was identified by the operation of relay V0 in the group of relays V0 to V6, thereby operating relays LR0 and HM0, a parallel circuit was closed which may be traced as for relays LR0 and HM0 to conductor 2812 and thence to the winding of relay VC0 and battery. Each of the relays V1 to V6, when operated, close circuits for similar relays, relay V6 for example, operating relay VC6. The vertical row relays VC0, VC6, etc. connect ground to two conductors in each of three sets of five conductors in accordance with the above code.

Since it has been assumed that the vertical row identified by relay VC0 is the zero vertical on frame 00, its number may be regarded as 000 and relay VC0 connects ground to conductors 2411 and 2412, 2421 and 2422, 2431 and 2432, which may be traced through cables 2416, 2426 and 2436 to contacts of relays DG00, DG01, etc.

Relay VC6, which identifies vertical row 6 on this same frame, grounds conductors 2411 and 2412, 2421 and 2422, as does relay VC0 to identify frame 00, but grounds conductors 2431 and 2433 to identify vertical row 6. It may be noted that one of the relays VC0 to VC6 is operated whenever one of the relays V0 to V6 is operated, independent of the horizontal group selected by the operation of one of the relays HG0 to HG9.

Relays LT0 to LT9 which selects the individual line to be served, also mark two out of five conductors, according to the code given, to transmit the identity of the position of the calling line to the recorder. With relay LT0 operated as above described, ground is connected over contacts 2 and 4 of relay LT0 to conductors 3221 and 3222 of the group of conductors 3221 to 3225, to identify the calling line as line 0 in the switch which has been identified by relays VC0 and HG0. For other relays of the chain LT0 to LT9, ground is supplied over contacts 1 and 3 of relay LT0 and any other intermediate unoperated relays of the chain and over contacts 2 and 4 of the operated relay to the corresponding conductors of the group 3221 to 3225. Conductors 3221 to 3225 are extended over contacts of relay HC0 to conductors 2821 to 2825, through cable 2826, to contacts of relays DG00 to DG04.

When relay DF0 was operated to indicate that the associated line link control circuit and sender link control circuits were to be connected together, it connected ground to conductor 3050, operating district group connector relay DG00. Similarly, relays DF02 and DF04, if operated, would ground conductors 3052 or 3054, operating relay DG02 or relay DG04. Each line link frame has five such relays DG00 to DG04, for connecting the identifying conductors to the recorders associated with the five district junctor frames to which the line link frame has access. Relay DG00 serves to connect the line identifying circuits to the recorder associated with district frame 0.

With relay DG00 operated, conductors 2341 to 2345 grounded by relay HG0 are connected to conductors 2351 to 2355 which extend through cable 2356 to the recorder associated with district frame 0.

Relay DG00 also extends conductors 2411, 2412, 2421, 2422, 2431 and 2432, grounded by relay VC0 to conductors 2311 and 2312, 2321 and 2322, 2331 and 2332 which extend through cables 2316, 2326 and 2336 to the recorder. In addition relay DG0 extends conductors 2821 and 2822 grounded by relay LT0 to conductors 2361 and 2362 and through cable 2366 to the recorder. Similarly each of the relays DG01 to DG04 when operated connects the various identifying conductors to the recorder associated with the corresponding district junctor frame.

Therefore while relays D0, DA0 and DF0 are operated to connect the line link control circuit with the sender link control circuit, circuits are prepared for transmitting the line identity to the recorder associated with the selected district junctor frame.

When relay BA operated following the selection of the subgroup of district junctors, it closed a circuit from ground to a conductor 4509 through cable 4203, to the first recorder where it extends over contact 1 of relay CR, through the winding of relay L0, contact 2 of relay L051 to battery at contact 7 of relay ON(13). Relay L0 locks to battery at its contact 4, at contact 3 opens the operating circuit for relay L00, in the district junctor, Fig. 70, and for any similar relays associated with the fifty district junctors served by this recorder. With relay L00 and all similar relays unoperated, a circuit is closed from ground at contact 1 of relay L00 and over the corresponding contacts on the similar lockout relays at all of the district junctors of the group, to conductor 6600, contact 2 of relay L0, winding of relay AC(9) to battery. At contact 10, relay AC(9) opens the release circuit of the line link control circuit to prevent its release before the calling line number has been recorded.

Relay AC(9) prepares the recorder to record the calling line number as derived from the line link control circuit. Accordingly relay AC(9) closes a circuit from battery through the windings of relays TR1(13) and TRA in series, contact 1 of relay ON(13) to ground at contact 2 of relay AC(9). Relay TRA closes a locking circuit for itself and relay TR1(13) over contact 2 of relay TRA to ground at contact 2 of relay AC(9), independent of relay ON(13). At contacts 2 and 3, relay TRA closes a circuit from its locking ground through the winding of relay TRB, contact 6 of relay CC1, contact 5 of relay CC, winding of relay TR2(13) to battery. Relay TRB also locks to ground over contact 2 of relay AC(9). Relay TR1(13) closes a circuit from battery through the winding of relay ON(13), to ground at contact 1 of relay TR1(13). Relay ON(13) also locks over its contact 2 to ground at contact 2 of relay AC(9). In addition relay TR1(13) closes a circuit from ground at contact 4 of relay LK, contact 5 of relay TR1(13), contact 5 of relay AC(9), to battery through the winding of relay A1(8). Relay A1(8) closes holding circuits for itself over its contacts 4, 5, 6 and 7 and conductors 1112, 1113, 1114 and 1115 to the back contacts of relays CK2, CK3, CK4 and CK5, respectively, of the tape perforator. Relay AC(9), at contact 4, also closes an obvious circuit for relay V which connects the conductors, grounded to identify the horizontal level and the position of the individual line, to relays VT0 to VT4 and VU0 to VU4. Since conductors 2351, 2352, 2361 and 2362 were grounded, relays VT0, VT1, VU0 and VU1 are operated and lock to ground at contact 6 of relay ON(13).

Relay A1(8) closes the circuits for operating the perforator magnets to record the numbers of the frame and of the vertical in which the switch serving the calling line is located, as well as the party calling if the line is a party line. As previously described, relay VC0, operated when the vertical position of the calling switch was identified, grounded conductors 2411 and 2412, 2421 and 2422, 2431 and 2432 to identify the vertical position of the switch as 000 indicating the 0 vertical of frame 00. When the district frame was selected, relay DF0 operated, operating relay DG00 to extend these frame and vertical identifying conductors to conductors 2311, 2312, 2321, 2322, 2331 and 2332 leading to the recorder.

In the sender, the operation of relay CS3 indicated that the calling line was a party line and a test was made to determine which party was calling, relay TP1 being operated to indicate that the call was originated by the tip party. With relay TP1 operated ground is connected to conductors 5526 and 5042 which are carried through cable 5045 over contacts of relay C0(46) and cables 4694, 4730 and 7301 to contacts of relay A1(8). It may be noted that, with relay TP1 unoperated, ground is connected to conductors 5043 and 5044 to indicate a calling ring party or an individual line. Four conductors are provided between the sender and the recorder which may be grounded in a code of two out of four to permit discriminating between four or more parties if that should become desirable.

With relay A1(8) operated, the ground connected to conductors 5526 and 5042 is extended to battery through the windings of magnets 4 and 5 in the group 4 to 7 operating those magnets; ground on conductors 2311 and 2312 operates magnets 8 and 9 in the group 8 to 12; ground on conductors 2321 and 2322 operates magnets 13 and 14 in the group 13 to 17 and ground on conductors 2331 and 2332 operates magnets 18 and 19 in the group 18 to 22. These magnets in operating perforate the tape to make a tape record of the vertical number and of the party number.

It may be noted that the party indication is recorded in a "two out of four" code, while the vertical number is recorded in a "two out of five" code.

When relay A1(8) operates, it closes a circuit from ground over its contact 3, conductor 800, upper winding of relay CD(13) to battery. Relay A1(8) also closes a circuit from ground over contact 2, conductor 801 to the winding of the stepper magnet 1100 of the tape recorder. Relay CD(13) connects ground over its upper contact to conductor 801 to hold magnet 1100 operated in preparation for advancing the tape on its release. Relay CD(13) also completes a circuit for relay LK extending from ground at the contact of the stepper magnet 1100, conductor 1101, contact 7 of relay LK, lower contact of relay CD(13) to battery through the winding of relay LK. Relay LK operates and locks over its contact 6 to ground on conductor 1101, independent of relay CD(13). At contact 5 relay LK closes an obvious circuit for relay LK2 which operates and locks to ground at contact 6 of relay ON(13). At its upper contact, relay LK2 closes a link in the release circuit of the line link control circuit permitting that control circuit to release under the control of the sender link control circuit as above described.

With relay LK operated, ground on conductor 800 is extended over contact 1 of relay LK to contact 3 and the winding of relay TR1(13), holding relay TR1(13) operated but shunting the winding of relay TRA, causing that relay to release and open the operating circuit for relay A1(8).

It will be noted that each punch magnet 1 to 22 is provided with a set of make contacts, the armatures of which are grounded, while the stationary contacts are connected to individual resistors which in turn are connected in parallel in groups, each group connected through the windings of a relay CK and a relay T to battery at a contact of a cut-in relay. More specifically punch magnets 4 and 5, when operated as above described, close a circuit from ground at their contacts, through their individual resistors, through the windings of relay CK2 and T2, over conductor 802 to battery at contact 1 of relay A1(8). Magnets 8 and 9 close a similar circuit through relays CK3 and T3; magnets 13 and 14 close a similar circuit through relays CK4 and T4, while magnets 18 and 19 close the circuit for relays CK5 and T5. Relays CK2 to CK5 and T2 to T5 are marginal relays, relays CK2 and CK5 being adjusted to operate with at least two resistors connected in parallel to their circuit, while relays T2 to T5 operate if more than two resistances are connected in parallel to their circuit. Relay CK1(11) operates in series with a single resistor while relay T1(11) operates if two or more resistors are connected in parallel. Therefore, if less than the proper number of magnets is operated in any group, the corresponding CK relay does not operate, while if more than the proper number is operated, the T relay operates. In either case the associated locking circuit for the cut-in relay fails to open and the recorder is held.

When relay ON(13) operated, it closed a circuit from ground at its contact 5, contact 2 of relay LK to battery through the winding of relay SR(13). When relay LK operates, it opens the circuit of relay SR(13) and that relay starts to release. Relay SR(13) being slow to release, relay LK is normally released to reclose the circuit of relay SR(13) before the latter relay can close its contact. However, if the recorder does not advance properly, relay SR(13) on releasing completes a circuit from ground over contact 5 of relay ON(13), contact 3 of relay LK, back contact of relay SR(13) to the alarm circuit 1300, causing an alarm to sound.

Assuming that relays CK2, CK3, CK4 and CK5 operate in response to punching the record above described, the locking circuits of relay A1(8) are opened and that relay releases, disconnecting ground from conductor 800 and permitting relay TR1(13) to release.

Relay A1(8) in releasing breaks the connections between the registering leads and the punch magnets, causing the latter to release. The lower winding of relay CD(13) is connected to conductor 802 so that, as long as any punch magnet remains operated, relay CD(13) remains operated in series with the associated T and CK relay to ground at the closed magnet contact. Relay CD(13) at its upper contact connects ground to conductor 801 to hold the stepper magnet 1100 operated until all of the punch magnets have released. When the last punch magnet releases, relay CD(13) releases, in turn releasing the stepper magnet 1100, which now advances the tape roll one space, bringing fresh paper under the punch pins. The release of magnet 1100 removes ground from conductor 1101, which, with relay CD(13) released permits relay LK to release. With relay LK released, a circuit is closed from ground at contact 4 of relay LK, contact 6 of relay TR1(13), contact 2 of relay TR2, contact 6 of relay AC(9), winding of cut-in relay A2(8) to battery. Relay A2(8) locks over its contacts 5 to 9, conductors 1111 to 1115 and the back contacts of relays CK1, CK2, CK3, CK4 and CK5, and establishes the circuits for recording the number identifying the horizontal position of the switch serving the calling line, the position of the line in the switch, and the tens and units digits of the number identifying the district junctor being employed in extending the call.

The horizontal level and line identifications have been set up on the register relays VT0 to VT4 and VU0 to VU4. The district junctor identification is derived directly from the junctor in the following manner. When relay AC(9) operated, it connected ground over its contact 3 to conductor 900. With primary hold magnets PSH0A and PSH0B operated this ground is extended over conductor 3950, contact 8 of relay TP(70) to the winding of relay L010 and battery. Relay L010 being individual to the zero district junctor, serves to identify that junctor to the recorder. To that end, at contacts 1 and 2, it connects ground to the two conductors 7021 and 7022 of the group of four conductors 7021 to 7024 indicating in the two out of four code that the tens digit is zero. A two out of four code may be used for the tens digit since the recorder serves only fifty district junctors. Similarly relay L010 at contacts 3 and 4 connects ground to the two conductors 7031 and 7032 of the group 7031 to 7035 to indicate in the two out of five code that the units digit is also zero.

From the foregoing it is apparent that, with relay A2(8) operated, punch magnets 4, 5, 8, 9, 13, 14, 18 and 19 are operated from the line and junctor registrations. In addition, relay A2(8) at its contact 2 connects ground to conductor 803, closing a circuit for punch magnet 1 as an indication that this is the first record in connection with a particular call. This number may be said to identify the class of entry. Relay A2(8) at contacts 3 and 4 grounds conductors 800 and 801, operating the stepper magnet 1100 and relay CD(13). As before, relay CD(13) operates relay LK which locks. Relay LK connects ground from conductor 800 over contact 1 of relay LK, contact 2 of relay TR1(13), contact 5 of relay TR2(13), to the operating circuit of relay TR2(13) in shunt of the winding of relay TRB, causing relay TRB to release and holding relay TR2 operated. Relay LK again reopens the circuit of relay SR(13).

The punch magnets operate relays CK1 to CK5 in the manner above described and when all of these relays have operated, the locking circuits of relay A2(8) are opened and that relay releases, opening the circuits of the punch magnets which also release. When all of the punch magnets have released, relay CD(13) releases, in turn releasing the stepper magnet 1100 which opens the circuit of relay LK. Relay LK releases and opens the holding circuit for relay TR2(13) which also releases.

A circuit is now closed from ground at contact 4 of relay LK, contact 6 of relay TR1(13), contact 1 of relay TR2(13), contact 5 of relay TR3, contact 3 of relay ON(13), contact 9 of relay AC(9), conductor 901, through cable 902, to the associated district junctor, over contact 8 of relay L010, winding of relay TP(70) to battery. Relay TP(70) operates and locks over its contact 4 to ground at contact 4 of relay S1(70). The operation of relay TP(70) records the fact that the district junctor identity has been recorded. At its contact 8 it opens the circuit of relay L010 causing that relay to release and disconnect ground from the junctor identifying leads.

When relay TR2(13) released, a circuit was closed from ground at contact 8 of relay AC(9), contact 4 of relay TR1(13), contact 4 of relay TR2(13), contact 4 of relay ON(13), winding of relay CR to battery. Relay CR operates, breaks the circuit of relay L0 and locks to ground supplied to conductor 4509 by relay BA to prevent the reseizure of the recorder until it has restored to normal. Relay L0, in releasing, opens the circuit of relay AC(9). However, relay AC(9) is held in a locking circuit over its contact 1, contact 2 of relay TRB, conductor 1301 through cable 902, contact 9 of relay L010, to contact 7 of relay TP(70) until the latter relay operates, thus insuring the operation of relay TP(70) in the district junctor before the recorder can return to normal. Relay AC(9) when released opens the locking circuit of relay ON(13) and the operating circuit of relay L010. With relay L010 operated, ground is connected over contact 5 of relay L010 to conductor 7040 through cable 902, to the locking circuit of relay ON(13), so that relay ON(13) is held operated until relay L010 also releases. The release of relay ON(13) releases all relays locked thereto, thereby restoring the recorder to normal.

*Called line number entry*

Because the sender register is arranged to transmit the office designation of a called number to the marker in accordance with a special code, and also to save holding time for the sender, a called number register is provided which receives the number from the sender and transmits it to the tape recorder after the sender has been dismissed.

When relay AST connected battery to conductor 4822, relay SS1 operates if the channel is idle as in the case of calling in the marker. Relay AST also connects battery to conductor 5119 so that, when relay SS1 operates, multicontact relay SF1 operates as before, in turn operating relay SA1. However, relay AST grounds conductor 4823 which completes a circuit over contact of relay SF1, to the back contact of relay CB7, individual to the first called number register and thence to the winding of relay RS1 and battery. Relay RS1 operates relay RF1 which closes a plurality of circuits connecting the sender with the called number register. Relay RF1 also connects ground to the winding of relay CB7 to mark this register busy in all of the channels, and connects ground to conductor 7600 to operate the start relay ST of the register.

The operation of the multicontact relays SF1, SA1 and RF1 connect the verticals of the crossbar register of the sender to the relay registers of the called number register. In response to dialing the wanted number, cross-points 5214, 5215, 5216, 5317, 5318, 5319 and 5320 have been closed. In addition relay REC was operated to indicate that the complete number was to be recorded and relay F00 was operated and cross-point 5203 closed to identify the frame on which the district junctor is located. Relay REC connects ground, supplied over conductor 5225 from the called number register, to conductor 4833 which is extended through the marker and register connector of Fig. 74 to the register. If relay CD(48) had been operated, conductor 4833 would have been grounded at contact 1 of relay CD(48). The same circuits grounded by the frame and code digit cross-points which transmitted the information to the marker are now extended to the called number register, the conductors grounded by the assumed setting being none of the frame conductors, A digit conductor 5242, B digit conductor 5253 and C digit conductors 5261 and 5262.

As in the case of the marker, certain relays in the code registers are operated directly from the ground on contacts of the cross-points while the other relays are operated from ground supplied over back contacts of a check relay, namely relay CK3, conductors 7525, 7526 and 7527 through cables 7528 and 7500, contacts of relays RF1 and SF1 to conductors 5225, 5226 and 5227. In addition relay CD0 is operated from ground on conductor 5225 over contact 1 of relay REC, conductor 4833 through the connector to conductor 7402, the winding of relay CD0 and battery. If relay CD(48) had been operated, conductor 4833 would have been grounded directly at contact 1 of that relay. When all of the register relays have operated, as well as relay CD0, a circuit is closed for relay CK1 over contacts of the frame register relays, conductor 7506, contacts of relays A1 to A4, conductor 7232, contact 1 of relay CD0 to ground, supplied to conductor 7507 from the connector. Relay CK1 locks under the control of relay CK3 to ground on conductor 7507. A similar circuit is closed for relay CK2 over the contacts of the relays of the B and C registers which are arranged in the same manner as the A register shown in detail. Relay CK2 also locks under the control of relay CK3. With relays CK1 and CK2 operated, an obvious circuit is completed for relay CK3 which operates and locks to conductor 7507. Relay CK3 releases relays CK1 and CK2 and removes ground from conductors 7525 to 7527, permitting the register relays operated thereover to release, leaving the code digits of the called number registered. When relays CK1 and CK2 have released, a circuit is closed from ground over contact 3 of relay CK3, contact 3 of relay CK2, contact 3 of relay CK1, to the winding of relay RR and battery. Relay RR closes a circuit for bringing about the connection of the called number register with the proper tape recorder.

In order to prepare the circuits for transmitting the numerical designation to the recorder, when relay AST operated, it also closed a circuit from battery through the windings of relays NT1 and NT2 over conductor 5040 and a circuit through the windings of relays NT3 and NT4 over conductor 5041, contacts 9 and 10 of relay AST, in parallel to conductor 4830, contact 1 of hold magnet U of the units vertical, contact 2 of hold magnet T to ground over conductor 5217.

Figure 73:
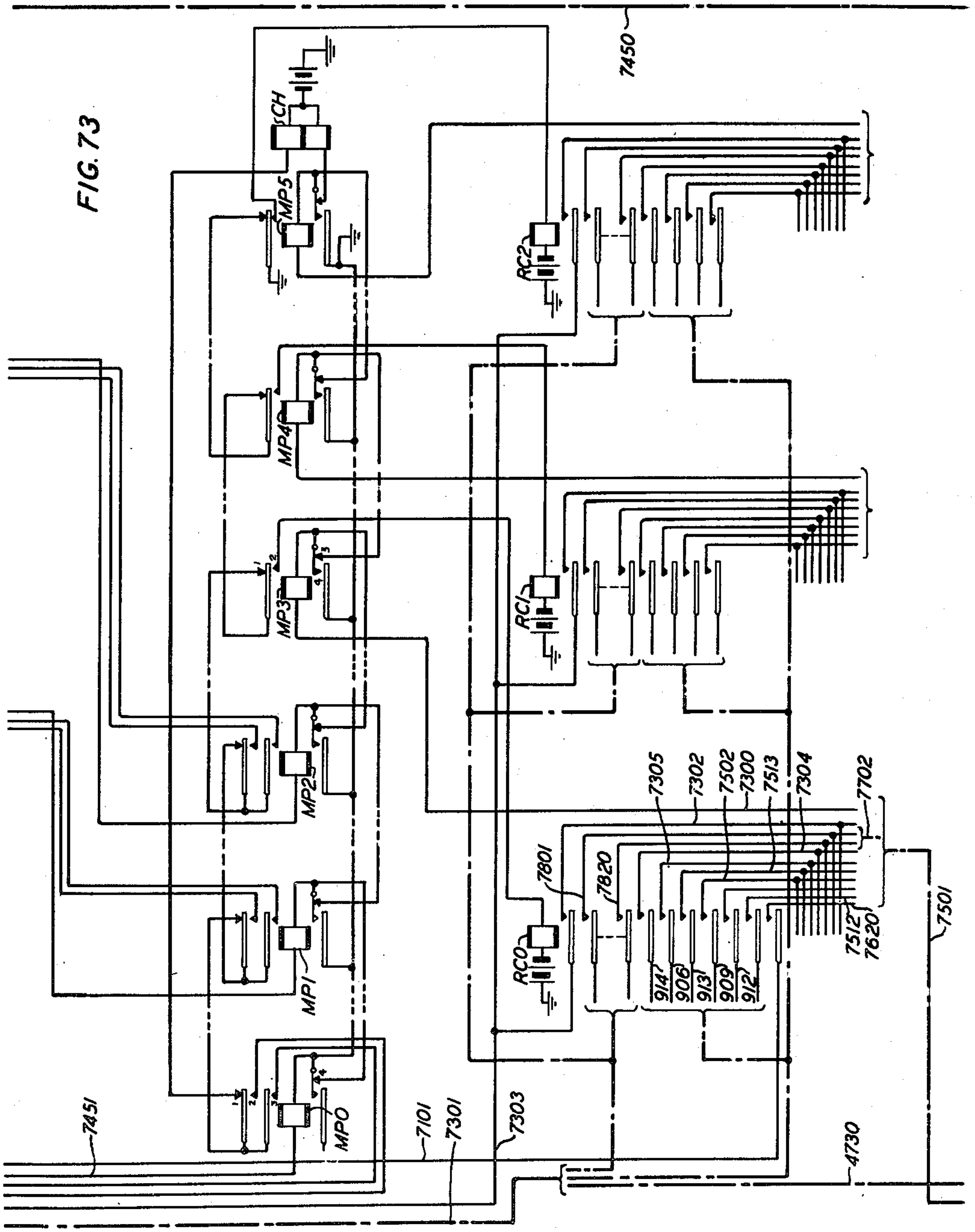

The circuits used for transmitting the numerical designation conform to the two out of five code mentioned in connection with recording the calling line number, so that cross-point 5317 closes one circuit from ground over contact 9 of relay NT1, contact of cross-point 5317, contact 4 of relay NT2 to conductor 5053 and a second circuit from ground over contact 10 of relay NT3, contact of cross-point 5317, contact 2 of relay NT2 to conductor 5054. Conductors 5053 and 5054 are extended through the marker and register connector to relays TH3 and TH4 of the thousands register. Similar circuits are closed by the other sender numerical registers for setting the corresponding registers of the called number register. When relay RR operated it closed a circuit which may be traced from battery, contact 5 of relay RR, through the frame register to conductor 7300 leading through cable 7501 to the district frame connector of Fig. 73 associated with the frame identified by the setting of the frame register, through the winding of preference relay MP3, normal contacts of relays MP2, MP1, MP0 and any other intermediate preference relays to ground. Relay MP3 operates, locks to ground over its contact 4, and closes a circuit for multiconnect relay RC0, contact 2 of relay MP3, normal contacts of relays MP4 and MP5 to ground. Relay RC0 now connects the called number register to circuits leading to the two tape recorders associated with this district frame.

When relay RR operates, it also operates relay CND2 which opens certain conductor checking circuits and connects ground to the code registers by means of which to ground the conductors leading to the tape recorder. Each register grounds two out of five conductors in accordance with the digit registered thereon, the ground being supplied by relay CND2.

At contact 1 relay RR connects ground to conductor 7620 which is extended through the connector to conductor 4820, leading to the sender and thence through the sender link switches as previously traced to conductor 7008, winding of relay F and battery. Relay F, in the manner previously described extends this ground to the winding of relay LC(69) and battery and relay LC(69) locks over conductor 7101 and contact of relay RC0 to ground in the called number register over conductor 7620. With relays LC(69) and RC0 operated a circuit is closed for connecting the district junctor involved in the connection with the associated tape recorder. This circuit may be traced from ground at contact 1 of relay ST, contact 4 of relay RR, through the frame register to conductor 7302 through cable 7501, contact of relay RC0, conductor 7303, contact of relay LC, conductor 6909, contact 8 of relay F, winding of relay L00, over the chain circuit contacts of the L0 relays of the other district junctors, conductor 6601, contact 3 of relay L0, contact 2 of relay L051 to battery at contact 7 of relay ON(13). Relay L00 operates in this circuit, locking to battery at its contact 3 and operating relay L010. Relay L010 when operated closes the previously described circuits for identifying the district junctor and also closes a circuit from ground at contact 10, contact 5 of relay TP(70), contact 9 of relay F, contact of relay LC(69), conductor 7102, winding of relay BC to battery. Relay L010 again connects ground to conductor 7040, completing a circuit over contact 1 of relay ON(13), windings of relay TRA and TR1(13) in series to battery. Relays TRA and TR1(13) operate and lock as before, in turn operating and locking relays TRB and TR2(13) in the manner previously described. With relay AC(9) normal, relay TRB extends its locking ground over its contact 4, winding of relay TRC, contact 7 of relay AC(9), winding of relay TR3 to battery. Relay TRC locks to ground on conductor 7040. Relay TR3 at contact 2 closes a locking circuit for relay BC, and at contact 1 closes a circuit over conductor 1302, contact 5 of relay BC, to conductor 903, which extends through cable 902 over contact 7 of relay L010 of the district junctor, to the winding of relay L00 to hold that relay operated until the record has been completed.

Following the operation of relay TR1(13), relay ON(13) operates and locks to conductor 7040. With relay BC operated, the operation of relay TR1(13) also closes a circuit from ground at contact 4 of relay LK, contact 5 of relay TR1(13), contact 1 of relay BC to the winding of relay B1(9) and battery. Relay B1(9) connects the code and stations conductors coming from the number recorder to the punch magnets. Relay B1(9) at contacts 8, 9 and 10 locks directly to ground at the back contacts of relays CK2, CK3 and CK4. It also locks at contact 7, over conductor 904, contact 1 of relay TRB, conductor 1115 to ground at the back contact of relay CK5. Relay B1(9) supplies battery to the windings of relays T1(11) to T5 and CK1(11), to CK5, operates step magnet 1100 and relay CD(13) and, at contact 4, extends ground over conductor 914 through cable 7301, contact of relay RC0, conductor 7304 to the called number register to operate relays CD1 and CD2 to connect the code and station conductors to the registers of the recorder over contacts of relay RC0. Ground supplied by these registers operates the corresponding punch magnets, in turn operating relays CK2 to CK5. It may be noted that punch magnet 3 is employed in the punching of the A digit code and the circuit closed by its auxiliary contact extends through resistance 1103, over conductor 1104, contact 6 of relay B1(9), conductor 907 to the winding of relay CK2 to provide the necessary operating circuit for relay CK2 if magnet 3 is operated in response to the code digit registered.

As previously described, the stepper magnet 1100 operates relay LK which opens the operating circuit of relay B1(9), connects ground to the winding of relay TR1(13), shunting and releasing relay TRA. When the locking circuits of relay B1(9) are opened, relay B1(9) releases, in turn releasing the stepper magnet to advance the tape for the next set of items and releasing relay LK. Relay LK released also releases relay TR1(13).

When relays CD1 and CD2 of the called number register are operated they connect ground over conductor 7512 to operate relay RH. Relay RH connects ground to conductors 7601 and 7602 to lock the register relays independent of the sender, closes a holding circuit for relays ST, and RR as well as for relay CD0, if that relay is operated, and operates relay CND. Relay CND locks over its contact 3, the contact of relay CND1, contact 5 of relay CND to ground at contact 3 of relay ST. Relay CND also connects ground to conductor 7603 to operate relay CB7 to mark the called number register busy.

The operation of relay RH brings about the disconnection of the called number register from the sender. At contact 1, relay RH connects ground from the back contact of relay RT1, to conductor 7624 which is extended through the connector to conductor 4824, winding of relay ARL and battery. Relay ARL restores the sender to normal as previously described.

With relays TR1(13) and LK released, a circuit is closed from battery through the winding of relay B2, contact 2 of relay BC, contact 2 of relay TR2(13), contact 6 of relay TR1(13), to ground at contact 4 of relay LK. Relay B2 locks at contacts 6, 7, 8 and 9 to relays CK2 to CK5, at contact 1 connects battery to the windings of relays T1(11) to T5 and CK1(11) to CK5, at contacts 2 and 3 operates the stepper magnet and relay CD(13), and at contact 4 connects ground to conductor 906 which is connected through cable 7301 over contact of relay RCO to conductor 7305 through cable 7501, contact 3 of relay CDO, conductor 7505 to the windings of relays ND1 and ND2 and battery, operating relays ND1 and ND2 to connect the conductors grounded by the numerical registers to the recorder. Relays ND1 and ND2 reclose the circuit for relay RH, but that relay is held operated over conductor 7512 through cable 7501, contact of relay RC0, conductor 912 through cable 7301, contact 6 of relay BC, contact 1 of relay TRA and contact 5 of relay TRB to ground, during the interval between the release of relays CD1 and CD2 and the operation of relays ND1 and ND2. Relay B2, operated, extends the numerical conductors to the punch magnets, which are thereupon operated in accordance with the number registered, in turn operating relays CK2 to CK5. The stepper magnet operates relay LK as before, relay LK connecting ground over contact 2 of relay TR1(13) to contact 5 of relay TR2(13), holding the latter relay operated and releasing relay TRB. Relay LK also runs the operating circuit of relay B2 and, when the punch magnets have operated relays CK2 to CK5, the locking circuits of relay B2 are opened and relay B2 releases, releasing the stepper magnet 1100 to advance the tape. When the punch magnets release, relay CD(13) releases, permitting relay LK to release and in turn to release relay TR2(13).

When relays TR2(13) and LK have released, a circuit is closed from battery through the winding of relay B3, contact 3 of relay BC, contact 4 of relay TR3, contact 1 of relay TR2(13), contact 6 of relay TR1(13) to ground at contact 4 of relay LK. Relay B3 operates in this circuit and locks at contacts 6, 7 and 8 to relays CK1(11), CK2 and CK3. Relay B3 at contact 1 supplies battery to relays T1(11) to T5 and CK1(11) to CK5. At contact 2, it closes a circuit for punch magnet 2 to indicate the class of entry and at contacts 3 and 4 operates stepper magnet 1100 and relay CD(13). As before, relay CD(13) operates relay LK, which locks and opens the operating circuit for relay B3. Relay B3 connects conductors 7031, 7032, 7021 and 7022, which were grounded by relay L010 associated with the district junctor, to the punch magnets. Therefore, the third item of the record includes the identity of the district junctor involved in the connection and the class of the entry. The release of the recorder takes place as described for the class 1 record. When the second entry was completed, relay TRB was released in turn releasing relays ND1 and ND2, so that relay RH also releases, opening the locking circuits for relays CD0, RR and the register relays. Relay RH also opens one holding circuit of relay ST. The release of relay RR releases relay CND2 and relay RH opens the operating circuit of relay CND. Relay CND tests for the release of the numerical registers, since it is locked to ground at contacts of all the numerical and stations register relays and holds relay ST operated in a circuit over contact 1 of relay CND to ground at contact 5 of relay RH. Relay CND2 closes a test circuit for the release of the code register relays. This circuit extends from ground at contact 7 of relay RH, contact 6 of relay CND2, conductor 7604, back contacts of relays A4, A3, A2 and A1, conductor 7834, contact 3 of relay CND2, conductor 7605 over the back contacts of the relays of the B code register to conductor 7835, contact 1 of relay CND2, conductor 7606, through the C code register to conductor 7836, contact 7 of relay CND2, contact 2 of relay CND to the winding of relay CND1 and battery. Therefore if the code registers release properly relay CND1 operates, opening the locking circuit of relay CND to release relays CND, ST and CND1 and restore the called number register to normal.

As described previously, when the called subscriber answers, relays L00 and L010 of the district junctor are operated as soon as the tape recorder is free. Ground connected to conductor 7016 by the district junctor completes a circuit through the winding of relay CC to battery. Ground is also connected to conductor 7040 to operate relays TRA and TR1(13) as previously described, relay TR1(13) operating relay ON(13). Since relay CC is operated, the circuit of relays TRB and TR2(13) is open at contact 5 of relay CC and the recorder is arranged to make only a single line entry, which includes the number of the district junctor and the time. The time is obtained from the timing circuit of Figs. 4 to 7 which will be described hereinafter. At contact 4, relay CC connects battery to the winding of relay PU. At contact 3 it closes the circuit of relay C1(10), at contact 2 it prepares the release circuit to the district junctor and at contact 1 it connects the contact of punch magnet 3 to the winding of relay CK1, since magnet 3 is now used to identify a class 3 record.

Relay C1(10) is operated in a circuit over contact 3 of relay CC, contact 5 of relay TR1(13) and contact 4 of relay LK. Relay C1 supplies battery to relays T1(11) to T5 and CK1(11) to CK5, it operates stepper magnet 1100 and relay CD(13), locks to relays CK1 to CK5, operates punch magnet 3 and connects the other punch magnets to the conductors on which the district junctor and the time are indicated. The identity of the district junctor is recorded in the manner previously described. The circuit of relay PU extends over conductor 1000, brush B13 in positions 2 to 10 or 12 to 20, to ground at contact 1 of relay C(6). As will be pointed out hereinafter, relay TCR is operated at the ten-minute intervals and at such times the circuit of relay PU is completed through contact 2 of relay TCR and brush B13 in positions 1 or 11.

When relay PU operates, it locks to ground at its own contact and connects ground to conductor 1001 to close a locking circuit for relays C(6) and C1(6) over contact 7 of relay C(6) to prevent these relays from releasing and stepping any switches while the record is being made. Relay PU also connects conductors 620 to 624 and 630 to 634, grounded in accordance with the two out of five code by brushes B15 and B16, B25 and B26 to indicate the six-second interval, during which the call was completed.

When the punch magnets have operated, in turn operating relays CK1 to CK5, relay C1(10) releases in the manner previously described. The stepper magnet operates relay LK which shunts relay TRA. Relay CD(13) releases, following the release of the punch magnets, in turn releasing relay LK which releases relay TR1(13) and then connects ground over contact 4 of relay LK, contact 6 of relay TR1(13), contact 1 of relay TR2(13), contact 5 of relay TR3, contact 3 of relay ON(13), contact 2 of relay CC to conductor 908 to release the recorder from the district junctor. When the district junctor removes ground from conductors 7016 and 7040, relay CC releases, in turn releasing relay PU, and relay ON(13) releases, restoring the recorder to normal.

The operation of the recorder in recording the time of release by the called subscriber is the same as for the answering time, the entry also consisting of the district identification and the time.

*Local calls*

For calls within the suburban area, no itemized billing is required. Such a call is identified by the marker which grounds conductor 4832 and the winding of relay CD(48) in the sender. Relay CD(48) operated connects ground to conductor 4833 which is extended when the register connector is operated to conductor 7402, winding of relay CD0 and battery. Relay CD0 opens the operating circuit of relays ND1 and ND2 so that no numerical digits can be recorded, disconnects ground from the stations register to prevent recording a stations digit when the code is recorded, and connects ground to conductor 7502. As described for the previous type of call, when the number has been registered, the called number register connects the recorder with the district junctor and with the register, operating relay BC, which in turn operates relay B1, and relays TRA to TR3 are operated as previously described. When the called number register has been connected to the tape recorder, ground on conductor 7502 is extended through cable 7501, contact of relay RC0, to conductor 909 so that, when relay B1 operates, a circuit is completed over contact 5 of relay B1, contact 3 of relay TR2(13), contact 6 of relay CC1, contact 5 of relay CC to the winding of relay TR2(13) and battery to hold relay TR2(13) and shunt and release relay TRB. Therefore, when relay LK releases relays TRA and TR1(13), following the punching of the first entry, and relay B1 is released, relay TR2(13) also releases and relay B3 is operated to control the recording of the district junctor number. It will be remembered that the locking circuit of relay B1 controlled by relay CK5 extends over contact 1 of relay TRB. Therefore, in connection with a call on which no stations digit is to be recorded, the release of relay TRB, immediately following the operation of relay B1 opens the locking circuit associated with the stations digit and permits relay B1 to release without a stations record.

*Timing circuit*

As pointed out above, the timing circuit comprises a timer individual to the recorder which counts six-second intervals under the control of a master timer. Each time that the master timer 600 closes its contact, a circuit is closed from ground, over the timer contact, through the lower winding of relay C(6), winding of relay C1(6) to battery. Relays C(6) and C1(6) operate in series. Relay C1(6) is slow to release and closes a supplementary circuit through the upper winding of relay C(6). Relay C(6) in operating, at contact 1 disconnects ground from brush B13 and at contact 7 prepares a locking circuit for itself over conductor 1001.

Whenever the recorder is ready to make a time record it tests for the ground supplied to conductor 1000 over brush B13 and connects ground to conductor 1001 to lock relay C(6), if it is operated by the master timer, to prevent the brushes of the timer from moving while a record is being made. The supplementary circuit for relay C(6) closed by slow relay C1(6) allows time for the locking circuit to be completed if the recorder seizes the timer just before relay C(6) is operated.

Relay C(6), at contact 6 completes a circuit for relay B2H, which in turn closes an obvious circuit for stepping magnet B2. Magnet B2 operates and prepares to step switch B2. When relay C(6) releases, relay B2H releases, releasing magnet B2 and advancing switch B2 one step. Therefore switch B2 advances one step at each six-second interval.

When switch B2 has been advanced ten steps, the next operation of relay C(6) closes a circuit from ground over contact 4 of relay C(6), brush B22 in position 10, through the winding of relay B1H to battery. Relay B1H closes an obvious circuit for magnet B1 which operates and prepares to step switch B1. The release of relay C(6) opens the circuits of relays B2H and B1H, which release magnets B2 and B1. Therefore switch B1 advances one step at each sixty-second, or one-minute interval.

Similarly, when switch B1 has advanced ten steps, switch A3 is advanced one step, to mark a ten-minute interval, under the control of relay C(6) and brush B12. After ten steps of switch A3, switch A2 is advanced one step and after ten steps of switch A2, switch A1 is advanced one step.

The stepping switches employed in the timer have twenty-two sets of terminals and therefore switches B2, B1, A3 and A2 are wired to also close the stepping circuit for the next switch when they reach position 20. When switch B2 steps to position 21, a circuit is closed from battery, through the winding of relay B2H, back contact of stepping magnet B2, brush B21 and its twenty-first terminal to ground. Relay B2H operates, in turn operating magnet B2 which opens the circuit of relay B2H. Relay B2H releases, in turn releasing magnet B2 to step switch B2 to position 22 where the circuit for relay B2H is again closed and switch B2 is stepped to normal. Similar circuits are provided for stepping switches B1, A3 and A2 over positions 21 and 22.

*Ten-minute record*

As indicated above, the time recorded as the answering or releasing time is the six-second interval within which the answer or release occurs. One hundred such intervals make up ten minutes which is regarded as the base time. At the beginning of each ten-minute interval an entry is made on the tape independent of the calls in progress. When switch B1 stands in position 1 or 11, at the beginning of the day or after one hundred six-second intervals have been counted, a circuit is closed from ground over brush B14 in position 1 or 11, conductor 603, contact 4 of relay TCR, conductor 701, winding of relay L051 to battery at contact 7 of relay ON(13) if the recorder is idle or as soon as it becomes idle. Relay L051 locks to battery at its contact 3 and at contact 2 opens the chain circuit to the district junctor L0 relays to prevent one of them seizing the recorder. With all of the junctor L0 relays released, ground is connected to conductor 6600 as previously described, over contact 1 of relay L0, contact 1 of relay L051, winding of relay CC1 to battery.

Relay CC1 at contacts 2, 3 and 4 prepares circuits for relays C3 and C4, at contact 6 opens the operating circuit for relay TR2(13) and at contact 5 closes a circuit from battery, through resistance 1201, over contact 5 of relay CC1, winding of relay PU1, conductor 707, contact 1 of relay TCR, brush B13, now in position 1 or 11, to ground at contact 1 of relay C(6). Relay PU1 operates and locks to ground over its contact 4, and at contact 3 connects ground to conductor 1001 to provide a locking circuit for relays C(6) and C1(6) if they should happen to be operated, thus preventing the advance of the timing switches while the recording is in progress. Relay CC1 also connects ground to conductor 7040, to operate relays TRA and TR1(13). With relay TR1(13) operated, relay ON(13) is operated and locked to conductor 7040. At contact 5, relay TR1(13) closes a circuit from ground at contact 4 of relay LK, contact 5 of relay TR1(13), contact 3 of relay CC1, contact 7 of relay CL to the winding of relay C4 and battery. Relay C4 operates in this circuit, locking over conductors 1111 to 1114 to ground at the back contacts of relays CK1(11) to CK4. Relay C4 closes battery over conductor 802 to the windings of relays T1(11) to T5 and CK1(11) to CK5, and also closes operating circuits for stepper magnet 1100 and relay CD(13). In addition, relay C4 closes circuits from the punch magnets to ground over brushes A15 and A16, A25 and A26, A35 and A36, to record the three digits identifying the ten-minute interval. Since the hundreds digit is only zero or one, it is recorded by punch magnets 4 to 7, while the tens and units digits are recorded in accordance with the usual two out of five code. Magnet 2 is also operated to give a time class identification.

As in the case of the other entries, stepper magnet 1100 operates relay LK, relay LK releases relay TRA and, when relays CK1(11) to CK4 have operated, releases relay C4. The release of the punch magnets releases relay CD(13) and in turn relays LK and TR1(13). When relay TR1(13) releases, a circuit is closed from ground at contact 4 of relay LK, contact 6 of relay TR1(13), contact 1 of relay TR2(13), contact 5 of relay TR3, contact 3 of relay ON(13), contact 1 of relay CC1, conductor 708 to the winding of relay TCR and battery. Relay TCR locks over its contact 3, conductor 603 to ground over brush B14. The operation of relay TCR opens the circuit of relay L051, which releases in turn releasing relay CC1. The recorder is now restored to normal. Relay TCR remains operated until switch B1 is stepped forward at the end of the minute. During this time the circuit of relay PU in the recorder circuit is extended over contact 2 of relay TCR to the contacts of brush B13 in positions 1 and 11.

*Reset of timer*

At the beginning of each day, the timing switches are reset, the tape is stepped forward and a record is made of the day and month, together with the number of the building and of the recorder.

As pointed out heretofore, in describing the timing circuit, switches A1, A2 and A3 are advanced to measure off one hundred and forty-four ten-minute intervals and at the end of the day switch A1 will stand in position 2, switch A2 in position 5 and switch A3 in position 5. When switch A3 is stepped to position 5, a circuit is closed from battery through the winding of relay RST, brush A12 in position 2, brush A22 in position 5, brush A32 in position 5 to ground. Relay RST locks over contact 4 to ground at contact 5 of relay TCR.

After switches B1 and B2 have counted the one hundred six-second intervals which make up the last ten minutes of the day, brush B14 will be in position 1 or 11, and will close the circuit previously traced for relay L051. Relay L051 opens the chain circuit, excluding the tape recorder from the district junctors and sender link control circuit. It also operates relay CC1 as previously described, which in turn operates relay PU1. Relay RST connects ground over contact 11 to conductor 705, operating relay CL(12). With relay PU1 operated, relay RST closes a circuit from ground over contact 10, conductor 706, contact 6 of relay PU1, conductor 1200 to the winding of relay DR1 and battery. Relay DR1 prepares the day and month circuit for advancement. When all recorders are ready to start the new day's tape and have operated their corresponding DR relays, the day units switch D2 is advanced, together with the day tens switch D1 and month switch M if necessary.

With switch A3 in position 5 and relay RST operated, a circuit is closed from battery through the winding of relay A3H, back contact of magnet A3, brush A31 and its strapped contacts 5 to 10, contact 1 of relay RST to ground. Relay A3H operates magnet A3 and switch A3 is advanced under the reciprocal control of relay A3H and magnet A3 to position eleven or one. When switch A3 reaches that position, it connects ground over brush A32 to conductor 604 completing a circuit over contact 2 of relay RST and the strapped contacts of brush A21, back contact of magnet A2, to the winding of relay A2H and battery. Relay A2H operates magnet A2 and switch A2 is advanced under the reciprocal control of relay A2H and magnet A2 to position one or eleven.

At contacts 3 and 7, relay RST closes a circuit from ground over contact 7 of relay RST, back contact of magnet A1, brush A11 and its strapped contacts, contact 3 of relay RST, conductor 702, contact 2 of relay PU1, conductor 801 to the winding of the stepper magnet 1100 of the recorder. Magnet 1100 operates and connects ground to conductor 1101, contact 7 of relay LK, conductor 1303, contact 5 of relay PU1, conductor 703, contact 8 of relay RST to the winding of relay A1H and battery. Relay A1H operates magnet A1 which releases the stepper magnet 1100 to in turn release relay A1H and magnet A1. Therefore switch A1 and the recorder tape are stepped alternately until switch A1 reaches position 20, in which position the circuit of the stepper magnet is opened and a circuit closed which may be traced from ground to brush A11 as before and over contact 20 of that brush, contact 5 of relay RST, conductor 704, contact 1 of relay PU1 to the winding of relay C2(12) and battery.

When relay CC1 was operated, it operated relays TR1(13) and TRA as described for the ten-minute record. Since relay CL(12) is now operated, relay TRA extends its locking ground over its contacts 2 and 3, through the winding of relay TRB, contact 1 of relay CL, contact 5 of relay CC to the winding of relay TR2(13) and battery. Relays TRB and TR2(13) operate and lock, relay TRB extending its locking ground to the winding of relay TRC, contact 7 of relay AC, winding of relay TR3 and battery. Relay TRC also locks itself and relay TR3 to ground on conductor 7040.

Relay C2(12) locks over conductors 1111 to 1115 under the control of relays CK1(11) to CK5, supplies battery to the windings of these relays, operates the stepper magnet 1100 and relay CD(13). With relay C2(12) operated, ground is supplied for operating the punch magnets in accordance with the codes for a two-digit number identifying the building number and a two-digit number identifying the recorder. These circuits are indicated schematically at the upper contacts of relay C2(12). In addition, ground is supplied over contact 3 of relay CL, and a contact of relay C2(12) to conductor 803 for operating punch magnet 1 to indicate this to be a class 1 time record. At the same time the operation of the stepper magnet closes the circuit above traced for relay A1H which operates, in turn operating magnet A1. Magnet A1 opens the operating circuit of relay C2(12) which releases as soon as its locking circuits are opened in the usual manner, in turn releasing the stepper magnet 1100. Relay A1H is held operated at this time by ground over contact 8 of relay LK.

As previously described, the punching of these numbers operates and releases relay LK to release relays TRA and TR1(13). When relay LK releases, relay A1H releases, in turn releasing magnet A1 and stepping switch A1 to position 21. Relay LK also closes a circuit from ground at contact 4 of relay LK, contact 6 of relay TR1, contact 2 of relay TR2(13), contact 2 of relay CC1, contact 5 of relay CL(12) to the winding of relay C3 and battery. Relay C3 performs the same control functions as relay C2, except that it provides no time class indication and therefore does not lock to conductor 1111. It closes four pairs of circuits from the punch magnets to ground supplied by relays R10 to R17, R20 to R27, R30 to R37 and R40 to R47 which are operated from the brushes of the month and day switches M, D1 and D2 in the two out of five code to indicate the day of the month for which the record is about to start. When this record has been entered, relays TRB, TR2(13) and C3 are released, relay A1H being operated by the stepper magnet to advance switch A1 to position 22. When relay LK is released in the manner previously described, relay LK closes a circuit over contact 6 of relay TR1(13), contact 1 of relay TR2(13), contact 4 of relay TR3, contact 4 of relay CC1, contact 6 of relay CL to the winding of relay C4 and battery.

Relay C4 causes the printing of the base or ten-minute time 000, under the control of switches A1, A2 and A3. Switches A1 and A2 were restored to position 1 as previously described, but the contacts of brushes A15 and A16 in position 22 are connected in multiple with those in position 1 to permit printing the hundreds digit zero at this time.

The stepper magnet 1100 operates relay A1H which in turn operates magnet A1, and relay LK holds relay A1H operated until after the record has been printed. When operated, relay LK releases relay TRC and holds relay TR3 as previously described and when released permits relay TR3 to release, thereupon closing a circuit from ground at contact 4 of relay LK, contact 6 of relay TR1(13), contact 1 of relay TR2(13), contact 5 of relay TR3, contact 3 of relay ON(13), contact 1 of relay CC1, conductor 708, winding of relay TCR and battery. Relay TCR locks over its contact 3, under the control of brush B14 as previously described. At contact 1 relay TCR opens the circuit of relay PU1 and at contact 2 prepares the circuit of relay PU. At contact 4, relay TCR opens the circuit of relay CC1 and at contact 5 opens the locking circuit of relay RST.

Switch A1 has now been advanced to position 1 by the release of relay A1H. Relay RST opens the stepping circuits for relays A3H and A2H, disconnects relay A1H from the recorder circuit and again places it under the control of switch A2, releases relay CL(12) and opens the circuit of relay DR1. The release of relay PU1 opens the holding circuit of relays C(6) and C1(6). The timing circuit and recorder are now ready to make the records of the new day.

What is claimed is:

1. In a telephone system for the automatic billing of connections, a calling line, line switches for extending a connection from said calling line, a control circuit for operating said line switches, means in said control circuit for identifying said calling line and for operating said switches to extend said calling line, a tape recorder and means to transfer the identity of said line from said control circuit directly to said tape recorder.

2. In a telephone system for the automatic billing of connections, a calling line, line switches for extending a connection from said calling line, a control circuit for operating said line switches, means in said control circuit for identifying said calling line, means under the control of said identifying means for operating sid line switches to extend said calling line, a recorder and means to transfer the identity of said line from said control circuit to said recorder.

3. In a telephone system for the automatic billing of connections, a calling line, line switches for extending a connection from said calling line, a control circuit for operating said line switches, means in said control circuit for identifying said calling line, means under the control of said identifying means for operating said line switches to extend said calling line, means responsive to the operation of said switches to release said control circuit, a recorder and means to transfer the identity of said line from said control circuit to said recorder before releasing said control circuit.

4. In a telephone system for the automatic billing of connections, a calling line, line switches for extending a connection from said calling line, a control circuit for operating said line switches, means in said control circuit for identifying said calling line and operating said line switches to extend said calling line, a recorder, means to transfer the identity of said line from said control circuit to said recorder, means to release said control circuit, and means in said recorder to render said release means ineffective.

5. In a telephone system for the automatic billing of connections, a calling line, line switches for extending a connection from said calling line, a control circuit for operating said line switches, means in said control circuit for identifying said calling line, means under the control of said identifying means for operating said line switches to extend said calling line, a recorder, means to transfer the identity of said line from said control circuit to said recorder, means to release said control circuit, and means in said recorder to render said release means ineffective.

6. In a telephone system for the automatic billing of connections, a calling line, line switches for extending a connection from said calling line, a control circuit for operating said line switches, means in said control circuit for identifying said calling line, means under the control of said identifying means for operating said line switches to extend said calling line, a recorder, means to transfer the identity of said line from said control circuit to said recorder, means responsive to the operation of said switches to release said control circuit, and means in said recorder to render said release means ineffective.

7. In a telephone system for the automatic billing of connections, a calling line, line switches for extending a connection from said calling line, a control circuit for operating said line switches, means in said control circuit for identifying said calling line and for operating said line switches to extend said calling line, a tape recorder, means to transfer the identity of said line from said control circuit directly to said recorder, means to release said control circuit, means associated with said tape recorder to render said release means ineffective, and means responsive to the complete transfer of said line identity to said tape recorder to render said release means effective.

8. In a telephone system for the automatic billing of connections, subscribers' lines, line switches serving a plurality of subscribers' lines, said switches arranged in a plurality of vertical and horizontal rows on a frame, a control circuit individual to said frame, means responsive to the initiation of a call by one of said lines for starting said control circuit, means in said control circuit for identifying the horizontal row and the vertical row in which the switch serving the calling line is located and the position of said line in said switch, means for employing said identifications to operate said switch to extend said calling line, a recorder, and means to transfer said identifications to said recorder.

9. In a telephone system for the automatic billing of connections, subscribers' lines, primary and secondary line switches serving a plurality of subscribers' lines, said switches arranged on a frame, a control circuit individual to said frame, means responsive to the initiation of a call by one of said lines for starting said control circuit, means in said control circuit for identifying the position of said line, a district junctor frame, a control circuit individual to said district junctor frame, means to associate said line frame control circuit with said junctor frame control circuit, means in said junctor frame control circuit to select an idle district junctor, means under the joint control of said control circuits to operate said line switches to connect said calling line with said idle district junctor, means responsive to the connection of said line with said district junctor to release said control circuits, a recorder individual to said district junctor frame, and means effective during the association of said line frame control circuit and said junctor frame control circuit to transfer said line identification to said recorder.

10. In a telephone system for the automatic billing of connections, subscribers' lines, primary and secondary line switches serving a plurality of subscribers' lines, said primary switches arranged in a plurality of vertical and horizontal rows on a frame, a control circuit individual to said frame, means responsive to the initiation of a call by one of said lines for starting said control circuit, means in said control circuit for identifying the horizontal row and the vertical row in which the switch serving the calling line is located and the position of said line in said switch, a district junctor frame, a plurality of groups of district junctors on said frame, a control circuit individual to said district junctor frame, means to associate said line frame control circuit with said junctor frame control circuit, means in said junctor frame control circuit to select a group of district junctors, a recorder individual to said district junctor frame, means responsive to said group selection to transfer said line identification to said recorder, means in said junctor frame control circuit to select an idle district junctor in said group and means under the joint control of said control circuits to operate said line switches to connect said calling line with said idle district junctor.

11. In a telephone system for the automatic billing of connections, subscribers' lines, primary and secondary line switches serving a plurality of subscribers' lines, said primary switches arranged in a plurality of vertical and horizontal rows on a frame, a control circuit individual to said frame, means responsive to the initiation of a call by one of said lines for starting said control circuit, means in said control circuit for identifying the horizontal row and the vertical row in which the switch serving the calling line is located and the position of said line in said switch, a district junctor frame, a plurality of groups of district junctors on said frame, a control circuit individual to said district junctor frame, means to associate said line frame control circuit with said junctor frame control circuit, means in said junctor frame control circuit to select a group of district junctors, a recorder individual to said district junctor frame, means responsive to said group selection to transfer said line identification to said recorder, means in said junctor frame control circuit to select an idle district junctor in said group, means under the joint control of said control circuits to operate said line switches to connect said calling line with said idle district junctor, means in said recorder to connect said district junctor with said recorder, means in said district junctor to transmit the identity of said junctor to said recorder, and means in said recorder to release said control circuits.

12. In a telephone system for the automatic billing of connections, a recorder, means in said recorder for recording a calling line number, means for recording a called line number, means for recording the time of completing or releasing a connection, district junctors included in telephone connections, means in said district junctors for transmitting a junctor identification to said recorder, means for operating one of said junctor identification transmitting means each time that said recorder makes a record, said transmitting means being operated under the control of said recorder or under the control of said junctor in accordance with the type of record made.

13. In a telephone system for the automatic billing of connections, a recorder, means in said recorder for recording a calling line number, means for recording a called line number, means for recording the time of completing or releasing a connection, district junctors included in telephone connections, means in said district junctors for transmitting a junctor identification to said recorder, means for operating one of said junctor identification transmitting means each time that said recorder makes a record, said transmitting means being operated under the control of said recorder when recording a calling line number and under the control of said junctor when making said other records.

14. In a telephone system for the automatic billing of connections, a recorder, means for registering a calling line number, means in said recorder for connecting said calling line number registering means with said recorder for recording a calling line number, a called line number register, means for connecting said called line number register with said recorder for recording a called line number, means for recording the time of completing or releasing a connection, district junctors included in telephone connections, means in said district junctors for transmitting a junctor identification to said recorder, means for operating one of said junctor identification transmitting means each time that said recorder makes a record, said transmitting means being operated under the control of said recorder, under the control of said called line number register connecting means, or under the control of said junctor when making said other records.

15. In a telephone system for the automatic billing of connections, a calling line, a called office, a register sender, means for connecting said line with said sender, means for registering the designation of a called line in said sender, a marker, means to connect said sender with said marker and to transmit a part of said designation to said marker, means in said marker to control the extension of said calling line to said called office and to transmit to said sender an indication of the type of charge to be made, a called number register, means to transmit said designation from said sender to said called number register, a recorder, means in said called number register to transmit said designation to said recorder and means under the control of said charge type indicating means to determine how much of said designation shall be transmitted.

16. In a telephone system for the automatic billing of connections, a calling line, a called office, a register sender, means for connecting said line with said sender, means for registering the designation of a called line in said sender, a marker, means to connect said sender with said marker and to transmit a part of said designation to said marker, means in said marker to control the extension of said calling line to said called office and to transmit to said sender an indication of the type of charge to be made, a called number register, means to transmit said designation from said sender to said called number register, a recorder, means in said called number register to transmit said designation to said recorder and means under the control of said charge type indicating means to determine whether all of said designation or only said part shall be transmitted.

17. In a telephone system for the automatic billing of connections, a calling line, a called office, a register sender, means for connecting said line with said sender, means for registering the code of the called office and the number of a called line terminating therein in said sender, a marker, means responsive to the registration of said office code in said sender to connect said sender with said marker and to transmit said office code to said marker, means in said marker operated in accordance with said code to control the extension of said calling line to said called office and to transmit to said sender an indication of the type of charge to be made, a called number register, means to transmit said called office code and said called line number from said sender to said called number register, a recorder, means in said called number register to transmit said code to said recorder, means to transmit said called line number to said recorder and means under the control of said charge type indicating means to render said last mentioned transmitting means ineffective.

18. In a telephone system for the automatic billing of connections, a calling line, a called office, a register sender, means for connecting said line with said sender, means for registering the code of the called office and the number of a called line terminating therein in said sender, a marker, means responsive to the registration of said office code in said sender to connect said sender with said marker and to transmit said code to said marker, means in said marker operated in accordance with said code to extend said calling line to said called office and to transmit to said sender an indication of the type of charge to be made, a called number register, means to transmit said called office code and said called line number from said sender to said called number register, a recorder, means in said called number register to transmit said code to said recorder, means to transmit said called line number to said recorder, means to transmit a pass-by signal to said recorder and means under the control of said charge type indicating means to determine which of said last mentioned two means shall be effective.

19. In a telephone system for the automatic billing of connections, a calling line, a called office, a register sender, means for connecting said line with said sender, means for registering the code of the called office and the number of a called line terminating therein in said sender, a marker, means responsive to the registration of said office code in said sender to connect said sender with said marker and to transmit said code to said marker, means in said marker operated in accordance with said code to extend said calling line to said called office and to transmit to said sender an indication of the type of charge to be made, a called number register, means to transmit said called office code and said called line number from said sender to said called number register, a recorder, means in said called number register to transmit said code to said recorder, means to transmit said called line number to said recorder, means to transmit a pass-by signal to said recorder, means under the control of said charge type indicating means to determine which of said last mentioned two means shall be effective and means under the control of said pass-by signal to modify the operation of said recorder.

20. In a telephone system for the automatic billing of connections, a calling line, a called office, a register sender, means for connecting said line with sender, means for registering the code of the called office and the number of a called line terminating therein in said sender, a marker, means responsive to the registration of said office code in said sender to connect said sender with said marker and to transmit said code to said marker, means in said marker operated in accordance with said code to extend said calling line to said called office and to transmit to said sender an indication of the type of charge to be made, a called number register, means to transmit said called office code and said called line number from said sender to said called number register, a recorder, means in said called number register to transmit said code to said recorder, means to transmit said called line number to said recorder, means to operate said recorder through a plurality of stages to record said code and said line number, means to transmit a pass-by signal to said recorder, means under the control of said charge type indicating means to determine which of said last mentioned two means shall be effective, and means under the control of said pass-by signal to advance said recorder through one of said stages to omit the corresponding record.

21. In a telephone system for the automatic billing of connections, a calling line, a called office, a register sender, means for connecting said line with said sender, means for registering the code of the called office and the number of a called line terminating therein in said sender, a marker, means responsive to the registration of said office code in said sender to connect said sender with said marker and to transmit said office code to said marker, means in said marker operated in accordance with said code to control the extension of said calling line to said called office, a called number register, means to transmit said called office code and said called line number from said sender to said called number register, a recorder, means to connect said called number register with said recorder to transmit said called office code and line number to said recorder, and means responsive to said connection to disconnect said sender from said line.

22. In a telephone system for the automatic billing of connections, a calling line, a called office, a register sender, means for connecting said line with said sender, means for registering the code of the called office and the number of a called line terminating therein in said sender, a marker, means responsive to the registration of said office code in said sender to connect said sender with said marker and to transmit said office code to said marker, means in said marker operated in accordance with said code to control the extension of said calling line to said called office, a called number register, means to transmit said called office code and said called line number from said sender to said called number register, a recorder, means to connect said called number register with said recorder, to transmit said called office code and line number to said recorder, means normally responsive to said connection to disconnect said sender from said line and means under the control of said marker to release said sender independent of said called number register and said recorder.

23. In an automatic telephone system, a plurality of lines each capable of calling or being called, trunks over one of which a calling line is connected to a selectively called line, each said trunk having an identifying designation, means operable incident to the making of any such call for uniquely identifying said calling line, means for registering the identification of said called line, a recorder, means operable incident to interconnecting two of said lines over said trunk to operate said recorder to record the calling line identification, the called line identification, and means to cause said recorder to record with said recorded identifications the identification of said utilized trunk.

24. In an automatic telephone system, in combination with lines and trunks each having an identifying designation, means for selectively establishing and disconnecting a talking connection between one line as a calling line and another line as a called line over said trunk, means for identifying said calling line, means for identifying said trunk, means for registering the designation of said called line, means for determining the times at which said connection is established and terminated, and means responsive to selective establishment and termination of a call for causing said recorder to record the calling line identification, the called line identification, the times of establishment and termination of the call and associated with each such record a record of the trunk designation.

25. In an automatic recording telephone system, in combination with calling lines, called lines, and trunks, said lines and trunks each having an individual identifying designation, means remotely controlled over one of said lines used as a calling line for establishing connection between said calling line and one of said lines as a selectively called line over one of said trunks, means for seizing one of said trunks for establishing said connection, means for identifying said calling line, means for identifying said seized trunk, means for registering the designation of said called lines, a recorder having an elongated recording medium, interconnections for causing said recorder to respond to and record under control of said trunk identifying means, said line identifying means, and said registering means to record on said medium a group of information indicia relating to each of said connections including an identification of the trunk used therefor.

26. In an automatic recording telephone system, in combination with calling lines, called lines, and trunks, said lines and trunks each having an identifying designation, means including means for seizing one of said trunks for establishing talking connections between said calling lines and said called lines over said seized trunks, means for identifying said calling lines, means for identifying the one of said trunks seized for each such connection, means for registering the designations of said called lines, means for determining the times at which said connections are established and terminated, a recorder having an elongated recording medium upon which it records indicia capable of machine sensing, and means causing said recorder to respond to said trunk identifying means, to said line identifying means, to said registering means, and to said time-determining means, incident to each connection, to record on said medium information in the form of such indicia relating to each of said connections.

27. The method of making telephone call records which comprises the recording on a common medium, in approximately the time order in which the events occur, of a plurality of separate entries relating to a plurality of telephone interconnections and disconnections, employing a plurality of interconnecting transmission trunks and the recording in each of said entries of an identification of the trunk involved in the connection or disconnection to which said entry relates.

28. The method of recording a telephone call record which comprises the recording upon a single record medium of a plurality of separate entries relating to said call, the recording at random, intervening between said entries, of similar entries relating to other calls, and the recording in fixed association with each of said entries of an identification of the trunk over which said call to which the entry relates is made.

29. The method of making a telephone call record suitable for automatic sorting and assembly of charges for calls which comprises the recording successively upon one medium of an entry containing an identification of the calling line and an identification of which of a plurality of trunks over which each successive call is made, the recording together of an entry containing an identification of the called line and an identification of the trunk over which each successive call is made, the recording together of an entry containing an indication of the time when a talking connection is established and an identification of the trunk over which said call is made, and the recording together of an entry containing an indication of the time when the talking connection is terminated and an identification of the trunk over which said call is made.

30. In an automatic recording telephone system, including a plurality of lines, the combination with a calling line, a called line, and a trunk and means for establishing and terminating under remote control over a calling line a talking connection between said calling line and said called line over said trunk, of means for recording an entry containing an identification of said calling line, means for recording an entry containing an identification of said called line, means for recording an entry containing an indication of the time when said talking connection is established, and means for recording an entry containing an indication of the time when said talking connection is terminated, means for recording an identification of said trunk in association with each and every of said other entries as a fixed part thereof.

31. In a telephone system, in combination, a plurality of lines one of which may function as a called line, selective means for establishing association of said calling line with a called line, a trunk having an identifying designation, means for establishing a connection between said calling line and said called line over said trunk, means for recording a plurality of entries relating to said connection, and means for recording in each of said entries the designation of said trunk.

32. In a telephone system, in combination, lines usable as calling lines, any of said lines capable of being a called line, trunks each having an identifying designation, means for seizing said trunks individually for establishing a plurality of connections between a plurality of said calling lines and a plurality of said called lines over a corresponding plurality of said trunks, means for recording on a common medium a plurality of discrete entries relating to each of said connections, and means for recording in each of said entries the designation of the seized trunk over which the connection to which said entry relates is made.

CHESTER E. BROOKS.
WARREN W. CARPENTER.

REFERENCES CITED

The following references are of record in the file of this patent:

UNITED STATES PATENTS

| Number | Name | Date |
|---|---|---|
| 2,235,803 | Carpenter | Mar. 18, 1941 |
| 2,369,868 | Taylor et al. | Feb. 20, 1945 |
| 2,370,736 | Kittredge | Mar. 6, 1945 |
| 2,373,908 | Ostline | Apr. 17, 1945 |
| 2,402,700 | Williams | June 25, 1946 |
| 2,513,112 | Shepherd | June 27, 1950 |